US010523618B2

(12) United States Patent
Davis et al.

(10) Patent No.: US 10,523,618 B2
(45) Date of Patent: Dec. 31, 2019

(54) COMPUTATIONAL SYSTEMS AND METHODS FOR IDENTIFYING A COMMUNICATIONS PARTNER

(75) Inventors: Marc E. Davis, San Francisco, CA (US); Matthew G. Dyor, Bellevue, WA (US); William Gates, Redmond, WA (US); Xuedong Huang, Bellevue, WA (US); Roderick A. Hyde, Redmond, WA (US); Edward K. Y. Jung, Las Vegas, NV (US); Jordin T. Kare, Seattle, WA (US); Royce A. Levien, Lexington, MA (US); Richard T. Lord, Tacoma, WA (US); Robert W. Lord, Seattle, WA (US); Qi Lu, Bellevue, WA (US); Mark A. Malamud, Seattle, WA (US); Nathan P. Myhrvold, Bellevue, WA (US); Satya Nadella, Clyde Hill, WA (US); Daniel Reed, Redmond, WA (US); Harry Shum, Medina, WA (US); Clarence T. Tegreene, Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 783 days.

(21) Appl. No.: 13/374,246

(22) Filed: Dec. 16, 2011

(65) Prior Publication Data
US 2013/0060866 A1 Mar. 7, 2013

Related U.S. Application Data

(63) Continuation of application No. 13/374,247, filed on Dec. 16, 2011, now Pat. No. 10,263,936, and a
(Continued)

(51) Int. Cl.
*H04W 8/00* (2009.01)
*H04L 12/58* (2006.01)
(Continued)

(52) U.S. Cl.
CPC .............. *H04L 51/28* (2013.01); *G06F 15/16* (2013.01); *H04L 67/30* (2013.01); *H04W 8/005* (2013.01)

(58) Field of Classification Search
USPC ........................................................ 709/206
See application file for complete search history.

(56) References Cited

U.S. PATENT DOCUMENTS 5,870,473 A 2/1999 Boesch et al.
5,878,141 A 3/1999 Daly et al.
(Continued)

FOREIGN PATENT DOCUMENTS

WO WO 2011/021924 A1 2/2011

OTHER PUBLICATIONS

Smith, "Cell Phone Triangulation Accuracy Is All Over the Map" (Year: 2008).*
(Continued)

*Primary Examiner* — Shirley X Zhang

(57) ABSTRACT

Methods, apparatuses, computer program products, devices and systems are described that carry out accepting at least one email communication from at least one member of a network; disambiguating the at least one search term including associating the at least one search term with at least one of network-participation identifier data or device-identifier data; and presenting the sender profile in association with the at least one email communication.

20 Claims, 60 Drawing Sheets

Related U.S. Application Data continuation-in-part of application No. 13/199,832, filed on Sep. 7, 2011, now Pat. No. 9,747,561, and a continuation-in-part of application No. 13/199,829, filed on Sep. 9, 2011, now Pat. No. 9,183,520, and a continuation-in-part of application No. 13/200,806, filed on Sep. 30, 2011, now Pat. No. 10,074,113, and a continuation-in-part of application No. 13/200,810, filed on Sep. 30, 2011, now Pat. No. 9,141,977, and a continuation-in-part of application No. 13/373,542, filed on Nov. 16, 2011, now Pat. No. 9,928,485, and a continuation-in-part of application No. 13/373,572, filed on Nov. 17, 2011, now Pat. No. 9,690,853, and a continuation-in-part of application No. 13/373,871, filed on Dec. 2, 2011, now Pat. No. 9,167,099, and a continuation-in-part of application No. 13/373,872, filed on Dec. 2, 2011, now Pat. No. 9,473,647.

(51) Int. Cl.
*G06F 15/16* (2006.01)
*H04L 29/08* (2006.01)

(56) References Cited

U.S. PATENT DOCUMENTS

| | | | |
|---|---|---|---|
| 5,944,787 A * | 8/1999 | Zoken | G06Q 10/107 709/200 |
| 5,978,373 A | 11/1999 | Hoff et al. | |
| 5,987,440 A | 11/1999 | O'Neil et al. | |
| 5,988,497 A | 11/1999 | Wallace | |
| 6,018,761 A * | 1/2000 | Uomini | G06Q 10/107 709/206 |
| 6,092,053 A | 7/2000 | Boesch et al. | |
| 6,141,010 A | 10/2000 | Hoyle | |
| 6,526,436 B1 | 2/2003 | Shiraishi et al. | |
| 6,763,020 B1 | 7/2004 | Hon | |
| 7,016,866 B1 | 3/2006 | Chin et al. | |
| 7,246,315 B1 | 7/2007 | Andrieu et al. | |
| 7,318,049 B2 | 1/2008 | Iannacci | |
| 7,334,184 B1 | 2/2008 | Simons | |
| 7,340,048 B2 | 3/2008 | Stern et al. | |
| 7,376,714 B1 * | 5/2008 | Gerken | G06Q 30/02 709/219 |
| 7,562,048 B1 | 7/2009 | Sunde et al. | |
| 7,636,853 B2 | 12/2009 | Cluts et al. | |
| 7,761,591 B2 | 7/2010 | Graham | |
| 7,831,684 B1 * | 11/2010 | Lawler | G06Q 10/10 709/200 |
| 7,853,472 B2 | 12/2010 | Al-Abdulqader et al. | |
| 7,895,177 B2 | 2/2011 | Wu | |
| 7,925,708 B2 * | 4/2011 | Davis et al. | 709/206 |
| 8,024,399 B2 | 9/2011 | Reisman | |
| 8,131,594 B1 * | 3/2012 | Yehoshua | G06Q 30/02 705/14.53 |
| 8,135,800 B1 | 3/2012 | Walsh et al. | |
| 8,244,556 B1 | 8/2012 | Ringold | |
| 8,256,013 B1 | 8/2012 | Hernacki et al. | |
| 8,296,179 B1 * | 10/2012 | Rennison | G06Q 30/0251 705/14.53 |
| 8,332,517 B2 | 12/2012 | Russell | |
| 8,365,257 B1 | 1/2013 | Causey et al. | |
| 8,375,331 B1 | 2/2013 | Mayers | |
| 8,386,353 B2 * | 2/2013 | Hirson | G06Q 20/10 705/35 |
| 8,549,412 B2 * | 10/2013 | Brezina | H04M 15/00 707/758 |
| 8,595,069 B2 * | 11/2013 | Shkedi | G06Q 30/02 705/14.4 |
| 8,600,343 B2 * | 12/2013 | Brezina | H04M 15/00 455/405 |
| 8,650,103 B2 * | 2/2014 | Wilf et al. | 705/35 |
| 8,655,721 B2 | 2/2014 | McAuliffe et al. | |
| 8,713,027 B2 * | 4/2014 | Forutanpour et al. | 707/748 |
| 8,768,838 B1 | 7/2014 | Hoffman | |
| 8,863,256 B1 | 10/2014 | Addepalli et al. | |
| 8,930,402 B1 | 1/2015 | Singh | |
| 9,159,055 B2 * | 10/2015 | Davis | G06Q 50/01 |
| 9,167,099 B2 * | 10/2015 | Davis | H04M 7/128 |
| 9,183,520 B2 * | 11/2015 | Davis | G06Q 10/06 |
| 9,195,848 B2 * | 11/2015 | Davis | G06F 21/6218 |
| 9,239,999 B2 | 1/2016 | Hawkins | |
| 9,253,137 B1 | 2/2016 | Jackson et al. | |
| 9,262,754 B1 | 2/2016 | Jawharkar | |
| 9,264,867 B1 | 2/2016 | Kotab | |
| 9,307,380 B1 | 4/2016 | Smith et al. | |
| 9,432,190 B2 * | 8/2016 | Davis | G06Q 10/10 |
| 9,432,502 B2 | 8/2016 | Papakipos et al. | |
| 9,465,993 B2 | 10/2016 | Krupka et al. | |
| 9,473,647 B2 * | 10/2016 | Davis | H04M 7/128 |
| 9,491,146 B2 * | 11/2016 | Davis | H04L 63/0428 |
| 10,079,811 B2 * | 9/2018 | Davis | H04L 63/0428 |
| 10,185,814 B2 * | 1/2019 | Davis | H04L 63/0861 |
| 10,198,729 B2 * | 2/2019 | Davis | G06Q 30/0185 |
| 10,263,936 B2 * | 4/2019 | Davis | H04L 67/30 |
| 2001/0020231 A1 | 9/2001 | Perri, III et al. | |
| 2001/0027413 A1 | 10/2001 | Bhutta | |
| 2001/0032316 A1 | 10/2001 | Lu et al. | |
| 2001/0049620 A1 | 12/2001 | Blasko | |
| 2002/0016769 A1 | 2/2002 | Barbara et al. | |
| 2002/0026382 A1 | 2/2002 | Nakajima | |
| 2002/0032785 A1 | 3/2002 | Britt, Jr. | |
| 2002/0046084 A1 | 4/2002 | Steele et al. | |
| 2002/0046109 A1 | 4/2002 | Leonard et al. | |
| 2002/0049708 A1 | 4/2002 | Moneymaker et al. | |
| 2002/0049907 A1 | 4/2002 | Woods et al. | |
| 2002/0055884 A1 | 5/2002 | Tokuma | |
| 2002/0062438 A1 | 5/2002 | Asay et al. | |
| 2002/0062451 A1 | 5/2002 | Scheidt et al. | |
| 2002/0073041 A1 | 6/2002 | Kumhyr | |
| 2002/0085511 A1 | 7/2002 | Koponen et al. | |
| 2002/0107027 A1 | 8/2002 | O'Neil | |
| 2002/0120714 A1 | 8/2002 | Agapiev | |
| 2002/0120873 A1 | 8/2002 | Salmivalli | |
| 2002/0147658 A1 | 10/2002 | Kwan | |
| 2002/0174363 A1 | 11/2002 | Chefalas et al. | |
| 2003/0004898 A1 | 1/2003 | McAuliffe et al. | |
| 2003/0009418 A1 | 1/2003 | Green et al. | |
| 2003/0061170 A1 | 3/2003 | Uzo | |
| 2003/0069874 A1 | 4/2003 | Hertzog et al. | |
| 2003/0107606 A1 | 6/2003 | Capps et al. | |
| 2003/0126079 A1 | 7/2003 | Roberson et al. | |
| 2003/0126092 A1 | 7/2003 | Chihara | |
| 2003/0126094 A1 | 7/2003 | Fisher et al. | |
| 2003/0130919 A1 | 7/2003 | Templeton et al. | |
| 2003/0131260 A1 | 7/2003 | Hanson et al. | |
| 2003/0135401 A1 | 7/2003 | Parr | |
| 2003/0149781 A1 | 8/2003 | Yared et al. | |
| 2003/0154171 A1 | 8/2003 | Karp et al. | |
| 2003/0163425 A1 | 8/2003 | Cannon, Jr. | |
| 2003/0177361 A1 | 9/2003 | Wheeler et al. | |
| 2003/0177363 A1 | 9/2003 | Yokota et al. | |
| 2003/0195846 A1 | 10/2003 | Felger | |
| 2003/0204445 A1 | 10/2003 | Vishik et al. | |
| 2004/0030637 A1 | 2/2004 | Robison et al. | |
| 2004/0070566 A1 | 4/2004 | Ashton | |
| 2004/0097217 A1 | 5/2004 | McClain | |
| 2004/0117302 A1 | 6/2004 | Weichert et al. | |
| 2004/0153405 A1 | 8/2004 | Millary et al. | |
| 2004/0199592 A1 | 10/2004 | Gould et al. | |
| 2004/0236942 A1 | 11/2004 | Kim et al. | |
| 2004/0260658 A1 | 12/2004 | Dettinger et al. | |
| 2005/0021448 A1 | 1/2005 | Shibusawa et al. | |
| 2005/0060532 A1 | 3/2005 | Dorenbosch et al. | |
| 2005/0091072 A1 | 4/2005 | Dunn et al. | |
| 2005/0108232 A1 | 5/2005 | Rockey | |
| 2005/0149854 A1 | 7/2005 | Pennell et al. | |
| 2005/0171954 A1 | 8/2005 | Hull et al. | |
| 2005/0199709 A1 | 9/2005 | Linlor | |
| 2005/0216953 A1 | 9/2005 | Ellingson | |
| 2005/0256766 A1 * | 11/2005 | Garcia | G06F 17/30241 705/14.54 |

(56) References Cited

U.S. PATENT DOCUMENTS

| | | |
|---|---|---|
| 2006/0005020 A1 | 1/2006 | Hardt |
| 2006/0020821 A1 | 1/2006 | Waltermann et al. |
| 2006/0029228 A1 | 2/2006 | Lagrange et al. |
| 2006/0036951 A1 | 2/2006 | Marion et al. |
| 2006/0046709 A1* | 3/2006 | Krumm ............... H04N 21/4126 455/422.1 |
| 2006/0064326 A1 | 3/2006 | Tucker |
| 2006/0079284 A1 | 4/2006 | Lu et al. |
| 2006/0085408 A1* | 4/2006 | Morsa .................... G06Q 30/02 |
| 2006/0136561 A1 | 6/2006 | Lee |
| 2006/0161501 A1 | 7/2006 | Waserstein et al. |
| 2006/0178986 A1 | 8/2006 | Giordano et al. |
| 2006/0179114 A1 | 8/2006 | Deeds |
| 2006/0195364 A1 | 8/2006 | Shroff et al. |
| 2006/0198351 A1 | 9/2006 | Baek |
| 2006/0206413 A1 | 9/2006 | Van Luchene et al. |
| 2006/0212407 A1 | 9/2006 | Lyon |
| 2006/0212713 A1 | 9/2006 | Hatakeda |
| 2006/0218111 A1* | 9/2006 | Cohen ............... G06F 17/30867 706/45 |
| 2006/0242245 A1* | 10/2006 | Christensen .................. 709/206 |
| 2006/0251008 A1 | 11/2006 | Wu et al. |
| 2006/0265347 A1 | 11/2006 | Caballero-McCann et al. |
| 2006/0270419 A1* | 11/2006 | Crowley ................. H04M 3/42 455/456.2 |
| 2006/0288394 A1 | 12/2006 | Thomas et al. |
| 2007/0042755 A1 | 2/2007 | Singhal |
| 2007/0047717 A1 | 3/2007 | Ho et al. |
| 2007/0061301 A1 | 3/2007 | Ramer et al. |
| 2007/0067448 A1 | 3/2007 | Giroux et al. |
| 2007/0086592 A1 | 4/2007 | Ellison et al. |
| 2007/0087822 A1 | 4/2007 | Van Luchene |
| 2007/0094042 A1 | 4/2007 | Ramer et al. |
| 2007/0121856 A1 | 5/2007 | Alperin et al. |
| 2007/0150603 A1 | 6/2007 | Crull et al. |
| 2007/0156664 A1 | 7/2007 | Norton et al. |
| 2007/0192179 A1 | 8/2007 | Van Luchene |
| 2007/0192245 A1 | 8/2007 | Fisher et al. |
| 2007/0198410 A1 | 8/2007 | Labgold et al. |
| 2007/0202484 A1 | 8/2007 | Toombs et al. |
| 2007/0214180 A1 | 9/2007 | Crawford |
| 2007/0226303 A1 | 9/2007 | Provo |
| 2007/0250585 A1 | 10/2007 | Ly et al. |
| 2007/0276926 A1 | 11/2007 | LaJoie et al. |
| 2007/0288320 A1 | 12/2007 | Cooper et al. |
| 2007/0299918 A1 | 12/2007 | Roberts |
| 2008/0005793 A1 | 1/2008 | Wenig et al. |
| 2008/0015987 A1 | 1/2008 | Ramavarjula et al. |
| 2008/0021829 A1 | 1/2008 | Kranzley |
| 2008/0021958 A1 | 1/2008 | Foote |
| 2008/0052182 A1 | 2/2008 | Marshall |
| 2008/0071808 A1 | 3/2008 | Hardt et al. |
| 2008/0083826 A1 | 4/2008 | Henry et al. |
| 2008/0097849 A1 | 4/2008 | Ramsaier et al. |
| 2008/0109473 A1 | 5/2008 | Dixon et al. |
| 2008/0114776 A1 | 5/2008 | Sun et al. |
| 2008/0125085 A1 | 5/2008 | Ullah |
| 2008/0127331 A1 | 5/2008 | Seidman et al. |
| 2008/0140650 A1* | 6/2008 | Stackpole ............ G06F 17/3087 |
| 2008/0168099 A1* | 7/2008 | Skaf ....................... G06Q 30/02 |
| 2008/0183832 A1 | 7/2008 | Kirkland et al. |
| 2008/0207327 A1 | 8/2008 | Van Luchene et al. |
| 2008/0208760 A1 | 8/2008 | Keithley |
| 2008/0214148 A1* | 9/2008 | Ramer ................... G06O 30/02 455/414.1 |
| 2008/0242283 A1 | 10/2008 | Ruckart |
| 2008/0243873 A1 | 10/2008 | Shah et al. |
| 2008/0275779 A1 | 11/2008 | Lakshminarayanan |
| 2008/0275785 A1* | 11/2008 | Altberg ................. G06Q 30/02 705/14.54 |
| 2008/0275865 A1* | 11/2008 | Kretz ................. H04L 29/12132 |
| 2008/0288395 A1 | 11/2008 | Srinivasan et al. |
| 2008/0301112 A1 | 12/2008 | Wu |
| 2008/0308624 A1 | 12/2008 | Gardner |
| 2008/0319849 A1 | 12/2008 | Rapoport |
| 2009/0006614 A1 | 1/2009 | Le et al. |
| 2009/0006628 A1 | 1/2009 | Webb et al. |
| 2009/0006940 A1 | 1/2009 | Hardt |
| 2009/0012878 A1 | 1/2009 | Tedesco et al. |
| 2009/0029674 A1* | 1/2009 | Brezina ................ H04M 15/00 455/405 |
| 2009/0031232 A1 | 1/2009 | Brezina et al. |
| 2009/0043502 A1 | 2/2009 | Shaffer et al. |
| 2009/0047924 A1 | 2/2009 | Ray et al. |
| 2009/0061406 A1 | 3/2009 | Clayton et al. |
| 2009/0082038 A1* | 3/2009 | McKiou ............... H04L 12/185 455/456.6 |
| 2009/0089176 A1 | 4/2009 | McCabe |
| 2009/0099924 A1 | 4/2009 | Lensch et al. |
| 2009/0100047 A1* | 4/2009 | Jones ................ G06F 17/30648 |
| 2009/0102712 A1 | 4/2009 | Heffez |
| 2009/0106149 A1 | 4/2009 | Bennett et al. |
| 2009/0106365 A1 | 4/2009 | Drory et al. |
| 2009/0106415 A1* | 4/2009 | Brezina ................ H04M 15/00 709/224 |
| 2009/0111487 A1* | 4/2009 | Scheibe ................... H04W 4/02 455/456.6 |
| 2009/0119222 A1 | 5/2009 | O'Neil et al. |
| 2009/0125435 A1 | 5/2009 | Cohen et al. |
| 2009/0125440 A1 | 5/2009 | Maeng |
| 2009/0131012 A1 | 5/2009 | Ashley, Jr. et al. |
| 2009/0141876 A1 | 6/2009 | Carter et al. |
| 2009/0144211 A1 | 6/2009 | O'Sullivan et al. |
| 2009/0149166 A1 | 6/2009 | Habib et al. |
| 2009/0150262 A1 | 6/2009 | Mizhen |
| 2009/0157560 A1 | 6/2009 | Carter et al. |
| 2009/0158030 A1 | 6/2009 | Rasti |
| 2009/0171690 A1 | 7/2009 | Lubarski et al. |
| 2009/0181653 A1* | 7/2009 | Alharayeri ............. H04L 67/16 455/414.1 |
| 2009/0203361 A1* | 8/2009 | Huang ................... G06Q 30/02 455/414.1 |
| 2009/0225967 A1 | 9/2009 | Koch |
| 2009/0227290 A1 | 9/2009 | Chien |
| 2009/0234760 A1 | 9/2009 | Walter |
| 2009/0234814 A1* | 9/2009 | Boerries ............ G06F 17/30864 |
| 2009/0240564 A1* | 9/2009 | Boerries ............ G06Q 30/0255 709/204 |
| 2009/0248680 A1 | 10/2009 | Kalavade |
| 2009/0254824 A1* | 10/2009 | Singh ................ G01C 21/3679 715/716 |
| 2009/0259560 A1 | 10/2009 | Bachenheimer |
| 2009/0260064 A1 | 10/2009 | McDowell et al. |
| 2009/0271764 A1 | 10/2009 | Gonzales, II |
| 2009/0275363 A1 | 11/2009 | McGregor et al. |
| 2009/0282187 A1 | 11/2009 | Ito et al. |
| 2009/0282345 A1 | 11/2009 | Smith et al. |
| 2009/0288012 A1 | 11/2009 | Hertel et al. |
| 2009/0292640 A1 | 11/2009 | Heatherly |
| 2009/0292814 A1 | 11/2009 | Ting et al. |
| 2009/0299957 A1 | 12/2009 | Ledlie |
| 2009/0307205 A1* | 12/2009 | Churchill ........... G06F 17/30867 |
| 2009/0319387 A1 | 12/2009 | Keithley et al. |
| 2009/0324022 A1 | 12/2009 | Sangberg et al. |
| 2009/0327296 A1 | 12/2009 | Francis et al. |
| 2009/0328173 A1 | 12/2009 | Jakobson et al. |
| 2010/0010887 A1 | 1/2010 | Karlin et al. |
| 2010/0042414 A1 | 2/2010 | Lewis et al. |
| 2010/0042470 A1 | 2/2010 | Chang et al. |
| 2010/0054600 A1 | 3/2010 | Anbalagan et al. |
| 2010/0061532 A1 | 3/2010 | Takiguchi |
| 2010/0063889 A1 | 3/2010 | Proctor, Jr. et al. |
| 2010/0063914 A1 | 3/2010 | Lozano et al. |
| 2010/0076955 A1 | 3/2010 | Van Steenbergen et al. |
| 2010/0082431 A1 | 4/2010 | Ramer et al. |
| 2010/0088752 A1* | 4/2010 | Nagulakonda et al. ......... 726/6 |
| 2010/0088753 A1 | 4/2010 | Ayres et al. |
| 2010/0100424 A1 | 4/2010 | Buchanan et al. |
| 2010/0106620 A1 | 4/2010 | Marcus |
| 2010/0107152 A1 | 4/2010 | Kwon |
| 2010/0113001 A1 | 5/2010 | Tenbrook et al. |
| 2010/0113162 A1 | 5/2010 | Vemuri et al. |

(56) References Cited

U.S. PATENT DOCUMENTS

| | | |
|---|---|---|
| 2010/0115114 A1 | 5/2010 | Headley |
| 2010/0131589 A1 | 5/2010 | Lawyer et al. |
| 2010/0144442 A1 | 6/2010 | Yanow |
| 2010/0146639 A1 | 6/2010 | Kim et al. |
| 2010/0153148 A1 | 6/2010 | Johnson et al. |
| 2010/0153269 A1 | 6/2010 | McCabe |
| 2010/0169010 A1 | 7/2010 | Jeong |
| 2010/0169182 A1 | 7/2010 | Madani |
| 2010/0169337 A1 | 7/2010 | Green et al. |
| 2010/0174647 A1 | 7/2010 | Kowalchyk et al. |
| 2010/0175116 A1 | 7/2010 | Gum |
| 2010/0180001 A1 | 7/2010 | Hardt |
| 2010/0187302 A1 | 7/2010 | Sermersheim et al. |
| 2010/0191590 A1 | 7/2010 | Hakkarainen et al. |
| 2010/0211637 A1 | 8/2010 | Borzsei et al. |
| 2010/0216491 A1 | 8/2010 | Winkler et al. |
| 2010/0228726 A1 | 9/2010 | Slinker et al. |
| 2010/0228767 A1 | 9/2010 | Slinker et al. |
| 2010/0235288 A1 | 9/2010 | Kisbye |
| 2010/0241507 A1 | 9/2010 | Quinn et al. |
| 2010/0241663 A1* | 9/2010 | Huang .................. G06Q 30/02 707/770 |
| 2010/0250578 A1* | 9/2010 | Athsani ............. G06F 17/30867 707/765 |
| 2010/0268830 A1 | 10/2010 | McKee et al. |
| 2010/0279713 A1 | 11/2010 | Dicke |
| 2010/0296505 A1 | 11/2010 | Kissinger et al. |
| 2010/0312636 A1 | 12/2010 | Coulter et al. |
| 2010/0313009 A1 | 12/2010 | Combet et al. |
| 2010/0318614 A1* | 12/2010 | Sager .................. G06Q 10/107 709/206 |
| 2010/0322396 A1 | 12/2010 | Southerland |
| 2010/0324989 A1 | 12/2010 | Etchegoyen |
| 2010/0325691 A1 | 12/2010 | Willars et al. |
| 2010/0332337 A1 | 12/2010 | Bullock |
| 2011/0010423 A1 | 1/2011 | Thatcher et al. |
| 2011/0022621 A1 | 1/2011 | Luo et al. |
| 2011/0029616 A1 | 2/2011 | Wang et al. |
| 2011/0040609 A1* | 2/2011 | Hawkins .............. G06Q 30/02 705/14.25 |
| 2011/0053574 A1 | 3/2011 | Rice |
| 2011/0060905 A1 | 3/2011 | Stack et al. |
| 2011/0071899 A1* | 3/2011 | Robertson ............ G06Q 30/02 705/14.43 |
| 2011/0072109 A1 | 3/2011 | Robb et al. |
| 2011/0082737 A1 | 4/2011 | Crowe et al. |
| 2011/0092227 A1* | 4/2011 | Phukan ........... H04M 1/274516 455/456.3 |
| 2011/0093949 A1 | 4/2011 | MacRae |
| 2011/0099612 A1 | 4/2011 | Lee et al. |
| 2011/0106429 A1 | 5/2011 | Poppen et al. |
| 2011/0106610 A1 | 5/2011 | Landis et al. |
| 2011/0106674 A1 | 5/2011 | Perlman |
| 2011/0110364 A1 | 5/2011 | Fried et al. |
| 2011/0119593 A1 | 5/2011 | Jacobson et al. |
| 2011/0131235 A1 | 6/2011 | Petrou et al. |
| 2011/0131491 A1 | 6/2011 | Lu et al. |
| 2011/0137932 A1 | 6/2011 | Wable |
| 2011/0142299 A1 | 6/2011 | Akbarzadeh et al. |
| 2011/0145273 A1 | 6/2011 | Kolathaya et al. |
| 2011/0159856 A1 | 6/2011 | Walsh et al. |
| 2011/0161149 A1 | 6/2011 | Kaplan |
| 2011/0162078 A1 | 6/2011 | Taveau et al. |
| 2011/0165896 A1 | 7/2011 | Stromberg et al. |
| 2011/0166869 A1 | 7/2011 | Froelich et al. |
| 2011/0179126 A1 | 7/2011 | Wetherell et al. |
| 2011/0183651 A1 | 7/2011 | Mundy et al. |
| 2011/0191177 A1 | 8/2011 | Blackhurst et al. |
| 2011/0191433 A1 | 8/2011 | Du |
| 2011/0209194 A1 | 8/2011 | Kennedy |
| 2011/0213785 A1 | 9/2011 | Kristiansson et al. |
| 2011/0215949 A1 | 9/2011 | Yarnold et al. |
| 2011/0225048 A1* | 9/2011 | Nair .................. G06Q 30/02 705/14.66 |
| 2011/0225640 A1 | 9/2011 | Ganapathy et al. |
| 2011/0231241 A1* | 9/2011 | Kesari .............. G06F 17/30699 705/14.42 |
| 2011/0231282 A1 | 9/2011 | Dai |
| 2011/0238575 A1 | 9/2011 | Nightengale et al. |
| 2011/0258049 A1 | 10/2011 | Ramer et al. |
| 2011/0264648 A1 | 10/2011 | Gulik et al. |
| 2011/0269424 A1 | 11/2011 | Multer et al. |
| 2011/0276418 A1 | 11/2011 | Velani |
| 2011/0288868 A1 | 11/2011 | Lloyd et al. |
| 2011/0288923 A1 | 11/2011 | Steinert et al. |
| 2011/0289132 A1 | 11/2011 | Polis et al. |
| 2011/0289143 A1 | 11/2011 | Polis et al. |
| 2011/0289153 A1 | 11/2011 | Hull et al. |
| 2011/0298701 A1 | 12/2011 | Holzer et al. |
| 2011/0302012 A1 | 12/2011 | Duroux et al. |
| 2011/0320282 A1 | 12/2011 | Ramer et al. |
| 2011/0320314 A1 | 12/2011 | Brown |
| 2012/0005221 A1 | 1/2012 | Ickman et al. |
| 2012/0017266 A1 | 1/2012 | DiChiara et al. |
| 2012/0022927 A1 | 1/2012 | Yankovich et al. |
| 2012/0022931 A1 | 1/2012 | Syed et al. |
| 2012/0027189 A1 | 2/2012 | Shaffer et al. |
| 2012/0030724 A1 | 2/2012 | Godas et al. |
| 2012/0033610 A1 | 2/2012 | Ring et al. |
| 2012/0036015 A1 | 2/2012 | Sheikh |
| 2012/0036364 A1 | 2/2012 | Yoneda et al. |
| 2012/0041830 A1 | 2/2012 | Rothschild et al. |
| 2012/0042320 A1 | 2/2012 | Jamjoom et al. |
| 2012/0044089 A1 | 2/2012 | Yarnold et al. |
| 2012/0066142 A1 | 3/2012 | Jenkins et al. |
| 2012/0066301 A1 | 3/2012 | Holland |
| 2012/0069731 A1 | 3/2012 | Tooher et al. |
| 2012/0071131 A1* | 3/2012 | Zisapel ............. H04L 63/1425 455/410 |
| 2012/0072494 A1 | 3/2012 | Wong et al. |
| 2012/0077462 A1 | 3/2012 | Rozensztejn et al. |
| 2012/0079019 A1 | 3/2012 | Miettinen et al. |
| 2012/0084078 A1 | 4/2012 | Moganti et al. |
| 2012/0084210 A1 | 4/2012 | Farahmand |
| 2012/0094642 A1 | 4/2012 | Pöpperl et al. |
| 2012/0116979 A1 | 5/2012 | Hatch et al. |
| 2012/0130853 A1 | 5/2012 | Petri et al. |
| 2012/0130898 A1 | 5/2012 | Snyder et al. |
| 2012/0131350 A1 | 5/2012 | Atherton |
| 2012/0143859 A1 | 6/2012 | Lymperopoulos et al. |
| 2012/0143968 A1 | 6/2012 | Oren et al. |
| 2012/0148043 A1 | 6/2012 | Tofighbakhsh |
| 2012/0150734 A1 | 6/2012 | Bangah et al. |
| 2012/0150742 A1 | 6/2012 | Poon et al. |
| 2012/0150960 A1* | 6/2012 | Nalawade ............ G06Q 30/02 709/204 |
| 2012/0157062 A1 | 6/2012 | Kim et al. |
| 2012/0158751 A1* | 6/2012 | Tseng ................. G06O 30/02 707/751 |
| 2012/0159479 A1 | 6/2012 | Chardon et al. |
| 2012/0166530 A1 | 6/2012 | Tseng |
| 2012/0167234 A1 | 6/2012 | Donfried et al. |
| 2012/0182935 A1 | 7/2012 | Addepalli et al. |
| 2012/0192258 A1 | 7/2012 | Spencer et al. |
| 2012/0196581 A1* | 8/2012 | Papakipos ............ H04L 51/046 455/415 |
| 2012/0196629 A1 | 8/2012 | Movsesyan et al. |
| 2012/0203846 A1 | 8/2012 | Hull et al. |
| 2012/0203853 A1* | 8/2012 | Davis et al. .................. 709/206 |
| 2012/0214442 A1 | 8/2012 | Crawford et al. |
| 2012/0244875 A1 | 9/2012 | Cardona et al. |
| 2012/0246075 A1 | 9/2012 | Rasti |
| 2012/0246089 A1 | 9/2012 | Sikes |
| 2012/0251077 A1 | 10/2012 | Stewart et al. |
| 2012/0253985 A1 | 10/2012 | Maron et al. |
| 2012/0254774 A1 | 10/2012 | Patton |
| 2012/0257753 A1 | 10/2012 | Ochikubo et al. |
| 2012/0265684 A1 | 10/2012 | Singh |
| 2012/0278176 A1 | 11/2012 | Naor et al. |
| 2012/0278732 A1 | 11/2012 | Lee et al. |
| 2012/0290468 A1 | 11/2012 | Benco et al. |
| 2012/0295633 A1* | 11/2012 | Yom-Tov .......... G06F 17/30867 455/456.1 |

(56) References Cited

U.S. PATENT DOCUMENTS

| | | |
|---|---|---|
| 2012/0303616 A1 | 11/2012 | Abuelsaad et al. |
| 2012/0310760 A1 | 12/2012 | Phillips et al. |
| 2012/0311320 A1 | 12/2012 | Brown et al. |
| 2012/0324228 A1 | 12/2012 | Padhye et al. |
| 2013/0006749 A1 | 1/2013 | Fink et al. |
| 2013/0013727 A1 | 1/2013 | Walker |
| 2013/0019089 A1 | 1/2013 | Guidotti et al. |
| 2013/0024105 A1* | 1/2013 | Thomas ............... H04W 4/023 701/410 |
| 2013/0024267 A1* | 1/2013 | Libenson ............... G06Q 30/02 705/14.38 |
| 2013/0030922 A1 | 1/2013 | Shalabi et al. |
| 2013/0031009 A1 | 1/2013 | Kapoor et al. |
| 2013/0031180 A1 | 1/2013 | Abendroth et al. |
| 2013/0036112 A1* | 2/2013 | Poon ................ G06F 17/30864 707/723 |
| 2013/0040654 A1 | 2/2013 | Parish |
| 2013/0041961 A1 | 2/2013 | Thrower, III et al. |
| 2013/0046689 A1 | 2/2013 | Sundberg et al. |
| 2013/0047100 A1 | 2/2013 | Kroeger et al. |
| 2013/0051542 A1 | 2/2013 | Yao et al. |
| 2013/0054587 A1 | 2/2013 | Ahari et al. |
| 2013/0060619 A1* | 3/2013 | Davis ................. G06Q 30/0185 705/14.23 |
| 2013/0060624 A1* | 3/2013 | Davis ................... G06Q 30/02 705/14.36 |
| 2013/0060625 A1* | 3/2013 | Davis ................... G06Q 30/02 705/14.36 |
| 2013/0060695 A1* | 3/2013 | Davis ................... G06Q 20/40 705/44 |
| 2013/0060850 A1 | 3/2013 | Davis et al. |
| 2013/0060852 A1* | 3/2013 | Davis ................... G06Q 20/40 709/204 |
| 2013/0060866 A1* | 3/2013 | Davis ................... H04L 51/28 709/206 |
| 2013/0060869 A1* | 3/2013 | Davis ................ G06Q 10/107 709/206 |
| 2013/0061050 A1 | 3/2013 | Davis et al. |
| 2013/0061127 A1 | 3/2013 | Reyes et al. |
| 2013/0061333 A1* | 3/2013 | Davis ............... H04L 63/0861 726/28 |
| 2013/0110827 A1* | 5/2013 | Nabar ................ G06Q 10/00 707/728 |
| 2013/0185285 A1* | 7/2013 | Shuman ............ G06F 17/30554 707/722 |
| 2013/0227707 A1 | 8/2013 | Gay et al. |
| 2013/0268773 A1* | 10/2013 | Davis ................. G06F 21/602 713/189 |
| 2013/0332700 A1 | 12/2013 | Kopylovitz et al. |
| 2014/0045454 A1 | 2/2014 | Monjas Llorente et al. |
| 2014/0048454 A1 | 2/2014 | Birken et al. |
| 2014/0058568 A1 | 2/2014 | Imes et al. |
| 2014/0067702 A1 | 3/2014 | Rathod |
| 2014/0068270 A1 | 3/2014 | Shenoy |
| 2014/0087687 A1* | 3/2014 | Brezina ............... H04M 15/00 455/405 |
| 2014/0128001 A1 | 5/2014 | Imes et al. |
| 2014/0222690 A1* | 8/2014 | Wilf et al. ................ 705/75 |
| 2015/0293997 A1* | 10/2015 | Smith ................... H04L 51/32 707/749 |

OTHER PUBLICATIONS

Milian, Mark; "Facebook lets users opt out of facial recognition"; CNN Tech; Jun. 9, 2011; pp. 1-5; retrieved by examiner on May 30, 2013; CNN Cable News Network, Turner Broadcasting System, Inc.; located at: http://www.cnn.com/2011/TECH/social.media/06/07/facebook.facial.recognition/index.html.

Spivack, Nova; "How Siri Works—Interview with Tom Gruber, CTO of SIRI"; Jan. 26, 2010; 9 pages; located at http://www.novaspivack.com/technology/how-hisiri-works-interview-with-tom-gruber-cto . . . .

Dancu, John; "Using Identity and Age Verification within Social Networking Sites"; bearing a date of Jul. 21, 2008 (retrieved on Apr. 13, 2014), as provided by examiner; pp. 1-4; located at: http://cyber.law.harvard.edu/sites/cyber.law.harvard.edu/files/IDology_ISTTFTAB_submission.pdf.

"How to Set Up an ICE Contact on Your iPhone"; The Backup Plan; Jun. 21, 2010; 11 pages; located at mn10.wordpress.com/2010/06/21/how-to-set-up-an-ice-contact-on-your-iphone/.

Smith, Chris Silver; "Cell Phone Triangulation Accuracy Is All Over The Map"; Sep. 22, 2008; total of 4 pages (as provided by examiner); located at: http://searchengineland.com/cell-phone-triangulation-accuracy-is-all-over-the-map-14790.

Weisbaum, Herb; "When are Social Security numbers required?"; Apr. 17, 2006; located at www.nbcnews.com/id/12359845/ns/business-consumer_news/t/when-are-social-security-numbers-required/#.XFs1F_IKjqY; total of 2 pages (as provided by examiner).

\* cited by examiner

FIG. 14

1400 An article of manufacture

1402 A signal bearing medium

1404 Computer program (a) one or more instructions for accepting device-identifier data corresponding to at least one communication device;

(b) one or more instructions for accepting network-participation identifier data associated with a verified real-world user associated with the at least one communication device; and (c) one or more instructions for assigning a unique identifier at least partly based on the device-identifier data and the network-participation identifier data 1406 a computer-readable medium 1408 a recordable medium 1410 a communications medium

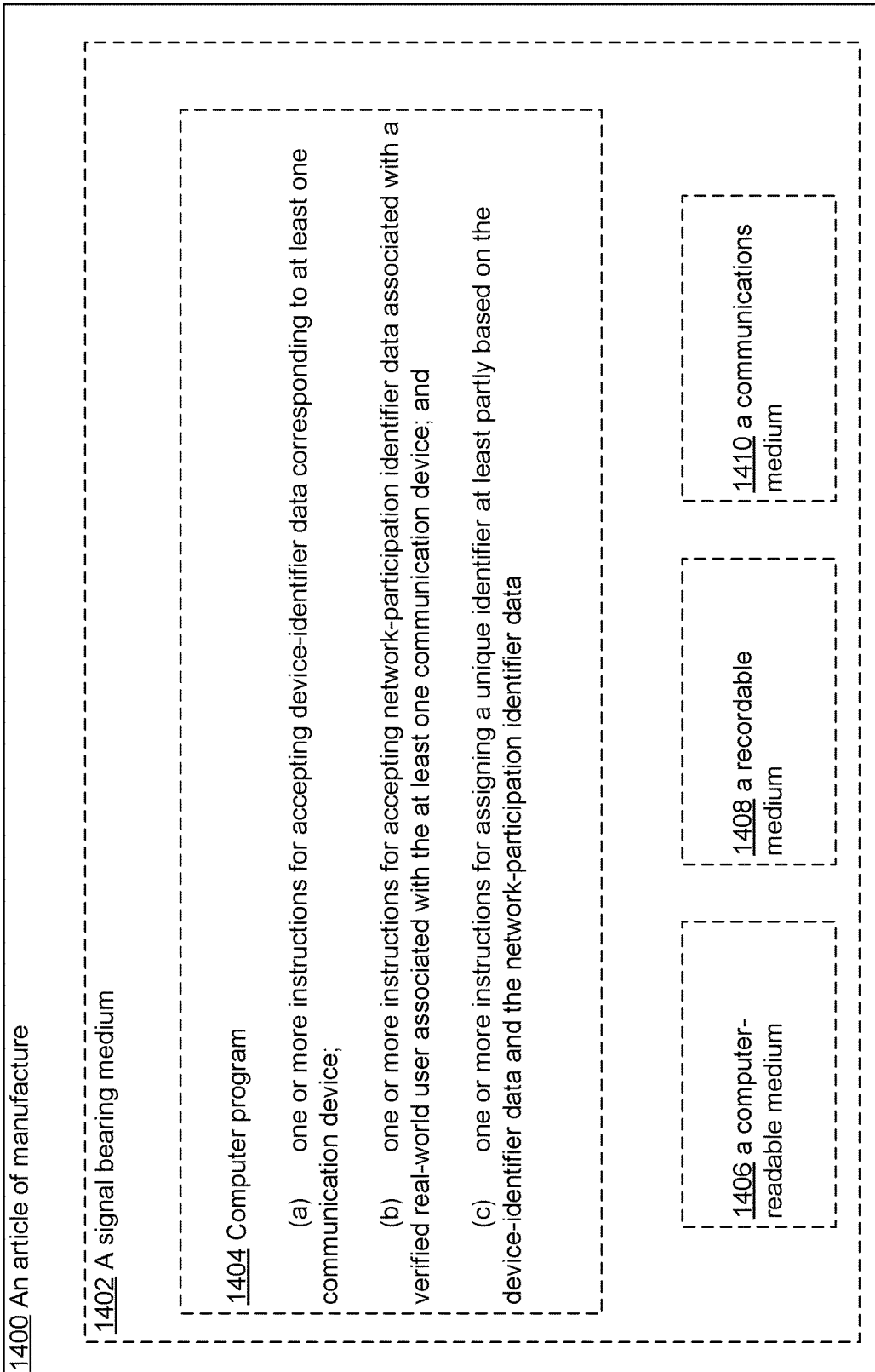

100 System

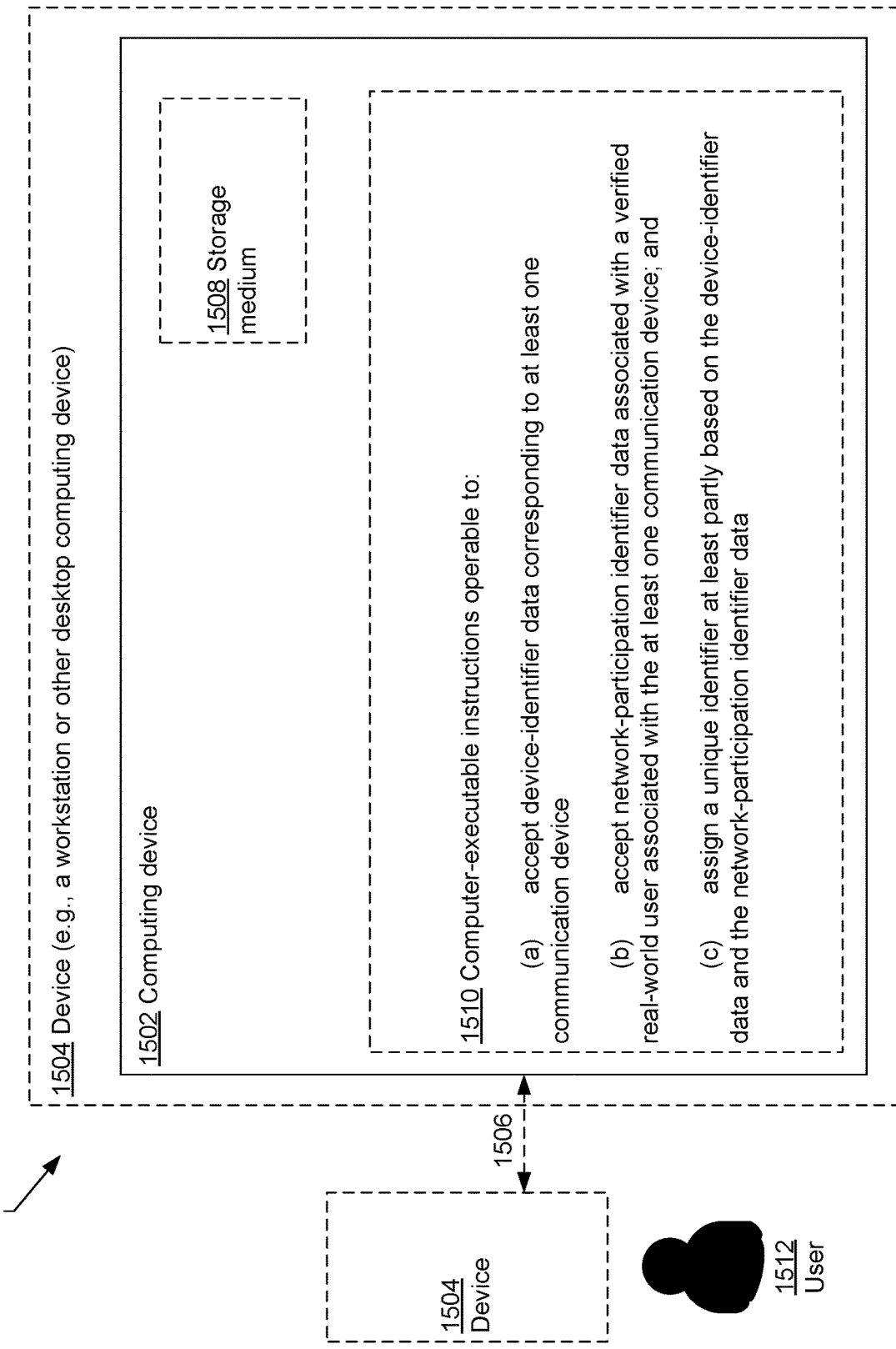

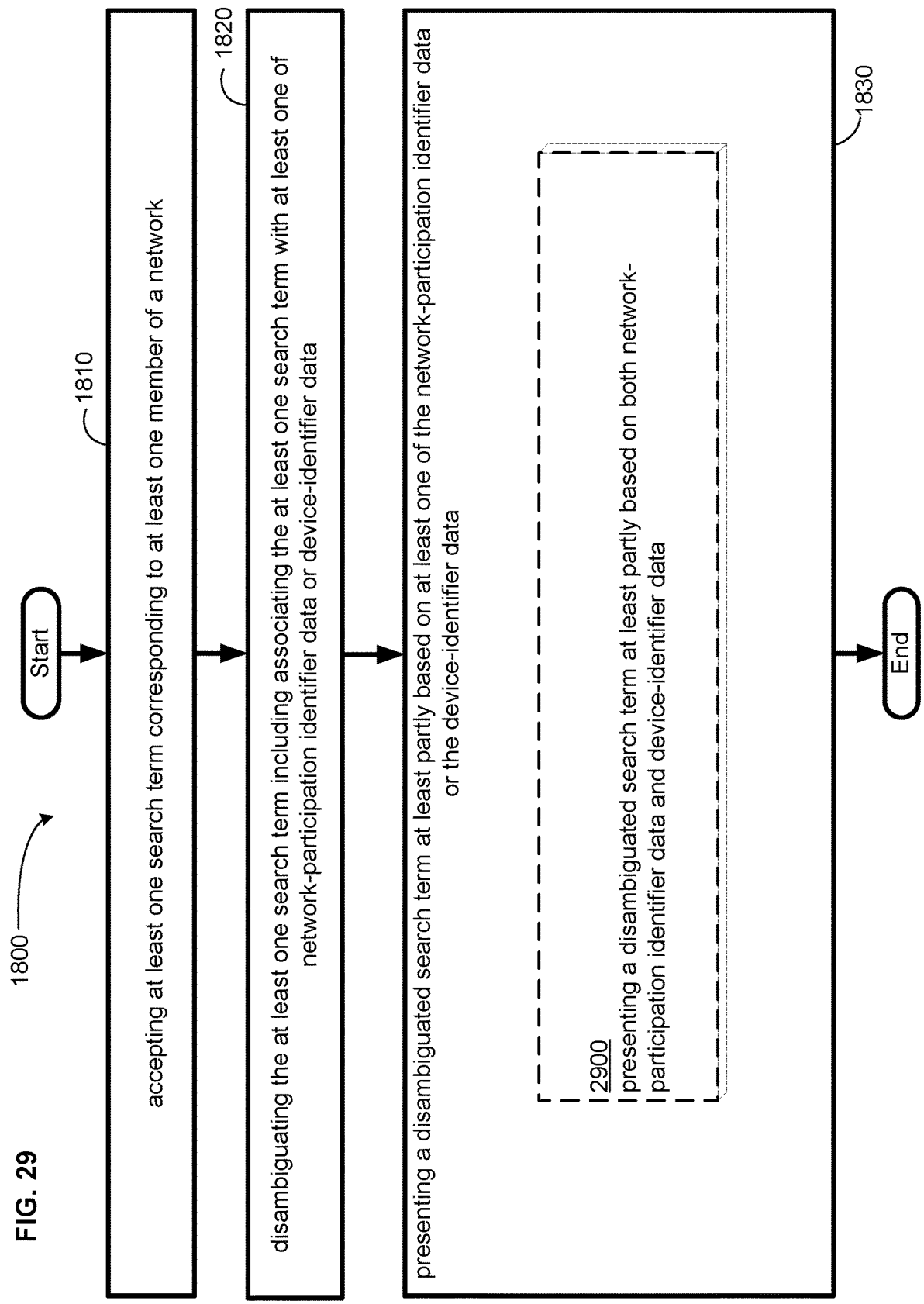

FIG. 30

3000 An article of manufacture

3002 A signal bearing medium

3004 Computer program (a)   one or more instructions for accepting at least one search term corresponding to at least one member of a network;

(b)   one or more instructions for disambiguating the at least one search term including associating the at least one search term with at least one of network-participation identifier data or device-identifier data; and (c)   one or more instructions for presenting a disambiguated search term at least partly based on at least one of the network-participation identifier data or the device-identifier data 3006 a computer-readable medium 3008 a recordable medium 3010 a communications medium 1700 System

FIG. 46

4600 Computing System Environment

4602 Computing device

4604 Device (e.g., a mobile phone or other computing device)

4608 Storage medium

4610 Computer-executable instructions operable to:

(a) accept at least one telephone communication from at least one member of a network (b) associate the at least one telephone communication with a sender profile at least partly based on the sender's device-identifier data and the sender's network-participation identifier data; and (c) present the sender profile in association with the at least one telephone communication

4606

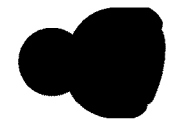

4604 Device

4612 Sender

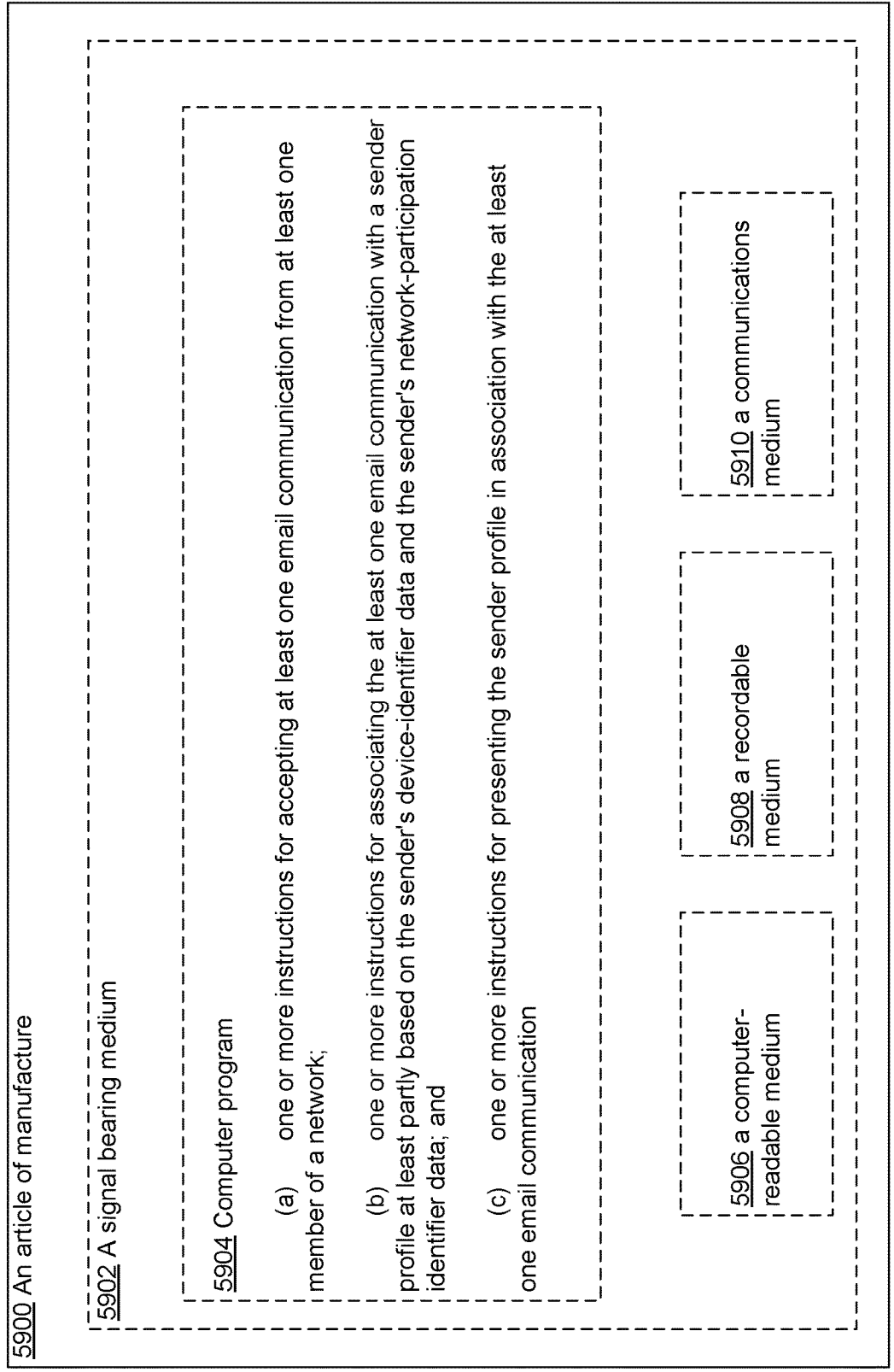

FIG. 60

6000 Computing System Environment

6004 Device (e.g., a mobile phone or other computing device)

6002 Computing device

6008 Storage medium

6010 Computer-executable instructions operable to:

(a)    accept at least one email communication from at least one member of a network (b)    associate the at least one email communication with a sender profile at least partly based on the sender's device-identifier data and the sender's network-participation identifier data; and (c)    present the sender profile in association with the at least one email communication

6006

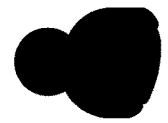

6004 Device

6012 Sender

COMPUTATIONAL SYSTEMS AND METHODS FOR IDENTIFYING A COMMUNICATIONS PARTNER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation of U.S. patent application Ser. No. 13/374,247 now U.S. Pat. No. 10,263,936, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/199,832 now U.S. Pat. No. 9,747,561, entitled COMPUTATIONAL SYSTEMS AND METHODS FOR LINKING USERS OF DEVICES, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 7 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/199,829 now U.S. Pat. No. 9,183,520, entitled COMPUTATIONAL SYSTEMS AND METHODS FOR LINKING USERS OF DEVICES, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 9 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,806 now U.S. Pat. No. 10,074,113, entitled COMPUTATIONAL SYSTEMS AND METHODS FOR DISAMBIGUATING SEARCH TERMS CORRESPONDING TO NETWORK MEMBERS, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,810 now U.S. Pat. No. 9,141,977, entitled COMPUTATIONAL SYSTEMS AND METHODS FOR DISAMBIGUATING SEARCH TERMS CORRESPONDING TO NETWORK MEMBERS, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Sep. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,542 now U.S. Pat. No. 9,928,485, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Nov. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,572 now U.S. Pat. No. 9,690,853, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 17 Nov. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,871 now U.S. Pat. No. 9,167,099, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 2 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,872 now U.S. Pat. No. 9,473,647, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 2 Dec. 2011 which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

This description relates to data capture and data handling techniques.

SUMMARY

An embodiment provides a system. In one implementation, the system includes but is not limited to circuitry for accepting at least one email communication from at least one member of a network; circuitry for associating the at least one email communication with a sender profile at least partly based on the sender's device-identifier data and the sender's network-participation identifier data; and circuitry for presenting the sender profile in association with the at least one email communication. In addition to the foregoing, other system aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one or more various aspects, related systems include but are not limited to computing means and/or programming for effecting the herein-referenced method aspects; the computing means and/or programming may be virtually any combination of hardware, software, and/or firmware configured to effect the herein-referenced method aspects depending upon the design choices of the system designer.

An embodiment provides a computer-implemented method. In one implementation, the method includes but is not limited to accepting at least one email communication from at least one member of a network; associating the at least one email communication with a sender profile at least partly based on the sender's device-identifier data and the sender's network-participation identifier data; and presenting the sender profile in association with the at least one email communication. In addition to the foregoing, other method aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to (a) accepting at least one email communication from at least one member of a network; (b) associating the at least one email communication with a sender profile at least partly based on the sender's device-identifier data and the sender's network-participation identifier data; and (c) presenting the sender profile in association with the at least one email communication. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to (a) accept at least one email communication from at least one member of a network; (b) associate the at least one email communication with a sender profile at least partly based on the sender's device-identifier data and the sender's network-participation identifier data; and (c) present the sender profile in association with the at least one email communication. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

With reference now to FIG. 1, shown is an example of a system for linking users of devices in which embodiments may be implemented, perhaps in a device and/or through a network, which may serve as a context for introducing one or more processes and/or devices described herein.

Figure 3:
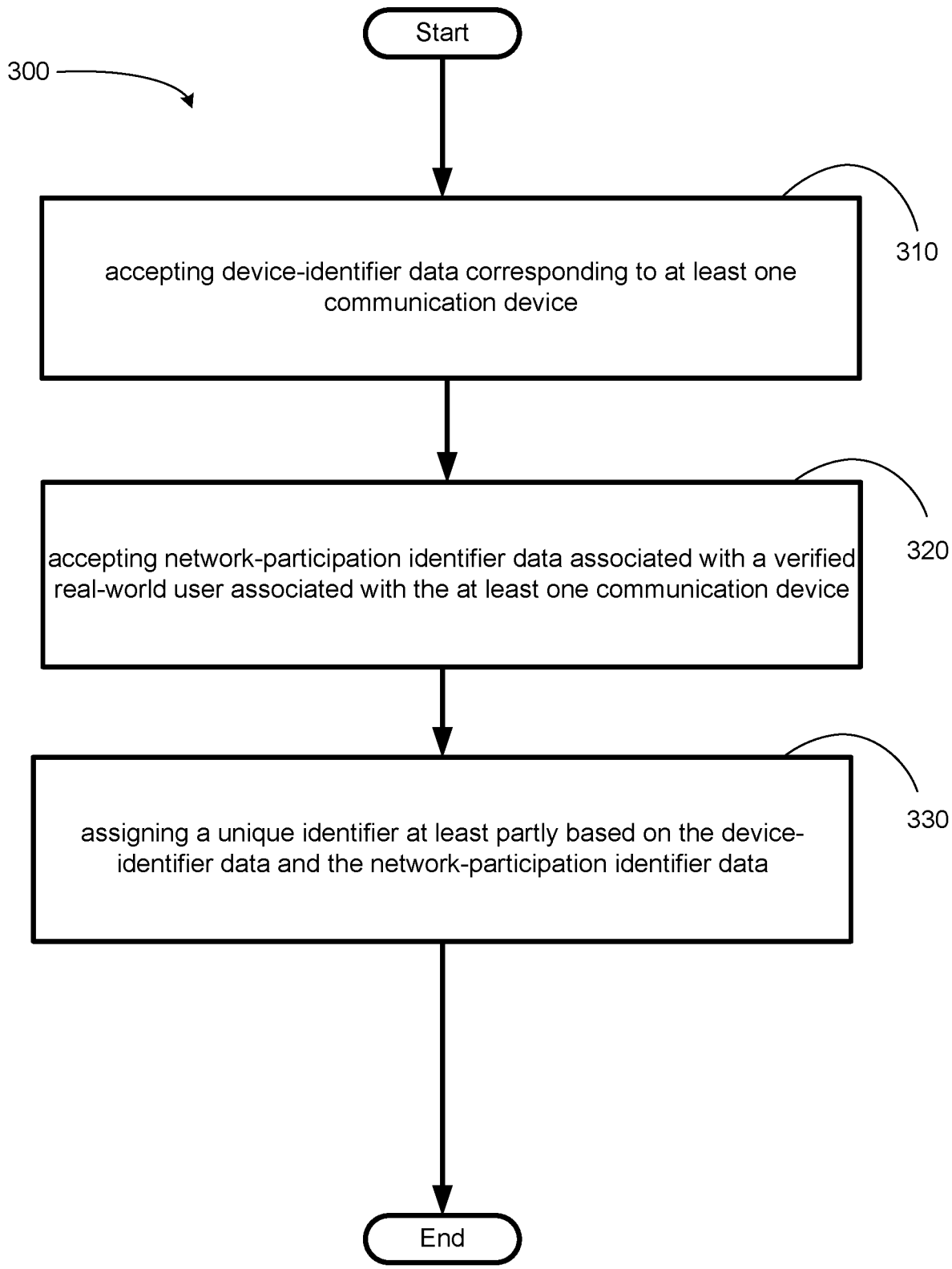

With reference now to FIG. 3, shown is an example of an operational flow representing example operations related to linking users of devices, which may serve as a context for introducing one or more processes and/or devices described herein.

Figure 4:
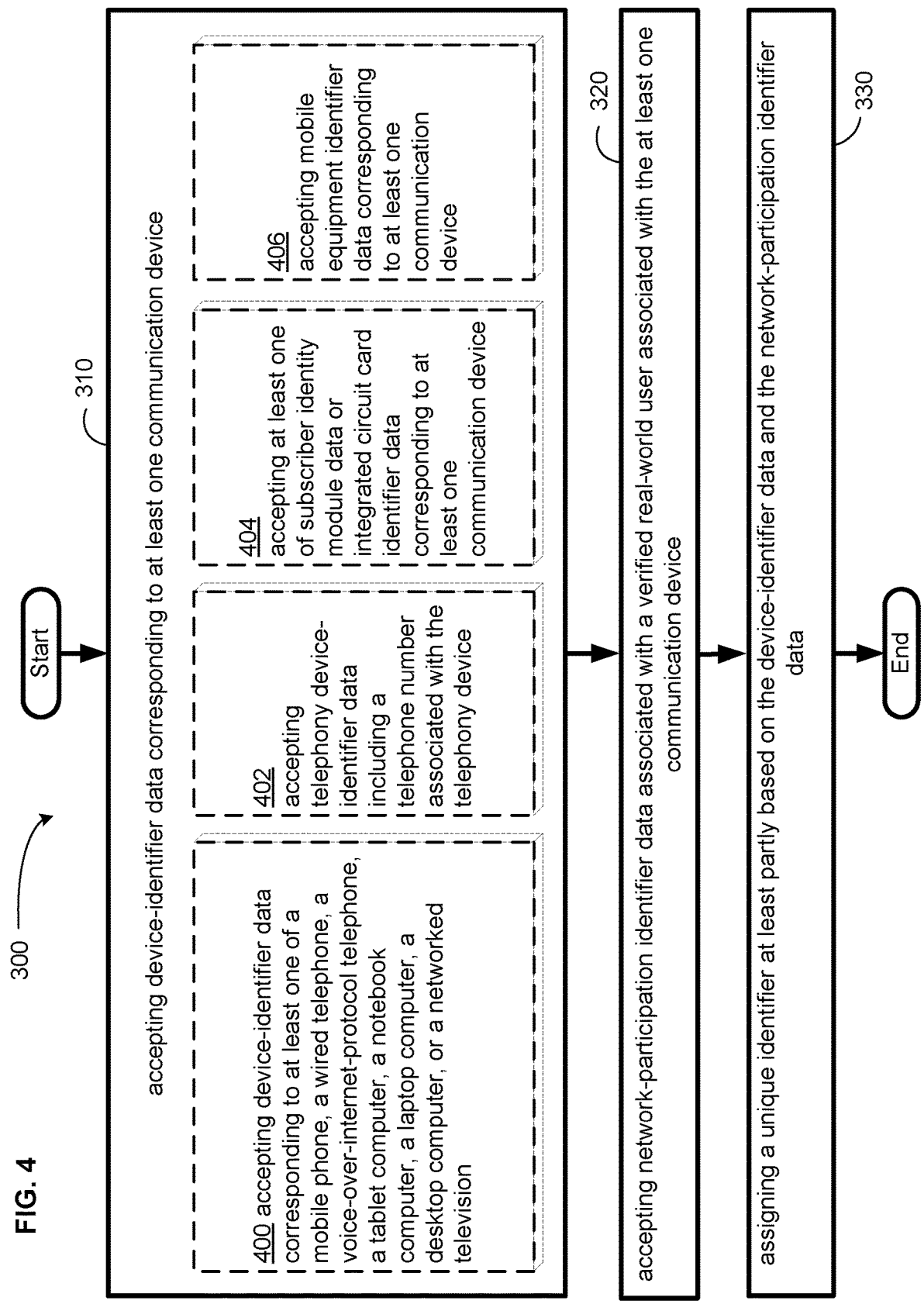

FIG. 4 illustrates an alternative embodiment of the example operational flow of FIG. 3.

Figure 5:
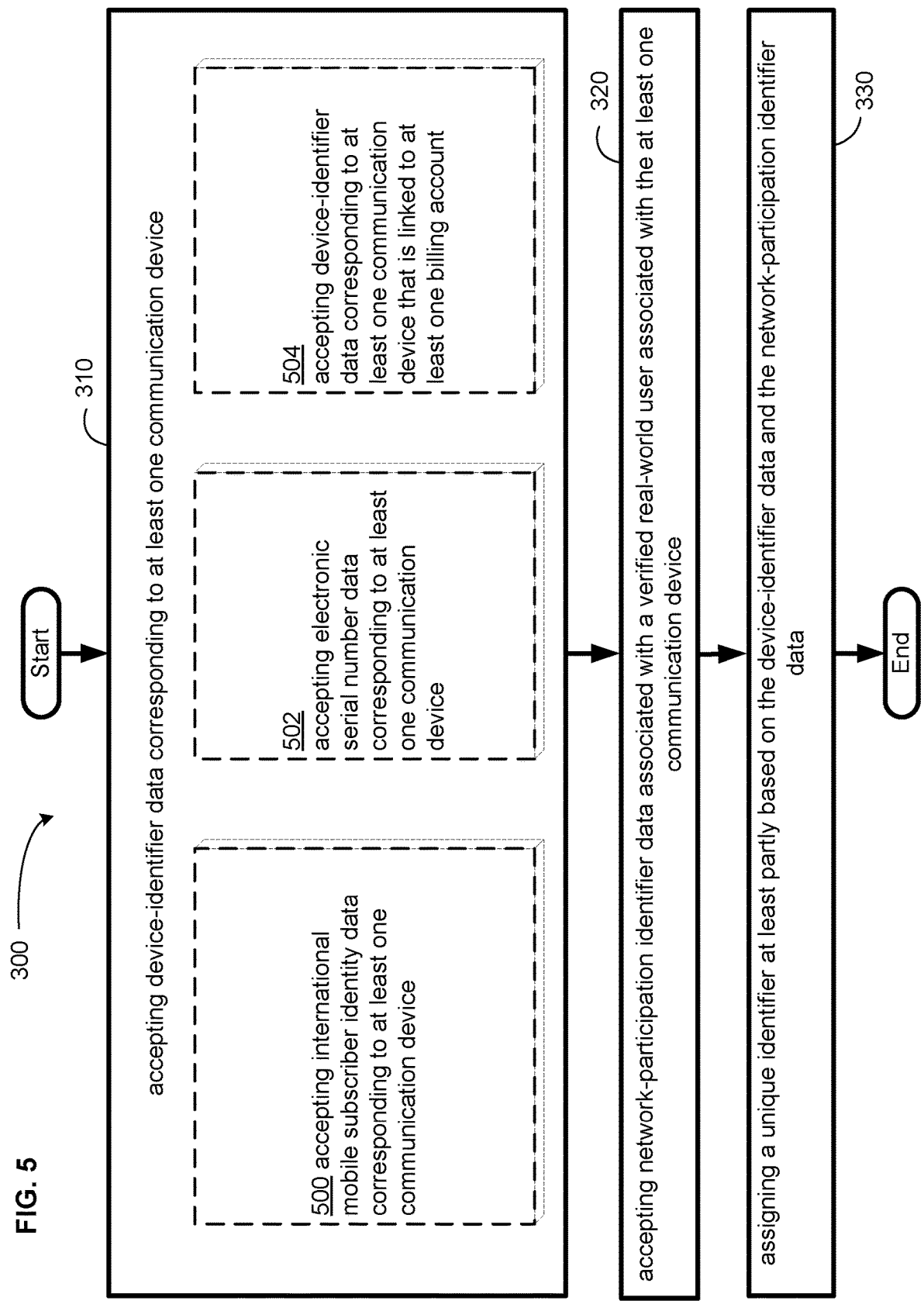

FIG. 5 illustrates an alternative embodiment of the example operational flow of FIG. 3.

Figure 6:
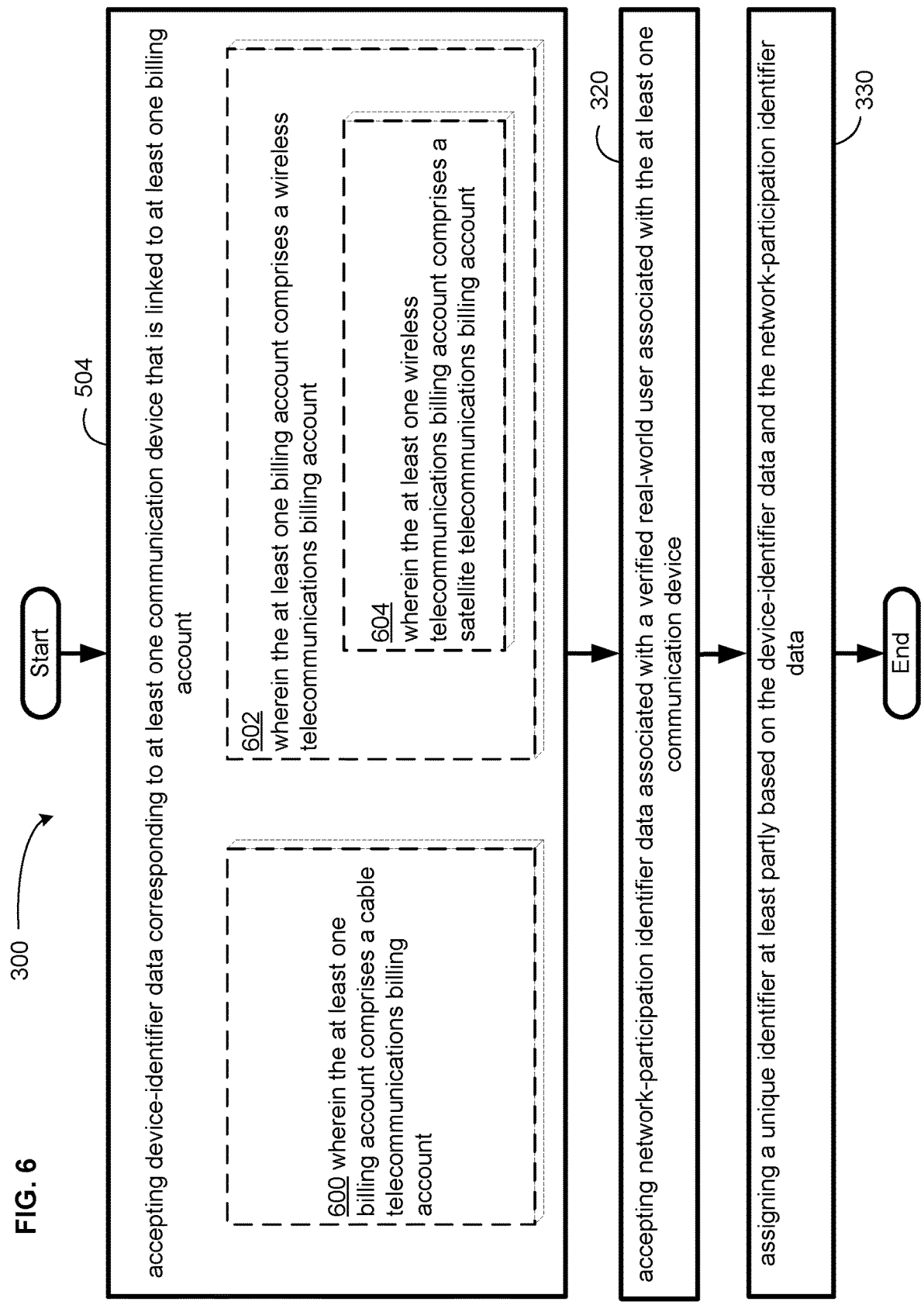

FIG. 6 illustrates an alternative embodiment of the example operational flow of FIG. 3.

Figure 7:
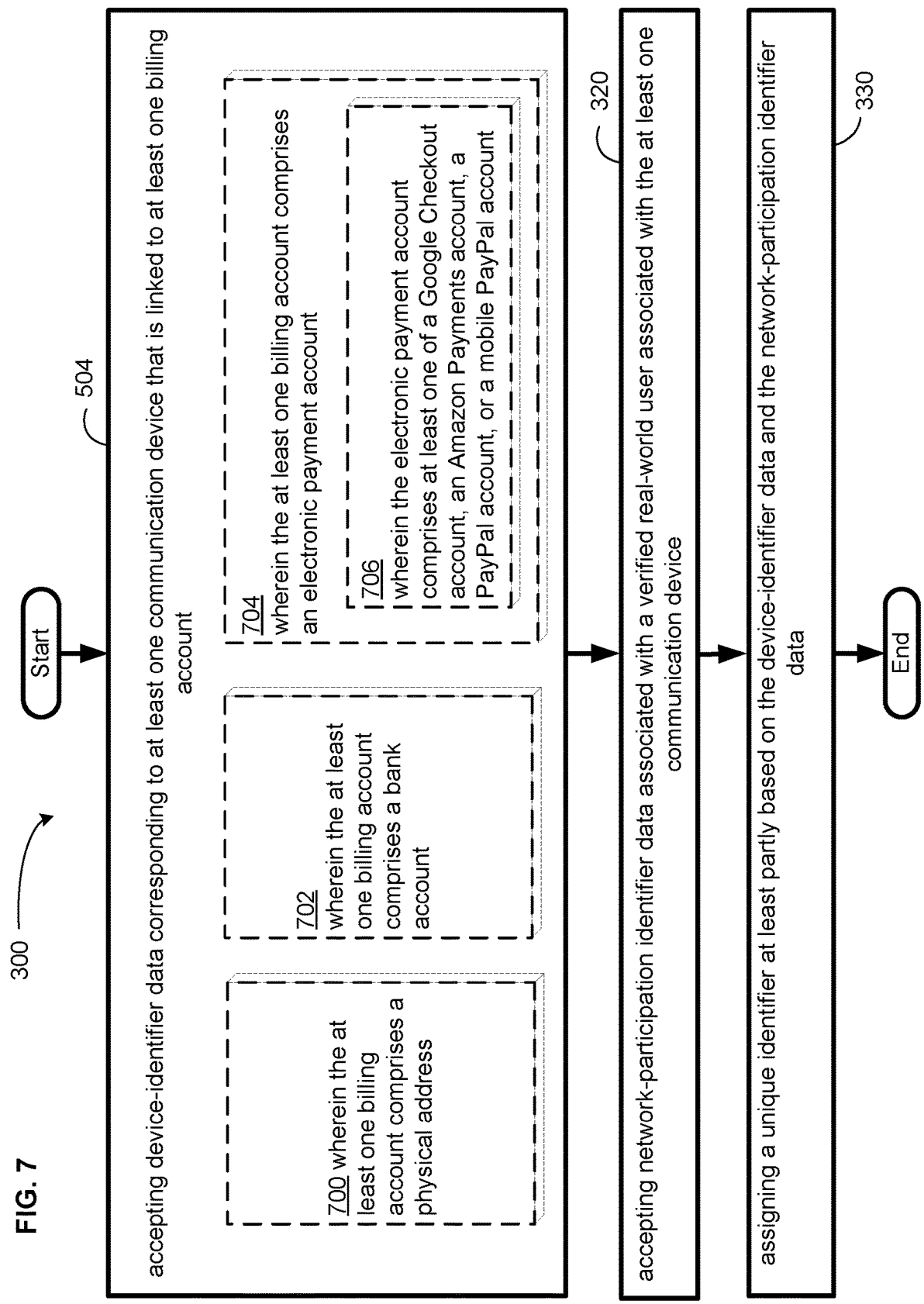

FIG. 7 illustrates an alternative embodiment of the example operational flow of FIG. 3.

Figure 8:
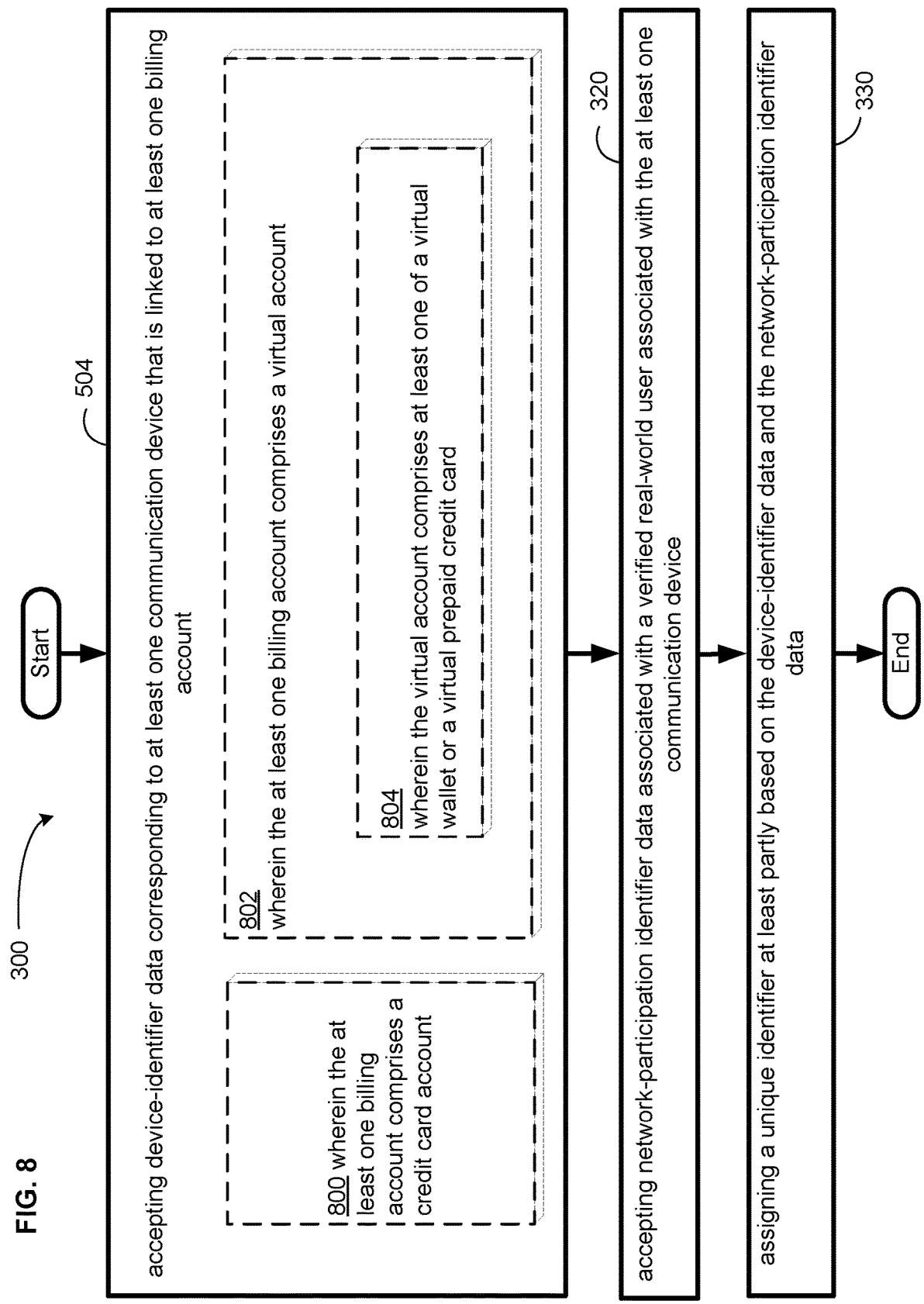

FIG. 8 illustrates an alternative embodiment of the example operational flow of FIG. 3.

Figure 9:
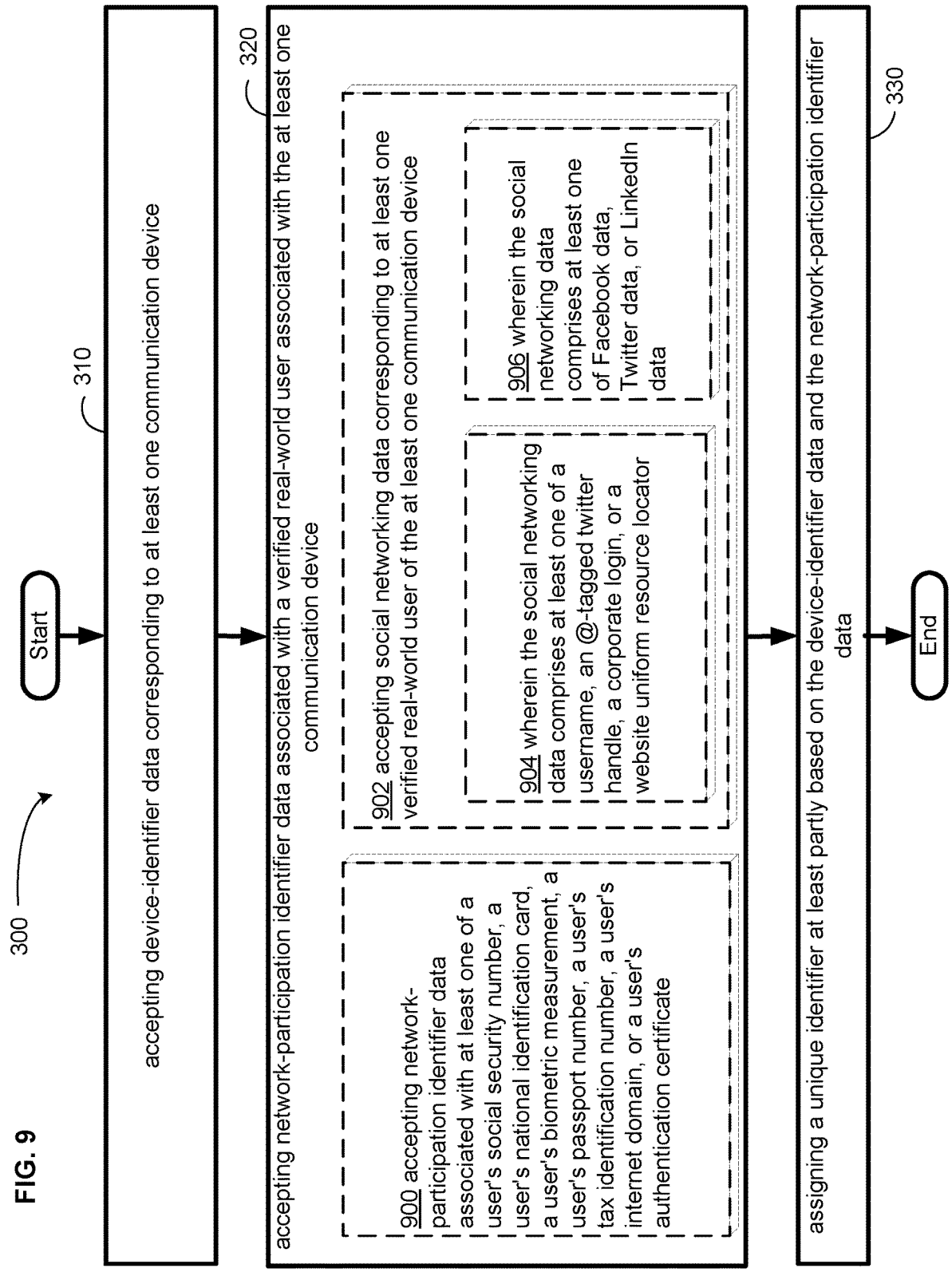

FIG. 9 illustrates an alternative embodiment of the example operational flow of FIG. 3.

Figure 10:
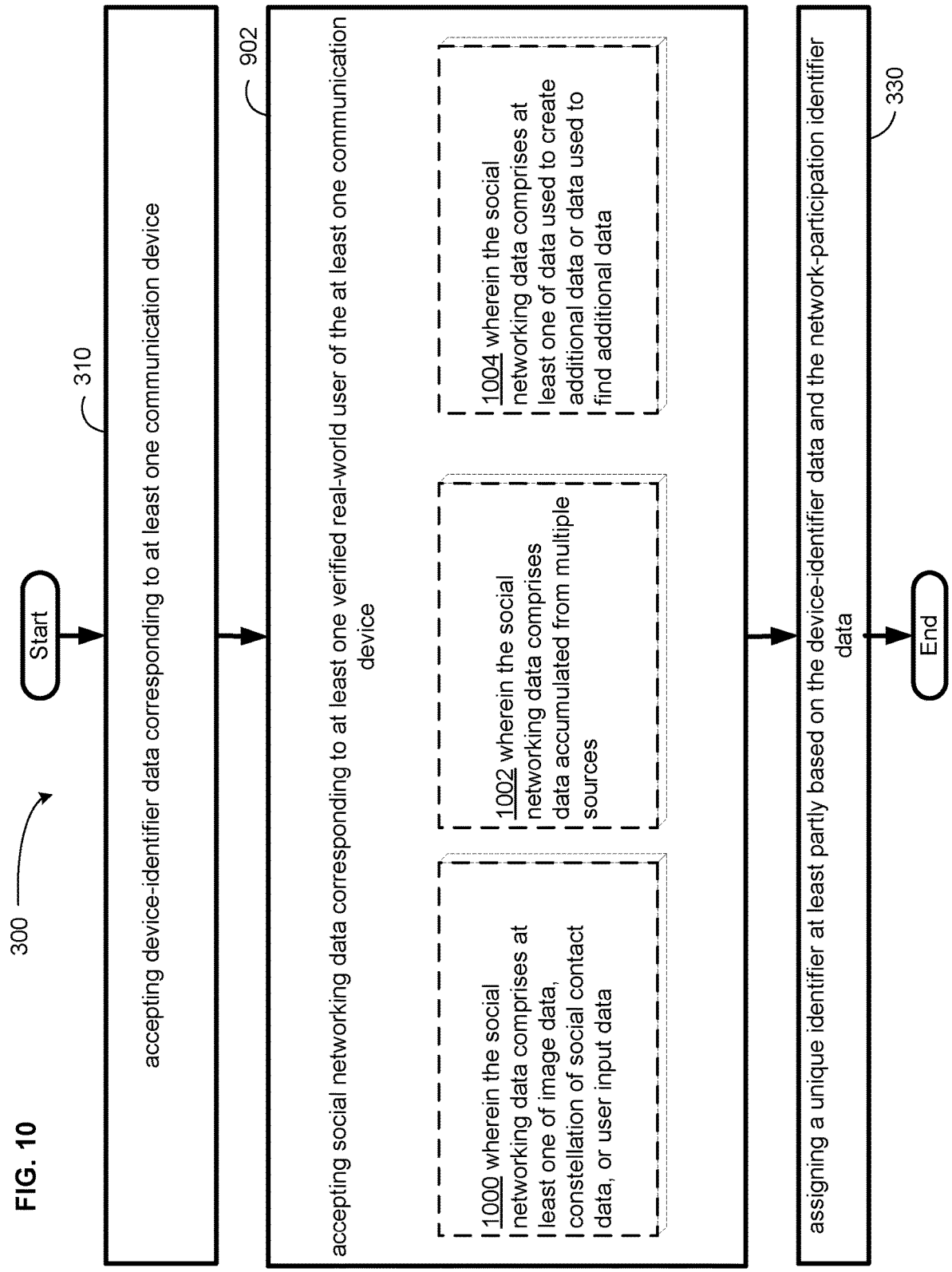

FIG. 10 illustrates an alternative embodiment of the example operational flow of FIG. 3.

Figure 11:
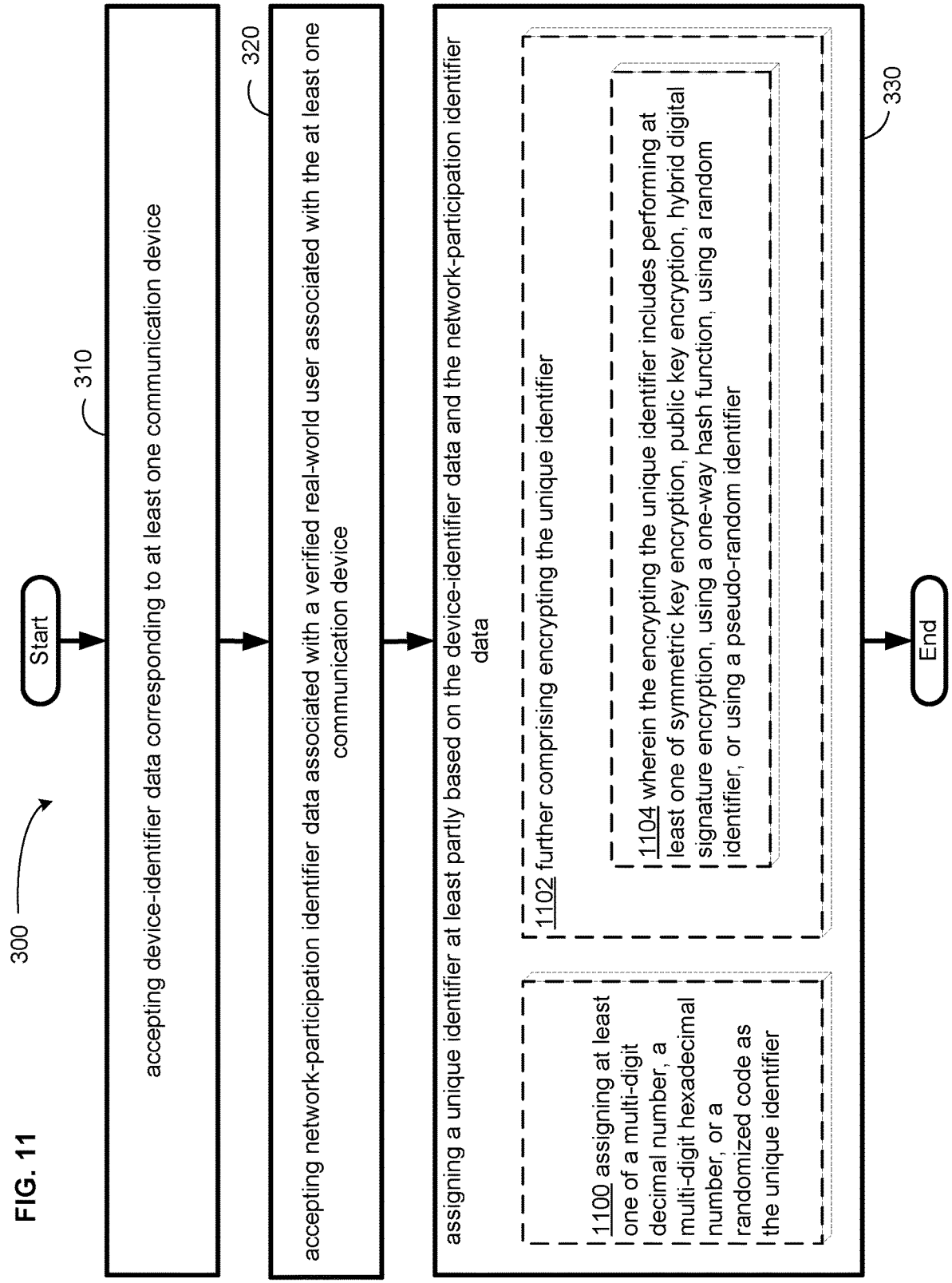

FIG. 11 illustrates an alternative embodiment of the example operational flow of FIG. 3.

Figure 12:
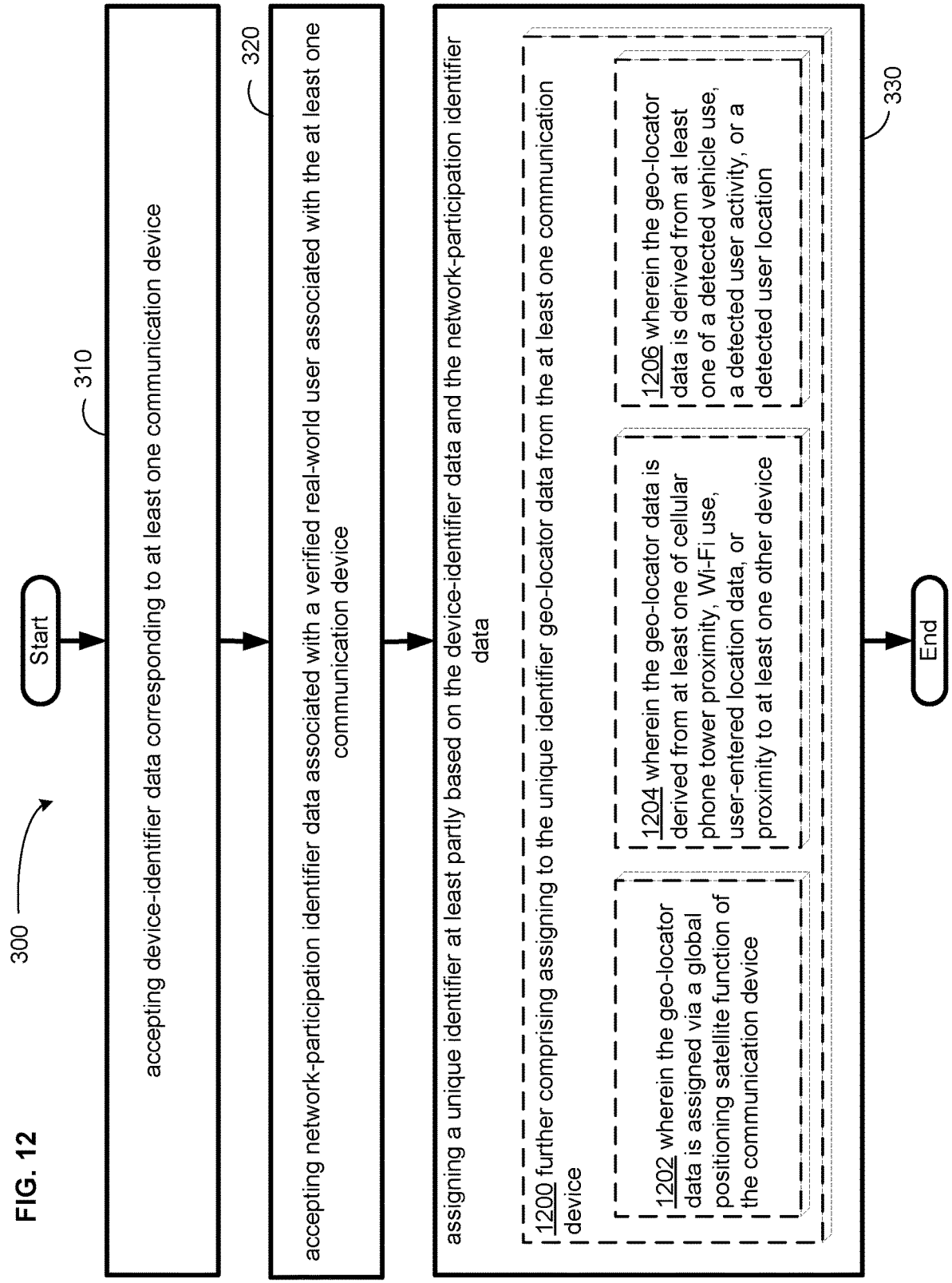

FIG. 12 illustrates an alternative embodiment of the example operational flow of FIG. 3.

Figure 13:
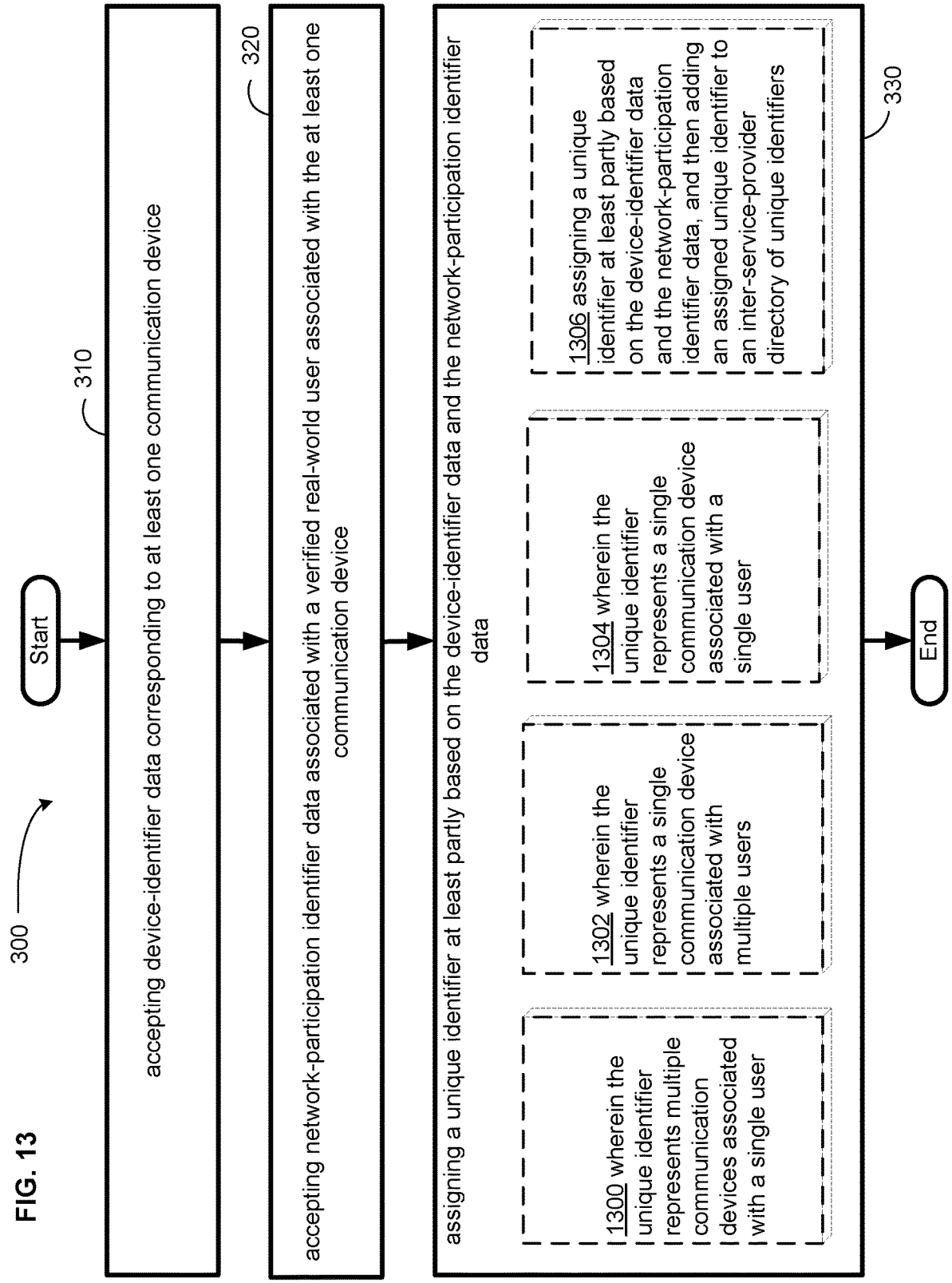

FIG. 13 illustrates an alternative embodiment of the example operational flow of FIG. 3.

With reference now to FIG. 14, shown is a partial view of an example article of manufacture including a computer program product that includes a computer program for executing a computer process on a computing device related to linking users of devices, which may serve as a context for introducing one or more processes and/or devices described herein.

With reference now to FIG. 15, shown is an example device in which embodiments may be implemented related to linking users of devices, which may serve as a context for introducing one or more processes and/or devices described herein.

Figure 16:
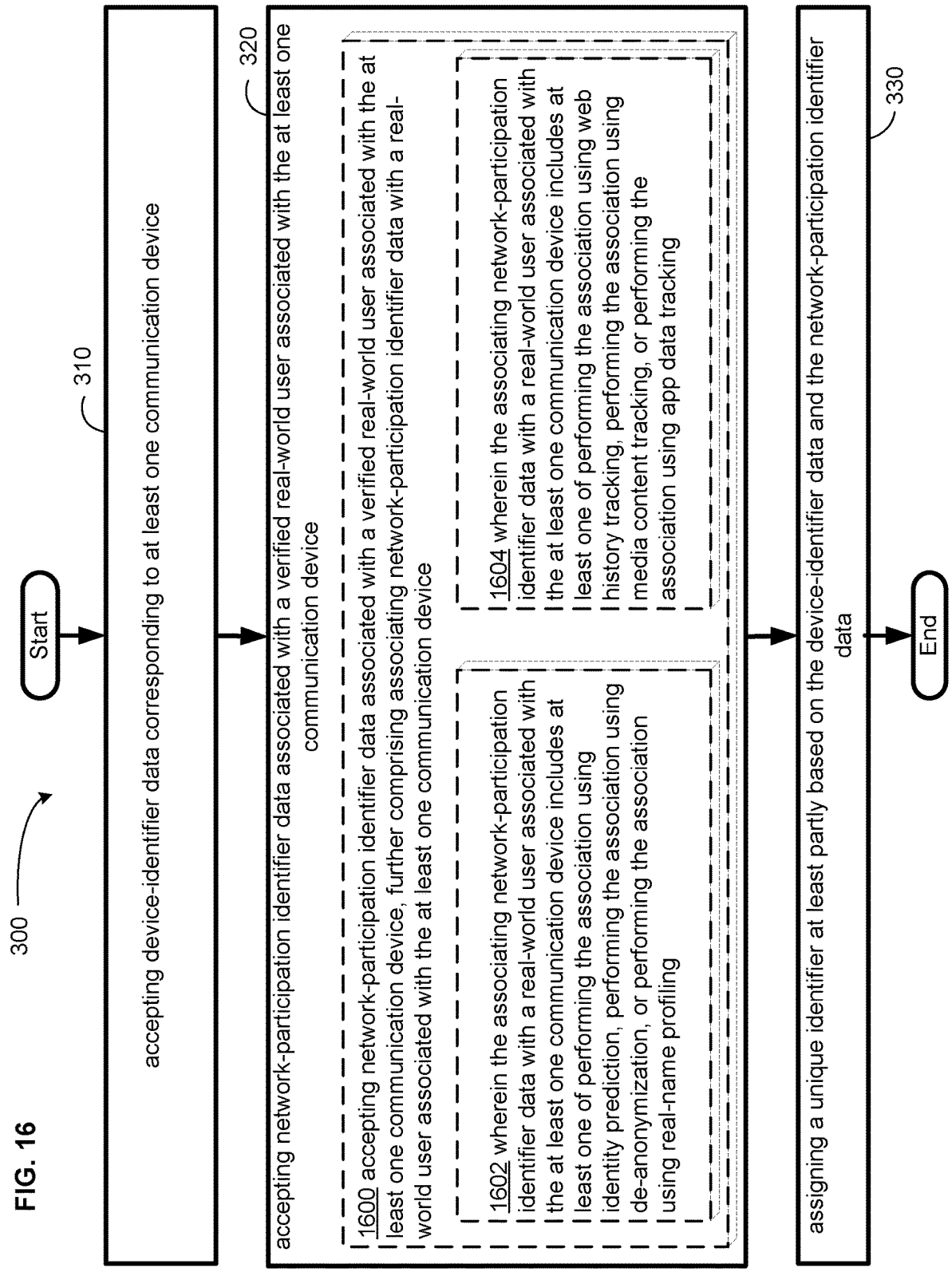

FIG. 16 illustrates an alternative embodiment of the example operational flow of FIG. 3.

Figure 17:
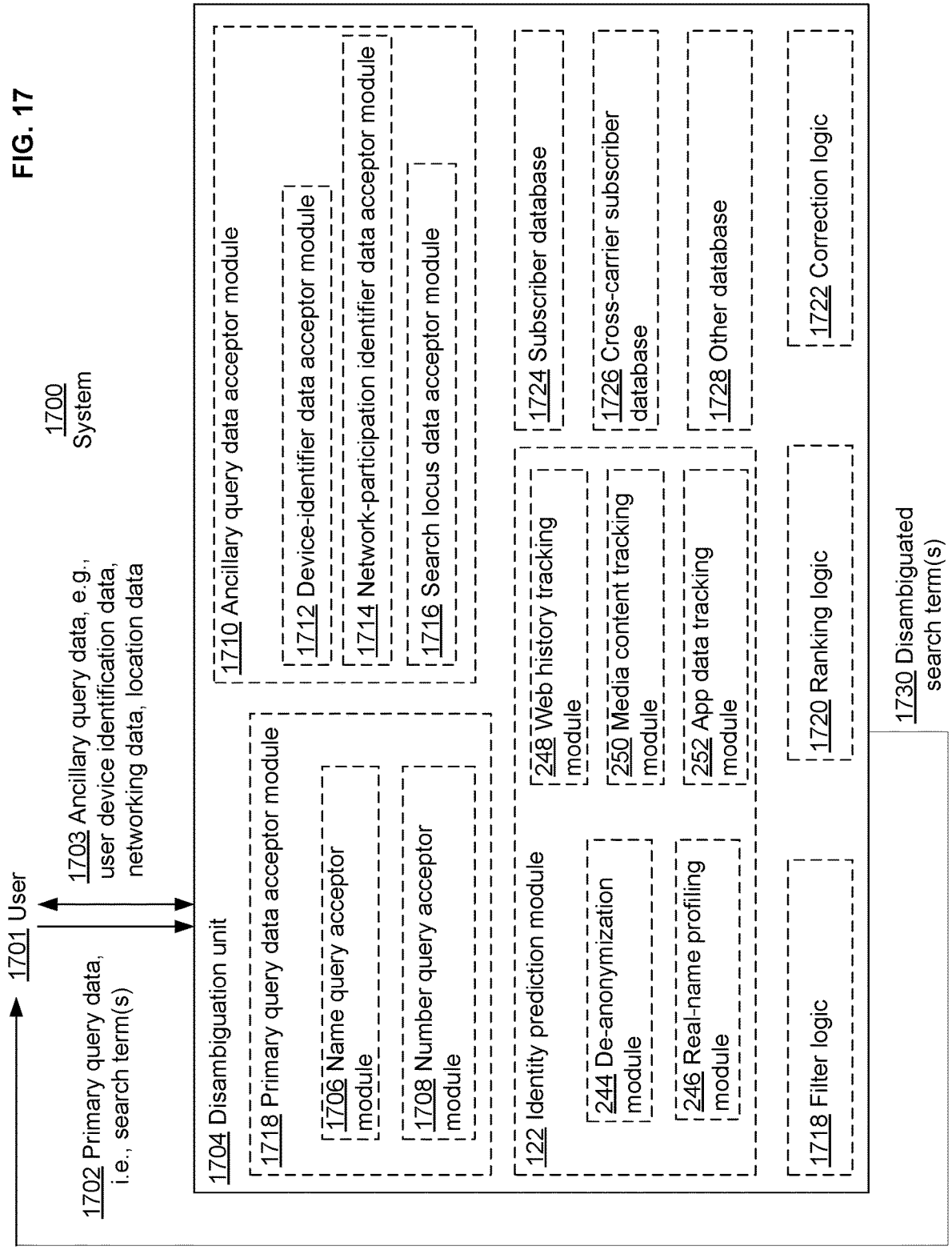

With reference now to FIG. 17, shown is an example of a system for disambiguating search terms corresponding to network members in which embodiments may be implemented, perhaps in a device and/or through a network, which may serve as a context for introducing one or more processes and/or devices described herein.

Figure 18:
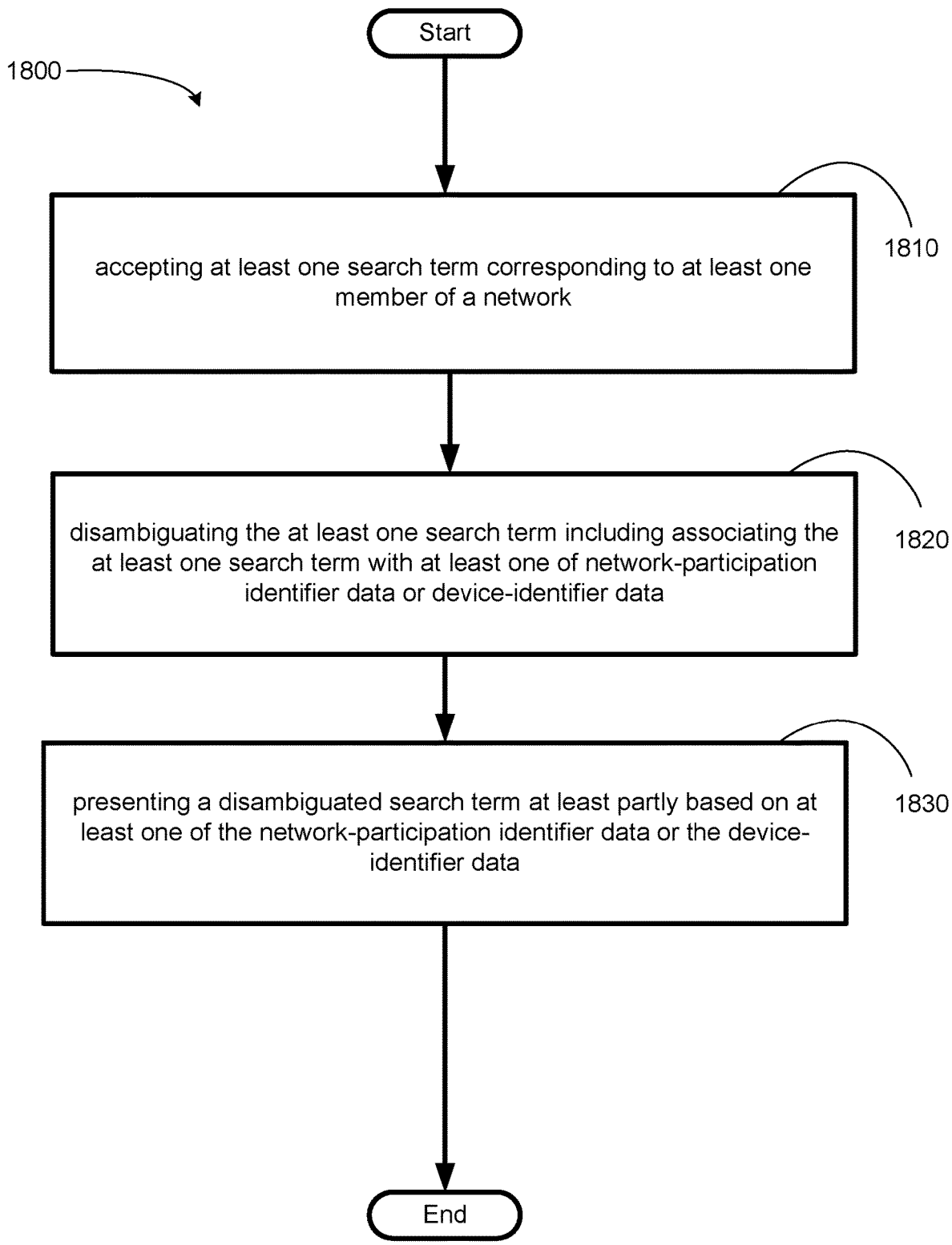

With reference now to FIG. 18, shown is an example of an operational flow representing example operations related to disambiguating search terms corresponding to network members, which may serve as a context for introducing one or more processes and/or devices described herein.

Figure 19:
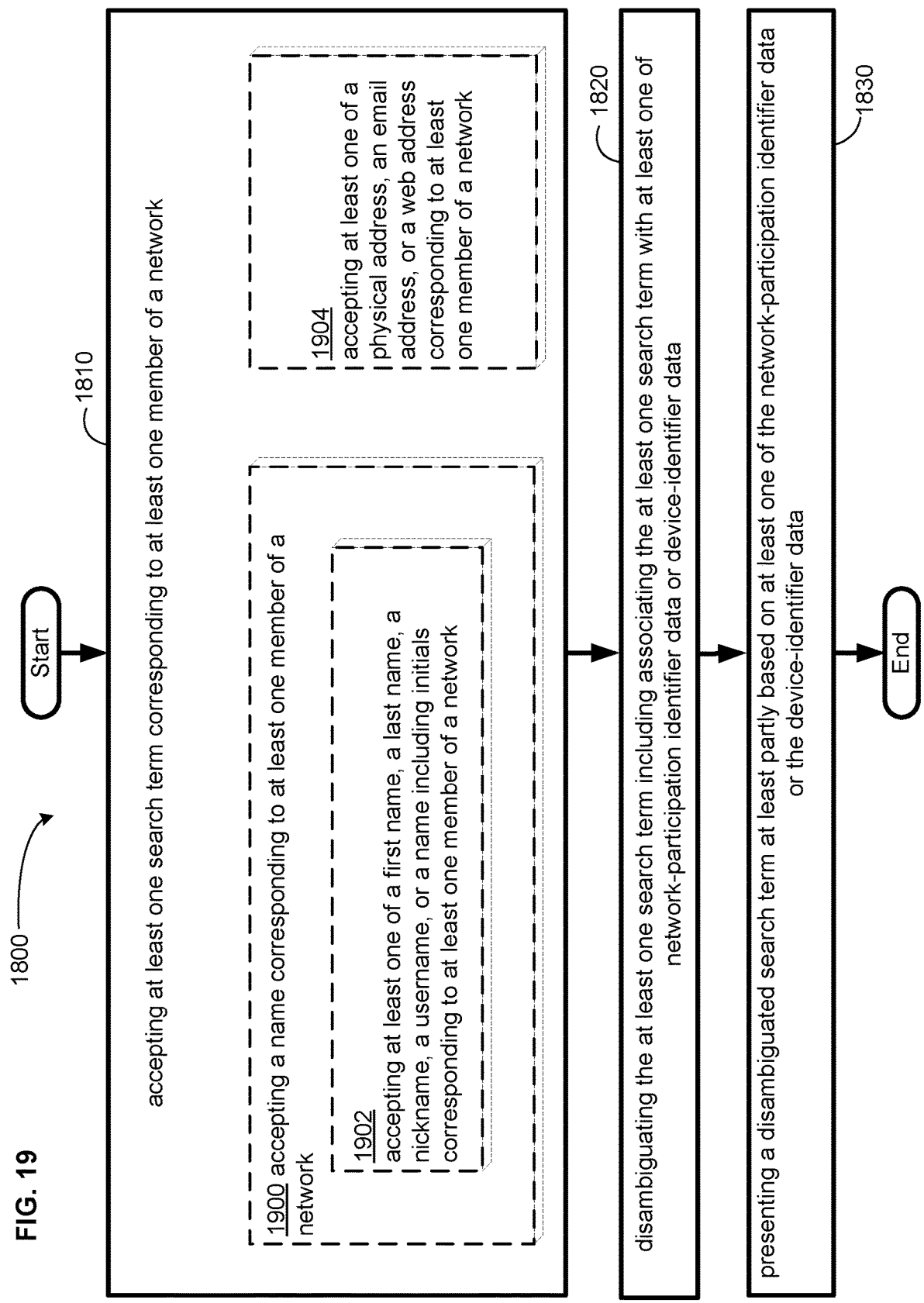

FIG. 19 illustrates an alternative embodiment of the example operational flow of FIG. 18.

Figure 20:
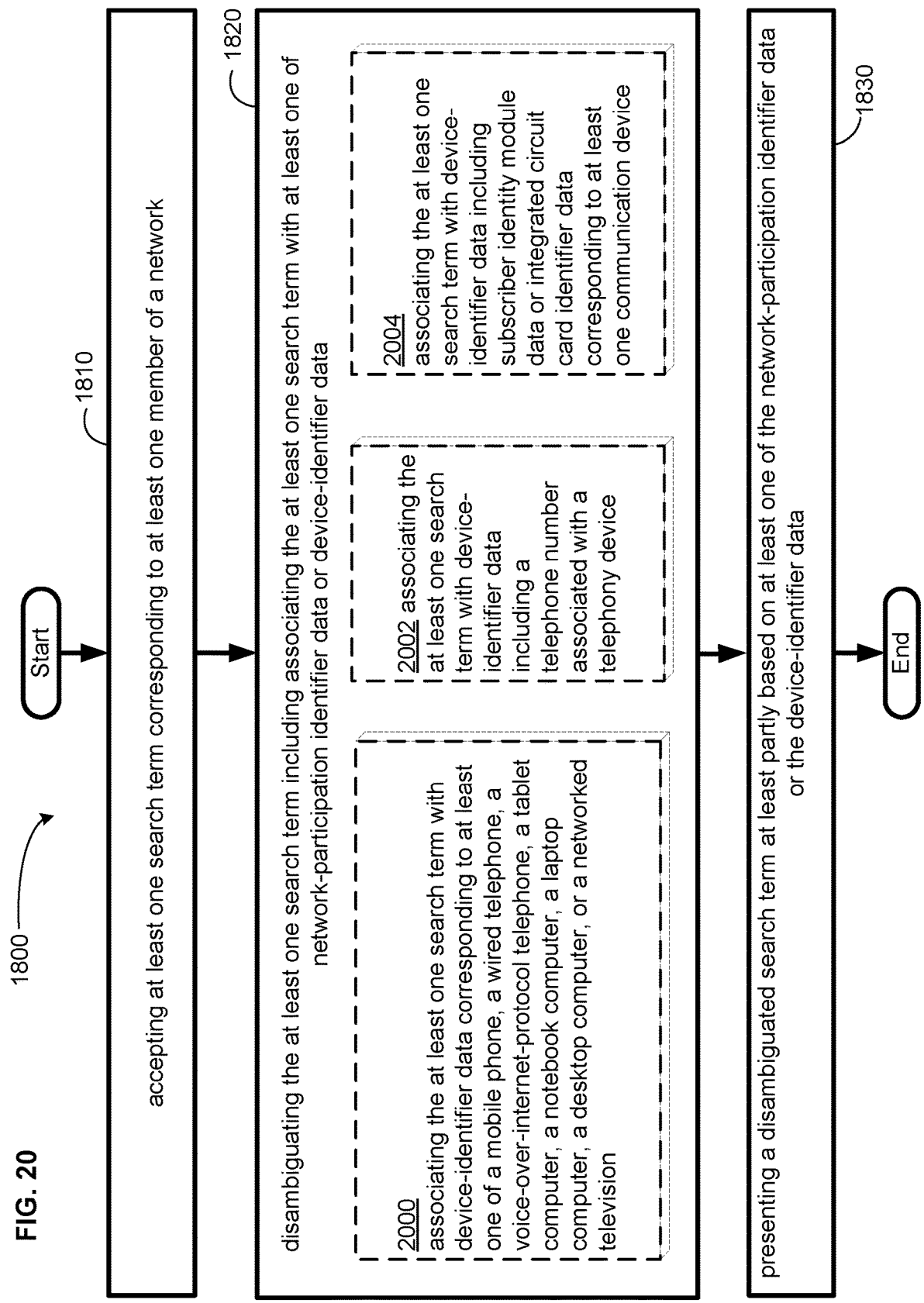

FIG. 20 illustrates an alternative embodiment of the example operational flow of FIG. 18.

Figure 21:
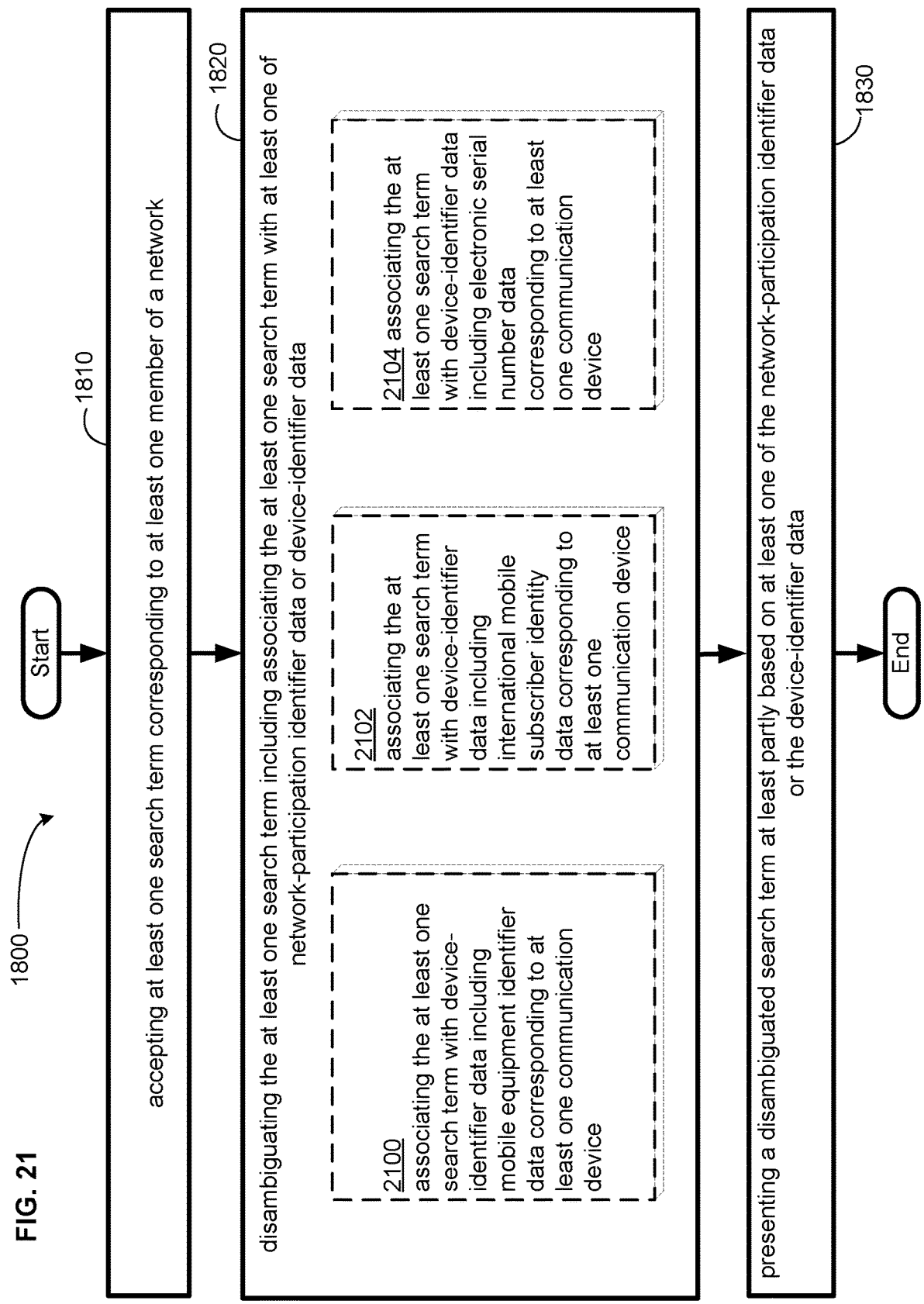

FIG. 21 illustrates an alternative embodiment of the example operational flow of FIG. 18.

Figure 22:
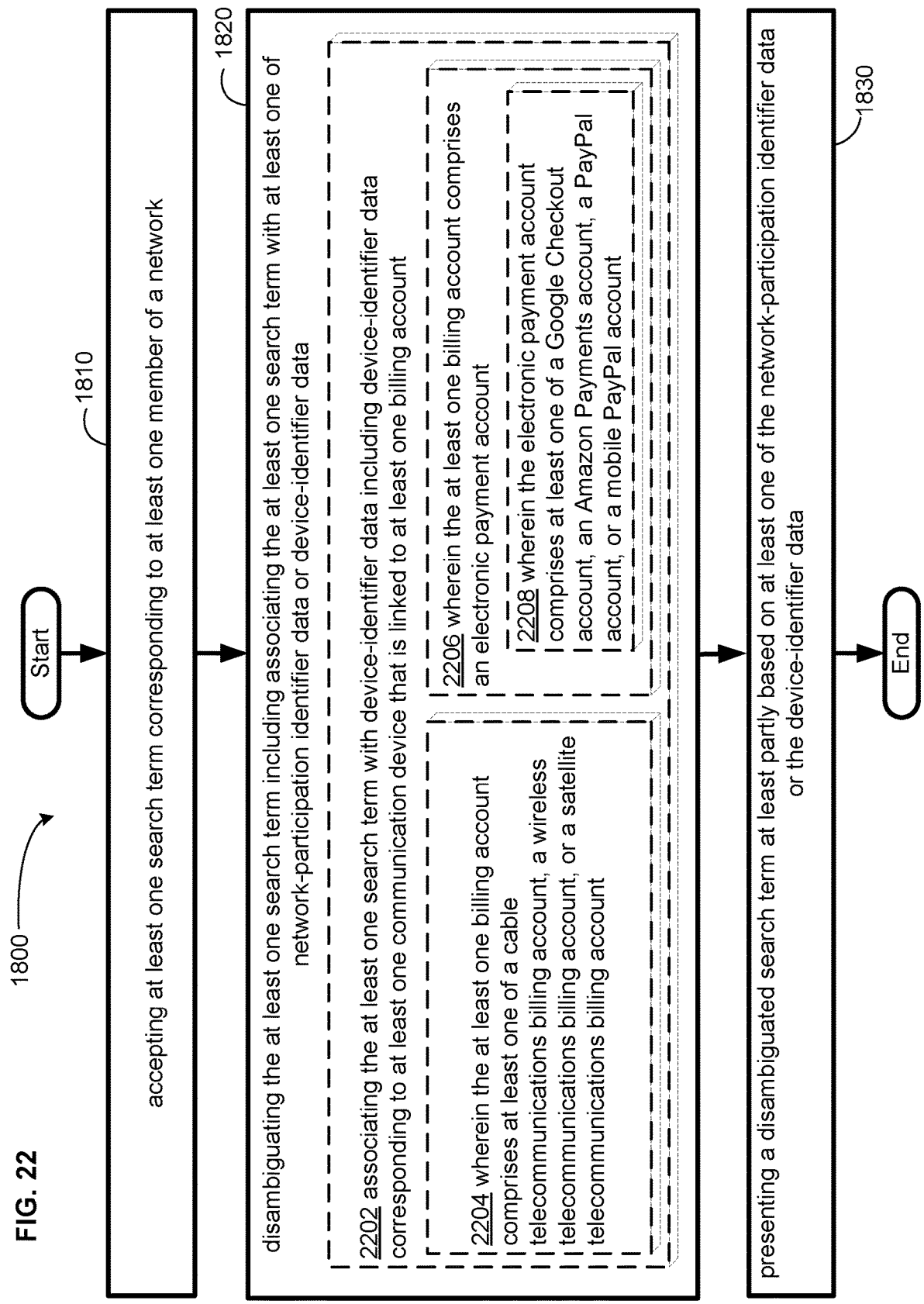

FIG. 22 illustrates an alternative embodiment of the example operational flow of FIG. 18.

Figure 23:
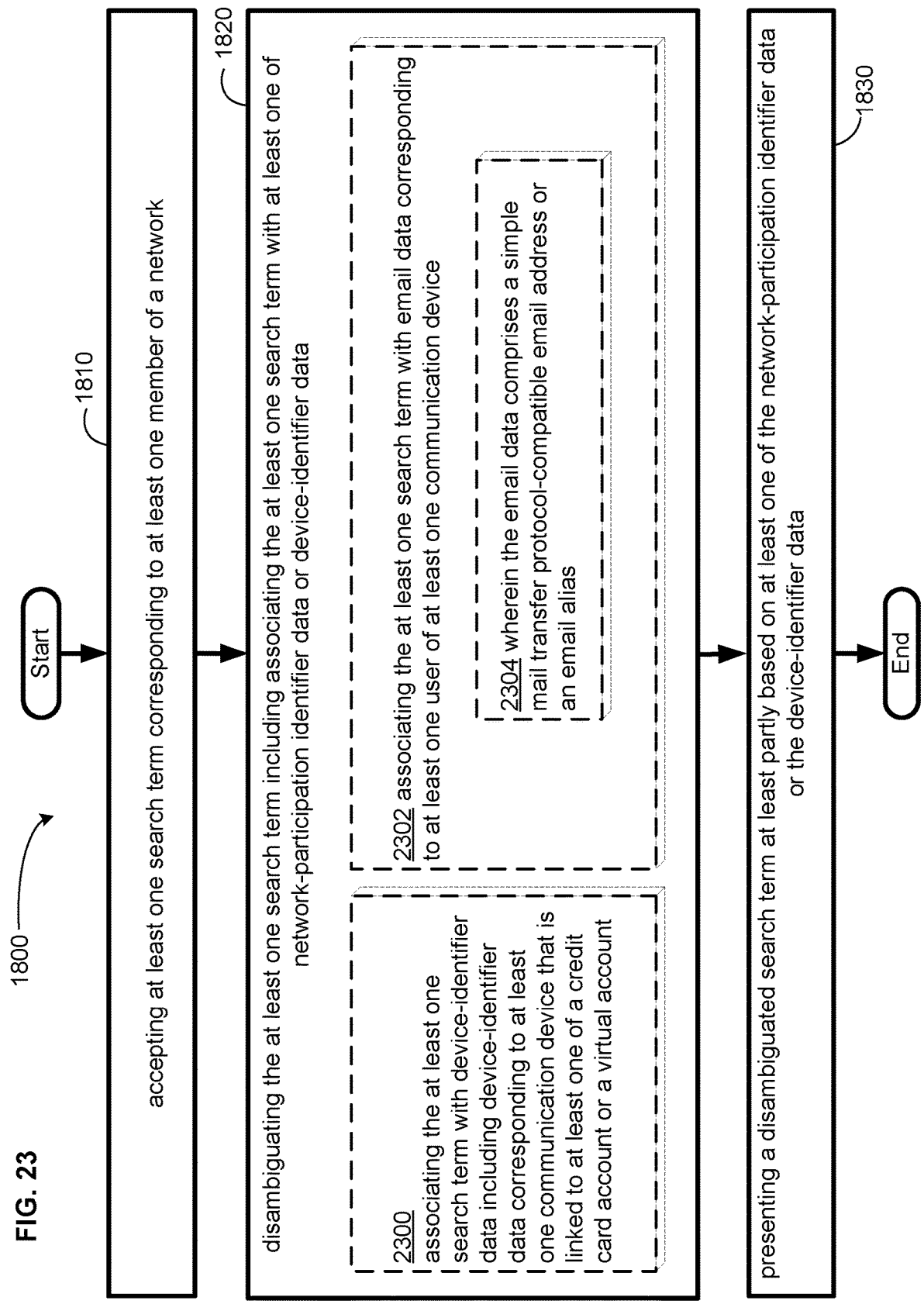

FIG. 23 illustrates an alternative embodiment of the example operational flow of FIG. 18.

Figure 24:
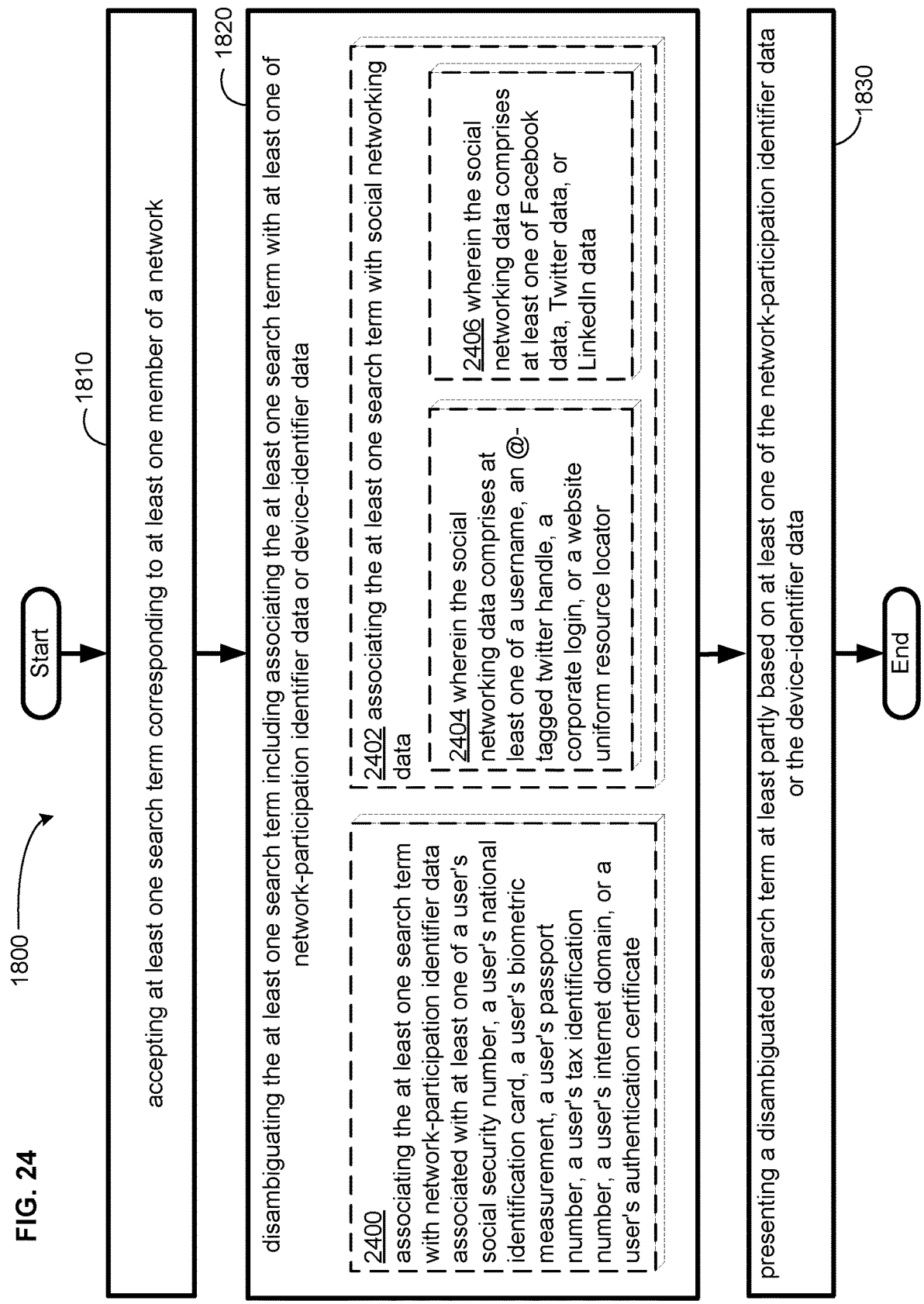

FIG. 24 illustrates an alternative embodiment of the example operational flow of FIG. 18.

Figure 25:
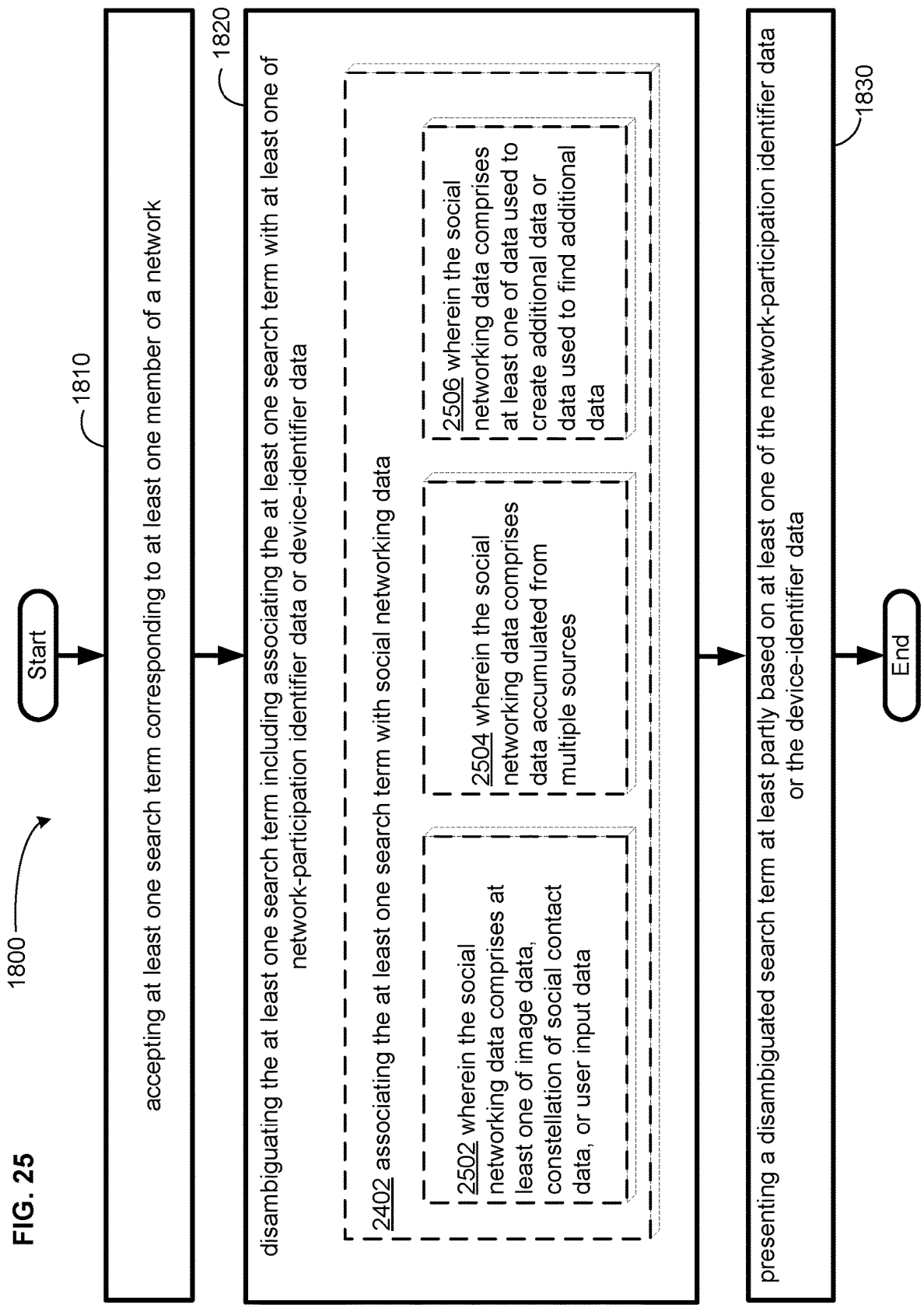

FIG. 25 illustrates an alternative embodiment of the example operational flow of FIG. 18.

Figure 26:
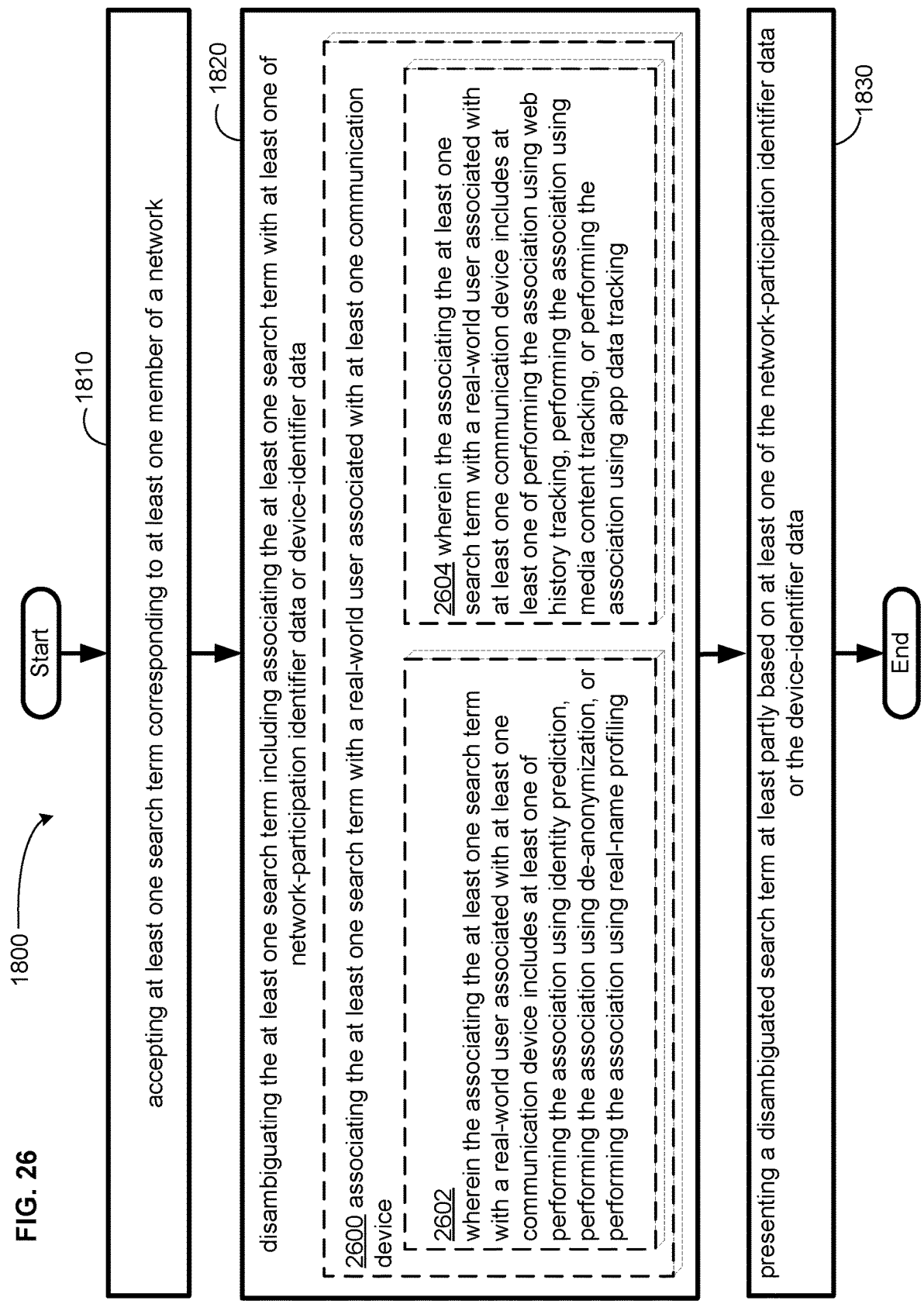

FIG. 26 illustrates an alternative embodiment of the example operational flow of FIG. 18.

Figure 27:
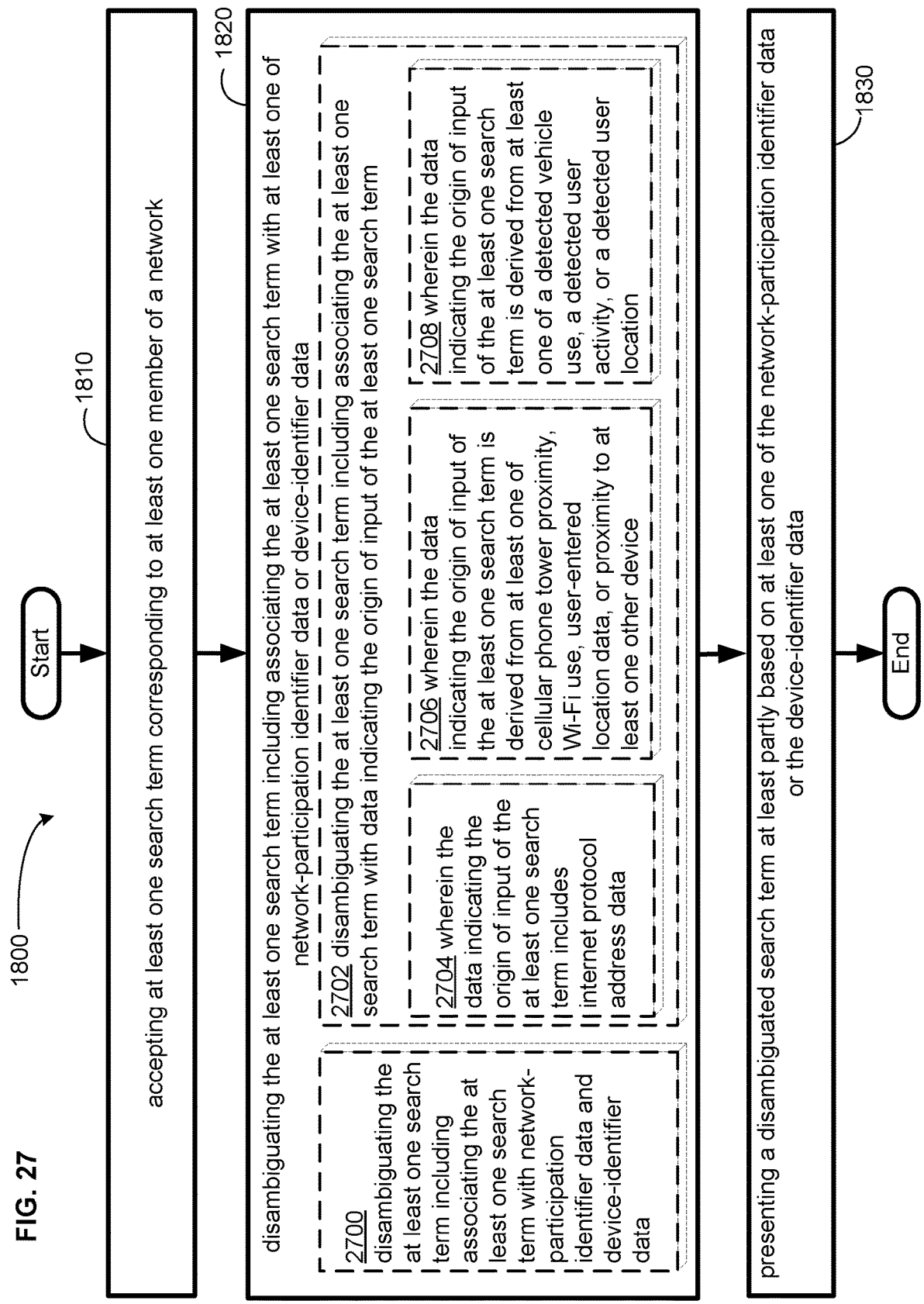

FIG. 27 illustrates an alternative embodiment of the example operational flow of FIG. 18.

Figure 28:
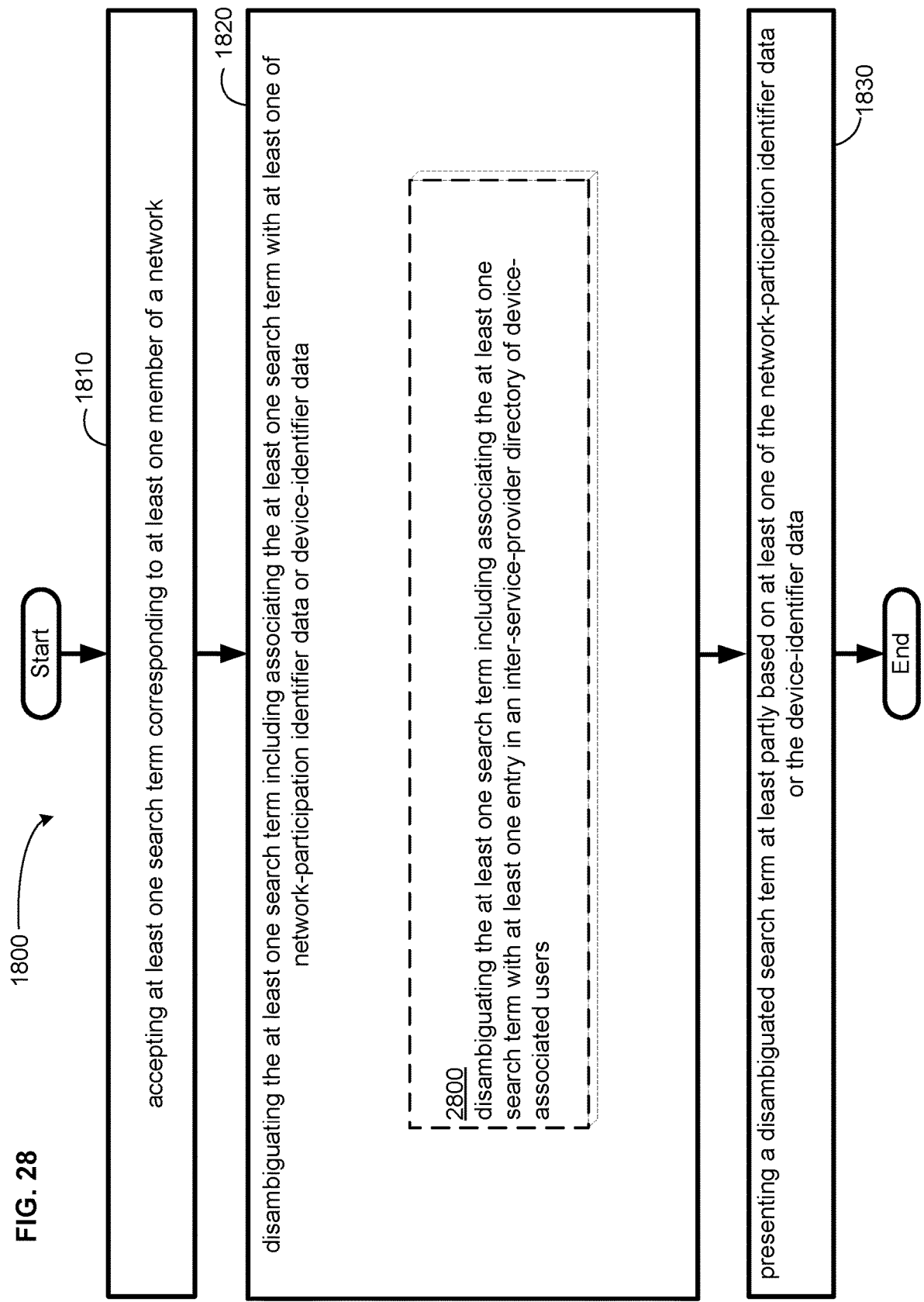

FIG. 28 illustrates an alternative embodiment of the example operational flow of FIG. 18.

FIG. 29 illustrates an alternative embodiment of the example operational flow of FIG. 18.

With reference now to FIG. 30, shown is a partial view of an example article of manufacture including a computer program product that includes a computer program for executing a computer process on a computing device related to disambiguating search terms corresponding to network members, which may serve as a context for introducing one or more processes and/or devices described herein.

Figure 31:
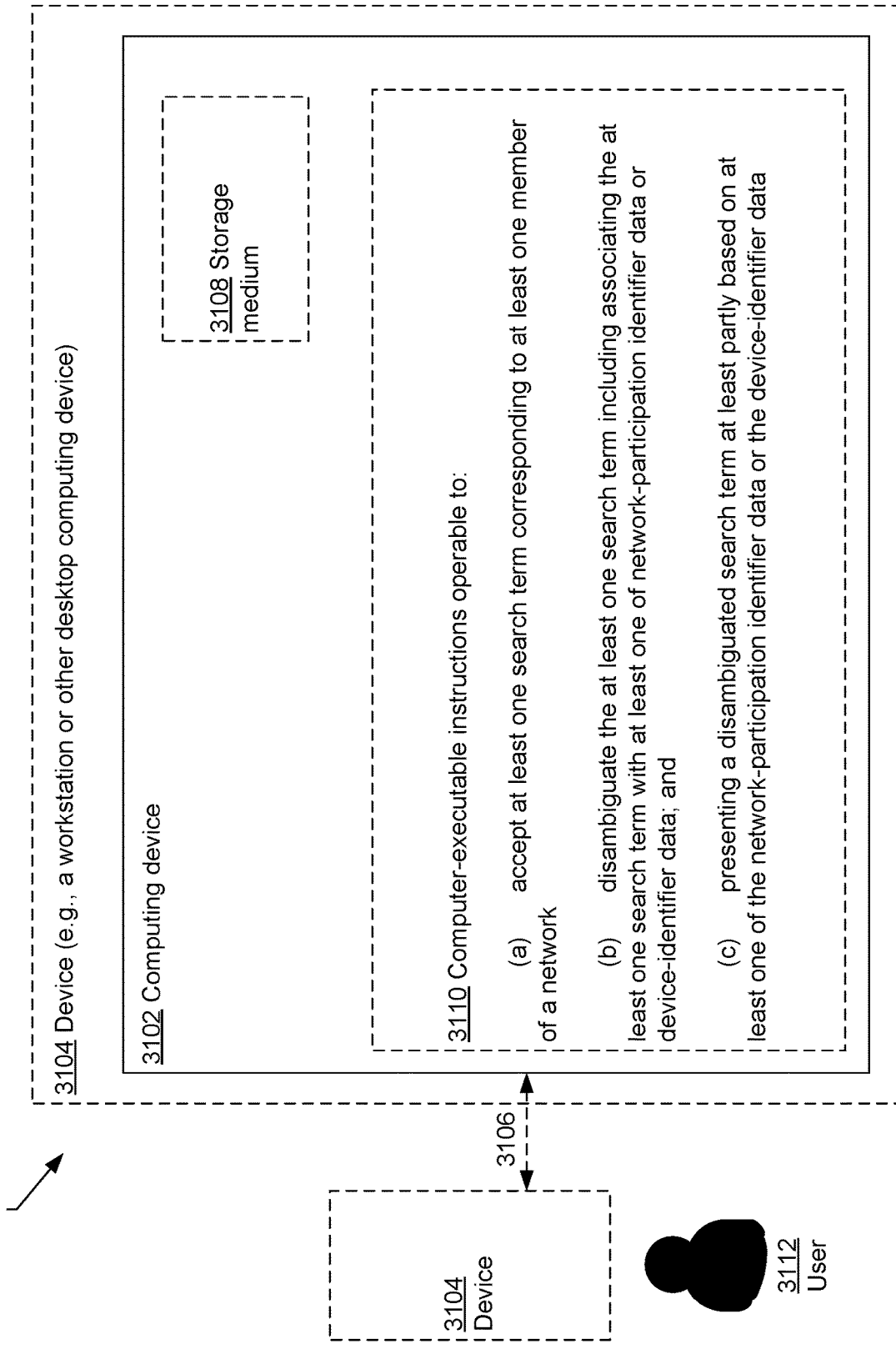

With reference now to FIG. 31, shown is an example device in which embodiments may be implemented related to disambiguating search terms corresponding to network members, which may serve as a context for introducing one or more processes and/or devices described herein.

Figure 32:
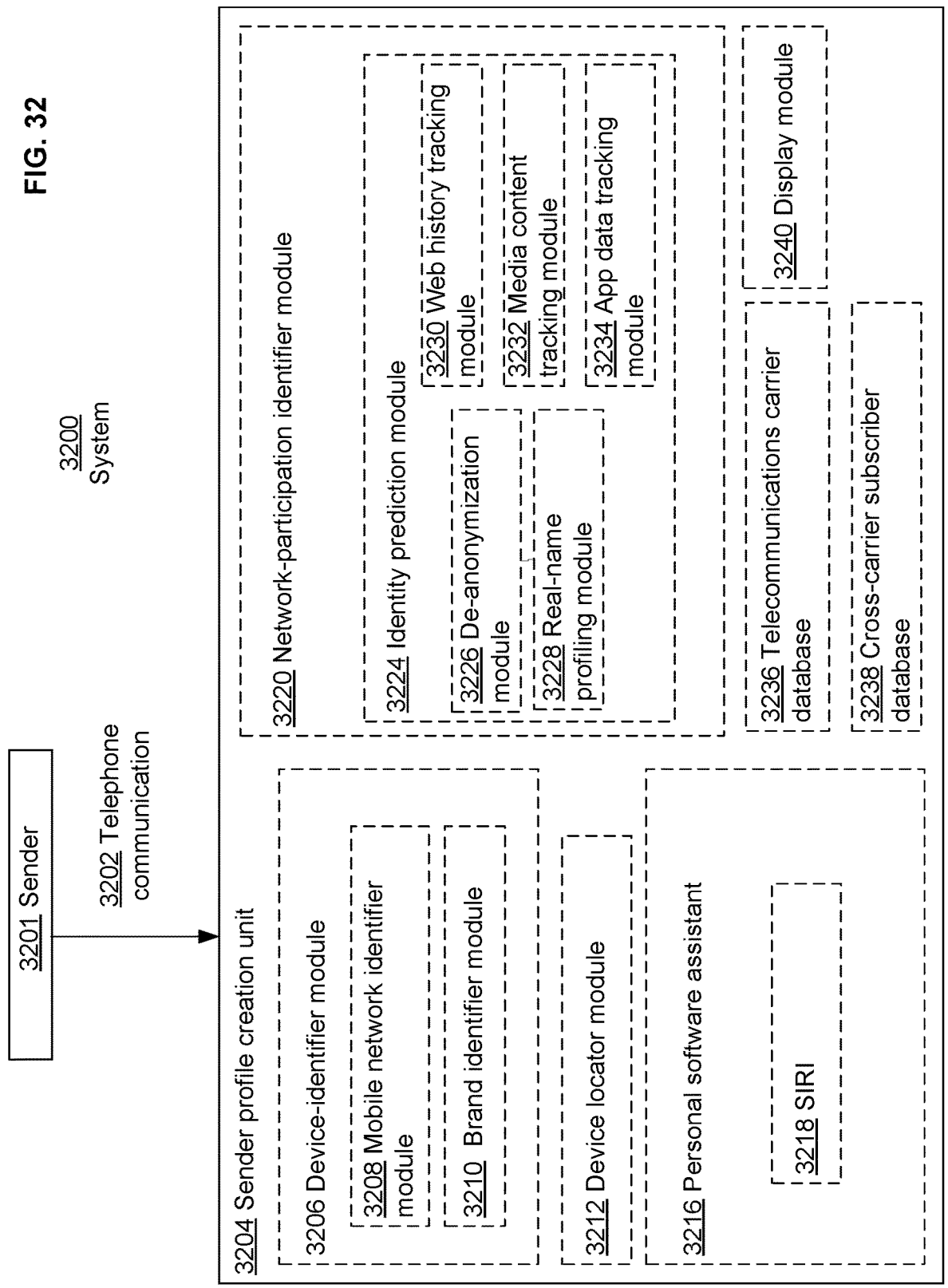

With reference now to FIG. 32, shown is an example of a system for identifying a communications partner in which embodiments may be implemented, perhaps in a device and/or through a network, which may serve as a context for introducing one or more processes and/or devices described herein.

Figure 33:
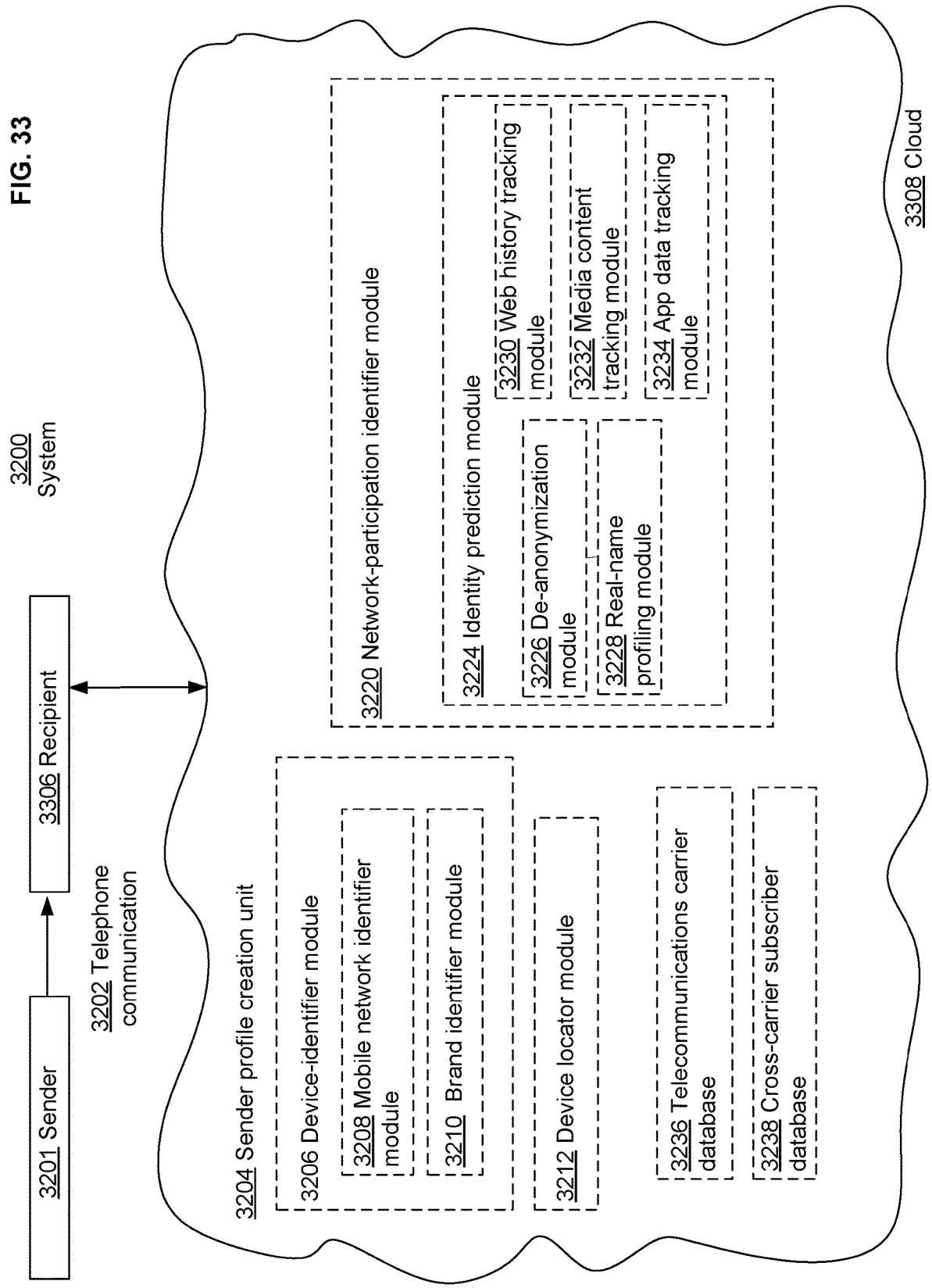

With reference now to FIG. 33, shown is another example of a system for identifying a communications partner in which embodiments may be implemented, perhaps in a device and/or through a network, which may serve as a context for introducing one or more processes and/or devices described herein.

Figure 34:
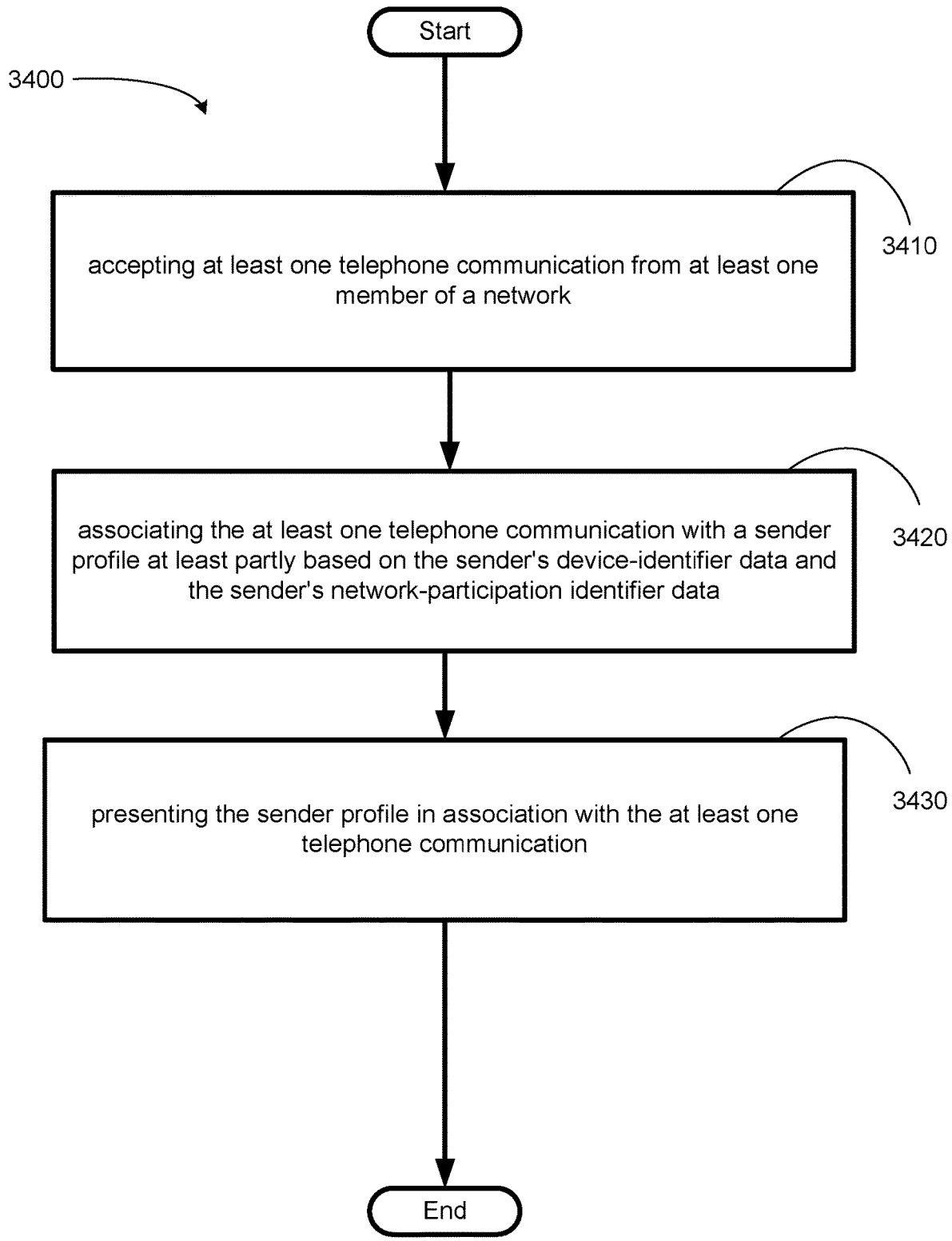

With reference now to FIG. 34, shown is an example of an operational flow representing example operations related to identifying a communications partner, which may serve as a context for introducing one or more processes and/or devices described herein.

Figure 35:
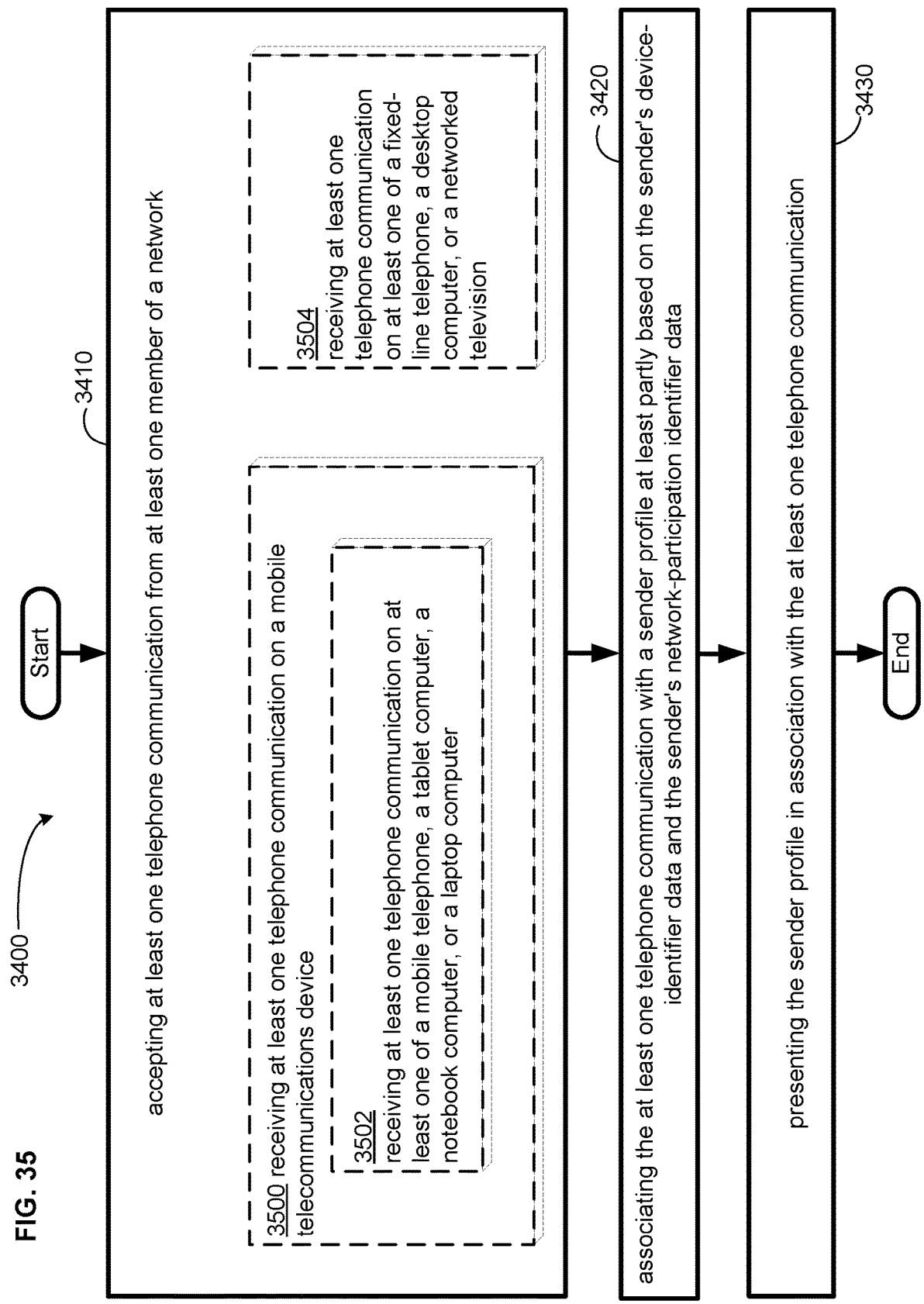

FIG. 35 illustrates an alternative embodiment of the example operational flow of FIG. 34.

Figure 36:
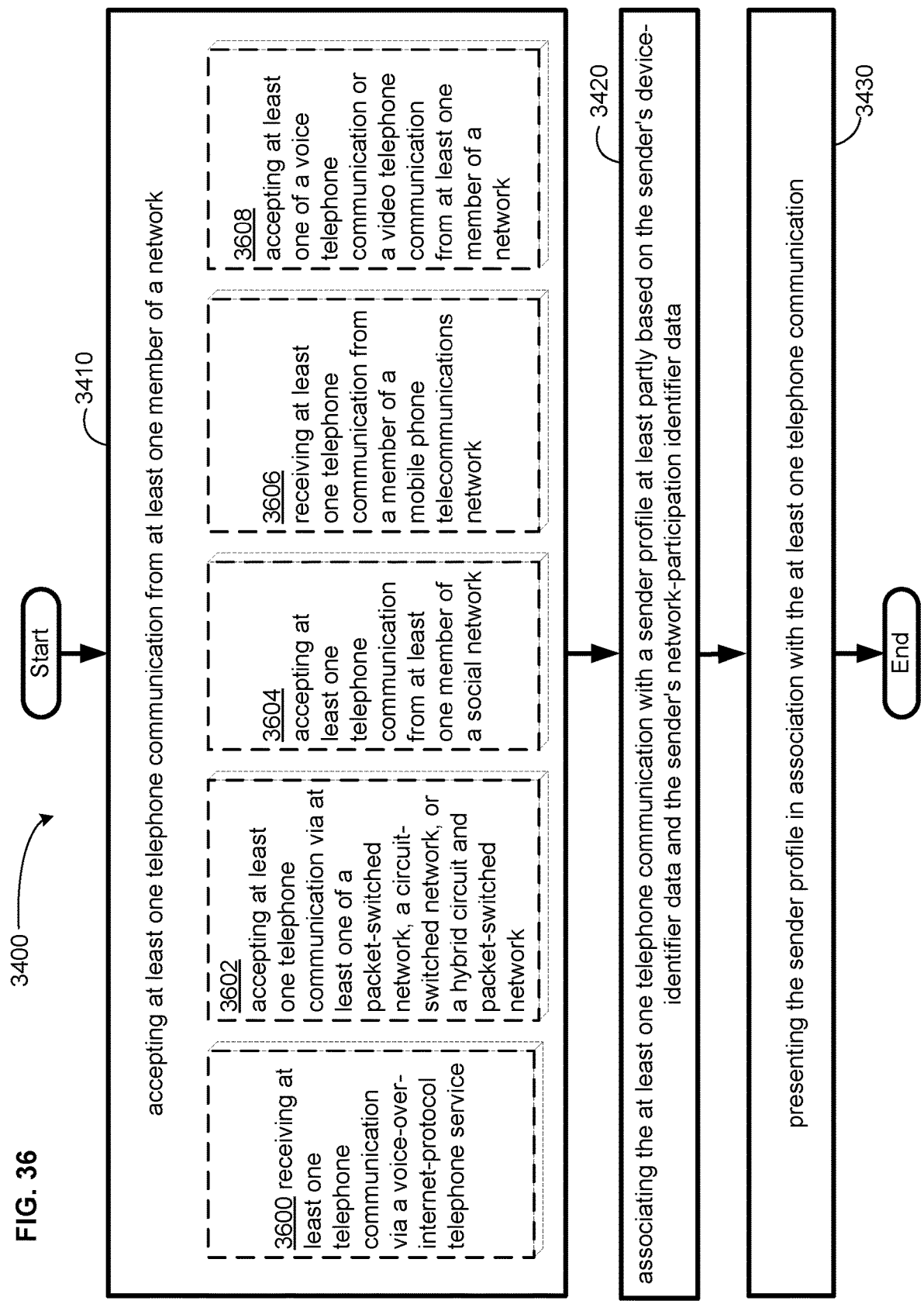

FIG. 36 illustrates an alternative embodiment of the example operational flow of FIG. 34.

Figure 37:
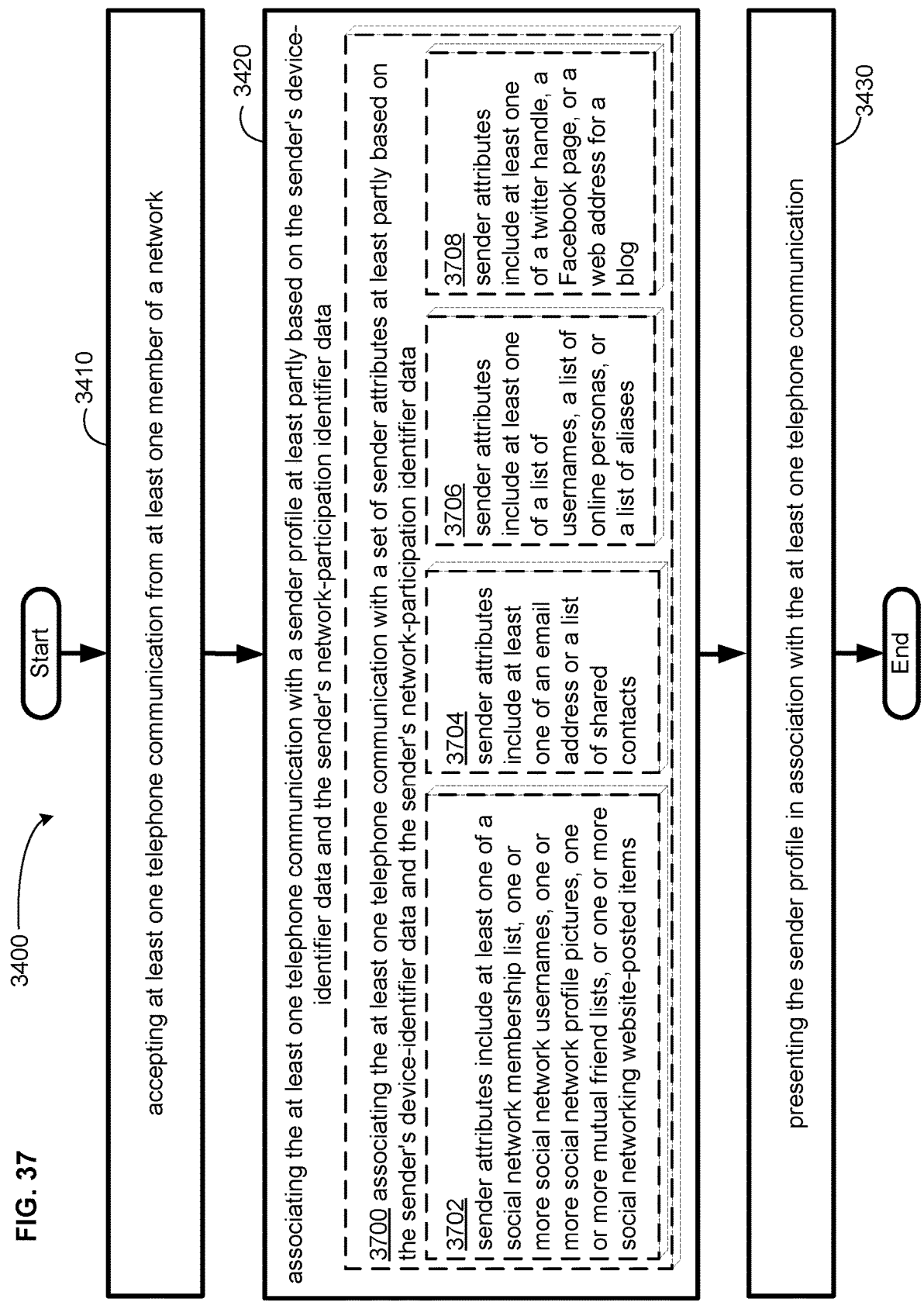

FIG. 37 illustrates an alternative embodiment of the example operational flow of FIG. 34.

Figure 38:
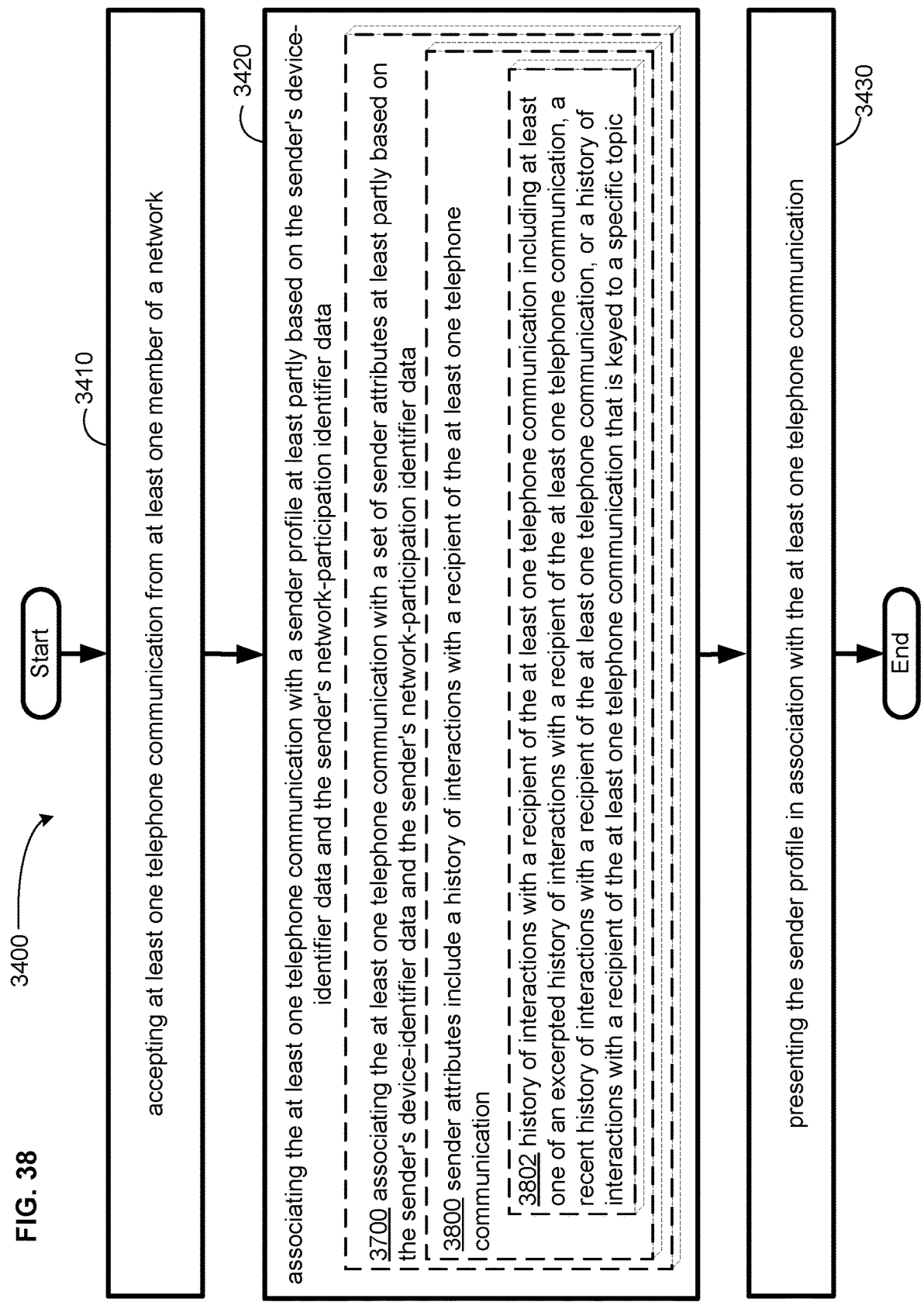

FIG. 38 illustrates an alternative embodiment of the example operational flow of FIG. 34.

Figure 39:
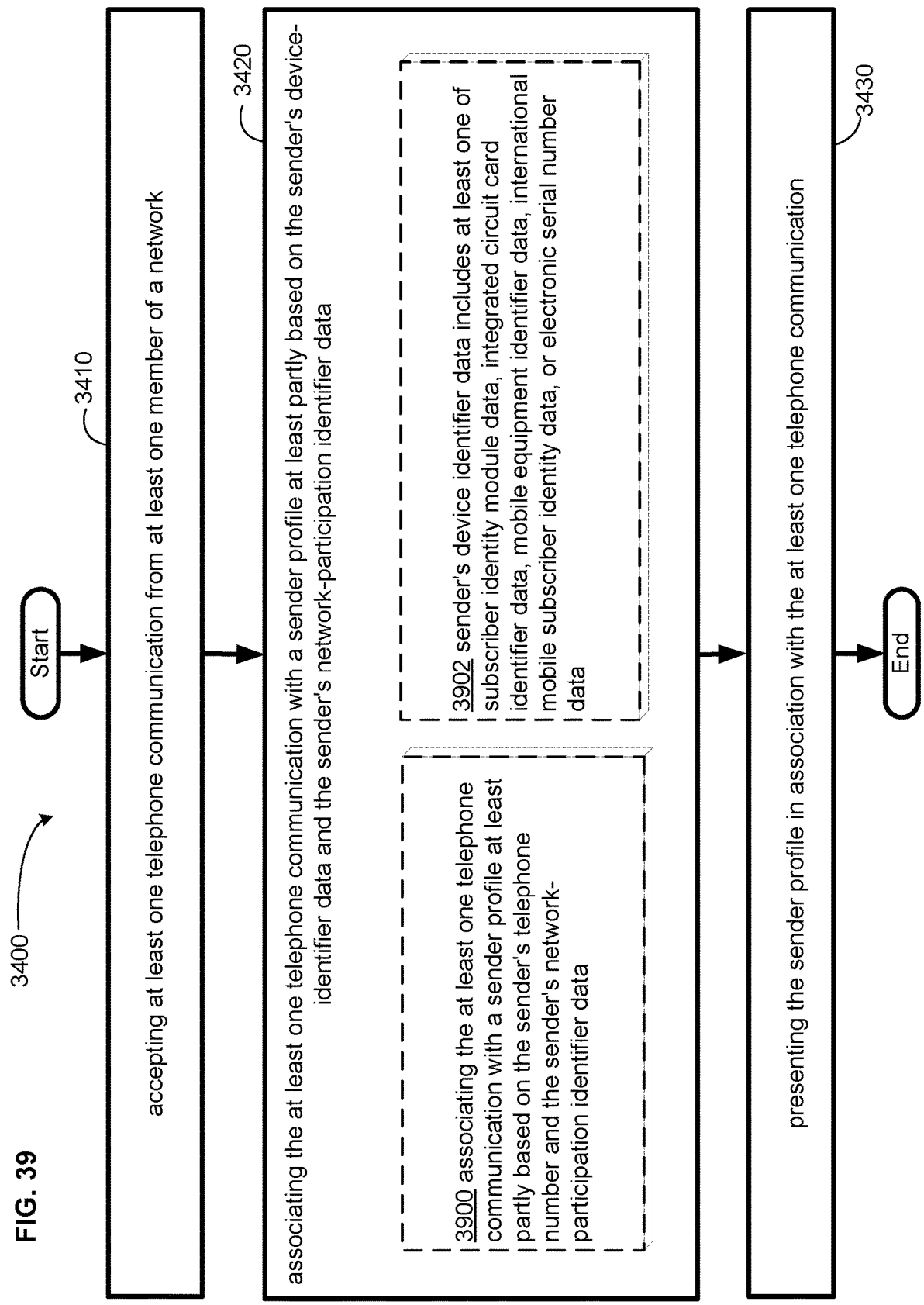

FIG. 39 illustrates an alternative embodiment of the example operational flow of FIG. 34.

Figure 40:
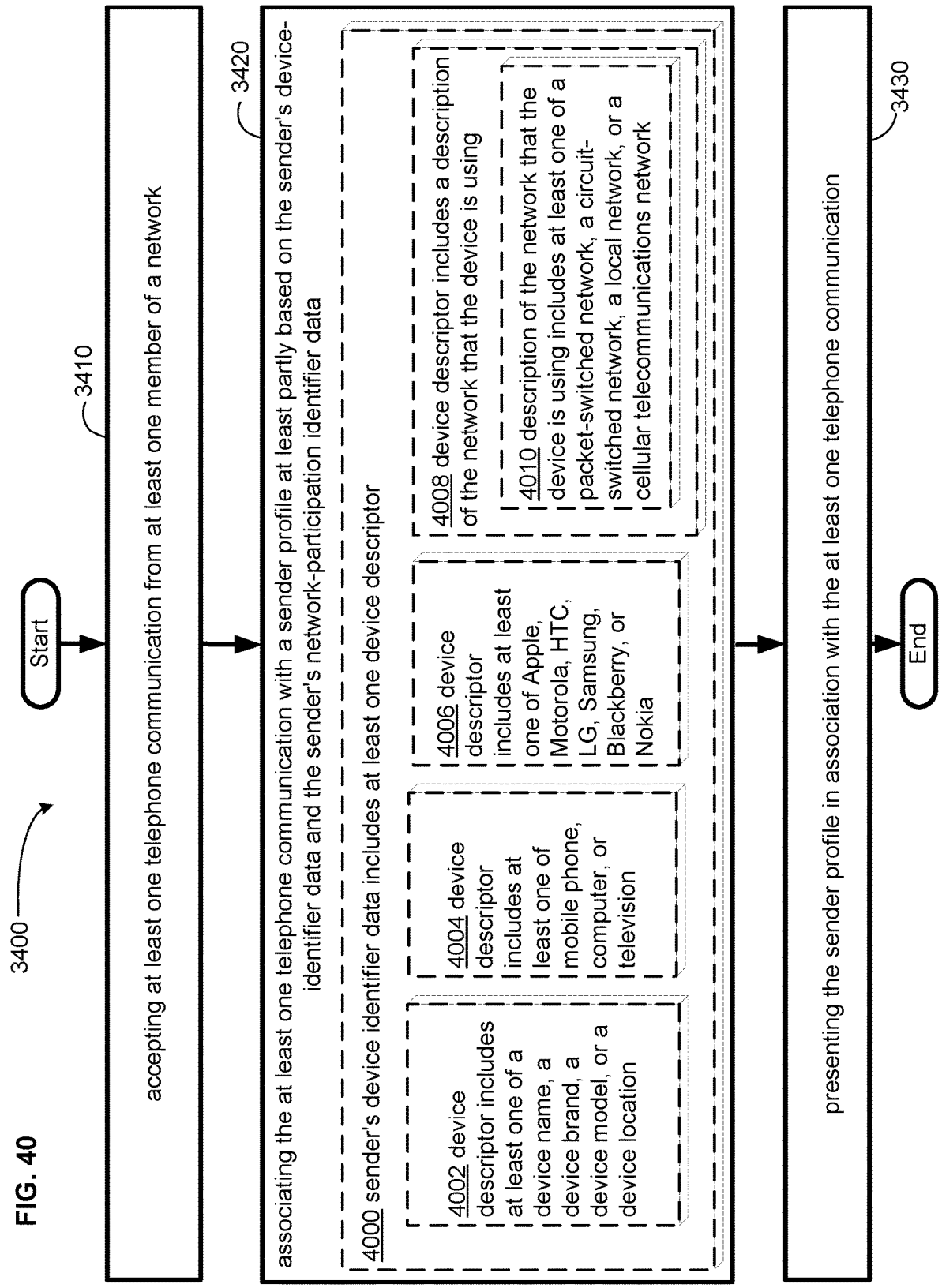

FIG. 40 illustrates an alternative embodiment of the example operational flow of FIG. 34.

Figure 41:
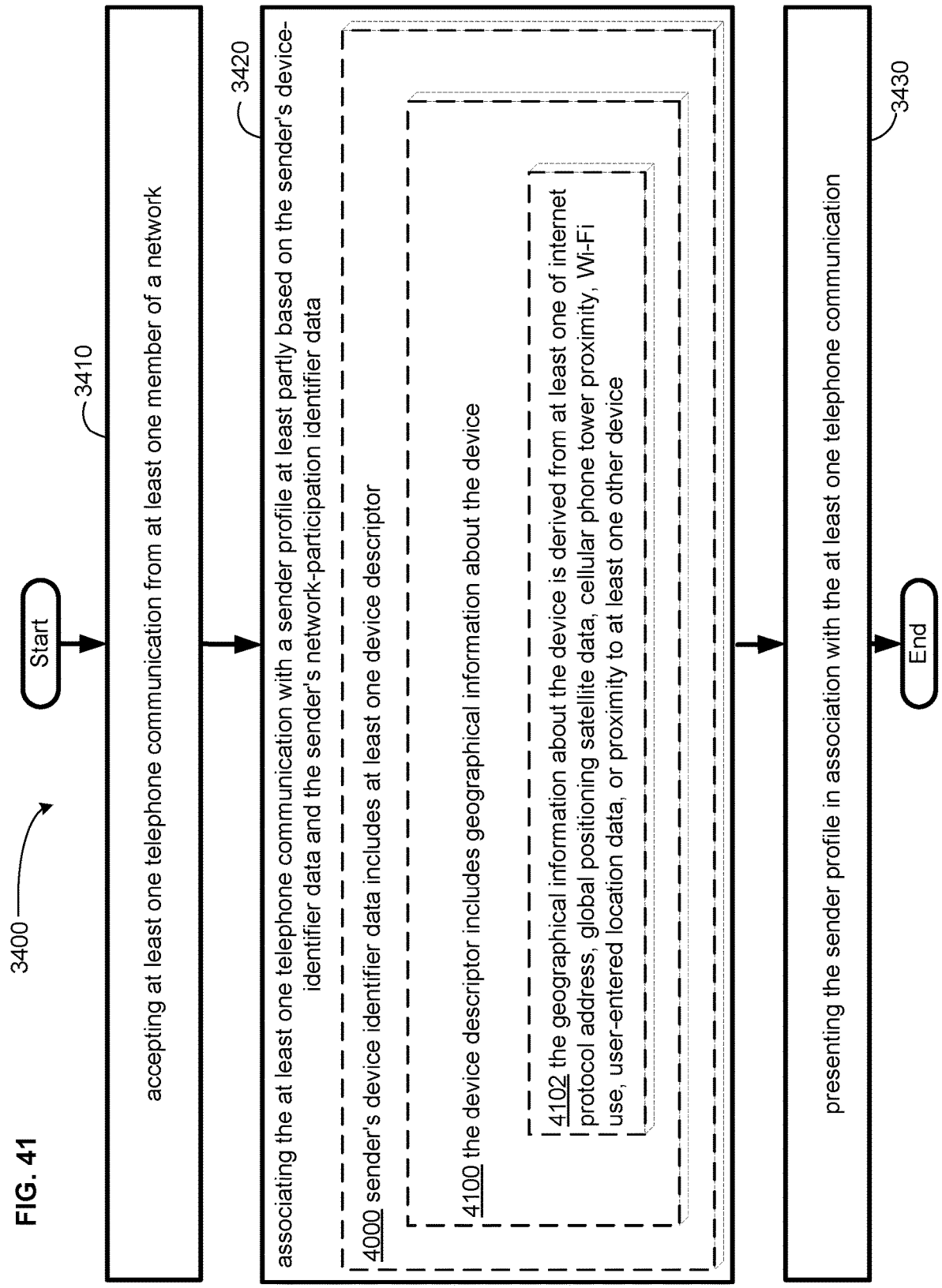

FIG. 41 illustrates an alternative embodiment of the example operational flow of FIG. 34.

Figure 42:
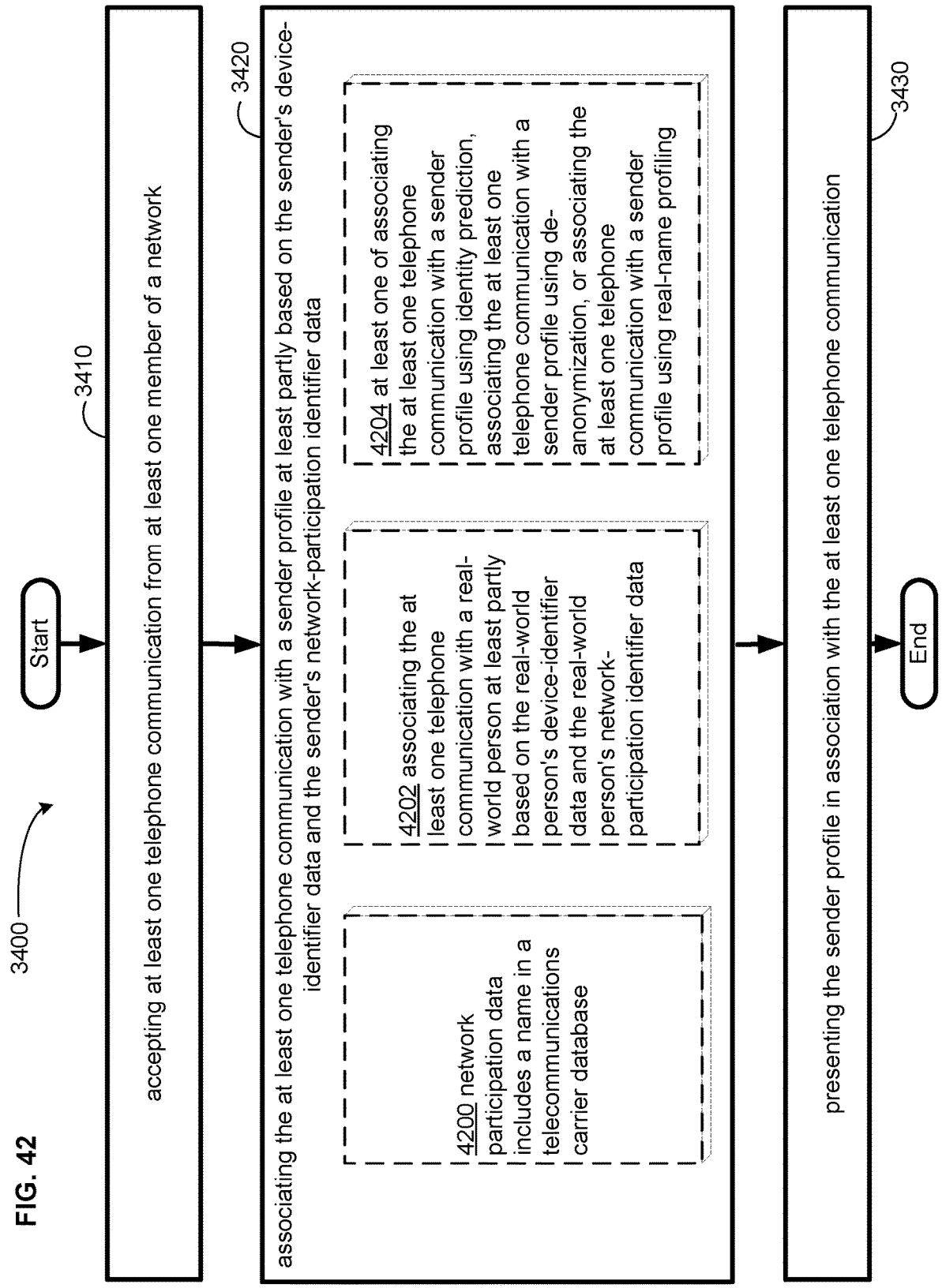

FIG. 42 illustrates an alternative embodiment of the example operational flow of FIG. 34.

Figure 43:
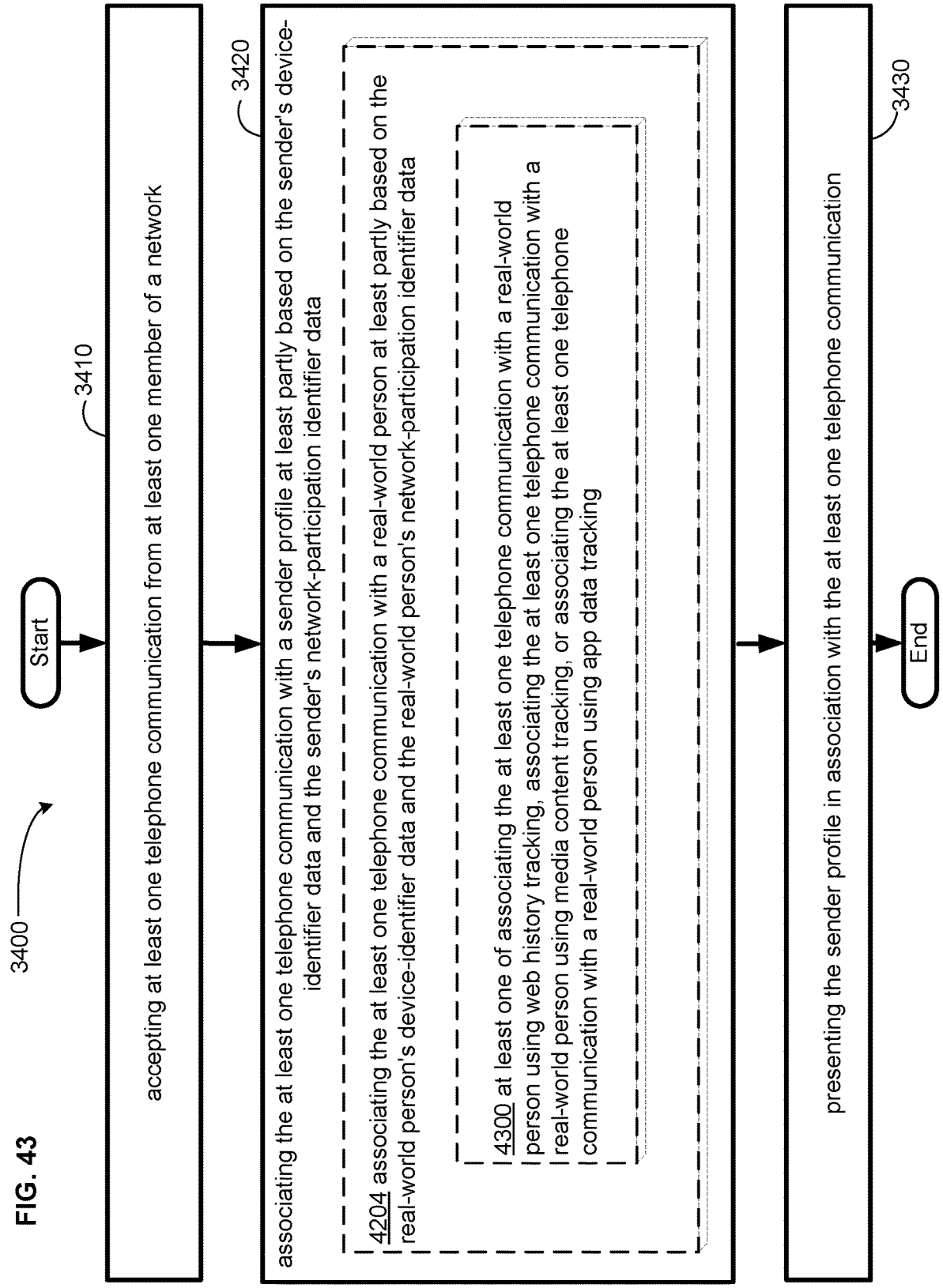

FIG. 43 illustrates an alternative embodiment of the example operational flow of FIG. 34.

Figure 44:
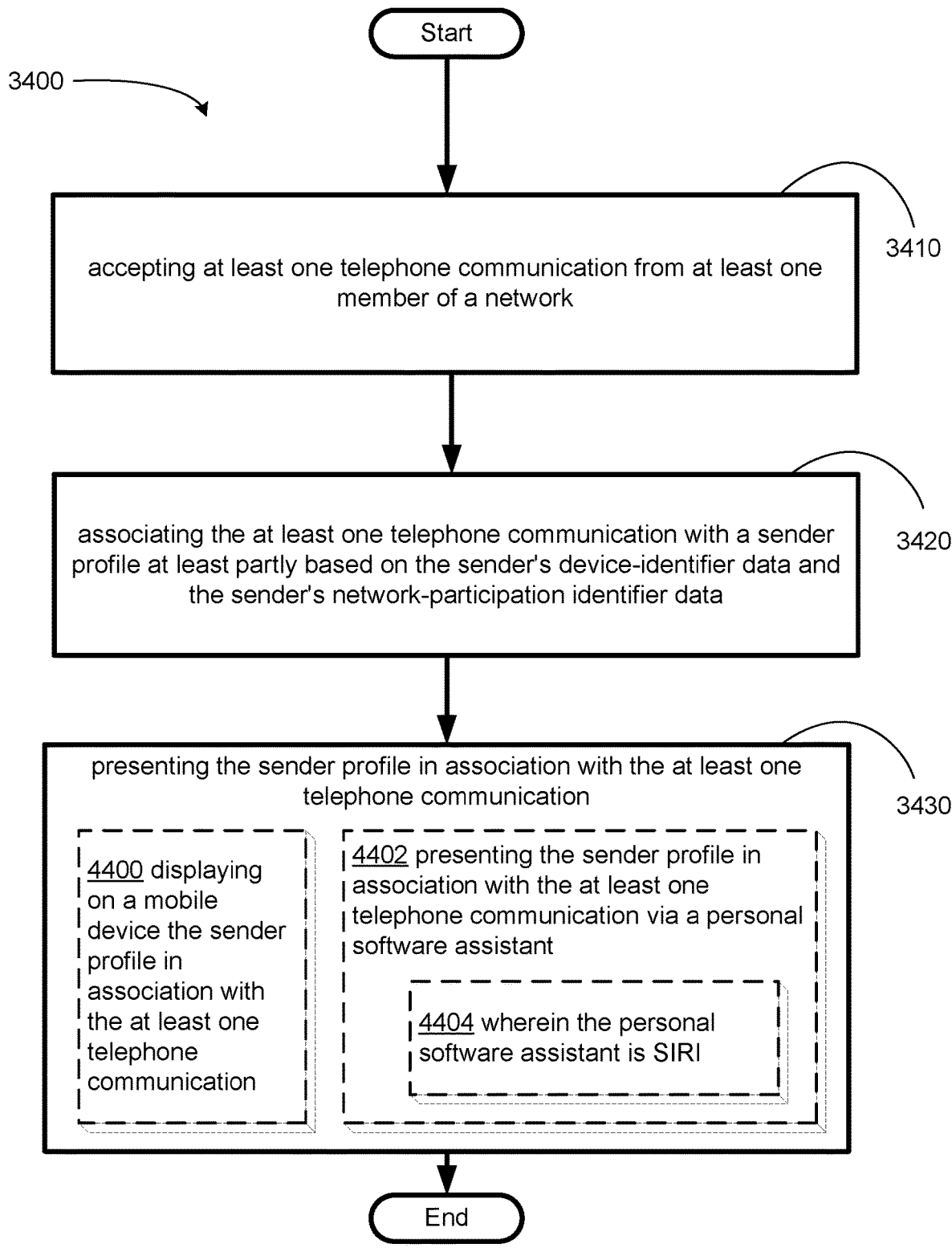

FIG. 44 illustrates an alternative embodiment of the example operational flow of FIG. 34.

Figure 45:
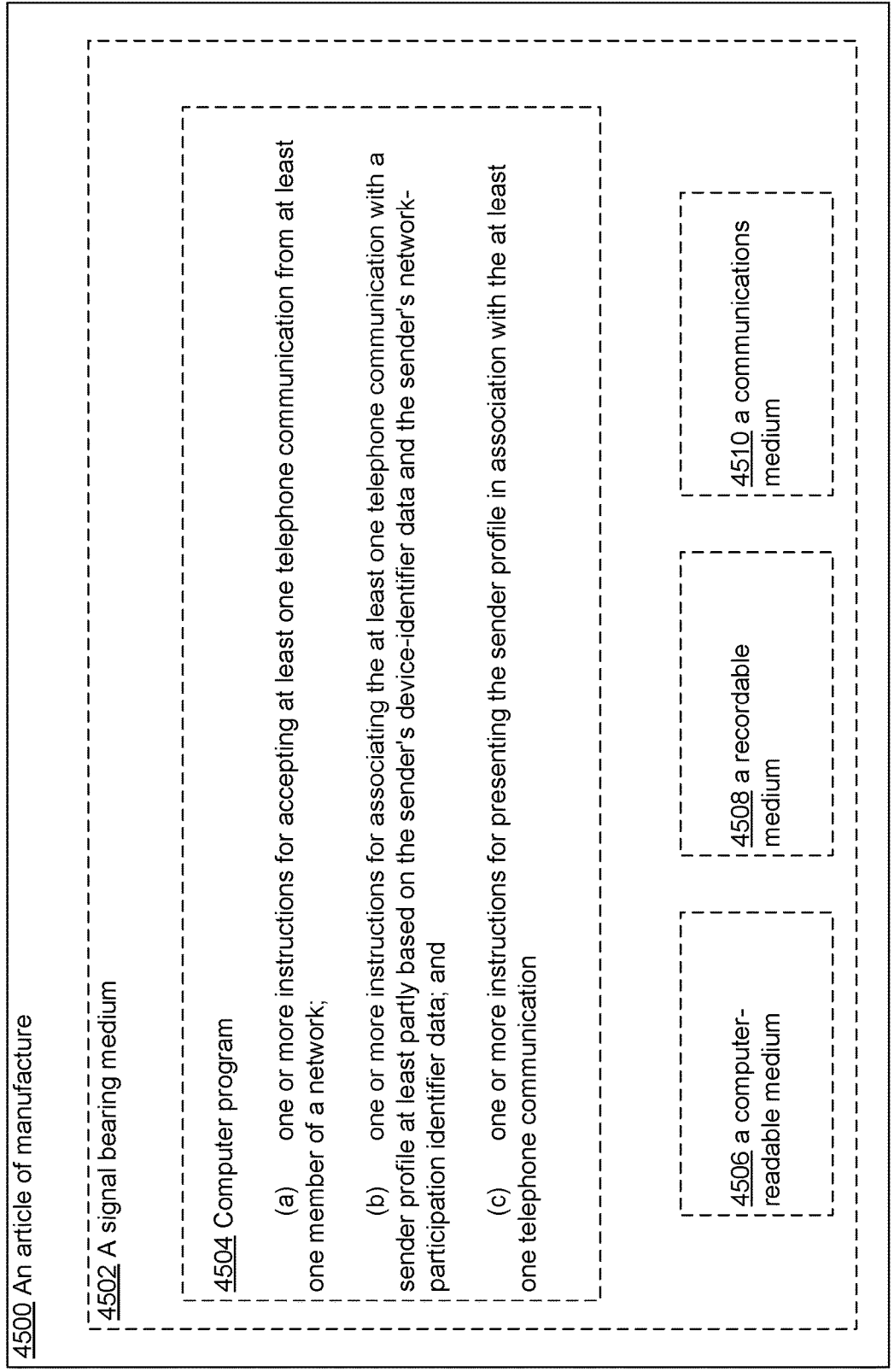

With reference now to FIG. 45, shown is a partial view of an example article of manufacture including a computer program product that includes a computer program for executing a computer process on a computing device related to identifying a communications partner, which may serve as a context for introducing one or more processes and/or devices described herein.

With reference now to FIG. 46, shown is an example device in which embodiments may be implemented related to identifying a communications partner, which may serve as a context for introducing one or more processes and/or devices described herein.

Figure 47:
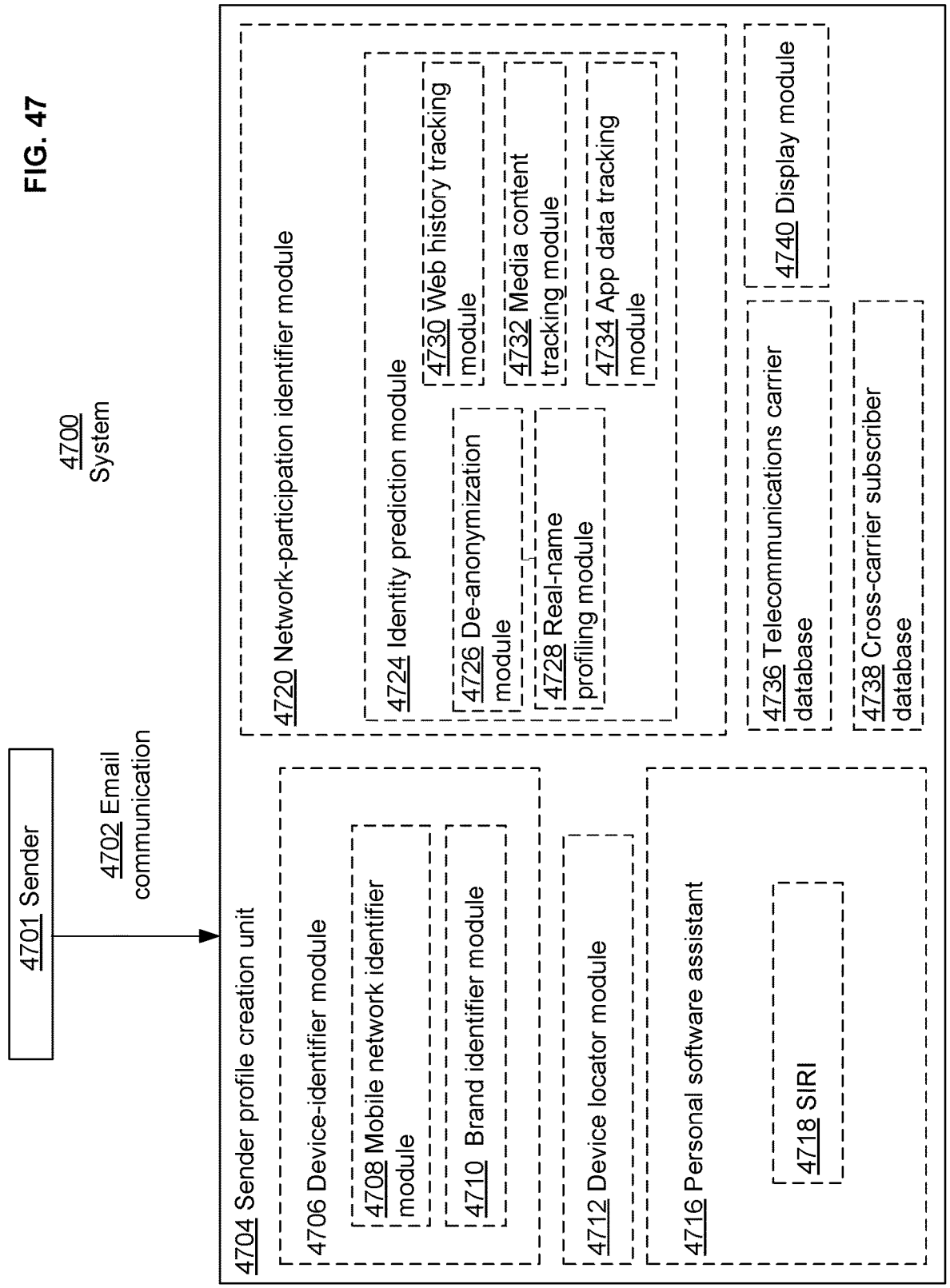

With reference now to FIG. 47, shown is an example of a system for identifying a communications partner in which embodiments may be implemented, perhaps in a device and/or through a network, which may serve as a context for introducing one or more processes and/or devices described herein.

Figure 48:
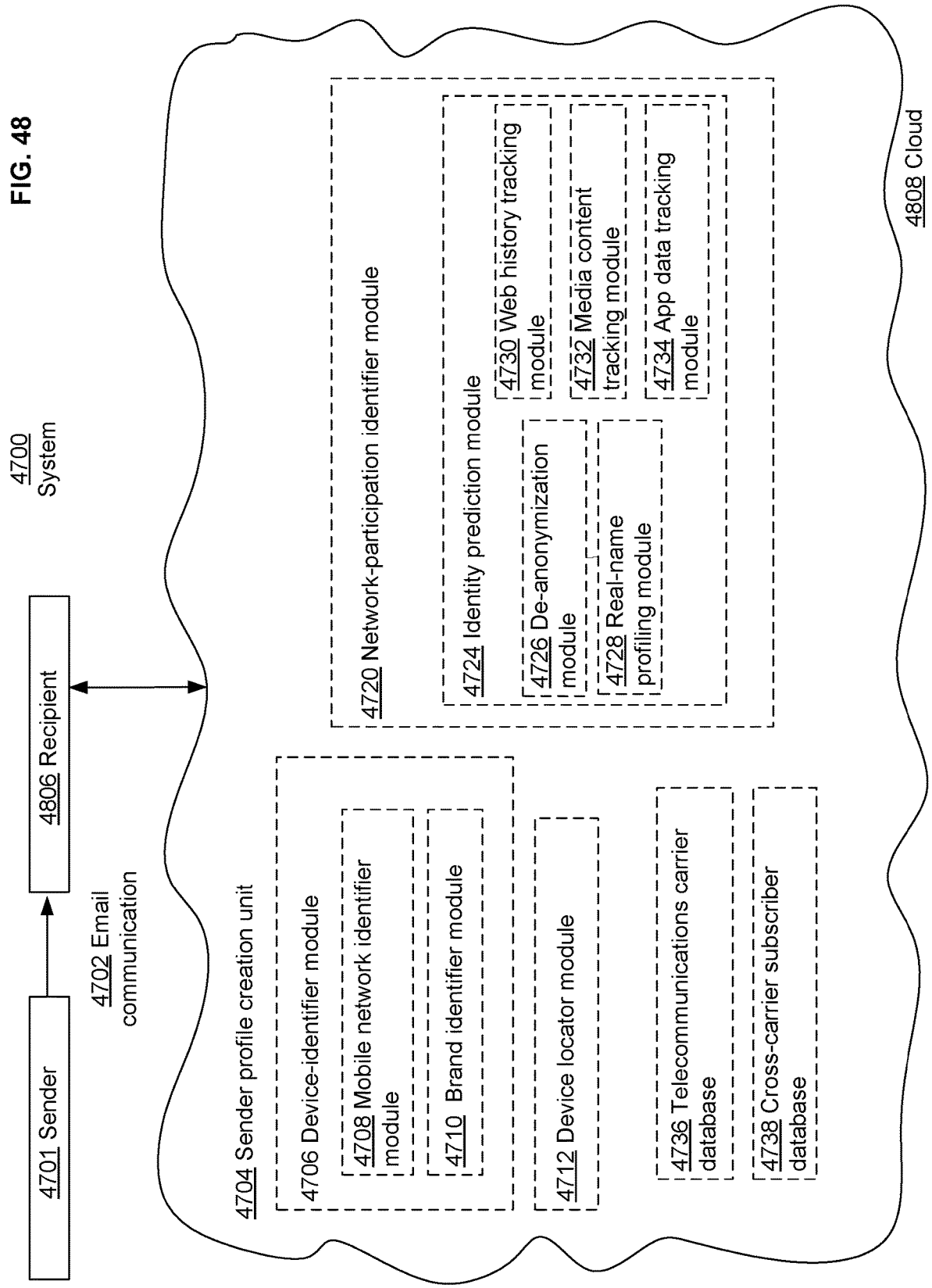

With reference now to FIG. 48, shown is another example of a system for identifying a communications partner in which embodiments may be implemented, perhaps in a device and/or through a network, which may serve as a context for introducing one or more processes and/or devices described herein.

Figure 49:
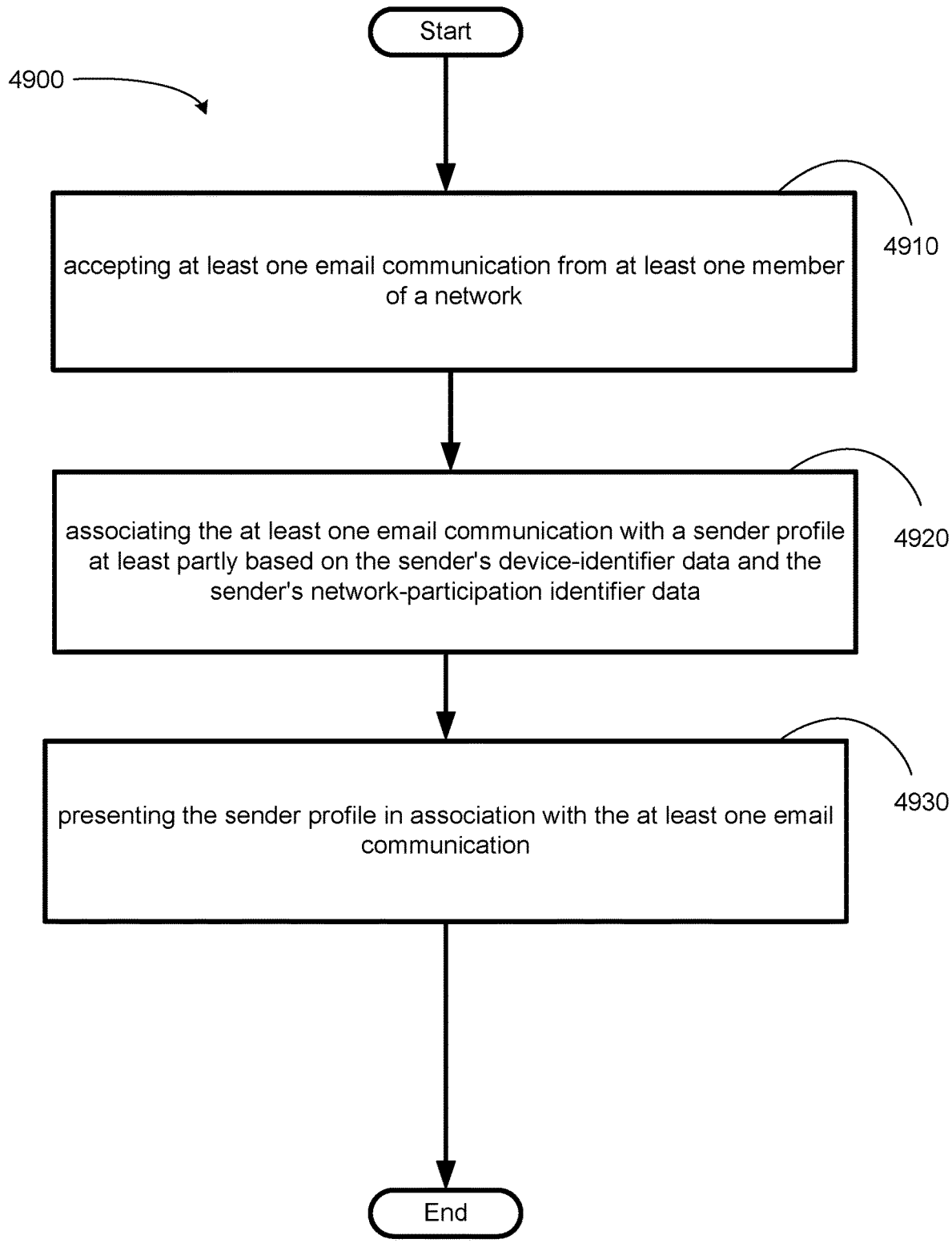

With reference now to FIG. 49, shown is an example of an operational flow representing example operations related to identifying a communications partner, which may serve as a context for introducing one or more processes and/or devices described herein.

Figure 50:
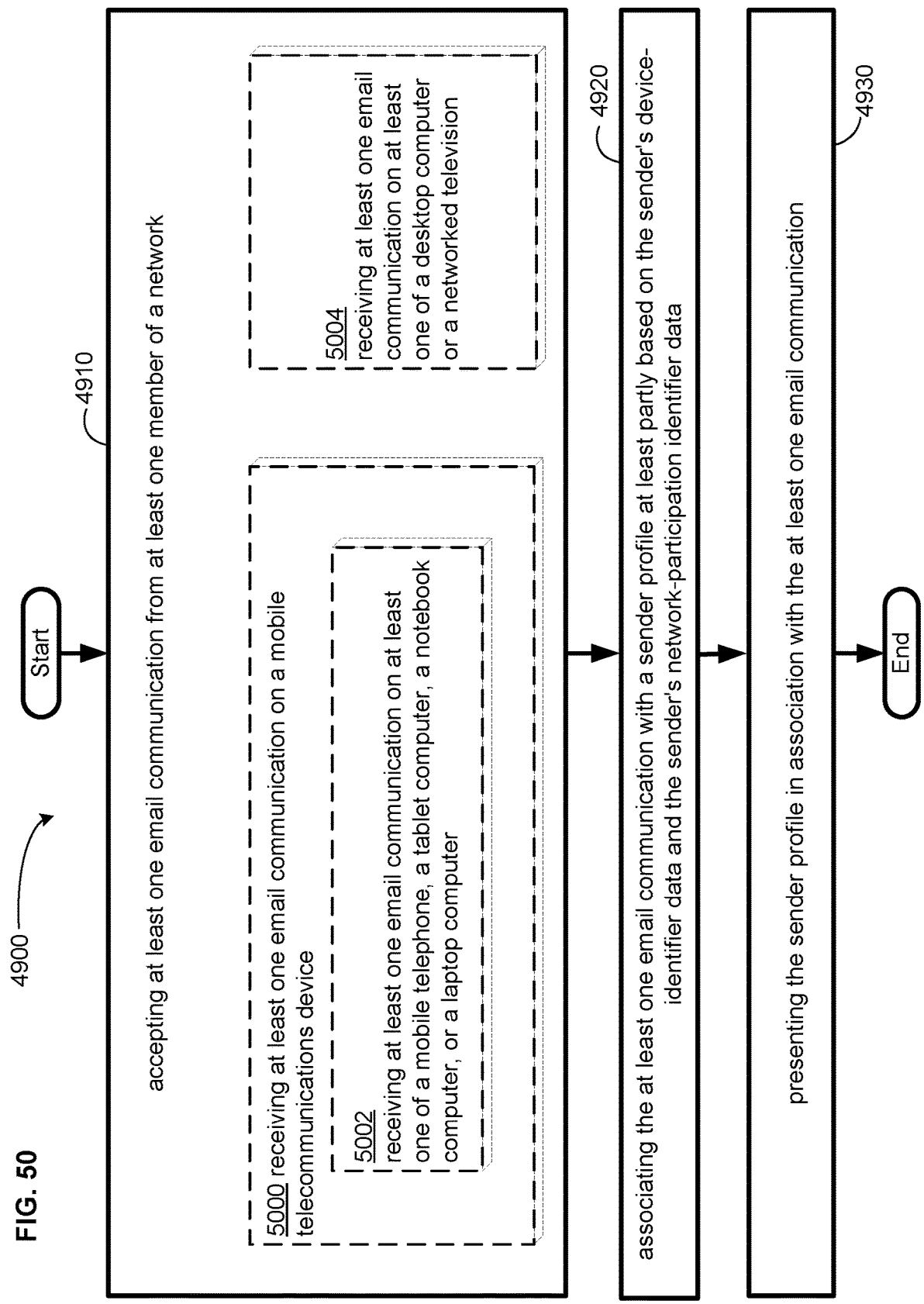

FIG. 50 illustrates an alternative embodiment of the example operational flow of FIG. 49.

Figure 51:
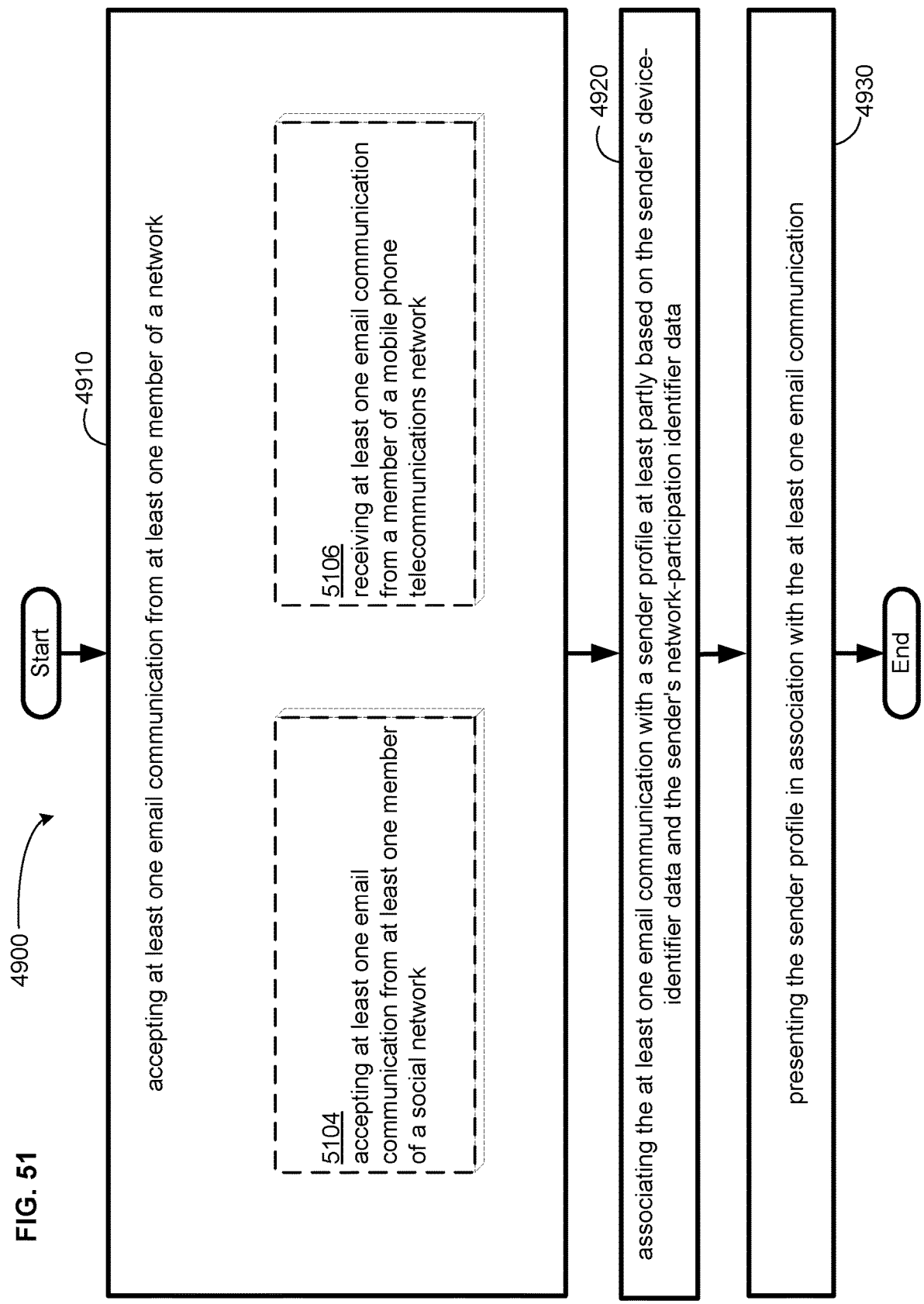

FIG. 51 illustrates an alternative embodiment of the example operational flow of FIG. 49.

Figure 52:
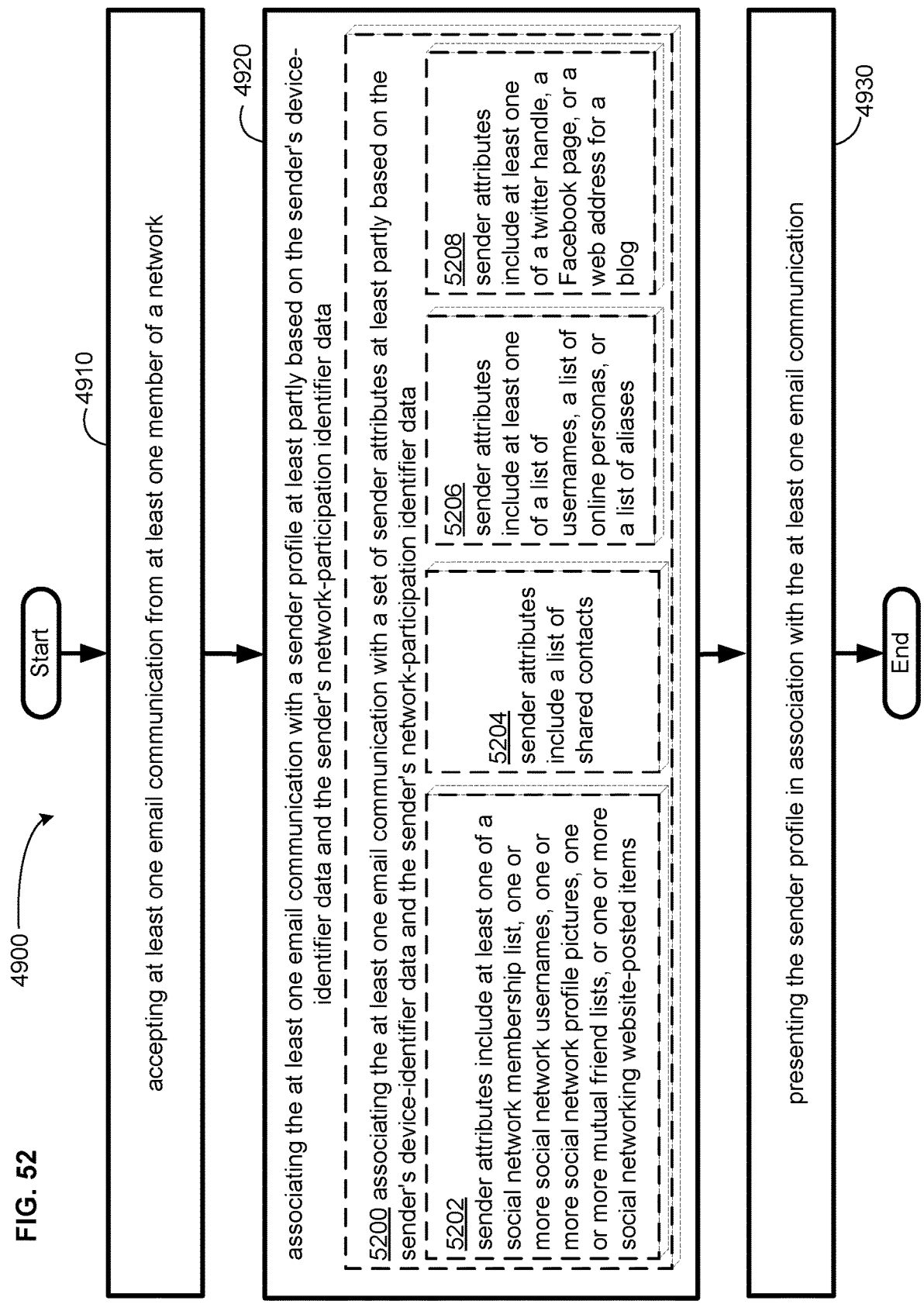

FIG. 52 illustrates an alternative embodiment of the example operational flow of FIG. 49.

Figure 53:
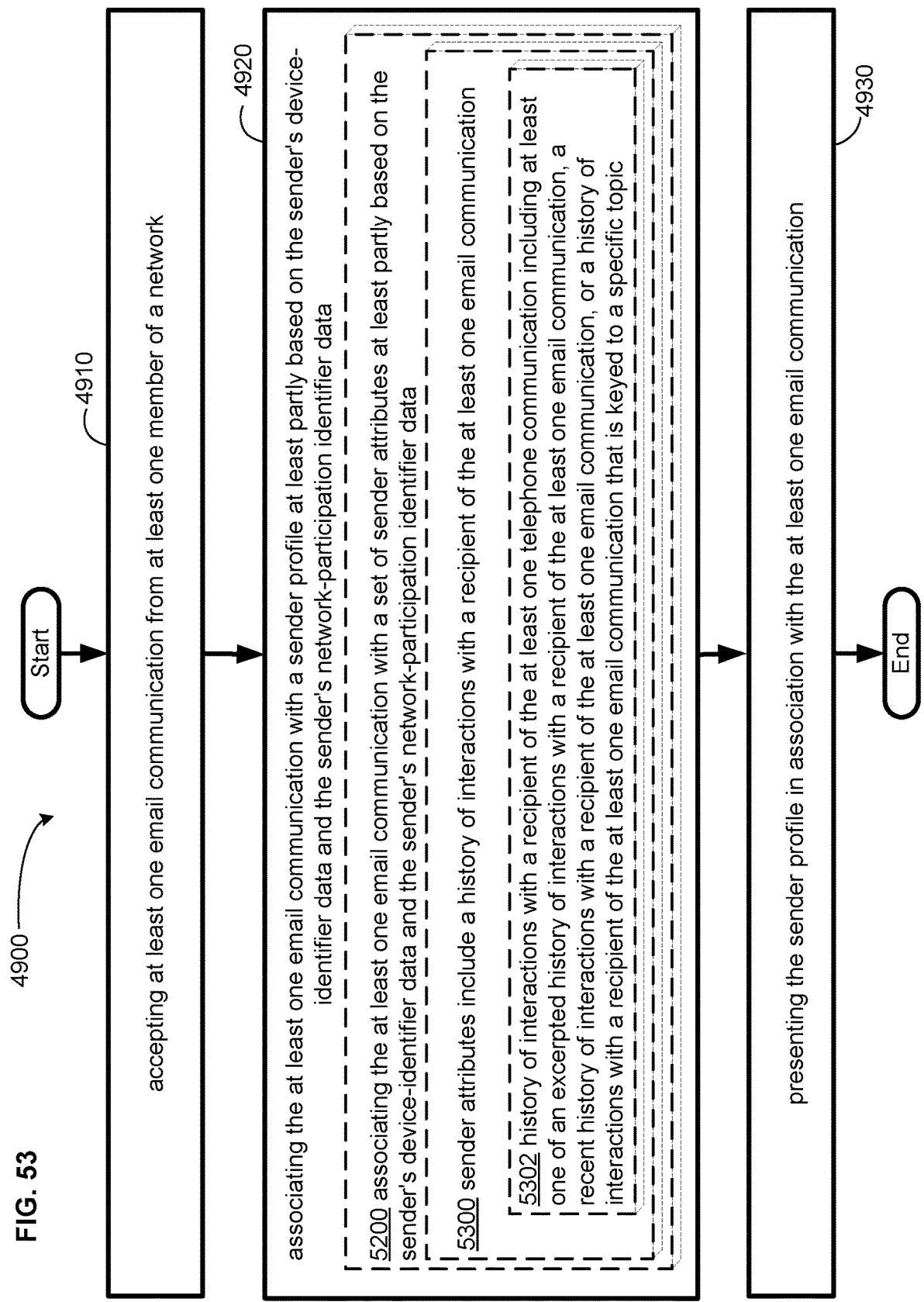

FIG. 53 illustrates an alternative embodiment of the example operational flow of FIG. 49.

Figure 54:
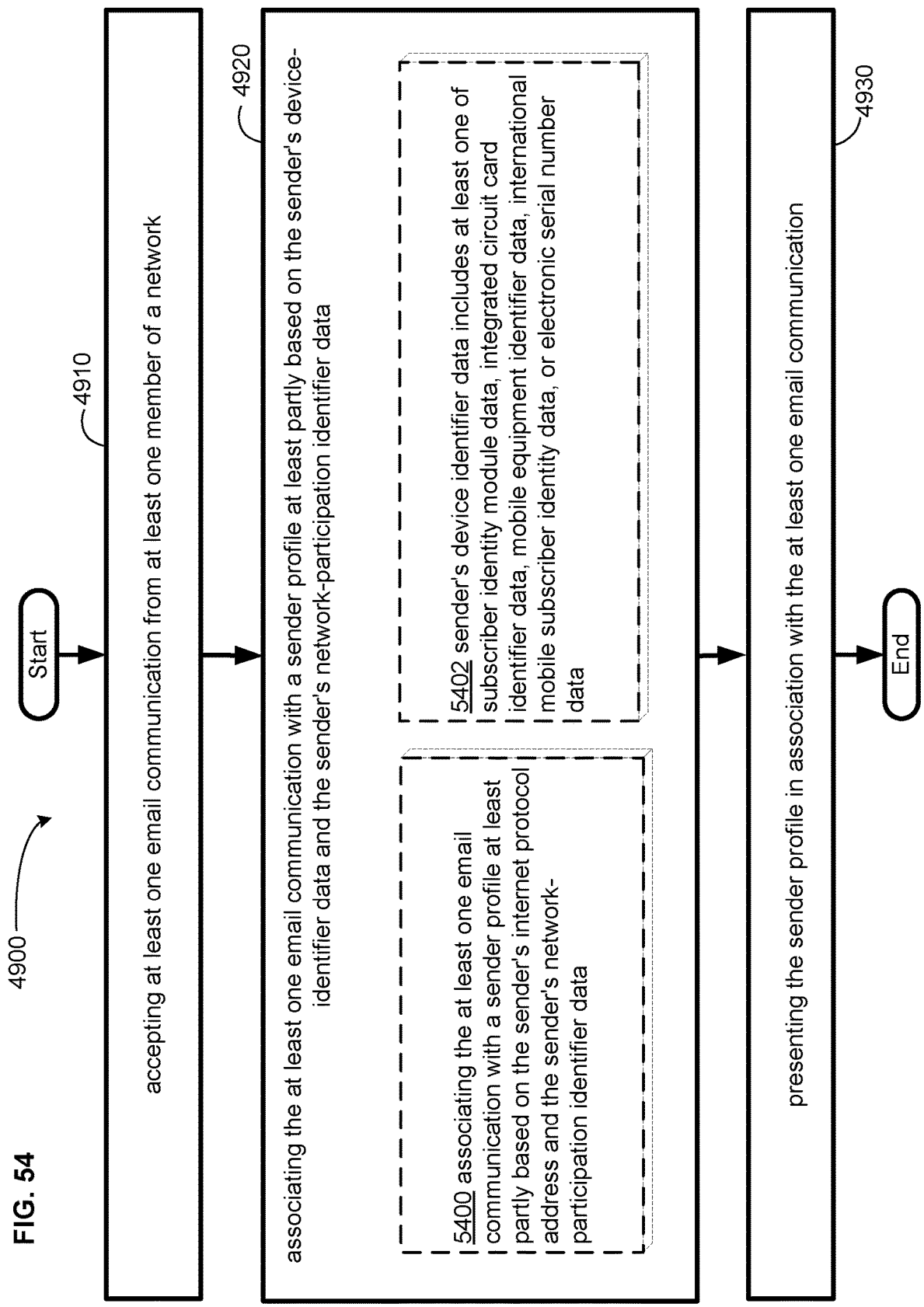

FIG. 54 illustrates an alternative embodiment of the example operational flow of FIG. 49.

Figure 55:
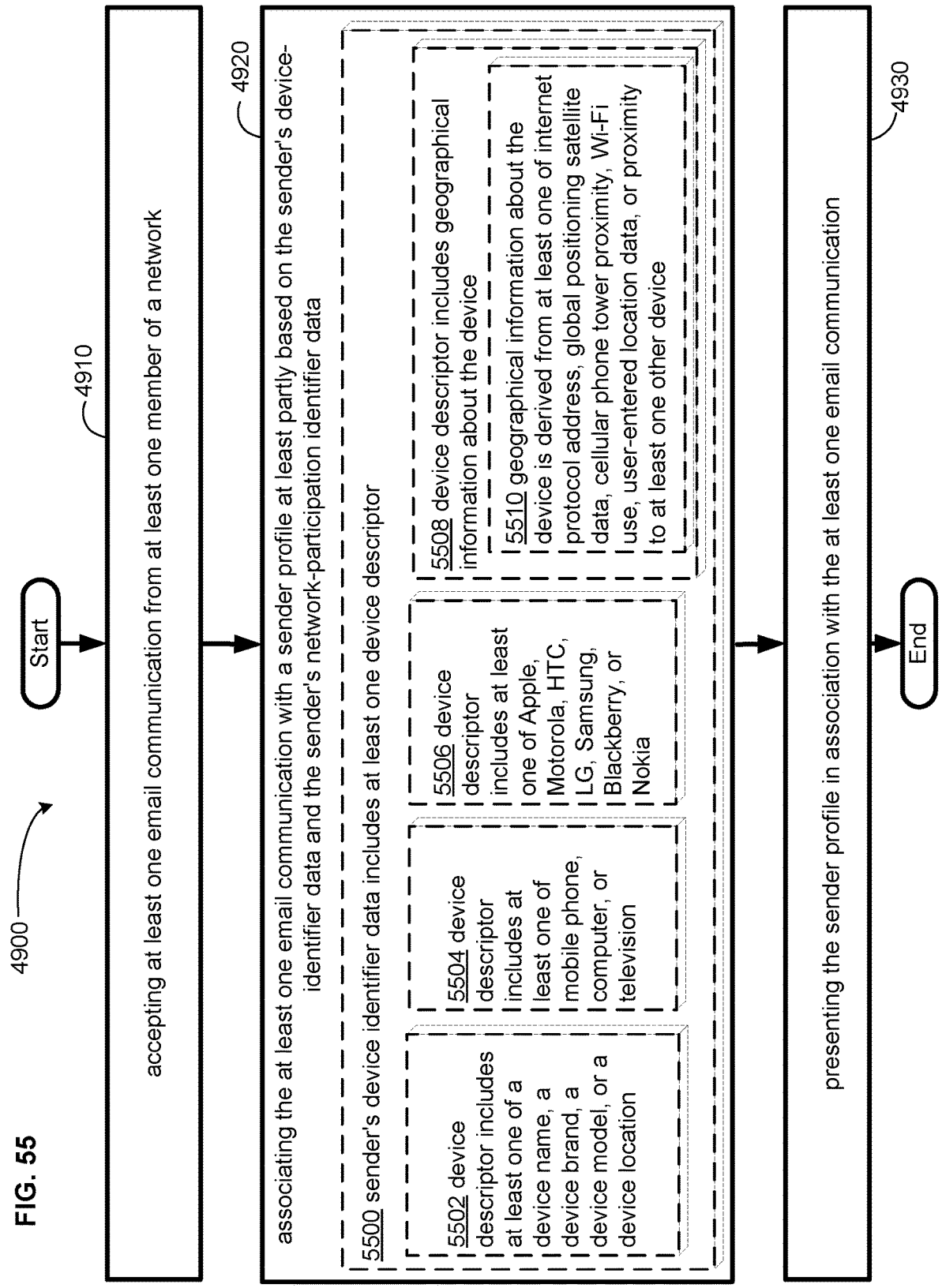

FIG. 55 illustrates an alternative embodiment of the example operational flow of FIG. 49.

Figure 56:
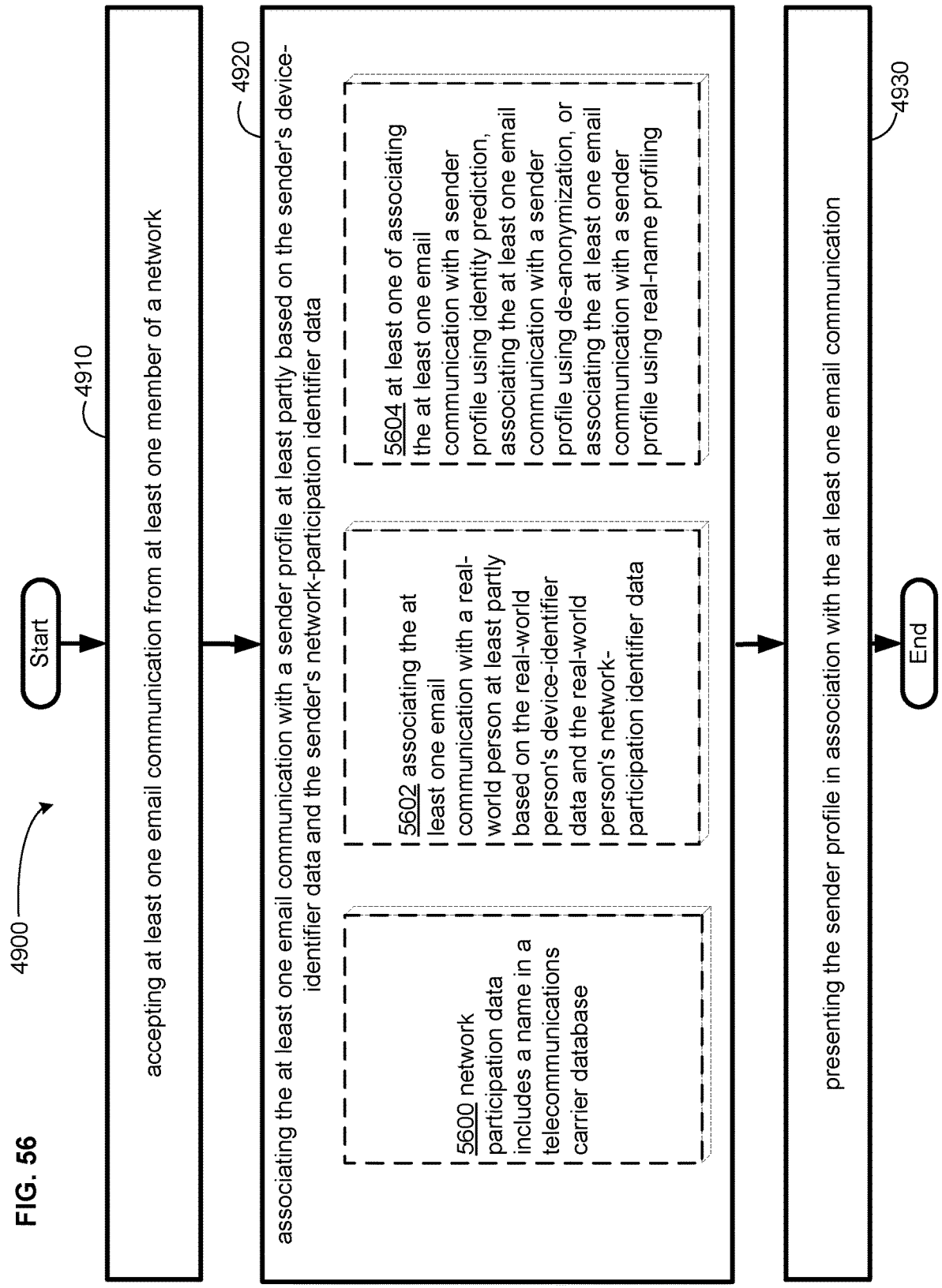

FIG. 56 illustrates an alternative embodiment of the example operational flow of FIG. 49.

Figure 57:
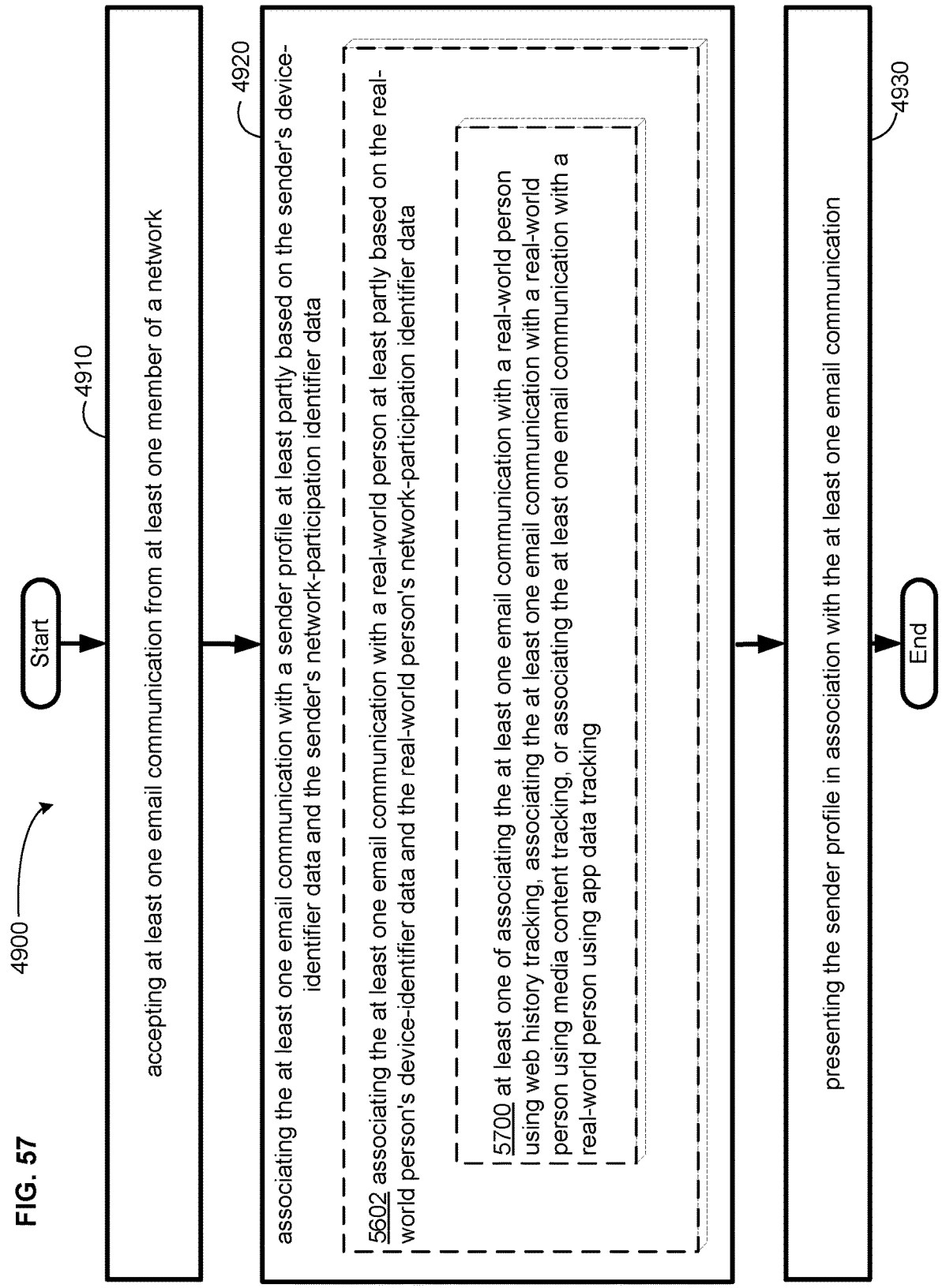

FIG. 57 illustrates an alternative embodiment of the example operational flow of FIG. 49.

Figure 58:
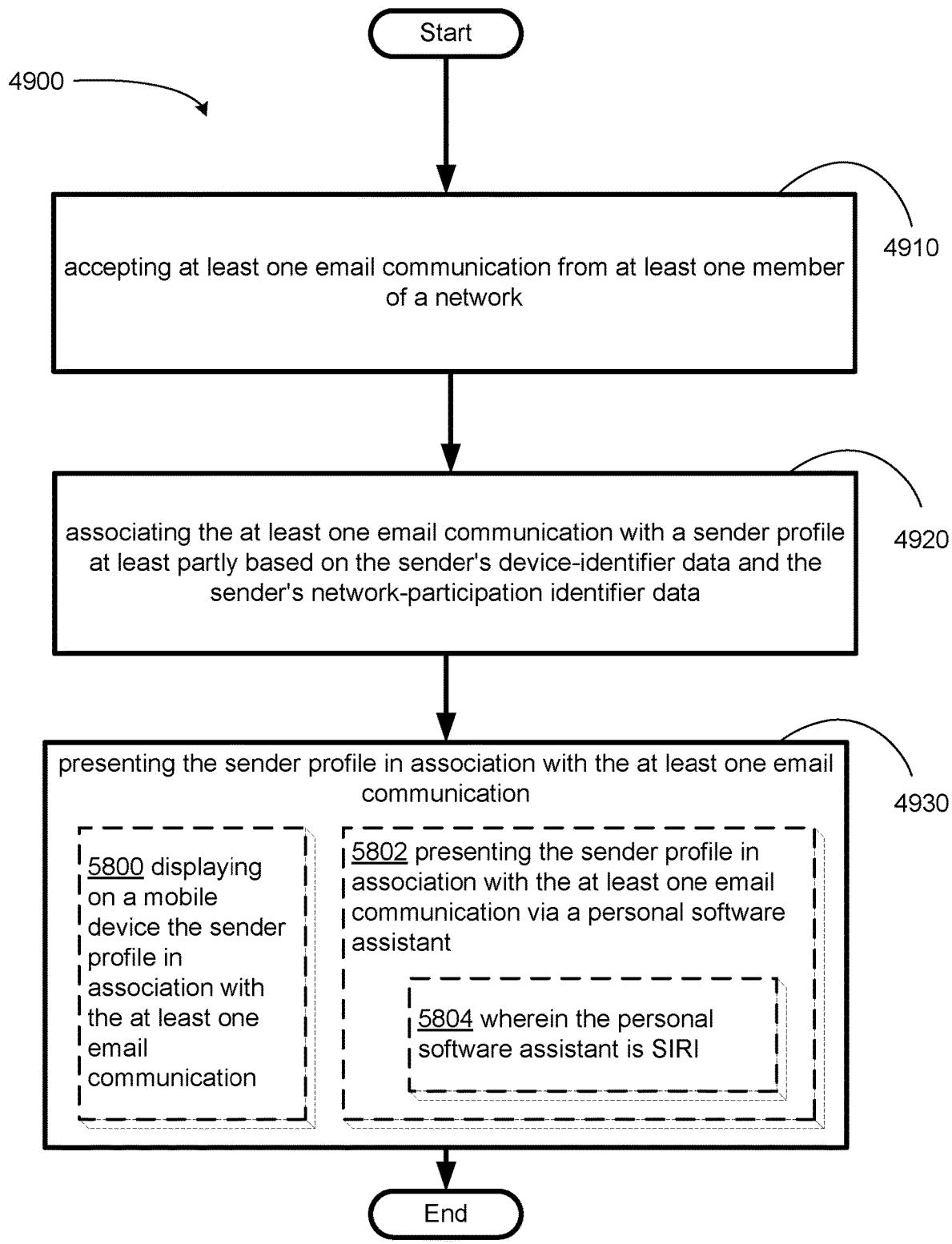

FIG. 58 illustrates an alternative embodiment of the example operational flow of FIG. 49.

With reference now to FIG. 59, shown is a partial view of an example article of manufacture including a computer program product that includes a computer program for executing a computer process on a computing device related to identifying a communications partner, which may serve as a context for introducing one or more processes and/or devices described herein.

With reference now to FIG. 60, shown is an example device in which embodiments may be implemented related to identifying a communications partner, which may serve as a context for introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
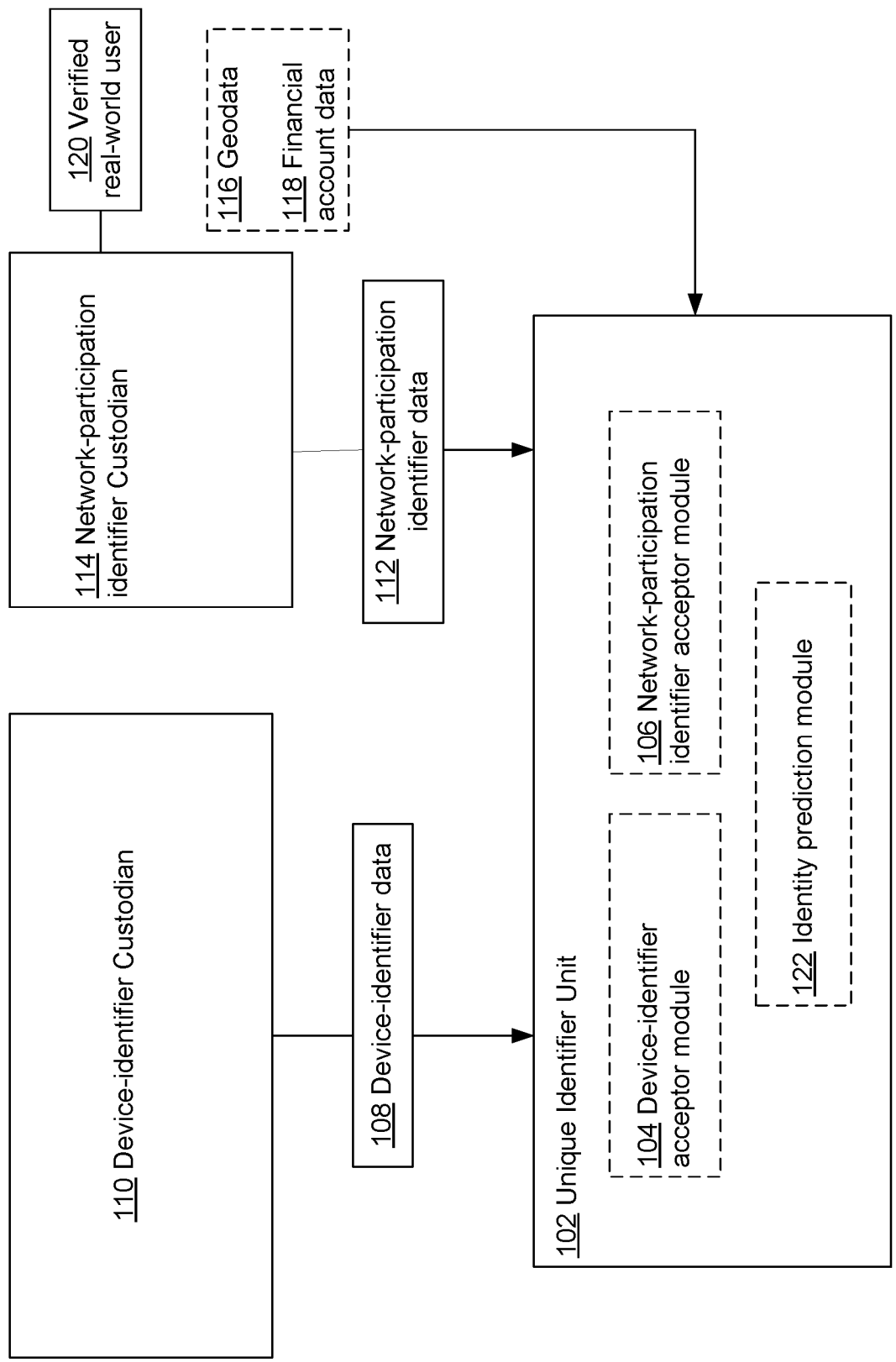

FIG. 1 illustrates an example system 100 in which embodiments may be implemented. The system 100 includes a unique identifier unit 102. The unique identifier unit 102 may contain, for example, device-identifier acceptor module 104 and network-participation identifier acceptor module 106. Unique identifier unit 102 may communicate over a network or directly with device-identifier custodian 110 to accept device-identifier data 108. Unique identifier unit 102 may also communicate over a network or directly with network-participation identifier custodian 114 to accept network-participation identifier data 112 associated with a verified real-world user 120 associated with the at least one communication device. Optionally, unique identifier unit 102 may also accept geodata 116 or financial account data 118. Unique identifier unit 102 may also include identity prediction module 122 for associating network-participation identifier data with a verified real-world user 120 associated with a communication device.

In FIG. 1, unique identifier unit 102 may assign a unique identifier based on accepted device-identifier data 108 and accepted network-participation identifier data 112. Optionally, unique identifier unit 102 may assign geodata 116 and/or financial account data 118 to an assigned unique identifier.

In FIG. 1, the unique identifier unit 102 is illustrated as possibly being included within a system 100. Of course, virtually any kind of computing device may be used to implement the special purpose unique identifier unit 102, such as, for example, a workstation, a desktop computer, a networked computer, a server, a collection of servers and/or databases, a virtual machine running inside a computing device, a mobile computing device, or a tablet PC.

Additionally, not all of the unique identifier unit 102 need be implemented on a single computing device. For example, the unique identifier unit 102 may be implemented and/or operable on a remote computer, while a user interface and/or local instance of the unique identifier unit 102 are implemented and/or occur on a local computer. Further, aspects of the unique identifier unit 102 may be implemented in different combinations and implementations than that shown in FIG. 1. For example, functionality of a user interface may be incorporated into the unique identifier unit 102. The unique identifier unit 120 may perform simple data relay functions and/or complex data analysis, including, for example, fuzzy logic and/or traditional logic steps. Further, many methods of assigning unique identifiers described herein or known in the art may be used, including, for example, algorithms used in generating globally unique identifiers, universally unique identifiers, other random number generation methods. In some embodiments, the unique identifier unit 102 may assign unique identifiers based on device-identifier data 108 and/or network-participation identifier data 112 available as updates through a network.

Unique identifier unit 102 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

Figure 2:
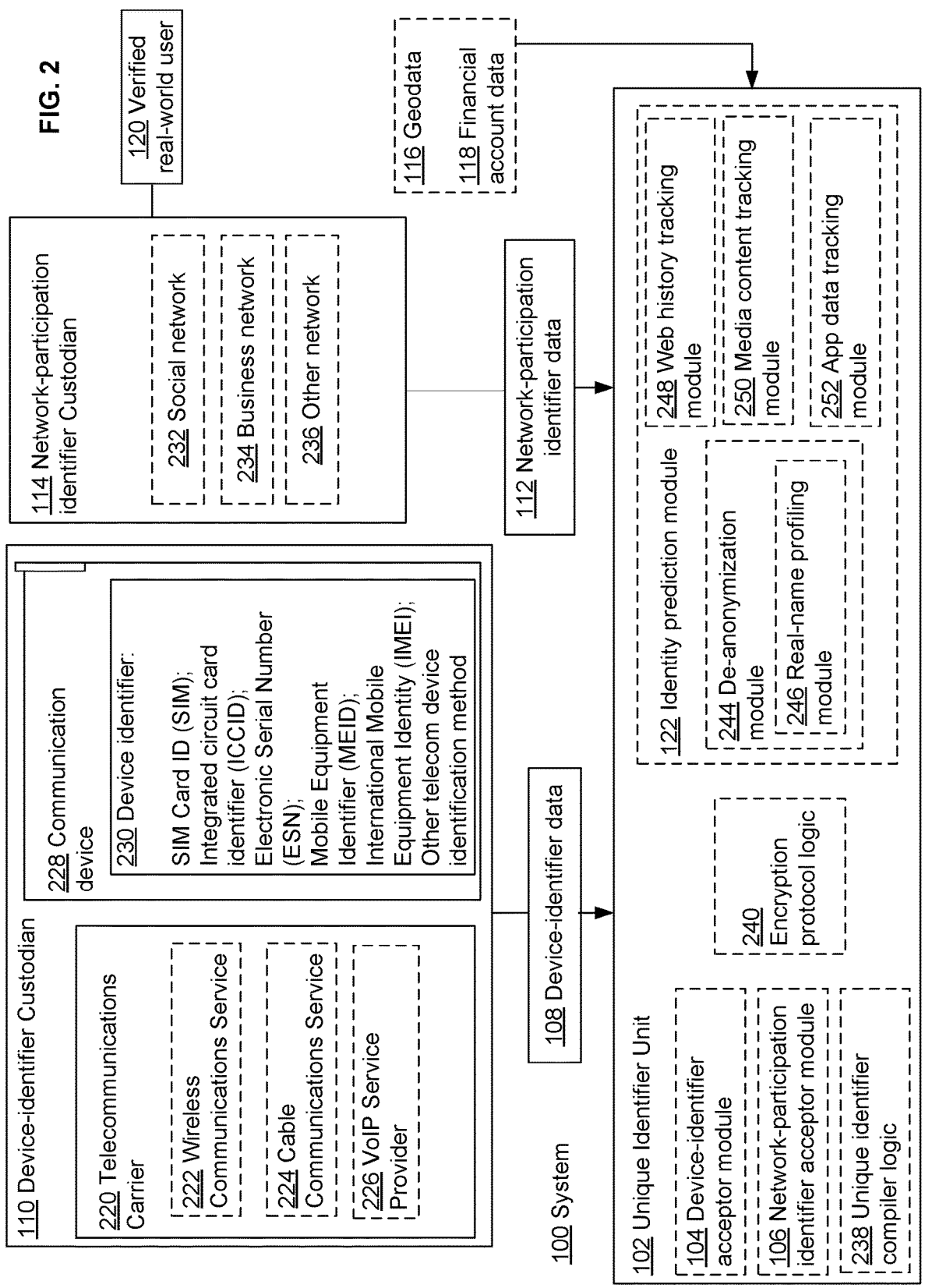
FIG. 2 illustrates certain alternative embodiments of the system for linking users of devices of FIG. 1.

FIG. 2 illustrates certain alternative embodiments of the system 100 of FIG. 1. In FIG. 2, The unique identifier unit 102 may also include unique identifier compiler logic 238 and or encryption protocol logic 240. Unique identifier unit 102 may communicate over a network or directly with device-identifier custodian 110 to accept device-identifier data 108, perhaps in the form of device identifier 230 from communication device 228. Unique identifier unit 102 may also communicate over a network or directly with network-participation identifier custodian 114 to accept network-participation identifier data 112 associated with a verified real-world user 120 associated with the at least one communication device, perhaps from social network 232, business network 234, and/or other network 236.

In this way, the unique identifier unit 102 may generate a compiled and/or encrypted list of unique identifiers that are optionally coded with or otherwise linked to geodata and/or financial account data.

In some embodiments, unique identifier compiler logic 112 may create a compiled set of composite identifiers that can be used to disambiguate search results in the network based on device-identifier data, network participation identifier data, and/or geodata, for example. Unique identifier unit 102 can be operated by a telecom company or by a social or other network owner, or by both in cooperation with each other. A compiled list of unique identifiers as discussed herein can represent all or substantially all unique user devices in a given social network or other communications network, e.g., wireless network, email network, or the like.

A directory of uniquely-identified devices can serve as the foundation for searching within a social network, and for facilitating financial transactions via the device for members of the social network associated with the device.

In some embodiments, unique identifier unit 102 may also include identity prediction module 122 for associating network-participation identifier data with a verified real-world user 120 associated with a communication device 228. Identity prediction module 122 may include various search and/or matching functions for associating network-participation identifier data 112 with a verified real-world user 120 associated with a communications device 228. For example, identity prediction module 122 may include de-anonymization module 244, which in turn may include real-name profiling module 246. Identity prediction module 122 may also include web history tracking module 248, media content tracking module 250, and/or app list tracking module 252.

For the purposes of this application, SIM as used herein includes mini-SIM, micro-SIM, Universal Subscriber Identity Module, CDMA Subscriber Identity Module, Universal Integrated Circuit Card, Removable User Identity Module, virtual SIM, and other variants of the subscriber identity module described herein and understood by those of ordinary skill in the art.

As referenced herein, the unique identifier unit 102 may be used to perform various data querying and/or recall techniques with respect to the device-identifier data 108 and/or network-participation identifier data 112, in order to assign a unique identifier. For example, where the network-participation identifier data 112 is organized, keyed to, and/or otherwise accessible using one or more user accounts such as social network, email, or the like, unique identifier unit 102 may employ various Boolean, statistical, and/or semi-boolean searching techniques to assign a unique identifier. Similarly, for example, where device-identifier data 108 is organized, keyed to, and/or otherwise accessible using one or more device-identifier custodian 110, various Boolean, statistical, and/or semi-boolean searching techniques may be performed by unique identifier unit 102 to assign a unique identifier.

Many examples of databases and database structures may be used in connection with the unique identifier unit 102. Such examples include hierarchical models (in which data is organized in a tree and/or parent-child node structure), network models (based on set theory, and in which multiparent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for disambiguating information and/or for gathering and/or compiling data from the relational database(s).

For example, SQL or SQL-like operations over one or more device-identifier data 108 and/or network-participation identifier data 112 may be performed, or Boolean operations using a device-identifier data 108 and/or network-participation identifier data 112 may be performed. For example, weighted Boolean operations may be performed in which different weights or priorities are assigned to one or more of the device-identifier data 108 and/or network-participation identifier data 112, including various network participation aliases associated with a particular verified real-world user, perhaps relative to one another. For example, a number-weighted, exclusive-OR operation may be performed to request specific weightings of network participation identifiers.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 3 illustrates an operational flow 300 representing example operations related to linking users of devices. In FIG. 3 and in following figures that include various examples of operational flows, discussion and explanation may be provided with respect to the above-described system environments of FIGS. 1-2, and/or with respect to other examples and contexts. However, it should be understood that the operational flows may be executed in a number of other environments and contexts including that of FIG. 15, and/or in modified versions of FIGS. 1-2. Also, although the various operational flows are presented in the sequence(s)

illustrated, it should be understood that the various operations may be performed in other orders than those which are illustrated, or may be performed concurrently.

After a start operation, operation 310 depicts accepting device-identifier data corresponding to at least one communication device. For example, unique identifier unit 102 and/or device-identifier acceptor module 104 can accept device-identifier data 108 from a telecommunications carrier 220, for example in the form of a Unique Device Identifier (UDID) for an iPhone or iPod Touch. The UDID is a sequence of 40 letters and numbers that is specific to each iPhone or iPod Touch. It may look something like this:

2b6f0cc904d137be2e1730235f5664094b831186. Other examples of sources of device-identifier data 108 include voice-over-internet-protocol service providers such as Skype (peer-to-peer VoIP), and wireless carriers such as Verizon Wireless (CDMA-based wireless communication). Other examples of device-identifier data 108 include Media Access Control addresses (MAC address) and International Mobile Equipment Identity numbers (IMEI).

Operation 320 depicts accepting network-participation identifier data associated with a verified real-world user associated with the at least one communication device. For example, unique identifier unit 102 and/or network-participation identifier acceptor module 106 may accept from Facebook a username associated with a verified real-world user having an iPhone and corresponding account with a telecommunications company. In another example, unique identifier unit 102 may accept from LinkedIn the name of a person associated with a videoconferencing device and corresponding account with a videoconferencing service such as WebEx Web conferencing. In another example, unique identifier unit 102 may accept from Google the email address of a person associated with an Android phone and corresponding account with a wireless carrier.

In some embodiments, network-participation identifier custodian 114 and device-identifier custodian will cooperate to provide the necessary network-participation identifier data 112 and device-identifier data 108 to unique identifier unit 108. For example, Facebook may provide usernames, images, birthdates, telephone numbers, or other data that it has about the verified real-world users of its social network to a consortium of telecommunications carriers 220 (this may optionally involve an opting-in step whereby users of Facebook affirmatively approve this action), who may provide device-identifier data 108. Assigning a unique identifier (discussed below) for each network-user-associated device across each of the carriers in the consortium may result in a directory that is particularly valuable for the telecommunications carriers, who can then provide directory searching, support, and disambiguation for a potentially large fraction of the Facebook social network. Such a directory will likely be of equal interest and value to networks including Facebook in this example, for the same reasons. For example, a cross-carrier directory of Facebook members with associated phone numbers would be an added feature for Facebook that could significantly enhance the social information provided by the network.

Operation 330 depicts assigning a unique identifier at least partly based on the device-identifier data and the network-participation identifier data. For example, unique identifier unit 102, upon accepting device-identifier data 108 and network-participation identifier data 112 associated with a verified real-world user 120 associated with the at least one communication device, may assign a randomly-generated 32-bit unique identifier. In the iPhone example above, unique identifier unit 102 may accept the iPhone's unique device identifier (UDID) as the device-identifier data 108, accept an iTunes username associated with a user with a valid credit card and security code as the network-participation identifier data 112 associated with a verified real-world user 120 associated with the at least one communication device, and assign a unique identifier to the device and username pair.

As another example, unique identifier unit 102 may accept the MAC address of a networked computer as the device-identifier data 108, accept an Outlook email address associated with a user with a verified biometric measurement as the network-participation identifier data 112 associated with a verified real-world user 120 associated with the at least one communication device, and assign a unique identifier to the computer and email address pair.

As another example, unique identifier unit 102 may accept a mobile phone's integrated circuit card ID (ICC-ID) as the device-identifier data 108, accept a Facebook username associated with a user with a valid Facebook Credits account as the network-participation identifier data 112 associated with a verified real-world user 120 associated with the at least one communication device, and assign a unique identifier to the mobile phone and Facebook username pair.

In some embodiments, unique identifier unit 102 may include an identity prediction algorithm such as a de-anonymization algorithm, a real-name profiling algorithm, a web history tracking algorithm, media content tracking algorithm, and/or an app list tracking algorithm. These algorithms may aid in the association of network-participation identifier data with a verified real-world user 120 associated with the communication device 228, where those associations are not provided directly by a device-identifier custodian 110 and/or a network-participation identifier custodian 114.

FIG. 4 illustrates alternative embodiments of the example operational flow 300 of FIG. 3. FIG. 4 illustrates example embodiments where the accepting operation 310 may include at least one additional operation. Additional operations may include operation 400, 402, 404, and/or operation 406.

Operation 400 depicts accepting device-identifier data corresponding to at least one of a mobile phone, a wired telephone, a voice-over-internet-protocol telephone, a tablet computer, a notebook computer, a laptop computer, a desktop computer, or a networked television. For example, unique identifier unit 102 and/or device-identifier acceptor module 104 may accept device-identifier data corresponding to at least one of a mobile phone, a wired telephone, a voice-over-internet-protocol telephone, a tablet computer, a notebook computer, a laptop computer, a desktop computer, or a networked television. For example, device-identifier acceptor module 104 may accept a mobile phone's mobile equipment identifier, a land line's telephone number, or a networked computer's media access control address (MAC address) or internet protocol address (IP address).

Device-identifier data 108 may be accepted in different forms depending on the device identified. For example, an IP address or MAC address may be used to identify a computer.

Every device connected to the public internet is assigned a unique number known as an internet protocol address (IP address). IP addresses consist of four numbers separated by periods (also called a "dotted-quad") and look something like 127.0.0.1. Since these numbers are usually assigned to internet service providers within region-based blocks, an IP address can often be used to identify the region or country from which a computer is connecting to the Internet. An IP address can sometimes be used to show the user's general location. An IP address may also be assigned to a Host name, which may be easier to remember. Hostnames may be looked up to find IP addresses, and vice-versa. At one time internet service providers issued one IP address to each user. These are static IP addresses. With the increased number of issued IP addresses, internet service providers now issue IP addresses in a dynamic fashion out of a pool of IP addresses using dynamic host configuration protocol (DHCP), which provides a central database for keeping track of computers that have been connected to the network. This prevents two computers from accidentally being configured with the same IP address. These are referred to as dynamic IP addresses. In addition to users connecting to the internet, with virtual hosting, a single machine can act like multiple machines, with multiple domain names and IP addresses.

MAC addresses are unique identifiers assigned to network interfaces for communications on the physical network segment. They are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. It may also be known as an Ethernet hardware address (EHA), hardware address, or physical address. A network node may have multiple NICs and will then have one unique MAC address per NIC.

A subscriber identity module or subscriber identification module (SIM) is an integrated circuit that securely stores the service-subscriber key or international mobile subscriber identity (IMSI) used to identify a subscriber on mobile telephony devices (such as mobile phones and computers). A SIM card typically contains its unique serial number (integrated circuit card identifier or ICCID), an internationally unique number of the mobile user (IMSI), security authentication and ciphering information, temporary information related to the local network, a list of the services the user has access to and two passwords: a personal identification number (PIN) for usual use and a PIN unlock code (PUC) for unlocking. A SIM card may also store other carrier-specific data such as the SMSC (Short Message Service Center) number, Service Provider Name (SPN), Service Dialing Numbers (SDN), Advice-Of-Charge parameters and Value Added Service (VAS) applications.

A SIM card's ICCID is stored in the SIM card and also engraved or printed on the SIM card body. The ICCID is typically composed of an issuer identification number (IIN), an individual account identification number, and a check digit.

SIM cards are identified on their individual operator networks by a unique international mobile subscriber identity number or IMSI. Mobile operators connect mobile phone calls and communicate with their market SIM cards using their IMSIs. The format is: the first 3 digits represent the Mobile Country Code (MCC), the next 2 or 3 digits represent the Mobile Network Code (MNC), and the next digits represent the mobile station identification number.

SIM cards may also orthogonally store a number of SMS messages and phone book contacts. A SIM is held on a removable SIM card, which can be transferred between different mobile devices.

Operation 402 depicts accepting telephony device-identifier data including a telephone number associated with the telephony device. For example, unique identifier unit 102 may accept a ten-digit telephone number or a seven-digit telephone number from a telecommunications carrier 220 as the device-identifier data 108. The number contains the information necessary to identify uniquely the intended endpoint for the telephone call. Each such endpoint must have a unique number within the public switched telephone network.

Operation 404 depicts accepting at least one of subscriber identity module data or integrated circuit card identifier data corresponding to at least one communication device. For example, unique identifier unit 102 may accept an international mobile subscriber identity (IMSI) from a mobile phone's SIM card from a telecommunications carrier 220 as the device-identifier data 108. As another example, device-identifier acceptor module 104 may accept from a wireless communications service 222 an integrated circuit card identifier number from a SIM card for a mobile phone.

Operation 406 depicts accepting mobile equipment identifier data corresponding to at least one communication device. For example, unique identifier unit 102 may accept a mobile equipment identifier corresponding to a mobile handset from a telecommunications carrier 220 or wireless communications service 222. A Mobile Equipment IDentifier (MEID) is a globally unique 56-bit identification number for a physical piece of mobile equipment. Equipment identifiers are "burned" into a device and are used as a means to facilitate mobile equipment identification and tracking. Additionally, MEIDs are coordinated with International Mobile Equipment Identifiers (IMEIs), facilitating global roaming and harmonization between 3G technologies as a universal mobile equipment identifier. The MEID is a 14-digit hexadecimal value. The MEID is capable of being transmitted over the air upon a request from the network. The MEID is composed mainly of two basic components, the manufacturer code and the serial number.

FIG. 5 illustrates alternative embodiments of the example operational flow 300 of FIG. 3. FIG. 5 illustrates example embodiments where the accepting operation 310 may include at least one additional operation. Additional operations may include operation 500, 502, and/or operation 504.

Operation 500 depicts accepting international mobile subscriber identity data corresponding to at least one communication device. For example, device-identifier acceptor module 104 may accept an international mobile subscriber identity (IMSI) from a mobile phone's SIM card from a wireless communications service 222 as the device-identifier data 108. An International Mobile Subscriber Identity or IMSI is a unique identification associated with all GSM and UMTS network mobile phone users. It is stored as a 64-bit field in the SIM inside the phone and is sent by the phone to the network. It is also used for acquiring other details of the mobile device in the Home Location Register (HLR) or as locally copied in the Visitor Location Register. To prevent eavesdroppers identifying and tracking the subscriber on the radio interface, the IMSI is sent as rarely as possible and a randomly-generated temporary mobile subscriber identity (TMSI) is sent instead. The IMSI is used in any mobile network that interconnects with other networks. This number is kept in the phone directly or in the removable user identity module (R-UIM) card, a card developed for CDMA handsets that extends the GSM SIM card to CDMA phones and networks.

Operation 502 depicts accepting electronic serial number data corresponding to at least one communication device. For example, unique identifier unit 102 may accept an electronic serial number from a mobile phone's SIM card from a telecommunications carrier 220 as the device-identifier data 108. As another example, device-identifier acceptor module 104 may accept from a wireless communications service 222 an electronic serial number from a SIM card for a CDMA-based mobile phone.

Operation 504 depicts accepting device-identifier data corresponding to at least one communication device that is linked to at least one billing account. For example, unique identifier unit 102 may accept a mobile equipment identifier from a mobile phone's SIM card from a telecommunications carrier 220, the MEID corresponding to a billing account for a subscriber of a wireless service provided by the telecommunications carrier 220. As another example, device-identifier acceptor module 104 may accept from a wireless communications service 222 an IMSI from a SIM card for a mobile phone, the IMSI corresponding to a billing account for a subscriber of the wireless communications service 222.

FIG. 6 illustrates alternative embodiments of the example operational flow 300 of FIGS. 3 and 5. FIG. 6 illustrates example embodiments where the accepting operation 504 may include at least one additional operation. Additional operations may include operation 600, 602, and/or operation 604.

Operation 600 depicts accepting device-identifier data corresponding to at least one communication device that is linked to at least one billing account, wherein the at least one billing account comprises a cable telecommunications billing account. For example, unique identifier unit 102 may accept a computer user's MAC address or IP address as the device identifier data 108. In this example, the MAC address or IP address of the computer may be linked to a Skype account for billing purposes.

Operation 602 depicts accepting device-identifier data corresponding to at least one communication device that is linked to at least one billing account, wherein the at least one billing account comprises a wireless telecommunications billing account. For example, unique identifier unit 102 may accept from a wireless service provider an IMEI for a mobile phone linked to a billing account for an individual subscriber.

Operation 604 depicts accepting device-identifier data corresponding to at least one communication device that is linked to at least one billing account, wherein the at least one wireless telecommunications billing account comprises a satellite telecommunications billing account. For example, unique identifier unit 102 may accept from a satellite-based wireless service provider such as LightSquared, a device-identifier for a mobile phone linked to a billing account for an individual subscriber.

FIG. 7 illustrates alternative embodiments of the example operational flow 300 of FIGS. 3 and 5. FIG. 7 illustrates example embodiments where the accepting operation 504 may include at least one additional operation. Additional operations may include operation 700, 702, 704, and/or operation 706.

Operation 700 depicts accepting device-identifier data corresponding to at least one communication device that is linked to at least one billing account, wherein the at least one billing account comprises a physical address. For example, device-identifier acceptor module 104 may accept from a wireless communications service 222 an IMSI from a SIM card for a mobile phone, the IMSI corresponding to a billing account for a subscriber of the wireless communications service 222 at a specific street, city, and country address.

Operation 702 depicts accepting device-identifier data corresponding to at least one communication device that is linked to at least one billing account, wherein the at least one billing account comprises a bank account. For example, device-identifier acceptor module 104 may accept from a wireless communications service 222 an iPhone or iPod Touch device identifier, the identifier corresponding to a bank account number for a subscriber of the wireless service to the iPhone or iPod Touch device.

Operation 704 depicts accepting device-identifier data corresponding to at least one communication device that is linked to at least one billing account, wherein the at least one billing account comprises an electronic payment account. To continue the previous example involving the iPhone or iPod Touch device, the wireless service subscription may be linked to a bank's electronic payment service, wire transfer service, or the like.

Operation 706 depicts accepting device-identifier data corresponding to at least one communication device that is linked to at least one electronic payment account, wherein the electronic payment account comprises at least one of a Google Checkout account, an Amazon Payments account, a PayPal account, or a mobile PayPal account. For example, a unique identifier unit 102 may accept a mobile device ID for an Android mobile phone from an Android app such as "Android Device ID" available for download from the Android Market. The Android mobile device ID, perhaps derived from a wireless network socket, for the mobile phone may correspond to a Google Checkout account for the subscriber of the wireless service to the mobile phone.

FIG. 8 illustrates alternative embodiments of the example operational flow 300 of FIGS. 3 and 5. FIG. 8 illustrates example embodiments where the accepting operation 504 may include at least one additional operation. Additional operations may include operation 800, 802, and/or operation 804.

Operation 800 depicts accepting device-identifier data corresponding to at least one communication device that is linked to at least one billing account, wherein the at least one billing account comprises a credit card account. For example, a wireless device's service subscription may be linked to a user's credit card account.

Operation 802 depicts accepting device-identifier data corresponding to at least one communication device that is linked to at least one billing account, wherein the at least one billing account comprises a virtual account. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual account such as a Facebook credit account.

Operation 804 depicts accepting device-identifier data corresponding to at least one communication device that is linked to at least one virtual account, wherein the virtual account comprises at least one of a virtual wallet or a virtual prepaid credit card. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual wallet account such as Google wallet.

FIG. 9 illustrates alternative embodiments of the example operational flow 300 of FIG. 3. FIG. 9 illustrates example embodiments where the accepting operation 320 may include at least one additional operation. Additional operations may include operation 900, 902, 904, and/or operation 906.

Operation 900 depicts accepting network-participation identifier data associated with at least one of a user's social security number, a user's national identification card, a user's biometric measurement, a user's passport number, a user's tax identification number, a user's internet domain, or a user's authentication certificate. For example, unique identifier unit 102 and/or network-participation identifier acceptor module 106 may accept network-participation identifier data associated with at least one of a user's social security number, a user's national identification card, a user's biometric measurement, a user's passport number, a user's tax identification number, a user's internet domain, or a user's authentication certificate. For example, network-participation identifier acceptor module 106 may accept a Facebook username as network-participation identifier data, the username associated with a photograph of the user as a biometric measurement verifying that a real-world user is associated with the username. In some embodiments, an image recognition system may be employed to associate an image with a specific user. In some embodiments, the real-world user may be a corporation.

In another example, network-participation identifier acceptor module 106 may accept an email address as network-participation identifier data, the email address associated with a social security number on file with a telecommunications company with which the user has a service subscription.

As used herein, "network-participation identifier data" may refer to a signifier of belonging in a network, such as an email address; a username, such as a social networking user name; or other mark such as an image, number, or writing that signifies participation in a particular network.

Operation 902 depicts accepting social networking data corresponding to at least one verified real-world user of the at least one communication device. For example, unique identifier unit 102 and/or network-participation identifier acceptor module 106 may accept a Google+ username as a network-participation identifier datum, wherein the Google+ username is associated with a photograph of the user having the username. In some embodiments, the photograph of the user may be analyzed by image recognition technologies to identify a person having specific geographic, demographic, or other identifying characteristics.

Operation 904 depicts accepting social networking data corresponding to at least one verified real-world user of the at least one communication device, wherein the social networking data comprises at least one of a username, an @-tagged twitter handle, a corporate login, or a website uniform resource locator (URL). For example, unique identifier unit 102 and/or network-participation identifier acceptor module 106 may accept a blogger's website URL as a network-participation identifier datum, wherein the website URL is associated with a photograph and/or description of the blogger on the website at the website URL.

Operation 906 depicts accepting social networking data corresponding to at least one verified real-world user of the at least one communication device, wherein the social networking data comprises at least one of Facebook data, Twitter data, or LinkedIn data. For example, unique identifier unit 102 and/or network-participation identifier acceptor module 106 may accept a LinkedIn username as a network-participation identifier datum, wherein the username is associated with a public profile of a user of the business-related social networking site LinkedIn.

FIG. 10 illustrates alternative embodiments of the example operational flow 300 of FIGS. 3 and 9. FIG. 10 illustrates example embodiments where the accepting operation 902 may include at least one additional operation. Additional operations may include operation 1000, 1002, and/or operation 1004.

Operation 1000 depicts accepting social networking data corresponding to at least one verified real-world user of the at least one communication device, wherein the social networking data comprises at least one of image data, constellation of social contact data, or user input data. For example, unique identifier unit 102 and/or network-participation identifier acceptor module 106 may accept a list of social contacts from a social network such as Facebook or LinkedIn as the network-participation identifier data. In another example, unique identifier unit 102 and/or network-participation identifier acceptor module 106 may accept a list of email contacts grouped as friends or family from an email contact list as the network-participation identifier data.

Operation 1002 depicts accepting social networking data corresponding to at least one verified real-world user of the at least one communication device, wherein the social networking data comprises data accumulated from multiple sources. For example, unique identifier unit 102 and/or network-participation identifier acceptor module 106 may accept a plurality of usernames sourced from various social networks, each corresponding to the same verified real-world user of the at least one communication device as the data accumulated from multiple sources. As another example, unique identifier unit 102 and/or network-participation identifier acceptor module 106 may accept a set of photographs of the same verified real-world user of the at least one communication device, sourced from various social networks as the data accumulated from multiple sources.

Operation 1004 depicts accepting social networking data corresponding to at least one verified real-world user of the at least one communication device, wherein the social networking data comprises at least one of data used to create additional data or data used to find additional data. For example, unique identifier unit 102 and/or network-participation identifier acceptor module 106 may accept a website URL of a social networking site's videoconferencing or videochat feed as data (website URL) used to create additional data (streaming video of network participants). In another example, unique identifier unit 102 and/or network-participation identifier acceptor module 106 may accept a user image or alias that can be used to find other data, for example as a search term in an reverse-image query or a text query, respectively.

FIG. 11 illustrates alternative embodiments of the example operational flow 300 of FIG. 3. FIG. 11 illustrates example embodiments where the assigning operation 330 may include at least one additional operation. Additional operations may include operation 1100, 1102, and/or operation 1104.

Operation 1100 depicts assigning at least one of a multi-digit decimal number, a multi-digit hexadecimal number, or a randomized code as the unique identifier. For example, unique identifier unit 102 may assign at least one of a multi-digit decimal number, a multi-digit hexadecimal number, or a randomized code as the unique identifier. In another example, unique identifier unit 102 may assign a unique identifier using an algorithm(s) known in the art to generate unique multi-digit decimal numbers or unique multi-digit hexadecimal numbers. See, e.g., U.S. Pat. No. 8,010,587 (hereby incorporated by reference).

Operation 1102 depicts further comprising encrypting the unique identifier. For example, unique identifier unit 102 and/or encryption protocol logic 240 may encrypt the assigned unique identifier. Encrypting the unique identifier may be desirable in cases where telecommunications carriers sharing a directory comprised of unique identifiers for the purpose of locating and disambiguating users of one or more networks, can share the unique identifiers but still protect them and the underlying data from access by undesirable entities such as spammers and telemarketers. In another example, unique identifier unit 102 may encrypt the assigned identifier or associated sensitive personal and/or financial information according to encryption schemes described herein and known in the art. See, e.g., U.S. Pat. Nos. 8,010,791 and 8,010,786 (hereby incorporated by reference).

Operation 1104 depicts further comprising encrypting the unique identifier, wherein the encrypting the unique identifier includes performing at least one of symmetric key encryption, public key encryption, hybrid digital signature encryption, using a one-way hash function, using a random identifier, or using a pseudo-random identifier. For example, unique identifier unit 102 and/or encryption protocol logic 240 may encrypt the assigned unique identifier using a one-way hash function, which is easy to compute on every input, but hard to invert given the image of a random input.

FIG. 12 illustrates alternative embodiments of the example operational flow 300 of FIG. 3. FIG. 12 illustrates example embodiments where the assigning operation 330 may include at least one additional operation. Additional operations may include operation 1200, 1202, 1204, and/or operation 1206.

Operation 1200 depicts assigning a unique identifier at least partly based on the device-identifier data and the network-participation identifier data, further comprising assigning to the unique identifier geo-locator data from the at least one communication device. For example, unique identifier unit 102 may accept geodata 116 from a mobile phone, and then assign that geodata to an assigned unique identifier corresponding to a device and a network participant. In another example, unique identifier unit 102 may accept geodata 116 in the form of a computer's IP address, and then assign that geodata to an assigned unique identifier corresponding to the computer and a verified network participant associated with that computer.

Operation 1202 depicts assigning a unique identifier at least partly based on the device-identifier data and the network-participation identifier data, further comprising assigning to the unique identifier geo-locator data from the at least one communication device, wherein the geo-locator data is assigned via a global positioning satellite function of the communication device. For example, unique identifier unit 102 may accept geodata 116 from a mobile phone having a gps receiver, and then assign that geodata to an assigned unique identifier corresponding to a device and a network participant.

Operation 1204 depicts assigning a unique identifier at least partly based on the device-identifier data and the network-participation identifier data, further comprising assigning to the unique identifier geo-locator data from the at least one communication device, wherein the geo-locator data is derived from at least one of cellular phone tower proximity, Wi-Fi use, user-entered location data, or proximity to at least one other device. For example, unique identifier unit 102 may accept geodata 116 from a smart phone using a Wi-Fi network contained in a database that contains location information for the Wi-Fi network, and then assign that geodata to an assigned unique identifier corresponding to a device and a network participant.

Operation 1206 depicts assigning a unique identifier at least partly based on the device-identifier data and the network-participation identifier data, further comprising assigning to the unique identifier geo-locator data from the at least one communication device, wherein the geo-locator data is derived from at least one of a detected vehicle use, a detected user activity, or a detected user location. For example, unique identifier unit 102 may derive geo-locator data from detected automobile use, based on, for example, last known location and predicted range of travel of the automobile. In another example, unique identifier unit 102 may receive or deduce geo-locator data from a detected user activity, for example, checking in with foursquare at a specific location or searching for driving directions in a web browser, respectively.

FIG. 13 illustrates alternative embodiments of the example operational flow 300 of FIG. 3. FIG. 13 illustrates example embodiments where the assigning operation 330 may include at least one additional operation. Additional operations may include operation 1300, 1302, 1304, and/or operation 1306.

Operation 1300 depicts assigning a unique identifier at least partly based on the device-identifier data and the network-participation identifier data, wherein the unique identifier represents multiple communication devices associated with a single user. For example, unique identifier unit 102 may assign a unique identifier at least partly based on the device-identifier data and the network-participation identifier data, wherein the unique identifier represents multiple communication devices associated with a single user. In another example, unique identifier unit 102 may accept device-identifier data from a mobile phone, a desktop computer, and a laptop computer, each of which is associated with a single user, for example by virtue of an IMSI or other SIM data, email data, billing account data, or social networking data.

Operation 1302 depicts assigning a unique identifier at least partly based on the device-identifier data and the network-participation identifier data, wherein the unique identifier represents a single communication device associated with multiple users. For example, unique identifier unit 102 may assign a unique identifier at least partly based on the device-identifier data and the network-participation identifier data, wherein the unique identifier represents a single communication device associated with multiple users. In another example, unique identifier unit 102 may accept device-identifier data from a mobile phone, the device-identifier data associated with a multiple users, for example members of a family by virtue of different login data used for access to the device and/or different social networking usernames used on the device.

Operation 1304 depicts assigning a unique identifier at least partly based on the device-identifier data and the network-participation identifier data, wherein the unique identifier represents a single communication device associated with a single user. For example, unique identifier unit 102 may assign a unique identifier at least partly based on the device-identifier data and the network-participation identifier data, wherein the unique identifier represents a single communication device associated with a single user. As another example, unique identifier unit 102 may assign a unique identifier at least partly based on a videoconferencing device ID, such as an IP address or a MAC address, and at least partly based on a username and password for the videoconference, accompanied by a video image of a user associated with the username and password, verifying that a real-world user is associated with the videoconferencing device.

Operation 1306 depicts assigning a unique identifier at least partly based on the device-identifier data and the network-participation identifier data, and then adding an assigned unique identifier to an inter-service-provider directory of unique identifiers. For example, unique identifier unit 102 may assign a unique identifier at least partly based on the device-identifier data and the network-participation identifier data, and then adding an assigned unique identifier to an inter-service-provider directory of unique identifiers. In another example, unique identifier unit 102 may assign a unique identifier at least partly based on SIM data identifying a user's mobile phone, and at least partly based on subscriber's participation in the wireless network, as verified, for example, by a social security number for the user on file with the wireless carrier for the mobile device, for example, Verizon. Verizon may similarly create unique identifiers for all of the other verified real-world users of its network and their associated devices. Other wireless carriers may similarly create unique identifiers for their subscribers and associated devices.

If many wireless carriers agree to share their unique identifier lists and keep them in the same format for use as a global directory of mobile phone users, a comprehensive "white pages" of communications device users becomes possible, across potentially all service providers. Such a directory could also be keyed to social networking data such as username or user image, such that, for example, Facebook users could easily find each other's device contact information and possibly location information. Inclusion of users' device information in such a directory could be done on an opt-in basis.

As used herein, a unique identifier based on a device-identifier and a network-participant identifier may be keyed to that underlying data. That is, having the unique identifier corresponding to specific device data and specific network-participation identifier data associated with a verified real-world user associated with the at least one communication device will permit the creator of the unique identifier to use it to call up the specific device data and specific network participation identifier data. This may allow, for example, a telecommunications carrier to disambiguate one user from another having similar or identical network participation identifier data. This can be done on the basis of different device identifier data for the two users with similar or identical network participation identifier data, for example.

FIG. 14 illustrates a partial view of an example article of manufacture 1400 that includes a computer program 1404 for executing a computer process on a computing device. An embodiment of the example article of manufacture 1400 is provided including a signal bearing medium 1402, and may include one or more instructions for accepting device-identifier data corresponding to at least one communication device; one or more instructions for accepting network-participation identifier data associated with a verified real-world user associated with the at least one communication device; and one or more instructions for assigning a unique identifier at least partly based on the device-identifier data and the network-participation identifier data. The one or more instructions may be, for example, computer executable and/or logic-implemented instructions. In one implementation, the signal-bearing medium 1402 may include a computer-readable medium 1406. In one implementation, the signal bearing medium 1402 may include a recordable medium 1408. In one implementation, the signal bearing medium 1402 may include a communications medium 1410.

FIG. 15 illustrates an example system 1500 in which embodiments may be implemented. The system 1500 includes a computing system environment. The system 1500 also illustrates a user 1512 using a device 1504, which is optionally shown as being in communication with a computing device 1502 by way of an optional coupling 1506. The optional coupling 1506 may represent a local, wide-area, or peer-to-peer network, or may represent a bus that is internal to a computing device (e.g., in example embodiments in which the computing device 1502 is contained in whole or in part within the device 1504). A storage medium 1508 may be any computer storage media. In one embodiment, the computing device 1502 may include a virtual machine operating within another computing device. In an alternative embodiment, the computing device 1502 may include a virtual machine operating within a program running on a remote server.

The computing device 1502 includes computer-executable instructions 1510 that when executed on the computing device 1502 cause the computing device 1502 to (a) accept device-identifier data corresponding to at least one communication device; (b) accept network-participation identifier data associated with a verified real-world user associated with the at least one communication device; and (c) assign a unique identifier at least partly based on the device-identifier data and the network-participation identifier data. As referenced above and as shown in FIG. 15, in some examples, the computing device 1502 may optionally be contained in whole or in part within the device 1504.

In FIG. 15, then, the system 1500 includes at least one computing device (e.g., 1502 and/or 1504). The computer-executable instructions 1510 may be executed on one or more of the at least one computing device. For example, the computing device 1502 may implement the computer-executable instructions 1510 and output a result to (and/or receive data from) the computing device 1504. Since the computing device 1502 may be wholly or partially contained within the computing device 1504, the device 1504 also may be said to execute some or all of the computer-executable instructions 1510, in order to be caused to perform or implement, for example, various ones of the techniques described herein, or other techniques.

The device 1504 may include, for example, a portable computing device, workstation, or desktop computing device. In another example embodiment, the computing device 1502 is operable to communicate with the device 1504 associated with the user 1512 to receive information about the input from the user 1512 for performing data access and data processing, and assign a unique identifier at least partly based on the device-identifier data and the network-participation identifier data.

FIG. 16 illustrates alternative embodiments of the example operational flow 300 of FIG. 3. FIG. 16 illustrates example embodiments where the accepting operation 320 may include at least one additional operation. Additional operations may include operation 1600, 1602, and/or operation 1604.

Operation 1600 depicts accepting network-participation identifier data associated with a verified real-world user associated with the at least one communication device, further comprising associating network-participation identifier data with a real-world user associated with the at least one communication device. To continue an example of operation 302 above in which unique identifier unit 102 and/or network-participation identifier acceptor module 106 may accept from Facebook a username associated with a verified real-world user having an iPhone and corresponding account with a telecommunications company, the unique identifier unit 102 and/or identity prediction module 122 may search one or more identity databases for associations between the username and a real-world user, and for associations between that real-world user and the iPhone. Sources of data for associating a user with network-participation data and/or a communication device may include, for example, information that is provided by the user. For example, social network, message boards, internet forums, and the like may contain a link between a username and a phone number, a real-world name, birth date, gender, age, or other identifying attribute. Private sources of data may also include information provided by the user, such as private social networks, ecommerce websites, or any websites to which a consumer provides sign-up information. Publicly available sources may contain unique consumer information, including for example, vehicle registration records, real estate records, driving records, voting records, political donations, health information, government related data, technographics, or any other on-line sources disclosing information about people. Examples of algorithms that may be employed to perform these associations can be found in U.S. Patent Application Publication 2010/0088313 "Data Source Attribution System," hereby incorporated in its entirety by reference. See also U.S. Patent Application Publication 2010/0010993 "Distributed Personal Information Aggregator," also hereby incorporated in its entirety by reference.

In the example above, the Facebook username may be used as a search query by identity prediction module 122 to find the same username on a blog containing a real-world name and mobile phone number associated with the username, the mobile phone number being assigned to the iPhone associated with the now-verified real-world user associated with the Facebook username.

Operation 1602 depicts associating network-participation identifier data with a real-world user associated with the at least one communication device, including at least one of performing the association using identity prediction, performing the association using de-anonymization, or performing the association using real-name profiling. For example, unique identifier unit 102, identity prediction module 122, de-anonymization module 244, and/or real-name profiling module 246 may associate network-participation identifier data with a real-world user associated with the at least one communication device, including at least one of performing the association using identity prediction, performing the association using de-anonymization, or performing the association using real-name profiling. For example, accept from LinkedIn the name of a person associated with a videoconferencing device and corresponding account with a videoconferencing service such as WebEx Web conferencing. If the association between the LinkedIn subscriber and a real-world user associated with the videoconferencing device is missing, identity prediction module 122 may search relevant identity databases for matches to the subscriber's username or other profile data. In this way, verification of the real-world user can be accomplished, and association between the network-participation identifier data and the user associated with the communications device can be performed.

Operation 1604 depicts associating network-participation identifier data with a real-world user associated with the at least one communication device, including at least one of performing the association using web history tracking, performing the association using media content tracking, or performing the association using app data tracking. For example, unique identifier unit 102, Web history tracking module 248, media content tracking module 250, and/or app data tracking module 252 may associate network-participation identifier data with a real-world user associated with the at least one communication device, including at least one of performing the association using web history tracking, performing the association using media content tracking, or performing the association using app data tracking. For example, unique identifier unit 102 may accept from Google the email address of a person associated with an Android phone and corresponding account with a wireless carrier. In this example, app data tracking module 252 may match the email address with device ID from the phone, e.g., SIM data, and make the association between the email address and the phone. Additionally, web history tracking module 248 may search public databases for verification that a real-world user is associated with the email address, for example by searching department of motor vehicle records or real estate records.

Disambiguating Search Terms Corresponding to Network Members

FIG. 17 illustrates an example system 1700 in which embodiments may be implemented. The system 1700 includes a disambiguation unit 1704. The disambiguation unit 1704 may contain, for example, primary query data acceptor module 1718, ancillary query data acceptor module 1710, and/or identity prediction module 122 disambiguation unit 1704 may communicate over a network or directly with user 1701 to accept primary query data 1702 and ancillary query data 1703. Disambiguation unit 1704 may also communicate over a network or directly with user 1701 to present disambiguated search term(s) 1730. Disambiguation unit 1704 may also include filter logic 1718, ranking logic 1720, correction logic 1722, subscriber database 1724, cross-carrier subscriber database 1726, and/or other database 1728.

In FIG. 17, disambiguation unit 1704 may associate at least one search term from user 1701 with ancillary query data 1703 such as network-participation identifier data or device-identifier data. Optionally, disambiguation unit 1704 may accept ancillary query data 1703 such as search locus data. Primary query data acceptor module 1718 may include name query acceptor module 1706 and/or number query acceptor module. Ancillary query data acceptor module 1710 may include device-identifier data acceptor module 1712, network-participation identifier data acceptor module 1714, and/or search locus data acceptor module 1716. Identity prediction module 122 may include de-anonymization module 244, real-name profiling module 246, web history tracking module 248, media content tracking module 250, and/or app data tracking module 252.

In FIG. 17, the disambiguation unit 1704 is illustrated as possibly being included within a system 1700. Of course, virtually any kind of computing device may be used to implement the special purpose disambiguation unit 1704, such as, for example, a workstation, a desktop computer, a networked computer, a server, a collection of servers and/or databases, a virtual machine running inside a computing device, a mobile computing device, or a tablet PC.

Additionally, not all of the disambiguation unit 1704 need be implemented on a single computing device. For example, the disambiguation unit 1704 may be implemented and/or operable on a remote computer, while a user interface and/or local instance of the disambiguation unit 1704 are implemented and/or occur on a local computer. Further, aspects of the disambiguation unit 1704 may be implemented in different combinations and implementations than that shown in FIG. 17. For example, functionality of a user interface may be incorporated into the disambiguation unit 1704. The disambiguation unit 1704 may perform simple data relay functions and/or complex data analysis, including, for example, fuzzy logic and/or traditional logic steps. Further, many methods of disambiguating search terms corresponding to network members described herein or known in the art may be used, including, for example, algorithms commonly used in disambiguating words based on syntax, context, and semantics. In some embodiments, the disambiguation unit 1704 may disambiguate a search term by associating the search term with network-participation identifier data and/or device-identifier data available as updates through a network.

Disambiguation unit 1704 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the disambiguation unit 1704 may be used to perform various data querying and/or recall techniques with respect to the primary query data 1702 and the ancillary query data 1703 (e.g., device-identifier data 108, searcher location data, and/or network-participation identifier data 112), in order to present a disambiguated search term(s) 1730. For example, where network-participation identifier data 112 is organized, keyed to, and/or otherwise accessible using one or more user accounts such as social network, email, or the like, disambiguation unit 1704 may employ various Boolean, statistical, and/or semi-boolean searching techniques to associate a search term with network-participation identifier data and/or device-identifier data for disambiguation. Similarly, for example, where network member data is organized, keyed to, and/or otherwise accessible using one or more inter-carrier directory or cross-carrier subscriber database 1726, various Boolean, statistical, and/or semi-boolean searching techniques may be performed by disambiguation unit 1704 to disambiguate a search term(s).

Many examples of databases and database structures may be used in connection with the disambiguation unit 1704. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for disambiguating information and/or for gathering and/or compiling data from the relational database(s).

For example, SQL or SQL-like operations over one or more primary query data 1702 and/or ancillary query data 1703 may be performed, or Boolean operations using primary query data 1702 and/or ancillary query data 1703 may be performed. For example, weighted Boolean operations may be performed in which different weights or priorities are assigned to one or more of the primary query data 1702 and/or ancillary query data 1703, including various device identifiers, locations, and/or network participation aliases associated with a particular network member, perhaps relative to one another. For example, a number-weighted, exclusive-OR operation may be performed to request specific weightings of device and/or network participation identifiers.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 18 illustrates an operational flow 1800 representing example operations related to disambiguating search terms corresponding to network members. In FIG. 18 and in following figures that include various examples of operational flows, discussion and explanation may be provided with respect to the above-described system environments of FIG. 17, and/or with respect to other examples and contexts. However, it should be understood that the operational flows may be executed in a number of other environments and contexts including that of FIG. 31, and/or in modified versions of FIG. 17. Also, although the various operational flows are presented in the sequence(s) illustrated, it should be understood that the various operations may be performed in other orders than those which are illustrated, or may be performed concurrently.

After a start operation, operation 1810 depicts accepting at least one search term corresponding to at least one member of a network. For example, disambiguation unit 1704, name query acceptor module 1706, and/or number query acceptor module 1708 can accept primary query data 1702 from a user 1701, for example in the form of a proper name search term like "John Smith" or a username search term such as "jsmith23." In another example, disambiguation unit 1704 or number query acceptor module 1708 may accept a street address search term from a user 1701, for example 123 Any Street, Peoria Ill.

Operation 1820 depicts disambiguating the at least one search term including associating the at least one search term with at least one of network-participation identifier data or device-identifier data. For example, disambiguation unit

1704, network-participation identifier data acceptor module 1714 and/or device-identifier data acceptor module 1712 may access ancillary query data 1703 from a social networking website such as Facebook, associate a search term, e.g., "John Smith" to continue the example from above, with information known or knowable about the searcher and/or the device that the searcher is using to conduct the query. One way of making an association between a search term and network participation data or device identification data may involve finding links between the search term and elements of the social network of user 1701. For example, a search for "John Smith" by a user 1701 logged in to Facebook may return results including phone numbers for those John Smiths that are connected in some way to the user 1701's Facebook friends network, perhaps ranked by degree of direct connection. Phone numbers for the John Smiths may be determined by the methods described herein or in the art for identity prediction, based on, for example, location of the searching user 1701 and/or publicly available records for the list of John Smiths. In another embodiment, disambiguation unit 1702 may query cross-carrier subscriber database 1726 (as described herein) containing telecommunication carrier subscriber device identification information across a social network for the search term in question to find a phone number for the John Smith of interest. In this way, a universal white pages for a social network may be created, for all telecommunications carriers, so that users may find phone numbers and other contact information, for example, for other people in their social network. Those people need not necessarily be directly or even indirectly connected to the user 1701 in the network.

In some embodiments, user 1701 will provide both primary query data 1702 and ancillary query data 1703 to disambiguation unit 1702. In another embodiment, user 1701 may provide primary query data 1702 and grant access to ancillary query data 1703, for example by an affirmative step of opting-in or by not opting-out of a request by disambiguation unit 1702. Ancillary query data may be obtainable as a matter of course by disambiguation unit 1702. For example, image data for a user 1701 providing videochat data to a search website, device identification data provided by an iPhone app, or location information provided by a user's internet protocol address may be among those data that are freely given or available to a computing device networked with a device upon which user 1701 has entered primary query data 1702. Other ancillary query data may be available from a social network that the user 1701 is logged in to. For example, Facebook may provide proper names, usernames, images, birthdates, telephone numbers, friend lists, or other data that it has about the users of its social network. Such information may be publicly available.

Operation 1830 depicts presenting a disambiguated search term at least partly based on at least one of the network-participation identifier data or the device-identifier data. For example, disambiguation unit 1702, upon making an association between a search term and ancillary data, for example, related to the user 1701, may present a disambiguated search term at least partly based on at least one of the network-participation identifier data or the device-identifier data and ancillary data. For example, disambiguation unit 1702 may accept a search term such as Jane Doe from user 1701. Disambiguation unit 1702 may then note the internet protocol address of the device from which user 1701 is performing the search. Disambiguation unit 1702 may then determine a region in which the user 1701 is located, and then limit its search to known Jane Doe's in that region, or in another embodiment, to Jane Doe's associated with user 1701's social network.

As another example, disambiguation unit 1702 may detect device identifier data such as a mobile phone's integrated circuit card ID (ICC-ID) as the ancillary query data 1703 (for example, some iPhone apps send device ID data with other app data), and associate that device ID (or associated app data) with the primary query data to arrive at an association that allows for presentation of a disambiguated search term to the user 1701.

In some embodiments, disambiguation unit 1702 may include an identity prediction algorithm such as a de-anonymization algorithm, a real-name profiling algorithm, a web history tracking algorithm, media content tracking algorithm, and/or an app list tracking algorithm. These algorithms may aid in the association of ancillary query data with a search term, where those associations are not provided directly by a user 1701 or readily apparent to disambiguation unit 1702.

In one embodiment, circuitry for accepting at least one telephone communication from at least one member of a network may interface with circuitry for associating the at least one telephone communication with a sender profile at least partly based on the sender's device-identifier data and the sender's network-participation identifier data, which in turn may interface with circuitry for presenting the sender profile in association with the at least one telephone communication.

FIG. 19 illustrates alternative embodiments of the example operational flow 1800 of FIG. 18. FIG. 19 illustrates example embodiments where the accepting operation 1810 may include at least one additional operation. Additional operations may include operation 1900, 1902, and/or operation 1904.

Operation 1900 depicts accepting a name corresponding to at least one member of a network. For example, disambiguation unit 1702 and/or name query acceptor module 1706 may accept a name corresponding to at least one member of a network. For example, name query acceptor module 1706 may accept as primary query data the name John Smith corresponding to a John Smith in a social network of the user, for example, LinkedIn. Names are typically entered by a user at a user interface, by typing, speaking, pasting, or other means of entering a name into a search window or search box, for example in a web browser.

Operation 1902 depicts accepting at least one of a first name, a last name, a nickname, a username, or a name including initials corresponding to at least one member of a network. For example, disambiguation unit 1702 and/or name query acceptor module 1706 may accept at least one of a first name, a last name, a nickname, a username, or a name including initials corresponding to at least one member of a network. For example, name query acceptor module 1706 may accept as primary query data the name J. J. Smith or Johnny Smith corresponding to a John Smith in a social network of the user, for example, Google+.

Operation 1904 depicts accepting at least one of a physical address, an email address, or a web address corresponding to at least one member of a network. For example, disambiguation unit 1702 and/or name query acceptor module 1706 may accept at least one of a physical address, an email address, or a web address corresponding to at least one member of a network. For example, name query acceptor module 1706 may accept as primary query data "jsmith123@hotmail.com" corresponding to a John Smith in a social network of the user, for example, Facebook.

FIG. 20 illustrates alternative embodiments of the example operational flow 1800 of FIG. 18. FIG. 20 illustrates example embodiments where the disambiguating operation 1820 may include at least one additional operation. Additional operations may include operation 2000, 2002, and/or operation 2004.

Operation 2000 depicts disambiguating the at least one search term including associating the at least one search term with device-identifier data corresponding to at least, one of a mobile phone, a wired telephone, a voice-over-internet-protocol telephone, a tablet computer, a notebook computer, a laptop computer, a desktop computer, or a networked television. For example, disambiguation unit 1702 and/or device-identifier data acceptor module 1712 may associate a search term with a mobile equipment identifier corresponding to a mobile handset as ancillary query data 1703 from a user 1701, telecommunications carrier 220, or wireless communications service 222. As discussed above, a Mobile Equipment IDentifier (MEID) is a globally unique 56-bit identification number for a physical piece of mobile equipment. Equipment identifiers are "burned" into a device and are used as a means to facilitate mobile equipment identification and tracking. Additionally, MEIDs are coordinated with International Mobile Equipment Identifiers (IMEIs), facilitating global roaming and harmonization between 3G technologies as a universal mobile equipment identifier. The MEID is a 14-digit hexadecimal value. The MEID is capable of being transmitted over the air upon a request from the network. The MEID is composed mainly of two basic components, the manufacturer code and the serial number. In some embodiments, associating primary query data 1702 with device identification data such as the MEID provides an avenue for disambiguation, because (1) disambiguation unit 1702 may find primary search term(s) on related devices on the same carrier service, or (2) by associating devices in the same geographic area as determined by the device ID with the primary search term(s).

Operation 2002 depicts disambiguating the at least one search term including associating the at least one search term with device-identifier data including a telephone number associated with a telephony device. For example, disambiguation unit 1702 and/or device-identifier data acceptor module 1712 may associate the at least one search term with device-identifier data including a telephone number associated with a telephony device. To continue the example discussed above, disambiguation unit 1702 may make the association between a primary search term and a device related (perhaps by carrier service or location) to the device of the user with a known MEID. In this case, the MEID may provide a link to a telephone number for its mobile device. This telephone number may in turn be used to find a telephone number for a John Smith as a search term, for example where an inter-service-provider directory of unique identifiers has been created, as discussed above.

Operation 2004 depicts disambiguating the at least one search term including associating the at least one search term with device-identifier data including subscriber identity module data or integrated circuit card identifier data corresponding to at least one communication device. For example, disambiguation unit 1702 and/or device-identifier data acceptor module 1712 may associate the at least one search term with device-identifier data including subscriber identity module data or integrated circuit card identifier data corresponding to at least one communication device. For example, accessing ICCI device-identifier data corresponding to the user 1701 may provide location data, network participation data (by virtue of a name associated with the device-identifier data), other elements that may be used to associate a search term with relevant information. One use for this disambiguation is to provide a universal white pages that can cross carrier boundaries and include most if not all members of a social network, for example.

FIG. 21 illustrates alternative embodiments of the example operational flow 1800 of FIG. 18. FIG. 21 illustrates example embodiments where the disambiguating operation 1820 may include at least one additional operation. Additional operations may include operation 2100, 2102, and/or operation 2104.

Operation 2100 depicts disambiguating the at least one search term including associating the at least one search term with device-identifier data including mobile equipment identifier data corresponding to at least one communication device. For example, disambiguation unit 1702 and/or device-identifier data acceptor module 1712 may associate the at least one search term with device-identifier data including mobile equipment identifier data corresponding to at least one communication device. In one embodiment, disambiguation unit 1702 may associate a search term with a Unique Device Identifier (UDID) for an iPhone upon which the user 1701 is performing the search iPhone apps are known to transmit device ID information with other app data, thus this is something that may be accepted by disambiguation unit 1702 in course of receiving the primary query data 1702. Having iPhone device ID information allows disambiguation unit 1702 to make find additional information about the user 1701, in order to make associations between the device/network participation of the user 1701 and the member of a network that user 1701 is searching for.

Operation 2102 depicts disambiguating the at least one search term including associating the at least one search term with device-identifier data including international mobile subscriber identity data corresponding to at least one communication device. For example, disambiguation unit 1702 and/or device-identifier data acceptor module 1712 may associate the at least one search term with device-identifier data including international mobile subscriber identity data corresponding to at least one communication device. In one embodiment, disambiguation unit 1702 may associate a search term with an IMSI belonging to cell phone upon which the user 1701 is performing the search. Having the IMSI may provide disambiguation unit 1702 with location data, for example, country of origin data, with which to make associations between the user 1701 and the member of a network that user 1701 is searching for. For example, IMSI data indicating that the user 1701 has a service plan in Finland may serve to elevate the rank of search results known to be located in Finland. For example, IMSI data indicating a Finnish origin of user 1701 may result in John Smith's (the search term) that have Finnish connections being ranked higher in the presentation of disambiguated search terms.

Operation 2104 depicts disambiguating the at least one search term including associating the at least one search term with device-identifier data including electronic serial number data corresponding to at least one communication device. For example, disambiguation unit 1702 and/or device-identifier data acceptor module 1712 may associate the at least one search term with device-identifier data including electronic serial number data corresponding to at least one communication device. In one embodiment, disambiguation unit 1702 may associate a search term with an electronic serial number belonging to cell phone of a member of the same carrier network as the user 1701. In this embodiment, membership in the same carrier network may be a significant association that elevates the rank of that result as a disambiguated search term.

FIG. 22 illustrates alternative embodiments of the example operational flow 1800 of FIG. 18. FIG. 22 illustrates example embodiments where the disambiguating operation 1820 may include at least one additional operation. Additional operations may include operation 2202, 2204, 2206, and/or operation 2208.

Operation 2202 depicts disambiguating the at least one search term including associating the at least one search term with device-identifier data including device-identifier data corresponding to at least one communication device that is linked to at least one billing account. For example, disambiguation unit 1702 may associate a mobile equipment identifier from a mobile phone's SIM card from a telecommunications carrier 220, the MEID corresponding to a billing account for a subscriber of a wireless service provided by the telecommunications carrier 220, for example, user 1701. That association may then in turn be used to associate a search term from user 1701 with results having connections to user 1701 and/or the carrier 220 associated with user 1701's billing account.

Operation 2204 depicts disambiguating the at least one search term including associating the at least one search term with device-identifier data including device-identifier data corresponding to at least one communication device that is linked to at least one billing account, wherein the at least one billing account comprises at least one of a cable telecommunications billing account, a wireless telecommunications billing account, or a satellite telecommunications billing account. For example, disambiguation unit 1702 may associate the at least one search term with device-identifier data including device-identifier data corresponding to at least one communication device that is linked to at least one billing account, wherein the at least one billing account comprises at least one of a cable telecommunications billing account, a wireless telecommunications billing account, or a satellite telecommunications billing account. For example, disambiguation unit 1702 may receive ancillary query data 1703 from user 1701 in the form of login status at a website, such as a Google home page. In one embodiment that login status may include data regarding a wireless telecommunications billing account, for example, for an Android mobile device. Such data may include name, address, or other personal information about user 1701 that may be used by disambiguation unit 1702 to make associations between a search term and the sphere of connections surrounding user 1701.

Operation 2206 depicts disambiguating the at least one search term including associating the at least one search term with device-identifier data including device-identifier data corresponding to at least one communication device that is linked to at least one billing account, wherein the at least one billing account comprises an electronic payment account. For example, disambiguation unit 1702 may associate the at least one search term with device-identifier data including device-identifier data corresponding to at least one communication device that is linked to at least one billing account, wherein the at least one billing account comprises an electronic payment account. For example, to continue the example above, disambiguation unit 1702 may receive ancillary query data 1703 from user 1701 in the form of login status at a website, such as a Google home page. In one embodiment that login status may include data regarding an electronic billing account, for example, Google Wallet. In another embodiment, disambiguation unit 1702 may receive ancillary query data 1703 from user 1701 in the form of a mobile device ID for an Android mobile phone from an Android app such as "Android Device ID" available for download from the Android Market. The Android mobile device ID for the mobile phone, for example derived from a wireless network socket, may correspond to a Google Checkout account for the subscriber of the wireless service to the mobile phone. As discussed above, such data may include name, address, or other personal information about user 1701 that may be used by disambiguation unit 1702 to make associations between a search term and the sphere of connections surrounding user 1701.

Operation 2208 depicts disambiguating the at least one search term including associating the at least one search term with device-identifier data including device-identifier data corresponding to at least one communication device that is linked to at least one billing account, wherein the at least one billing account comprises an electronic payment account, and wherein the electronic payment account comprises at least one of a Google Checkout account, an Amazon Payments account, a PayPal account, or a mobile PayPal account. For example, disambiguation unit 1702 may associate the at least one search term with device-identifier data including device-identifier data corresponding to at least one communication device that is linked to at least one billing account, wherein the at least one billing account comprises an electronic payment account, and wherein the electronic payment account comprises at least one of a Google Checkout account, an Amazon Payments account, a PayPal account, or a mobile PayPal account. For example, disambiguation unit 1702 may receive ancillary query data 1703 from user 1701 in the form of login status at a website, such as Amazon.com. In one embodiment that login status may include data regarding an electronic billing account, for example, Amazon Payments. Such data may include name, address, purchase history, wishlist, or other personal information about user 1701 that may be used by disambiguation unit 1702 to make associations between a search term and the sphere of connections surrounding user 1701.

FIG. 23 illustrates alternative embodiments of the example operational flow 1800 of FIG. 18. FIG. 23 illustrates example embodiments where the disambiguating operation 1820 may include at least one additional operation. Additional operations may include operation 2300, 2302, and/or operation 2304.

Operation 2300 depicts disambiguating the at least one search term including associating the at least one search term with device-identifier data including device-identifier data corresponding to at least one communication device that is linked to at least one of a credit card account or a virtual account. For example, disambiguation unit 1702 may associate the at least one search term with device-identifier data including device-identifier data corresponding to at least one communication device that is linked to at least one of a credit card account or a virtual account. For example, a user's wireless device's service subscription may be linked to a user's credit card account.

Operation 2302 depicts disambiguating the at least one search term including associating the at least one search term with email data corresponding to at least one user of at least one communication device. For example, disambiguation unit 1702 may associate the at least one search term with email data corresponding to at least one user of at least one communication device. For example, network-participation identifier data acceptor module 1714 may accept an email address as network-participation identifier data corresponding to user 1701, the email address associated with a name and address on file with a telecommunications company with which the user has a service subscription. In a further example, for a searching user 1701 logged in to a gmail account, for example, disambiguation unit 1702 may have access to text in the emails of the personal mailbox of the user as a data source to search for associations with the search term.

Operation 2304 depicts disambiguating the at least one search term including associating the at least one search term with email data corresponding to at least one user of at least one communication device, wherein the email data comprises a simple mail transfer protocol-compatible email address or an email alias. In one example, disambiguation unit 1702 may associate the at least one search term with email data corresponding to at least one user of at least one communication device, wherein the email data comprises a simple mail transfer protocol-compatible email address or an email alias. For example, network-participation identifier data acceptor module 1714 may accept an email alias as network-participation identifier data corresponding to user 1701, the email alias associated with a name on file with a website with which the user has an account, such as hotmail.com.

FIG. 24 illustrates alternative embodiments of the example operational flow 1800 of FIG. 18. FIG. 24 illustrates example embodiments where the disambiguating operation 1820 may include at least one additional operation. Additional operations may include operation 2400, 2402, 2404, and/or operation 2406.

Operation 2400 depicts disambiguating the at least one search term including associating the at least one search term with network-participation identifier data associated with at least one of a user's social security number, a user's national identification card, a user's biometric measurement, a user's passport number, a user's tax identification number, a user's internet domain, or a user's authentication certificate. In one example, disambiguation unit 1702 and/or ancillary query data acceptor module 1710 may associate the at least one search term with network-participation identifier data associated with at least one of a user's social security number, a user's national identification card, a user's biometric measurement, a user's passport number, a user's tax identification number, a user's internet domain, or a user's authentication certificate. As another example, network-participation identifier data acceptor module 1714 may accept a Facebook username or login status as network-participation identifier data, the username associated with a photograph of the user 1701 as image data or as a biometric measurement. In some embodiments, an image recognition system may be employed to associate an image with a specific user 1701 for biometric purposes. Identifying features of the user 1701, such as social network participation, national status, web presence indicators (e.g., blog authorship, personal web pages, or the like), may provide associations for disambiguation unit 1702 to use in presenting a disambiguated search term of high relevance to the user 1701.

As discussed above, as used herein, "network-participation identifier data" may refer to a signifier of belonging in a network, such as an email address; a username, such as a social networking user name; or other mark such as an image, number, or writing that signifies participation in a particular network.

Operation 2402 depicts disambiguating the at least one search term including associating the at least one search term with social networking data. In one example, disambiguation unit 1702 and/or ancillary query data acceptor module 1710 may associate the at least one search term with social networking data. As another example, network-participation identifier data acceptor module 1714 may accept a Facebook username or login status as network-participation identifier data, the username associated with a photograph of the user 1701, interests of the user 1701, education of the user 1701, home town of the user 1701, current location of the user 1701 (e.g., city or street level location a la foursquare.com), or the like. As discussed above, identifying features of the user 1701 gleaned from social network participation may provide associations with a search term for disambiguation unit 1702 to use in presenting a disambiguated search term of high relevance to the user 1701. For example, searching for "Mike Jones" may result in disambiguation unit 1702 making an association with a Mike Jones who is a Google+ friend of a Google+ friend of the user 1701 logged in to Google+. That specific Mike Jones may then be presented as the first result in a list of disambiguated search terms. Details of the association may also be presented by disambiguation unit 1702 with the disambiguated search term so as to inform the user 1701 as to the association underlying the ranking, and the known attributes of that particular Mike Jones.

Operation 2404 depicts disambiguating the at least one search term including associating the at least one search term with social networking data, wherein the social networking data comprises at least one of a username, an @-tagged twitter handle, a corporate login, or a website uniform resource locator. In one example, disambiguation unit 1702 and/or ancillary query data acceptor module 1710 may associate the at least one search term with social networking data, wherein the social networking data comprises at least one of a username, an @-tagged twitter handle, a corporate login, or a website uniform resource locator. As in the above Facebook example, network-participation identifier data acceptor module 1714 may accept a Facebook username as network-participation identifier data, the username associated with various attributes of the user 1701 as grist for making associations with the search term(s).

Operation 2406 depicts disambiguating the at least one search term including associating the at least one search term with social networking data, wherein the social networking data comprises at least one of Facebook data, Twitter data, or LinkedIn data. In one example, disambiguation unit 1702 and/or ancillary query data acceptor module 1710 may associate the at least one search term with social networking data, wherein the social networking data comprises at least one of Facebook data, Twitter data, or LinkedIn data. For example, network-participation identifier data acceptor module 1714 may accept a LinkedIn username as network-participation identifier data, the username associated with various attributes of the user 1701 as a basis for making associations with the search term(s).

FIG. 25 illustrates alternative embodiments of the example operational flow 1800 of FIG. 18. FIG. 25 illustrates example embodiments where the disambiguating operation 1820 may include at least one additional operation. Additional operations may include operation 2502, 2504, and/or operation 2506.

Operation 2502 depicts disambiguating the at least one search term including associating the at least one search term with social networking data, wherein the social networking data comprises at least one of image data, constellation of social contact data, or user input data. In one example, disambiguation unit 1702 and/or ancillary query data acceptor module 1710 may associate the at least one search term with social networking data, wherein the social networking data comprises at least one of image data, constellation of social contact data, or user input data. For example, network-participation identifier data acceptor module 1714 may accept a Facebook username as network-participation identifier data, the username associated with a constellation of friends of the user 1701, as a basis for making associations with the search term(s). As discussed above, a photograph of a user 1701 may be analyzed by image recognition technologies to identify a person having specific geographic, demographic, or other identifying characteristics.

Operation 2504 depicts disambiguating the at least one search term including associating the at least one search term with social networking data, wherein the social networking data comprises data accumulated from multiple sources. In one example, disambiguation unit 1702 and/or ancillary query data acceptor module 1710 may associate the at least one search term with social networking data, wherein the social networking data comprises data accumulated from multiple sources. For example, network-participation identifier data acceptor module 1714 may accept a Google+ username and Twitter username as network-participation identifier data, the usernames associated with a constellation of Facebook friends and/or Twitter followers of the user 1701, as a basis for making associations with the search term(s). In this way, significant power of association (and resulting disambiguation) may be obtained by making associations based on common matches from multiple sources.

Operation 2506 depicts disambiguating the at least one search term including associating the at least one search term with social networking data, wherein the social networking data comprises at least one of data used to create additional data or data used to find additional data. In one example, disambiguation unit 1702 and/or ancillary query data acceptor module 1710 may associate the at least one search term with social networking data, wherein the social networking data comprises at least one of data used to create additional data or data used to find additional data. For example, network-participation identifier data acceptor module 1714 may associate a search term with a website URL of a social networking site's videoconferencing or videochat feed as data (website URL) used to create additional data (streaming video of conference/chat/network participants). In another example, disambiguation unit 1702 and/or ancillary query data acceptor module 1710 may associate a search term with a user image or alias that can be used to find other data, for example as a search term in an reverse-image query or a text query, respectively.

FIG. 26 illustrates alternative embodiments of the example operational flow 1800 of FIG. 18. FIG. 26 illustrates example embodiments where the disambiguating operation 1820 may include at least one additional operation. Additional operations may include operation 2600, 2602, and/or operation 2604.

Operation 2600 depicts disambiguating the at least one search term including associating the at least one search term with a real-world user associated with at least one communication device. In one example, disambiguation unit 1702 and/or ancillary query data acceptor module 1710 may associate the at least one search term with a real-world user associated with at least one communication device. For example, network-participation identifier data acceptor module 1714 may associate a search term with a real-world user 1701 on the basis of telecommunication carrier records and/or network account records, for example when a user 1701 performs a Google search from a Google phone while logged in to a personal Google page or Google+. In other embodiments, identity prediction methods may be employed to associate a search term with a real-world user, or to associate a user 1701 with a real-world user, as described below. In some embodiments, disambiguation unit 1702 may associate user 1701 with identifying data (e.g., device data or network participation data), and then associate the now-known attributes of the user 1701 with the search term in order to disambiguate the search term. Matches or associations derived in this way may provide significant power in disambiguation by disambiguation unit 1702, which may present such matches as highly ranked disambiguated search terms. This approach can also be done in a complementary way in reverse—disambiguation unit 1702 can associate a search term with device identification data and/or network participation data, which can then be cross-reference with known attributes of user 1701 to find commonalities indicative of relevance.

As another example, a Facebook username search term "Mike Jones" may be used by identity prediction module 122 to find the same username "Mike Jones" on a blog containing a real-world name "Michael B. Jones" and mobile phone number associated with the username and real-world name, the mobile phone number being assigned to an iPhone associated with the real-world user, whose "Mike Jones" username is within the same social network as the searching user 1701. This particular "Mike Jones" or "Michael B. Jones" may then be presented with the mobile phone number as a disambiguated search term to user 1701.

As described above, sources of data for associating a search term or user 1701 with network-participation data and/or a communication device may include, for example, information that is provided by the user. For example, social network, message boards, internet forums, and the like may contain a link between a username and a phone number, a real-world name, birth date, gender, age, or other identifying attribute. Private sources of data may also include information provided by the user, such as private social networks, ecommerce websites, or any websites to which a consumer provides sign-up information. Publicly available sources may contain unique consumer information, including for example, vehicle registration records, real estate records, driving records, voting records, political donations, health information, government related data, technographics, or any other on-line sources disclosing information about people. Examples of algorithms that may be employed to perform these associations can be found in U.S. Patent Application Publication 2010/0088313 "Data Source Attribution System," hereby incorporated in its entirety by reference. See also U.S. Patent Application Publication 2010/0010993 "Distributed Personal Information Aggregator," also hereby incorporated in its entirety by reference. See also web databases such as the Notable Names Database (NNDB) at http://www.nndb.com/ and similar public databases providing information about people.

Operation 2602 depicts disambiguating the at least one search term including associating the at least one search term with a real-world user associated with at least one communication device, wherein the associating the at least one search term with a real-world user associated with at least one communication device includes at least one of performing the association using identity prediction, performing the association using de-anonymization, or performing the association using real-name profiling. In one example, disambiguation unit 1702, de-anonymization module 244, real-name profiling module 246, and/or identity prediction module 122 may associate the at least one search term with a real-world user associated with at least one communication device, wherein the associating the at least one search term with a real-world user associated with at least one communication device includes at least one of performing the association using identity prediction, performing the association using de-anonymization, or performing the association using real-name profiling. For example, real-name profiling module 246 may associate a name as a search term with people having that name, including attributes that differentiate those of the same name, such as location, age, or any other distinguishing features. Those attributes may be cross-referenced with attributes of the user 1701 to identify commonalities that would indicate a connection and increased relevance for disambiguation.

Operation 2604 depicts disambiguating the at least one search term including associating the at least one search term with a real-world user associated with at least one communication device, wherein the associating the at least one search term with a real-world user associated with at least one communication device includes at least one of performing the association using web history tracking, performing the association using media content tracking, or performing the association using app data tracking. In one example, disambiguation unit 1702, web history tracking module 248, media content tracking module 250, app data tracking module 252, and/or identity prediction module 122 may associate the at least one search term with a real-world user associated with at least one communication device, wherein the associating the at least one search term with a real-world user associated with at least one communication device includes at least one of performing the association using web history tracking, performing the association using media content tracking, or performing the association using app data tracking.

For example, app data tracking module 252 may obtain and associate a user's device ID with a telecommunications carrier network. That network may then be used as a basis for finding a relevant search term, thereby narrowing the possibilities and disambiguating the search term. Alternatively, ancillary query data acceptor module 1710 may accept from Google the email address of a user 1701 associated with an Android phone and corresponding account with a wireless carrier (e.g., the user performing a Google search on an Android phone). In this example, app data tracking module 252 may match the email address with device ID from the phone, e.g., SIM data, by monitoring apps used by the user 1701 that provide this data, and then make the association between the email address and the phone. Additionally, web history tracking module 248 may search public databases for identifying features of a real-world, such as physical address or phone number associated with the user's email address, for example by searching department of motor vehicle records or real estate records. As discussed above, those attributes may be cross-referenced with attributes of the search term to identify commonalities that would indicate a connection and increased relevance for disambiguation.

FIG. 27 illustrates alternative embodiments of the example operational flow 1800 of FIG. 18. FIG. 27 illustrates example embodiments where the disambiguating operation 1820 may include at least one additional operation. Additional operations may include operation 2700, 2702, 2704, 2706, and/or operation 2708.

Operation 2700 depicts disambiguating the at least one search term including associating the at least one search term with network-participation identifier data and device-identifier data. In one example, disambiguation unit 1702, ancillary query data acceptor module 1710, and/or identity prediction module 122 may disambiguate the at least one search term by associating the at least one search term with network-participation identifier data and device-identifier data relating to a searching user 1701. For example, ancillary query data acceptor module 1710 may receive both device location data, for example via foursquare, and network participation data via Facebook for the user 1701. Disambiguation unit 1702 may then apply those data to the search term, "Mike Jones" for example, to find those "Mike Jones"es who are near the user's location and either in the Facebook social network or specifically connected to the searching user 1701 on Facebook or connected to a friend of the searching user 1701.

Operation 2702 depicts disambiguating the at least one search term including associating the at least one search term with data indicating the origin of input of the at least one search term. In one example, disambiguation unit 1702, ancillary query data acceptor module 1710, and/or identity prediction module 122 may disambiguate the at least one search term by associating the at least one search term with data indicating the origin of input of the at least one search term. For example, ancillary query data acceptor module 1710 may receive device location data, for example via foursquare, for the user 1701. Disambiguation unit 1702 may then apply those data to the search term, "MJones" for example, to find those "MJones"es who are near the user's foursquare location.

Operation 2704 depicts disambiguating the at least one search term including associating the at least one search term with data indicating the origin of input of the at least one search term, wherein the data indicating the origin of input of the at least one search term includes internet protocol address data. In one example, disambiguation unit 1702, ancillary query data acceptor module 1710, and/or identity prediction module 122 may disambiguate the at least one search term by associating the at least one search term with data indicating the origin of input of the at least one search term, wherein the data indicating the origin of input of the at least one search term includes internet protocol address data. For example, ancillary query data acceptor module 1710 may receive device location data including IP address data, for example via a web browsing session on a desktop computer, for the user 1701. To the extent that an IP address provides an indication of geographic location, disambiguation unit 1702 may then apply those location data to the search term, "MJones" for example, to find those "MJones"es who are near the user's computer's location. Disambiguation unit 1702 may employ geolocation software to identify, based on a user's IP address, the country (including down to the city and ZIP code level), organization, or user the IP address has been assigned to. Other methods include examination of a MAC address, image metadata, or available credit card information.

Operation 2706 depicts disambiguating the at least one search term including associating the at least one search term with data indicating the origin of input of the at least one search term, wherein the data indicating the origin of input of the at least one search term is derived from at least one of cellular phone tower proximity, Wi-Fi use, user-entered location data, or proximity to at least one other device. In one example, disambiguation unit 1702, ancillary query data acceptor module 1710, and/or identity prediction module 122 may disambiguate the at least one search term by associating the at least one search term with data indicating the origin of input of the at least one search term, wherein the data indicating the origin of input of the at least one search term is derived from at least one of cellular phone tower proximity, Wi-Fi use, user-entered location data, or proximity to at least one other device. For example, ancillary query data acceptor module 1710 may receive device location data from a Wi-Fi smart phone of a searching user 1701 by accessing a database that contains location information for the Wi-Fi network, and then ancillary query data acceptor module 1710 may use that location data to disambiguate the search term relative to the user's location.

Operation 2708 depicts disambiguating the at least one search term including associating the at least one search term with data indicating the origin of input of the at least one search term, wherein the data indicating the origin of input of the at least one search term is derived from at least one of a detected vehicle use, a detected user activity, or a detected user location. In one example, disambiguation unit 1702, ancillary query data acceptor module 1710, and/or identity prediction module 122 may disambiguate the at least one search term by associating the at least one search term with data indicating the origin of input of the at least one search term, wherein the data indicating the origin of input of the at least one search term is derived from at least one of a detected vehicle use, a detected user activity, or a detected user location. For example, ancillary query data acceptor module 1710 may receive device location data from detected automobile use, based on, for example, last known location and predicted range of travel of an automobile equipped with gps tracking, for example. In another example, ancillary query data acceptor module 1710 may receive or deduce location data from a detected user activity, for example, checking in with foursquare at a specific location or searching for driving directions in a web browser, respectively.

FIG. 28 illustrates alternative embodiments of the example operational flow 1800 of FIG. 18. FIG. 28 illustrates an example embodiment where the disambiguating operation 1820 may include at least one additional operation. Additional operations may include operation 2800.

Operation 2800 depicts disambiguating the at least one search term including associating the at least one search term with at least one entry in an inter-service-provider directory of device-associated users. In one example, disambiguation unit 1702, ancillary query data acceptor module 1710, and/or identity prediction module 122 may disambiguate the at least one search term by associating the at least one search term with at least one entry in an inter-service-provider directory of device-associated users. For example as discussed above, a telecommunications carrier, social network, or other entity may create a directory of device-associated users across all carriers that functions as a modern-day white pages for communication devices regardless of carrier. This "inter-service-provider directory" may, for example and as discussed above, be based on SIM data identifying a user's mobile phone, and at least partly based on a user's participation in a wireless network. Attributes associated with entries in such a directory may be used by disambiguation unit 1704 to associate a search term with a phone number in the instant application, for presenting to the user 1701 as a disambiguated search term.

As discussed above, if many wireless carriers agree to share their unique identifier lists and keep them in the same format for use as a global directory of mobile phone users, a comprehensive "white pages" of communications device users becomes possible, across potentially all service providers. Such a directory could also be keyed to social networking data such as username or user image, such that, for example, Facebook users could easily find each other's device contact information and possibly location information. Inclusion of users' device information in such a directory could be done on an opt-in basis.

As used herein, a unique identifier based on a device-identifier and a network-participant identifier may be keyed to that underlying data. That is, having the unique identifier corresponding to specific device data and specific network-participation identifier data associated with a verified real-world user associated with the at least one communication device will permit the creator of the unique identifier to use it to call up the specific device data and specific network participation identifier data. This may allow, for example, a telecommunications carrier to disambiguate one user from another having similar or identical network participation identifier data. This can be done on the basis of different device identifier data for the two users with similar or identical network participation identifier data, for example.

FIG. 29 illustrates alternative embodiments of the example operational flow 1800 of FIG. 18. FIG. 29 illustrates an example embodiment where the presenting operation 1830 may include at least one additional operation. Additional operations may include operation 2900.

Operation 2900 depicts presenting a disambiguated search term at least partly based on both network-participation identifier data and device-identifier data. In one example, disambiguation unit 1702, ancillary query data acceptor module 1710, and/or identity prediction module 122 may present a disambiguated search term at least partly based on both network-participation identifier data and device-identifier data. For example, ancillary query data acceptor module 1710 may associate a user's IP address-derived location data and social network participation data with a search term to narrow the list of possible matches for the search term, filter out likely mismatches, and rank results in order of relevance.

FIG. 30 illustrates a partial view of an example article of manufacture 3000 that includes a computer program 3004 for executing a computer process on a computing device. An embodiment of the example article of manufacture 3000 is provided including a signal bearing medium 3002, and may include one or more instructions for accepting at least one search term corresponding to at least one member of a network; one or more instructions for disambiguating the at least one search term including associating the at least one search term with at least one of network-participation identifier data or device-identifier data; and one or more instructions for presenting a disambiguated search term at least partly based on at least one of the network-participation identifier data or the device-identifier data. The one or more instructions may be, for example, computer executable and/or logic-implemented instructions. In one implementation, the signal-bearing medium 3002 may include a computer-readable medium 3006. In one implementation, the signal bearing medium 3002 may include a recordable medium 3008. In one implementation, the signal bearing medium 3002 may include a communications medium 3010.

FIG. 31 illustrates an example system 3100 in which embodiments may be implemented. The system 3100 includes a computing system environment. The system 3100 also illustrates a user 3112 using a device 3104, which is optionally shown as being in communication with a computing device 3102 by way of an optional coupling 3106. The optional coupling 3106 may represent a local, wide-area, or peer-to-peer network, or may represent a bus that is internal to a computing device (e.g., in example embodiments in which the computing device 3102 is contained in whole or in part within the device 3104). A storage medium 3108 may be any computer storage media. In one embodiment, the computing device 3102 may include a virtual machine operating within another computing device. In an alternative embodiment, the computing device 3102 may include a virtual machine operating within a program running on a remote server.

The computing device 3102 includes computer-executable instructions 3110 that when executed on the computing device 3102 cause the computing device 3102 to (a) accept at least one search term corresponding to at least one member of a network; (b) disambiguate the at least one search term including associating the at least one search term with at least one of network-participation identifier data or device-identifier data; and (c) presenting a disambiguated search term at least partly based on at least one of the network-participation identifier data or the device-identifier data. As referenced above and as shown in FIG. 31, in some examples, the computing device 3102 may optionally be contained in whole or in part within the device 3104.

In FIG. 31, then, the system 3100 includes at least one computing device (e.g., 3102 and/or 3104). The computer-executable instructions 3110 may be executed on one or more of the at least one computing device. For example, the computing device 3102 may implement the computer-executable instructions 3110 and output a result to (and/or receive data from) the computing device 3104. Since the computing device 3102 may be wholly or partially contained within the computing device 3104, the device 3104 also may be said to execute some or all of the computer-executable instructions 3110, in order to be caused to perform or implement, for example, various ones of the techniques described herein, or other techniques.

The device 3104 may include, for example, a portable computing device, workstation, or desktop computing device. In another example embodiment, the computing device 3102 is operable to communicate with the device 3104 associated with the user 3112 to receive information about the input from the user 3112 for performing data access and data processing, and present a disambiguated search term at least partly based on at least one of the network-participation identifier data or the device-identifier data.

Identifying a Communications Partner—Telephone

FIG. 32 illustrates an example system 3200 in which embodiments may be implemented. The system 3200 includes a sender profile creation unit 3204. The sender profile creation unit 3204 may contain, for example, device-identifier module 3206 and network-participation identifier module 3220. Sender profile creation unit 3204 may communicate over a network or directly with sender 3201 to accept telephone communication 3202. Optionally, sender profile creation unit 3204 may also include identity prediction module 3224 for associating network-participation identifier data with the telephone communication 3304. Sender profile creation unit 3204 may also include device locator module 3212, telecommunications carrier database 3236, cross-carrier subscriber database 3238, personal software assistant 3216, and/or display module 3240.

In some embodiments, identity prediction module 3224 may include various search and/or matching functions for associating a sender profile with a telephone communication 3202. For example, identity prediction module 3224 may include de-anonymization module 3226, real-name profiling module 3228, web history tracking module 3230, media content tracking module 3232, and/or app data tracking module 3234.

Device-identifier module 3206 may include mobile network identifier module 3208 and/or brand identifier module 3210. As discussed above, for the purposes of this application, SIM as used herein includes mini-SIM, micro-SIM, Universal Subscriber Identity Module, CDMA Subscriber Identity Module, Universal Integrated Circuit Card, Removable User Identity Module, virtual SIM, and other variants of the subscriber identity module described herein and understood by those of ordinary skill in the art.

As referenced herein, the sender profile creation unit 3204 may be used to perform various data querying and/or recall techniques with respect to the telephone communication 3202, device-identifier data, and/or network-participation identifier data, in order to create a sender profile. For example, where network-participation identifier data is organized, keyed to, and/or otherwise accessible using one or more user accounts such as social network, email, or the like, sender profile creation unit 3204 may employ various Boolean, statistical, and/or semi-boolean searching techniques to associate appropriate network-participation identifier data about the sender with the telephone communication 3202. Similarly, for example, where device-identifier data is organized, keyed to, and/or otherwise accessible using device-identifier module 3206, various Boolean, statistical, and/or semi-boolean searching techniques may be performed by device-identifier module 3206 to associate appropriate device information with a sender profile and a telephone communication 3202.

Many examples of databases and database structures may be used in connection with the sender profile creation unit 3204. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for finding information relevant to a telephone communication and/or for gathering and/or compiling data from the relational database(s).

For example, SQL or SQL-like operations over one or more device-identifier data and/or network-participation identifier data may be performed, or Boolean operations using device-identifier data and/or network-participation identifier data may be performed. For example, weighted Boolean operations may be performed in which different weights or priorities are assigned to one or more of the device-identifier data and/or network-participation identifier data, including various network participation characteristics associated with a particular sender 3201, perhaps relative to one another. For example, a number-weighted, exclusive-OR operation may be performed to request specific weightings of network participation identifiers.

In FIG. 32, sender profile creation unit 3204 may associate a telephone communication 3304 with information about the device that the sender 3302 is using to make the telephone communication, such as device brand or model, telecommunications carrier name, and/or device-identifier data such as SIM data or other data that may identify a specific device or sender, as discussed above. Optionally, sender profile creation unit 3204 may include a device locator module 3212 that may associate geodata with telephone communication 3304.

In FIG. 32, sender profile creation unit 3204 is illustrated as possibly being included within a system 3200. Of course, virtually any kind of computing device may be used to implement the special purpose sender profile creation unit 3204, such as, for example, a smart phone, a mobile computer such as a tablet or a laptop, a workstation, a desktop computer, a networked computer, a server, a collection of servers and/or databases, or a virtual machine running inside a computing device.

Additionally, not all of the sender profile creation unit 3204 need be implemented on a single computing device. For example, the sender profile creation unit 3204 may be implemented and/or operable on a remote computer, while a user interface and/or local instance of the sender profile creation unit 3204 are implemented and/or occur on a local computer. Further, aspects of the sender profile creation unit 3204 may be implemented in different combinations and implementations than that shown in FIG. 32. For example, functionality of a user interface may be incorporated into the sender profile creation unit 3204. In one embodiment, sender profile information may be presented via a personal software assistant 3216 such as SIRI 3218. The sender profile creation unit 3204 may perform simple data relay functions and/or complex data analysis, including, for example, fuzzy logic and/or traditional logic steps. Further, many methods of associating data with a telephone call described herein or known in the art may be used, including, for example, algorithms used in caller identification, automatic number identification, or carrier identification coding. In some embodiments, the sender profile creation unit 3204 may create a sender profile based on device-identifier data and/or network-participation identifier data available as updates through a network.

Sender profile creation unit 3204 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

FIG. 33 illustrates certain alternative embodiments of the system 3200 of FIG. 32. In FIG. 33, the sender profile creation unit 3204 may interface over a network, such as the internet. Sender profile creation unit 3204 may communicate over a network or directly with recipient 3306 to associate a profile with telephone communication 3202. In this way, the sender profile creation unit 3204 may generate a sender profile that contains a rich set of information about the sender for the benefit of recipient 3306. Many of the functions of sender profile creation unit 3204 may be performed in the cloud 3308, for example on remote servers with high computing power and capacity relative to, for example, a given mobile device receiving a telephone communication as recipient 3306. In this example, a mobile device receiving a telephone communication may send data regarding the telephone communication for processing and sender profile creation. A profile associated with the telephone communication by a sender profile creation unit 3204 located in the cloud may then be sent to be presented on a local device to recipient 3306.

In some embodiments, sender profile creation unit 3204 may access telecommunications carrier database 3236 in creating a sender profile, for example. Sender profile creation unit 3204 can be operated by a telecom company or by a social or other network owner, or by both in cooperation with each other. In one embodiment, the compiled list of unique identifiers discussed above provides an easy resource for organizing profiles containing both device identifier data and network-participation identifier data, including social network and email data.

A directory of uniquely-identified devices can serve as the foundation for enhanced caller identification functions, whereby a recipient of a telephone communication can quickly and easily access information about the caller beyond just name, phone number, and general location. Additional axes of information about a sender 3201 may include, for example, social network participation, email address, twitter handle, and/or blog activity.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 34 illustrates an operational flow 3400 representing example operations related to identifying a communications partner. In FIG. 34 and in following figures that include various examples of operational flows, discussion and explanation may be provided with respect to the above-described system environments of FIGS. 32-33, and/or with respect to other examples and contexts. However, it should be understood that the operational flows may be executed in a number of other environments and contexts, and/or in modified versions of FIGS. 32-33. Also, although the various operational flows are presented in the sequence(s) illustrated, it should be understood that the various operations may be performed in other orders than those which are illustrated, or may be performed concurrently.

After a start operation, operation 3410 depicts accepting at least one telephone communication from at least one member of a network. For example, sender profile creation unit 3204 and/or device-identifier module 3206 can accept at least one telephone communication from at least one member of a network. In one embodiment, a user or recipient with a mobile phone may receive a telephone call from a Facebook friend. That telephone call may be accompanied by information about the sender such as caller ID giving the telephone number called from and a name associated with the telephone number. In some instances a location where the phone number is registered is also available. In another embodiment, mobile telephone device users may opt-in to a system in which their device ID information, e.g., SIM data or IMEI data, is transmitted with their phone call, so that a recipient can identify additional information about the caller. Further, it is envisioned herein that for those sharing some aspect of their social graph, e.g., co-membership in a social network, additional information may be transmitted to a call recipient from a sender including, e.g., social network identifiers such as usernames, twitter handles, or other elements of social network activity as described below.

Operation 3420 depicts associating the at least one telephone communication with a sender profile at least partly based on the sender's device-identifier data and the sender's network-participation identifier data. For example, sender profile creation unit 3204, device-identifier module 3206 and/or network-participation identifier module 3220 may associate the at least one telephone communication with a sender profile at least partly based on the sender's device-identifier data and the sender's network-participation identifier data. In one embodiment, device-identifier module 3206 may identify a telephone call as one originated from an iPhone and handled by Verizon as the wireless carrier. Further, network-participation identifier module 3220 may associate a name connected to the telephone number of the sender with a Facebook friend of the recipient of the telephone call. Sender profile creation unit 3204 may then associate a profile of the sender with the telephone call, wherein the profile consists of the name associated with the telephone number of the sender, a Facebook user name, a Facebook profile picture, a twitter handle, an email address, and a location of the sending device.

In some embodiments, sender profile creation unit 3204 may include an identity prediction algorithm such as a de-anonymization algorithm, a real-name profiling algorithm, a web history tracking algorithm, media content tracking algorithm, and/or an app list tracking algorithm. These algorithms may aid in the association of network-participation identifier data with a telephone communication, for example by searching public or private databases for the telephone number and/or name associated with the number to find relevant network-participation identifier data.

In some embodiments, sender profile creation unit 3204 may associate a telephone number with a person including network-participation information about the person by accessing a unique identifier corresponding to the person and their device as described above. For example, Facebook may provide usernames, images, birthdates, telephone numbers, or other data that it has about the users of its social network to a consortium of telecommunications carriers 220 (this may optionally involve an opting-in step whereby users of Facebook affirmatively approve this action), who may provide device-identifier data 108. Assigning a unique identifier (discussed above) for each network-user-associated device across each of the carriers in the consortium may result in a directory that is particularly valuable for the telecommunications carriers, who can then provide directory searching, support, and disambiguation for a potentially large fraction of the Facebook social network. Such a directory will likely be of equal interest and value to networks including Facebook in this example, for the same reasons. For example, a cross-carrier directory of Facebook members with associated phone numbers would be an added feature for Facebook that could significantly enhance the social information provided by the network. An enhanced caller ID that provides social network information about the caller/sender, for example as contact information, would be useful for recipients of phone calls.

Operation 3430 depicts presenting the sender profile in association with the at least one telephone communication. For example, sender profile creation unit 3204 sender profile creation unit 3204 and/or personal software assistant 3216 may present the sender profile in association with the at least one telephone communication, optionally via display module 3240. In one embodiment, personal software assistant 3216 may present a profile of a sender as a set of attributes of the sender including name, phone number, wireless carrier network, blog address, and email address to a recipient 3306 of a telephone call.

In another embodiment, the profile or set of attributes of the sender may be integrated into a contact file for the sender in an application on the recipient's telephony device. For example, SIRI 3218 may store each element of a profile associated with telephone number on a personalized gmail contact page for the sender, perhaps updating outdated items in an existing entry, filling in missing items in an existing entry, or creating a new entry.

FIG. 35 illustrates alternative embodiments of the example operational flow 3400 of FIG. 34. FIG. 35 illustrates example embodiments where the accepting operation 3410 may include at least one additional operation. Additional operations may include operation 3500, 3502, and/or operation 3504.

Operation 3500 depicts receiving at least one telephone communication on a mobile telecommunications device. For example, sender profile creation unit 3204 and/or recipient 3306 may receive at least one telephone communication on a mobile telecommunications device. In one embodiment, a person may receive a telephone call on a smart phone running a sender profile creation unit 3204 program that can identify device-identifier data sent with the telephone communication by a sender 3201, associate device-identifier data with a name, and use that name to search for and find additional information about the sender. Sender profile creation unit 3204 may then associate the additional information about the sender with the telephone communication and present the additional information in a profile to the recipient 3306 of the telephone communication.

Operation 3502 depicts receiving at least one telephone communication on at least one of a mobile telephone, a tablet computer, a notebook computer, or a laptop computer. For example, sender profile creation unit 3204 and/or recipient 3306 may receive at least one telephone communication on at least one of a mobile telephone, a tablet computer, a notebook computer, or a laptop computer. Many mobile computing devices are equipped with telephony capability, whether implemented by VOIP technology, cellular network radio technology or satellite communications technology. In one embodiment, a person may receive a telephone call on a tablet computer via the Skype VOIP service, wherein the tablet includes a sender profile creation unit 3204 program that can identify device-identifier data sent with the telephone communication by a sender 3201, associate device-identifier data with a name, and use that name to search for and find additional information such as (network-participation data) about the sender. As above, sender profile creation unit 3204 may then associate the additional information about the sender with the telephone communication and present the additional information in a profile to the recipient 3306 of the telephone communication.

Operation 3504 depicts receiving at least one telephone communication on at least one of a fixed-line telephone, a desktop computer, or a networked television. For example, sender profile creation unit 3204 and/or recipient 3306 may receive at least one telephone communication on at least one of a fixed-line telephone, a desktop computer, or a networked television. As with mobile computing devices discussed above, many home computing devices are also equipped with telephony capability, including computers used primarily in the home and even internet-ready televisions and televisions compatible for use in video conferencing. In one embodiment, a person may receive a telephone call on a networked television such as a television equipped with the Cisco Umi, a device with a camera mounted on the top of the television screen that can capture 1080p video at about 30 frames per second. The camera is connected to a set-top box that connects to the internet through either a wired connection or Wi-Fi and compresses the video. In this example, the television or accessory device may include a sender profile creation unit 3204 program that can identify device-identifier data sent with the telephone communication by a sender 3201, associate device-identifier data with a name, and use that name to search for and find additional information such as (network-participation data) about the sender. As above, sender profile creation unit 3204 may then associate the additional information about the sender with the telephone communication and present the additional information in a profile to the recipient 3306 of the telephone communication, perhaps directly on the television screen.

FIG. 36 illustrates alternative embodiments of the example operational flow 3400 of FIG. 34. FIG. 36 illustrates example embodiments where the accepting operation 3410 may include at least one additional operation. Additional operations may include operation 3600, 3602, 3604, 3606, and/or operation 3608.

Operation 3600 depicts receiving at least one telephone communication via a voice-over-internet-protocol telephone service. For example, sender profile creation unit 3204 and/or recipient 3306 may receive at least one telephone communication via a voice-over-internet-protocol telephone service. In one embodiment, a person may receive a telephone call on their iPhone via Apple's FaceTime app which uses 3G or 4G wireless signaling to a VoIP app on the iPhone. In this example, if the sender's device is also an iPhone, the sender's device information may include iOS information, iPhone model information, specific unit identifier information such as the iPhone's UDID, as discussed above. The device information including the telephone number of the sender can be used by sender profile creation unit 3204 to associate the device-identifier data with a name, and use that name to search for and find additional information such as (network-participation data) about the sender. As above, sender profile creation unit 3204 may then associate the additional information about the sender with the telephone communication and present the additional information in a profile to the recipient 3306 of the telephone communication, for example on the iPhone display and/or stored in a sender profile on the iPhone. Other examples of VoIP services include Skype, iChat, Vonage, and RingCentral.

VoIP may be implemented on "softphones." Softphones are client devices for making and receiving voice and video calls over the IP network and usually allow integration with IP phones and USB phones instead of utilizing a computer's microphone and speakers (or a headset). Most softphone clients run on the open Session Initiation Protocol (SIP) supporting various codecs. Skype runs on a closed proprietary network, though the network (but not the official Skype client software) also supports SIP clients. Online chat programs now also incorporate voice and video communications.

Other VoIP software applications include conferencing servers, intercom systems, virtual foreign exchange offices, and adapted telephony software which concurrently support VoIP and PSTN-like interactive voice response systems, dial-in dictation, on hold, and call recording servers.

Other terms frequently encountered and often used synonymously with VoIP are IP telephony, Internet telephony, voice over broadband (VoBB), broadband telephony, and broadband phone. VoIP includes voice, fax, SMS, and/or voice-messaging applications that are transported via the interne, rather than the public-switched telephone network (PSTN). The steps involved in originating a VoIP telephone call are signaling and media channel setup, digitization of the analog voice signal, encoding, packetization, and transmission as Internet Protocol (IP) packets over a packet-switched network. On the receiving side, similar steps (usually in the reverse order) such as reception of the IP packets, decoding of the packets and digital-to-analog conversion reproduce the original voice stream. Even though IP Telephony and VoIP are terms that are used interchangeably, they are actually different; IP telephony has to do with digital telephony systems that use IP protocols for voice communication while VoIP is actually a subset of IP telephony. VoIP is a technology used by IP telephony as a means of transporting phone calls. For the purposes of this application, VoIP is synonymous with IP telephony.

VoIP systems employ session control protocols to control the set-up and tear-down of calls as well as audio codecs which encode speech allowing transmission over an IP network as digital audio via an audio stream. The codec used is varied between different implementations of VoIP (and often a range of codecs are used); some implementations rely on narrowband and compressed speech, while others support high fidelity stereo codecs.

VoIP is available on many smartphones and internet devices so even the users of portable devices that are not phones can still make calls or send SMS text messages over 3G; 4G or Wi-Fi.

Operation 3602 depicts accepting at least one telephone communication via at least one of a packet-switched network, a circuit-switched network, or a hybrid circuit and packet-switched network. For example, sender profile creation unit 3204 and/or recipient 3306 may accept at least one telephone communication via at least one of a packet-switched network, a circuit-switched network, or a hybrid circuit and packet-switched network. In one embodiment, a person may receive a telephone call on their home landline (also called fixed-line telephone) from a sender using a VoIP app on a mobile device. In this example of a hybrid system, telephone communication may travel on a both a packet-switched network (the internet) and a circuit-switched network (e.g., the telephone company's public switched telephone network or PSTN; or the private branch exchange or PBX). Virtual circuit switching is a packet switching technology that emulates circuit switching, in the sense that the connection is established before any packets are transferred, and packets are delivered in order. Examples of packet switched networks include the internet and most local area networks.

Operation 3604 depicts accepting at least one telephone communication from at least one member of a social network. For example, sender profile creation unit 3204 and/or recipient 3306 may accept at least one telephone communication from at least one member of a social network. In one embodiment, a person may receive a telephone call from a sender who is a member of the Facebook social network. Sender profile creation unit 3204 may search social network databases by telephone number or name associated with the telephone number to find social networks that include members with the same name or number. Moreover, intersections between sender and recipient social network data may be identified by network participation identifier module 3220, e.g., overlap of the social graph including direct connections or mutual friends on Facebook. Such connections may provide a tool for disambiguation as discussed above, and may also provide content for a sender profile to be presented to, e.g., recipient 3306.

Operation 3606 depicts receiving at least one telephone communication from a member of a mobile phone telecommunications network. For example, sender profile creation unit 3204 and/or recipient 3306 may receive at least one telephone communication from a member of a mobile phone telecommunications network. In one embodiment, a person may receive a telephone call from a sender 3201 who is a member of the AT&T mobile phone telecommunications network. Sender profile creation unit 3204 may search the AT&T mobile phone telecommunications network by telephone number to find a name associated with the telephone number. Other useful information about the sender's AT&T mobile phone telecommunications network participation may also be associated with the telephone communication such as wireless plan usage information for purposes of limiting airtime usage when a limit is near. For example, profiles containing information about a sender's mobile phone telecommunications network can be useful to a recipient for purposes of identifying the sender as a member of a shared calling circle.

Operation 3608 depicts accepting at least one of a voice telephone communication or a video telephone communication from at least one member of a network. For example, sender profile creation unit 3204 and/or recipient 3306 may accept at least one of a voice telephone communication or a video telephone communication from at least one member of a network. In one embodiment, a FaceTime user may accept a video telephone communication from another FaceTime user. In this example, FaceTime is a network that provides information about the sender, including username. The username may be used by sender profile creation unit 3204 to search and find additional information about the sender (e.g., additional network participation data), perhaps for use as contact information.

FIG. 37 illustrates alternative embodiments of the example operational flow 3400 of FIG. 34. FIG. 37 illustrates example embodiments where the associating operation 3420 may include at least one additional operation. Additional operations may include operation 3700, 3702, 3704, 3706, and/or operation 3708.

Operation 3700 depicts associating the at least one telephone communication with a set of sender attributes at least partly based on the sender's device-identifier data and the sender's network-participation identifier data. For example, sender profile creation unit 3204, device-identifier module 3206, and/or network-participation identifier module 3220 may associate the at least one telephone communication with a set of sender attributes at least partly based on the sender's device-identifier data and the sender's network-participation identifier data. In one embodiment, device-identifier module 3206 may accept a telephone number associated with a telephone communication, and then search a telecommunications carrier database to find a name associated with the telephone number. Network-participation identifier module 3220 may then search one or more social networks to find network participation data for the name associated with the telephone number. In this example, network-participation identifier module 3220 may employ real-name profiling or de-anonymization to find sender attributes that are in some way connected to the recipient for disambiguation purposes and to provide a full, rich set of network participation data for the recipient to keep as a resource in future communications with the sender. Together, the device identifier data such as the telephone number and the network participation data such as social network participation data may be compiled in a sender profile to be presented as a reference for recipient 3306, for use either during the telephone communication or at any time after the telephone communication is ended.

Operation 3702 depicts associating the at least one telephone communication with a set of sender attributes at least partly based on the sender's device-identifier data and the sender's network-participation identifier data, wherein the sender attributes include at least one of a social network membership list, one or more social network usernames, one or more social network profile pictures, one or more mutual friend lists, or one or more social networking website-posted items. For example, sender profile creation unit 3204, device-identifier module 3206, and/or network-participation identifier module 3220 may associate the at least one telephone communication with a set of sender attributes at least partly based on the sender's device-identifier data and the sender's network-participation identifier data, wherein the sender attributes include at least one of a social network membership list, one or more social network usernames, one or more social network profile pictures, one or more mutual friend lists, or one or more social networking website-posted items. In one embodiment, device-identifier module 3206 may accept a telephone number associated with a telephone communication, and then search a telecommunications carrier database to find a name associated with the telephone number. Network-participation identifier module 3220 may then search one or more social networks to find network participation data for the name associated with the telephone number. In this example, network-participation identifier module 3220 may employ real-name profiling or de-anonymization to find sender attributes that are in some way connected to the recipient for disambiguation purposes and to provide a full, rich set of network participation data for the recipient to keep as a resource in future communications with the sender. In some embodiments, network-participation identifier module 3220 may identify connections between the sender and the recipient in a social network, such as direct communication in a social network such as posting to a Facebook wall or photograph posted on Facebook with each of the sender and the recipient tagged in the same photograph. Together, the device identifier data such as the telephone number and the network participation data such as a list of shared friends on a social network (i.e., mutual friend list) may be compiled in a sender profile to be presented as a reference for recipient 3306, for use either during the telephone communication or at any time after the telephone communication is ended.

Operation 3704 depicts associating the at least one telephone communication with a set of sender attributes at least partly based on the sender's device-identifier data and the sender's network-participation identifier data, wherein the sender attributes include at least one of an email address or a list of shared contacts. For example, sender profile creation unit 3204, device-identifier module 3206, and/or network-participation identifier module 3220 may associate the at least one telephone communication with a set of sender attributes at least partly based on the sender's device-identifier data and the sender's network-participation identifier data, wherein the sender attributes include at least one of an email address or a list of shared contacts. In one embodiment, device-identifier module 3206 may accept a telephone number, name, and device identifier associated with a telephone communication. Network-participation identifier module 3220 may then search one or more social networks to find network participation data for the name and/or device identifier associated with the telephone number. In this example, network-participation identifier module 3220 may search the internet to find an email address or a list of contacts that are also contacts of the recipient of the telephone communication. Such information is useful to provide enhanced contact information about callers in telephone contact with recipients; it is particularly useful for a recipient to be presented with an email address for a caller automatically when a telephone call is occurring, or even shortly thereafter. In this application caller and sender are synonymous.

Operation 3706 depicts associating the at least one telephone communication with a set of sender attributes at least partly based on the sender's device-identifier data and the sender's network-participation identifier data, wherein the sender attributes include at least one of a list of usernames, a list of online personas, or a list of aliases. For example, sender profile creation unit 3204, device-identifier module 3206, and/or network-participation identifier module 3220 may associate the at least one telephone communication with a set of sender attributes at least partly based on the sender's device-identifier data and the sender's network-participation identifier data, wherein the sender attributes include at least one of a list of usernames, a list of online personas, or a list of aliases. In one embodiment, device-identifier module 3206 may accept a telephone number, name, and device identifier associated with a telephone communication. Network-participation identifier module 3220 may then search one or more networks including the internet to find network participation data for the name and/or device identifier associated with the telephone number. In this example, network-participation identifier module 3220 may search the internet to find usernames associated with the telephone number or name, usernames that signify membership in a social network such as LinkedIn or Facebook. Results indicating online personas linked to the sender can then be used to search for additional specific information about the sender, such as things in common with the recipient. In one embodiment, a sender profile indicating membership in Facebook may include a Facebook username that is different from the name associated with standard caller ID for the telephone communication, but which provides desired information for future social networking activity/communication between the sender and the recipient. For example, automatically getting the Facebook username during or shortly after the telecommunication allows the recipient to more easily initiate a Facebook friendship with the sender.

Operation 3708 depicts associating the at least one telephone communication with a set of sender attributes at least partly based on the sender's device-identifier data and the sender's network-participation identifier data, wherein the sender attributes include at least one of a twitter handle, a Facebook page, or a web address for a blog. For example, sender profile creation unit 3204, device-identifier module 3206, and/or network-participation identifier module 3220 may associate the at least one telephone communication with a set of sender attributes at least partly based on the sender's device-identifier data and the sender's network-participation identifier data, wherein the sender attributes include at least one of a twitter handle, a Facebook page, or a web address for a blog. In one embodiment, device-identifier module 3206 may accept a telephone number, name, and device identifier associated with a telephone communication. Network-participation identifier module 3220 may then search one or more networks including the internet to find network participation data for the name and/or device identifier associated with the telephone number. In this example, network-participation identifier module 3220 may search the internet to find twitter feeds or web pages associated with the telephone number or name. Sender profiles including such twitter feeds or webpages, including social network webpages, may be of interest to a recipient/friend of the sender who would like to know more about the online activities of the sender. In this example, sender profile creation unit 3204 may automatically present to the recipient URL's associated with the sender for storage in, for example, the device on which the telephone communication is being conducted. This allows for information such as URL's to be recorded for the recipient without the need for memorization, writing them down, or typing them or speaking them into a device for storage.

FIG. 38 illustrates alternative embodiments of the example operational flow 3400 of FIG. 34. FIG. 38 illustrates example embodiments where the associating operation 3420 may include at least one additional operation. Additional operations may include operation 3800 and/or operation 3802.

Operation 3800 depicts associating the at least one telephone communication with a set of sender attributes at least partly based on the sender's device-identifier data and the sender's network-participation identifier data, wherein the sender attributes include a history of interactions with a recipient of the at least one telephone communication. For example, sender profile creation unit 3204, device-identifier module 3206, and/or network-participation identifier module 3220 may associate the at least one telephone communication with a set of sender attributes at least partly based on the sender's device-identifier data and the sender's network-participation identifier data, wherein the sender attributes include a history of interactions with a recipient of the at least one telephone communication. In one embodiment, sender 3201, a friend of recipient 3306, may have opted in to transmitting with a telephone call to recipient 3306 device-identifier data including telephone number, name, and device identifier data associated with the telephone communication. In one embodiment, the opt in includes sending to recipient 3306 and/or sender profile creation unit 3204 basic network-participation identifier data such as email address and Facebook username. Network-participation identifier module 3220 may then search one or more networks including the internet and/or social networks to find information about past interactions between the sender and recipient. Network-participation identifier module 3220 may then associate those past interactions with the telephone communication and present them as part of a sender profile.

Operation 3802 depicts associating the at least one telephone communication with a set of sender attributes at least partly based on the sender's device-identifier data and the sender's network-participation identifier data, wherein the sender attributes include a history of interactions with a recipient of the at least one telephone communication including at least one of an excerpted history of interactions with a recipient of the at least one telephone communication, a recent history of interactions with a recipient of the at least one telephone communication, or a history of interactions with a recipient of the at least one telephone communication that is keyed to a specific topic. For example, sender profile creation unit 3204, device-identifier module 3206, and/or network-participation identifier module 3220 may associate the at least one telephone communication with a set of sender attributes at least partly based on the sender's device-identifier data and the sender's network-participation identifier data, wherein the sender attributes include a history of interactions with a recipient of the at least one telephone communication including at least one of an excerpted history of interactions with a recipient of the at least one telephone communication, a recent history of interactions with a recipient of the at least one telephone communication, or a history of interactions with a recipient of the at least one telephone communication that is keyed to a specific topic. In one embodiment, network-participation identifier module 3220 may associate the at least one telephone communication (e.g., by using the name associated with the telephone number as a search term) with a Facebook message thread between the sender and recipient. That message thread may be placed by network-participation identifier module 3220 into the sender profile. The record of the message thread in the sender profile may be useful to recipient 3306 for reference purposes. In another embodiment, recipient 3306 may input by voice, keyboard or other input device a topic key word or phrase by which network-participation identifier module 3220 may narrow the results of a social network history of interactions, for example. In one embodiment, recipient 3306, upon being presented with a profile containing a name and Facebook username, may type into her phone "christmas 2010 photos" as a direction for network-participation identifier module 3220 to copy Christmas 2010 photos from the sender's Facebook page to the sender profile on the recipient's phone.

FIG. 39 illustrates alternative embodiments of the example operational flow 3400 of FIG. 34. FIG. 39 illustrates example embodiments where the associating operation 3420 may include at least one additional operation. Additional operations may include operation 3900 and/or operation 3902.

Operation 3900 depicts associating the at least one telephone communication with a sender profile at least partly based on the sender's telephone number and the sender's network-participation identifier data. For example, sender profile creation unit 3204 and/or device-identifier module 3206 may associate the at least one telephone communication with a sender profile at least partly based on the sender's telephone number and the sender's network-participation identifier data. For example, device-identifier module 3206 may accept a sender's telephone number coincident with a telephone call. Caller ID (also termed caller identification or CID), also called calling line identification (CLID) or calling number identification (CNID) or Calling Line Identification Presentation (CLIP), is a telephone service, available in analog and digital phone systems and most Voice over Internet Protocol (VoIP) applications, that transmits a caller's number to the called party's telephone equipment during the ringing signal, or when the call is being set up but before the call is answered. Caller ID may be used to display a caller's telephone number and, in association with a database, the caller's name on a call recipient's telephone. The information made available to the recipient may be displayed on a telephone's display or on a separately attached device.

In this example, caller ID may provide to device-identifier module 3206 a sender's telephone number, which may in turn be used by network-participation identifier module 3220 as a search term with which to find additional information about, for example, the online activities of the sender 3201. Sender profile creation unit 3204 may then present the information in a profile to the recipient's phone during the call. Many telephonic devices allow for concurrent voice/video calling and internet usage on the device.

Operation 3902 depicts associating the at least one telephone communication with a sender profile at least partly based on the sender's device-identifier data and the sender's network-participation identifier data, wherein the sender's device identifier data includes at least one of subscriber identity module data, integrated circuit card identifier data, mobile equipment identifier data, international mobile subscriber identity data, or electronic serial number data. For example, sender profile creation unit 3204 and/or device-identifier module 3206 may associate the at least one telephone communication with a sender profile at least partly based on the sender's device-identifier data and the sender's network-participation identifier data, wherein the sender's device identifier data includes at least one of subscriber identity module data, integrated circuit card identifier data, mobile equipment identifier data, international mobile subscriber identity data, or electronic serial number data. In one embodiment, device-identifier module 3206 may accept SIM data with a telephone call, where the SIM data includes, e.g., contact information from the sender's phone. In one embodiment, contacts from the sender's phone that overlap with those of the recipient's phone may be placed in the sender's profile, or used to sync or update the contact list in the recipient's phone.

In another embodiment, device-identifier module 3206 may accept mobile equipment identifier data specific to the sender's phone during a telephone call, and use that MEI data to search a unique identifier database, either for a single carrier or one that includes multiple carriers as discussed above, to access information about the sender to associate with the telephone communication and place in a sender profile.

FIG. 40 illustrates alternative embodiments of the example operational flow 3400 of FIG. 34. FIG. 40 illustrates example embodiments where the associating operation 3420 may include at least one additional operation. Additional operations may include operation 4000, 4002, 4004, 4006, 4008, and/or operation 4010.

Operation 4000 depicts associating the at least one telephone communication with a sender profile at least partly based on the sender's device-identifier data and the sender's network-participation identifier data, wherein the sender's device identifier data includes at least one device descriptor. For example, sender profile creation unit 3204, device-identifier module 3206, mobile network identifier module 3208, and/or brand identifier module 3210 may associate the at least one telephone communication with a sender profile at least partly based on the sender's device-identifier data and the sender's network-participation identifier data, wherein the sender's device identifier data includes at least one device descriptor. In one embodiment, mobile network identifier module 3208 may accept a telephone communication from a sender over a wireless network together with an indication of the wireless carrier's name, such as AT&T, Verizon, Sprint, or the like. The name of the wireless carrier may be placed in the sender profile for association with the telephone communication for use by the recipient of the call, for example to determine whether the sender is in-network or out-of-network, whether the sender is within a calling circle of which the recipient is a member, or whether the sender has a particular data transmission capacity (e.g., some wireless carriers have unlimited talk, text, and web plans). In one embodiment, details of the sender's calling plan may be accepted by mobile network identifier module 3208, placed in a sender profile, and associated with the telephone communication.

Operation 4002 depicts associating the at least one telephone communication with a sender profile at least partly based on the sender's device-identifier data and the sender's network-participation identifier data, wherein the sender's device identifier data includes at least one device descriptor, and wherein the device descriptor includes at least one of a device name, a device brand, a device model, or a device location. For example, sender profile creation unit 3204, device-identifier module 3206, mobile network identifier module 3208, and/or brand identifier module 3210 may associate the at least one telephone communication with a sender profile at least partly based on the sender's device-identifier data and the sender's network-participation identifier data, wherein the sender's device identifier data includes at least one device descriptor, and wherein the device descriptor includes at least one of a device name, a device brand, a device model, or a device location. In one embodiment, brand identifier module 3210 may accept a telephone communication from a sender over a wireless network together with an indication of the brand of the sender's calling device. The brand of the sender's calling device may be placed in the sender profile for association with the telephone communication for use by the recipient of the call, for example to determine whether the sender's device is able to use certain operating system-specific apps, such as FaceTime. In this example, sender profile creation unit 3204 may associate a sender profile showing the sender's device as an iPhone, which may indicate to the recipient that the sender is capable of communicating using the FaceTime video calling app operable only on iOS and macOS devices.

Operation 4004 depicts associating the at least one telephone communication with a sender profile at least partly based on the sender's device-identifier data and the sender's network-participation identifier data, wherein the sender's device identifier data includes at least one device descriptor, and wherein the device descriptor includes at least one of mobile phone, computer, or television. For example, sender profile creation unit 3204, device-identifier module 3206, mobile network identifier module 3208, and/or brand identifier module 3210 may associate the at least one telephone communication with a sender profile at least partly based on the sender's device-identifier data and the sender's network-participation identifier data, wherein the sender's device descriptor includes at least one of mobile phone, computer, or television. In one embodiment, device-identifier module 3206 may accept a VoIP telephone communication from a sender over a wireless network together with an indication that the sender's calling device is a networked television. The sender's device-type information may be placed in the sender profile for association with the telephone communication for use by the recipient of the call, for example to help the recipient decide whether to switch devices for initiating or continuing the call. In this example, sender profile creation unit 3204 may associate a sender profile showing the sender's device as a networked television, which may tell the recipient that she can forward the call to a device with a larger screen if desired, particularly if the original call was received on a relatively small mobile phone.

Operation 4006 depicts associating the at least one telephone communication with a sender profile at least partly based on the sender's device-identifier data and the sender's network-participation identifier data, wherein the sender's device identifier data includes at least one device descriptor, and wherein the device descriptor includes at least one of Apple, Motorola, HTC, LG, Samsung, Blackberry, or Nokia. For example, sender profile creation unit 3204, device-identifier module 3206, mobile network identifier module 3208, and/or brand identifier module 3210 may associate the at least one telephone communication with a sender profile at least partly based on the sender's device-identifier data and the sender's network-participation identifier data, wherein the sender's device descriptor includes at least one of Apple, Motorola, HTC, LC; Samsung, Blackberry, or Nokia. In one embodiment, brand identifier module 3210 may accept a VoIP telephone communication from a sender over a wireless network together with an indication that the sender's calling device is an HTC phone running the Android mobile operating system. The sender's device brand and operating system information may be placed in the sender profile for association with the telephone communication for use by the recipient of the call, for example to help the recipient decide whether to switch devices for initiating or continuing the call. In this example, sender profile creation unit 3204 may associate a sender profile showing the sender's device as an HTC Android phone, which may tell the recipient that she may want to switch devices to one running an Android OS if the recipient's phone (e.g., an iPhone) is not compatible with an Android OS app that the recipient want to use with the sender.

Operation 4008 depicts associating the at least one telephone communication with a sender profile at least partly based on the sender's device-identifier data and the sender's network-participation identifier data, wherein the sender's device identifier data includes at least one device descriptor, and wherein the device descriptor includes a description of the network that the device is using. For example, sender profile creation unit 3204, device-identifier module 3206, mobile network identifier module 3208, and/or brand identifier module 3210 may associate the at least one telephone communication with a sender profile at least partly based on the sender's device-identifier data and the sender's network-participation identifier data, wherein the sender's device descriptor includes a description of the network that the device is using. In one embodiment, mobile network identifier module 3208 may accept a telephone communication from a sender over a wireless network together with an indication that the sender's calling device is sending the signal from a specific telecommunication carrier's wireless network, such as the Verizon network. The sender's network carrier may serve as an identifying feature of the sender's profile, and in one embodiment, that feature may be used to detect hacking of the sender's device. For example, if a friend with an iPhone known to be using the AT&T wireless network calls, but mobile network identifier module 3208 detects that the telephone number is associated with a different carrier, then sender profile creation unit 3204 may record a security alert in the sender profile associated with the telephone communication.

Operation 4010 depicts associating the at least one telephone communication with a sender profile at least partly based on the sender's device-identifier data and the sender's network-participation identifier data, wherein the sender's device identifier data includes at least one device descriptor, and wherein the device descriptor includes a description of the network that the device is using, and wherein the description of the network that the device is using includes at least one of a packet-switched network, a circuit-switched network, a local network, or a cellular telecommunications network. For example, sender profile creation unit 3204, device-identifier module 3206, mobile network identifier module 3208, and/or brand identifier module 3210 may associate the at least one telephone communication with a sender profile at least partly based on the sender's device-identifier data and the sender's network-participation identifier data, wherein the sender's device descriptor includes a description of the network that the device is using, and wherein the description of the network that the device is using includes at least one of a packet-switched network, a circuit-switched network, a local network, or a cellular telecommunications network. In one embodiment, mobile network identifier module 3208 may accept a sender's telephone communication originating from a wireless network together with an indication that the sender's signal originated from a 4G network, which is an all-internet protocol packet-switched network. The sender's network carrier may indicate the nature of the network. For example, some networks have adopted the 4G standard ahead of others, some of which may employ circuit-switched networks in at least a portion of their overall network. Detection of network quality (e.g., 3G, 4G, LTE, EDGE) and association of that information by network identifier module 3208 in a sender profile with a telephone call may be helpful to a recipient in gauging the capabilities of the sender's device in terms of bandwidth capacity (e.g., data transfer speed as measured in Mbit/second).

FIG. 41 illustrates alternative embodiments of the example operational flow 3400 of FIG. 34. FIG. 41 illustrates example embodiments where the associating operation 3420 may include at least one additional operation. Additional operations may include operation 4100 and/or operation 4102.

Operation 4100 depicts associating the at least one telephone communication with a sender profile at least partly based on the sender's device-identifier data and the sender's network-participation identifier data, wherein the sender's device identifier data includes at least one device descriptor, and wherein the device descriptor includes geographical information about the device. For example, sender profile creation unit 3204, device-identifier module 3206, mobile network identifier module 3208, device locator module 3212, and/or brand identifier module 3210 may associate the at least one telephone communication with a sender profile at least partly based on the sender's device-identifier data and the sender's network-participation identifier data, wherein the sender's device identifier data includes at least one device descriptor, and wherein the device descriptor includes geographical information about the device. In one embodiment device-identifier module 3206 or device locator module 3212 may accept a telephone number coincident with a call from a sender and associate a geographical location with the telephone communication using the area code or country code of the telephone number, which typically corresponds to a limited geographical region. Other geographical information that may be accepted by device-identifier module 3206 or device locator module 3212 and associated with a sender profile includes internet protocol address information which can be used to identify a geographical location of a sender's device. In one embodiment, IP address lookup services like those available from an online service provider such as geobytes.com may be performed by device-identifier module 3206.

Operation 4102 depicts associating the at least one telephone communication with, a sender profile at least partly based on the sender's device-identifier data and the sender's network-participation identifier data, wherein the sender's device identifier data includes at least one device descriptor, and wherein the device descriptor includes geographical information about the device, and wherein the geographical information about the device is derived from at least one of internet protocol address, global positioning satellite data, cellular phone tower proximity, Wi-Fi use, user-entered location data, or proximity to at least one other device. For example, sender profile creation unit 3204, device-identifier module 3206, mobile network identifier module 3208, device locator module 3212, and/or brand identifier module 3210 may associate the at least one telephone communication with a sender profile at least partly based on the sender's device-identifier data and the sender's network-participation identifier data, wherein the sender's device identifier data includes at least one device descriptor, and wherein the device descriptor includes geographical information about the device, and wherein the geographical information about the device is derived from at least one of internet protocol address, global positioning satellite data, cellular phone tower proximity, Wi-Fi use, user-entered location data, or proximity to at least one other device. In one embodiment device-identifier module 3206 or device locator module 3212 may accept Wi-Fi use data coincident with a VoIP call from a sender and associate a geographical location as part of the sender profile with the telephone communication using database of Wi-Fi hotspot locations to identify where the Wi-Fi hotspot that the sender is using is located. In another embodiment, network-participation identifier module 3220 or device locator module 3212 may accept geodata coincident with a call from a sender in the form of a Foursquare checkin by the sender at a specific business or map location, for example in Facebook. Network-participation identifier module 3220 may then associate the geographical location as part of the sender profile with the telephone communication for presentation to recipient 3306.

FIG. 42 illustrates alternative embodiments of the example operational flow 3400 of FIG. 34. FIG. 42 illustrates example embodiments where the associating operation 3420 may include at least one additional operation. Additional operations may include operation 4200, 4202, and/or operation 4204.

Operation 4200 depicts associating the at least one telephone communication with a sender profile at least partly based on the sender's device-identifier data and the sender's network-participation identifier data, wherein the sender's network-participation identifier data includes a name in a telecommunications carrier database. For example, sender profile creation unit 3204 and/or network-participation identifier module 3220 may associate the at least one telephone communication with a sender profile at least partly based on the sender's device-identifier data and the sender's network-participation identifier data, wherein the sender's network-participation identifier data includes a name in a telecommunications carrier database. In one embodiment network-participation identifier module 3220 may accept a telephone number coincident with a call from a sender and associate the telephone number with a person's identity information on file with the telecommunications carrier handling the call for the sender. In this embodiment, a sender may opt-in to allowing the telecommunications carrier to transmit certain information about the identity linked to the telephone number with the call. Such information may include publicly available information such as name and address, or in some cases more private information may be shared among designated calling circles, for example within a designated private network. In this example, friends who want to automatically keep other friends' contact information up-to-date may allow their telecommunications carrier to transmit with a phone call their contact information including updates to, e.g., email address, twitter account, Facebook profile picture, or the like.

Operation 4202 depicts associating the at least one telephone communication with a real-world person at least partly based on the real-world person's device-identifier data and the real-world person's network-participation identifier data. For example, sender profile creation unit 3204, network-participation identifier module 3220, and/or identity prediction module 3224 may associate the at least one telephone communication with a real-world person at least partly based on the real-world person's device-identifier data and the real-world person's network-participation identifier data. In one embodiment network-participation identifier module 3220 may accept a telephone number and name associated with that number coincident with a call from a sender and employ identity prediction module 3224 to associate the name and telephone number (which may provide geographical information as discussed above to associate with the name for disambiguation purposes) with a real-world person's identity information, for example available publicly on the interne. In this embodiment, identity prediction module may associate a name associated with a sender's telephone number with information publicly available on the world wide web, such as email address, home address, website URL, Facebook page, twitter handle, or the like, and place that information in a sender profile for association with the telephone call and presentation to a recipient 3306.

Operation 4204 depicts associating the at least one telephone communication with a sender profile at least partly based on the sender's device-identifier data and the sender's network-participation identifier data, including at least one of associating the at least one telephone communication with a sender profile using identity prediction, associating the at least one telephone communication with a sender profile using de-anonymization, or associating the at least one telephone communication with a sender profile using real-name profiling. For example, sender profile creation unit 3204, network-participation identifier module 3220, identity prediction module 3224, de-anonymization module 3226, and/or real-name profiling module 3228 may associate the at least one telephone communication with a sender profile at least partly based on the sender's device-identifier data and the sender's network-participation identifier data, including at least one of associating the at least one telephone communication with a sender profile using identity prediction, associating the at least one telephone communication with a sender profile using de-anonymization, or associating the at least one telephone communication with a sender profile using real-name profiling. In one embodiment de-anonymization module 3226 may accept device identifier data from an otherwise anonymous sender's device during a telephone call and associate it with a name and network participation information. Any device-identifier information may provide a starting point for a de-anonymization algorithm. For example, wireless network information or device ID information may be used in a de-anonymization attempt whereby de-anonymization module 3226 identifies a small number of seed nodes which are present both in the anonymous target graph and an auxiliary graph, and maps them to each other. A propagation stage may then be carried out in which the seed mapping is extended to new nodes using only the topology of the network, and the new mapping is fed back to the algorithm. The eventual result is a large mapping between subgraphs of the auxiliary and target networks which re-identifies all mapped nodes in the latter. In one embodiment, de-anonymization module 3226 may partially de-anonymize an otherwise anonymous telephone call correlating its number or other device or network identifier with a catalog merchants' telephone order database or other database. De-anonymization module 3226 may then place the partly de-anonymized information about the call in a sender profile for presentation, for example, to recipient 3306.

FIG. 43 illustrates alternative embodiments of the example operational flow 3400 of FIG. 34. FIG. 43 illustrates example embodiments where the associating operation 3420 may include at least one additional operation. Additional operations may include operation 4300.

Operation 4300 depicts associating the at least one telephone communication with a real-world person at least partly based on the real-world person's device-identifier data and the real-world person's network-participation identifier data, including at least one of associating the at least one telephone communication with a real-world person using web history tracking, associating the at least one telephone communication with a real-world person using media content tracking, or associating the at least one telephone communication with a real-world person using app data tracking. For example, sender profile creation unit 3204, network-participation identifier module 3220, identity prediction module 3224, web history tracking module 3230, media content tracking module 3232, and/or app data tracking module 3234 may associate the at least one telephone communication with a real-world person at least partly based on the real-world person's device-identifier data and the real-world person's network-participation identifier data, including at least one of associating the at least one telephone communication with a real-world person using web history tracking, associating the at least one telephone communication with a real-world person using media content tracking, or associating the at least one telephone communication with a real-world person using app data tracking. In one embodiment, app data tracking module 3234 may associate iPhone UDID information with a user account, a Facebook page, or to GPS coordinates. Such associations have been reported, for example, based on data transmitted to OpenFeint, a mobile social gaming company (see the blog post at http://corte.si/posts/security/openfeint-udid-deanonymization/index.html). Research shows that 68% of iOS apps silently send UDIDs to servers on the Internet. This is often accompanied by information on how, when and where the device is used. The most common destination for traffic containing a user's UDID is Apple itself, followed by the Flurry mobile analytics network and OpenFeint. These companies are aggregators of UDID-linked user information, because so many apps use their APIs. After the big three are thousands of individual developer sites, ad servers, and smaller analytics firms.

It is possible to use OpenFeint to de-anonymize a large proportion of UDIDs. Further, when an OpenFeint-enabled app is started, it submits the device's UDID to OpenFeint's servers, which then return a list of associated accounts: https://api.openfeint.com/users/for device.xml?udid=XXX. This is an unauthenticated call. Included is the user's latitude and longitude, the last game played (i.e., app used), chosen account name, and Facebook profile picture URL. Some portions of the OpenFeint API return a user location as well.

If the user registered a Facebook account with OpenFeint, a profile picture URL hosted by the Facebook CDN was returned in the user's profile data. Facebook profile picture URLs include the user's Facebook ID, directly linking it to their Facebook account. This represents a complete de-anonymization of the UDID, directly linking the supposedly anonymous identifier with a user's real-world identity. Also, it has been reported that Scoreloop, a cross platform mobile gaining SDK for virtual currency, partially discloses users' friends lists, even if they are private. One test of seven networks revealed that all seven networks allowed UDIDs to be linked to potentially identifying user information, ranging from usernames to email addresses, friends lists and private messages (See http://corte.si/posts/security/udid-must-die/index.html). Such connections may be used by, for example media content tracking module 3232, to assemble a sender profile, associate it with a telephone communication and present it to a recipient 3306.

FIG. 44 illustrates alternative embodiments of the example operational flow 3400 of FIG. 34. FIG. 44 illustrates example embodiments where the presenting operation 3430 may include at least one additional operation. Additional operations may include operations 4400, 4402, and/or operation 4404.

Operation 4400 depicts displaying on a mobile device the sender profile in association with the at least one telephone communication. For example, sender profile creation unit 3204 and/or display module 3240 may display on a mobile device the sender profile in association with the at least one telephone communication. In one embodiment, a sender profile may be displayed on a mobile device capable of online interaction at the same time that a telephone call is occurring on the mobile device. In this embodiment, additional information may be added to the sender profile in a dynamic fashion as the telephone call progresses. For example, additional data may be sent by the sender's device as the call progresses, and that data such as photos, location data, or voice data, may be used to update the sender profile as new data comes in to the sender profile creation unit 3204. Similarly, information may be deleted from the sender profile as appropriate based on new data accepted during the call, or sender profile data may be altered as necessary to reflect, for example, changes in state of the sender's device such as location changes. Display of the sender profile may thus occur during the call and change dynamically during the call to provide a real-time profile of the sender.

Operation 4402 depicts presenting the sender profile in association with the at least one telephone communication via a personal software assistant. For example, sender profile creation unit 3204, personal software assistant 3216, SIRI 3218, and/or display module 3240 may present the sender profile in association with the at least one telephone communication via a personal software assistant. In one embodiment, a sender profile may be described to a recipient via voice from a mobile device running a personal software assistant capable of translating information about the sender into voice. In this embodiment, information about the sender profile may be accessible to a recipient for whom visual review of a sender profile is inconvenient or unlawful (e.g., while driving) or impossible (e.g., for the blind).

Operation 4404 depicts presenting the sender profile in association with the at least one telephone communication via a personal software assistant, wherein the personal software assistant is SIRI. For example, sender profile creation unit 3204, personal software assistant 3216, SIRI 3218, and/or display module 3240 may present the sender profile in association with the at least one telephone communication via a personal software assistant, wherein the personal software assistant is SIRI. In one embodiment, a sender profile may be described to a recipient via voice from an iPhone4S mobile device running SIRI, a popular personal software assistant. SIRI is capable of accessing a sender profile and performing state changes, for example, to a recipient's contact list based on information from a sender profile.

FIG. 45 illustrates a partial view of an example article of manufacture 4500 that includes a computer program 4504 for executing a computer process on a computing device. An embodiment of the example article of manufacture 4500 is provided including a signal bearing medium 4502, and may include one or more instructions for accepting at least one telephone communication from at least one member of a network; one or more instructions for associating the at least one telephone communication with a sender profile at least partly based on the sender's device-identifier data and the sender's network-participation identifier data; and one or more instructions for presenting the sender profile in association with the at least one telephone communication. The one or more instructions may be, for example, computer executable and/or logic-implemented instructions. In one implementation, the signal-bearing medium 4502 may include a computer-readable medium 4506. In one implementation, the signal bearing medium 4502 may include a recordable medium 4508. In one implementation, the signal bearing medium 4502 may include a communications medium 4510.

FIG. 46 illustrates an example system 4600 in which embodiments may be implemented. The system 4600 includes a computing system environment. The system 4600 also illustrates a user 4612 using a device 4604, which is optionally shown as being in communication with a computing device 4602 by way of an optional coupling 4606. The optional coupling 4606 may represent a local, wide-area, or peer-to-peer network, or may represent a bus that is internal to a computing device (e.g., in example embodiments in which the computing device 4602 is contained in whole or in part within the device 4604). A storage medium 4608 may be any computer storage media. In one embodiment, the computing device 4602 may include a virtual machine operating within another computing device. In an alternative embodiment, the computing device 4602 may include a virtual machine operating within a program running on a remote server.

The computing device 4602 includes computer-executable instructions 4610 that when executed on the computing device 4602 cause the computing device 4602 to (a) accept at least one telephone communication from at least one member of a network; (b) associate the at least one telephone communication with a sender profile at least partly based on the sender's device-identifier data and the sender's network-participation identifier data; and (c) present the sender profile in association with the at least one telephone communication. As referenced above and as shown in FIG. 46, in some examples, the computing device 4602 may optionally be contained in whole or in part within the device 4604.

In FIG. 46, then, the system 4600 includes at least one computing device (e.g., 4602 and/or 4604). The computer-executable instructions 4610 may be executed on one or more of the at least one computing device. For example, the computing device 4602 may implement the computer-executable instructions 4610 and output a result to (and/or receive data from) the computing device 4604. Since the computing device 4602 may be wholly or partially contained within the computing device 4604, the device 4604 also may be said to execute some or all of the computer-executable instructions 4610, in order to be caused to perform or implement, for example, various ones of the techniques described herein, or other techniques.

The device 4604 may include, for example, a portable computing device, workstation, or desktop computing device. In another example embodiment, the computing device 4602 is operable to communicate with the device 4604 associated with the user 4612 to receive information about the input from the user 4612 for performing data access and data processing, and present a sender profile in association with the at least one telephone communication.

Identifying a Communications Partner—Email

FIG. 47 illustrates an example system 4700 in which embodiments may be implemented. The system 4700 includes a sender profile creation unit 4704. The sender profile creation unit 4704 may contain, for example, device-identifier module 4706 and network-participation identifier module 4720. Sender profile creation unit 4704 may communicate over a network or directly with sender 4701 to accept email communication 4702. Optionally, sender profile creation unit 4704 may also include identity prediction module 4724 for associating network-participation identifier data with the email communication 3304. Sender profile creation unit 4704 may also include device locator module 4712, telecommunications carrier database 4736, cross-carrier subscriber database 4738, personal software assistant 4716, and/or display module 4740.

In some embodiments, identity prediction module 4724 may include various search and/or matching functions for associating a sender profile with an email communication 4702. For example, identity prediction module 4724 may include de-anonymization module 4726, real-name profiling module 4728, web history tracking module 4730, media content tracking module 4732, and/or app data tracking module 4734.

Device-identifier module 4706 may include mobile network identifier module 4708 and/or brand identifier module 4710. As discussed above, for the purposes of this application, SIM as used herein includes mini-SIM, micro-SIM, Universal Subscriber Identity Module, CDMA Subscriber Identity Module, Universal Integrated Circuit Card, Removable User Identity Module, virtual SIM, and other variants of the subscriber identity module described herein and understood by those of ordinary skill in the art.

As referenced herein, the sender profile creation unit 4704 may be used to perform various data querying and/or recall techniques with respect to the email communication 4702, device-identifier data, and/or network-participation identifier data, in order to create a sender profile. For example, where network-participation identifier data is organized, keyed to, and/or otherwise accessible using one or more user accounts such as social network account, email account, telecommunications carrier account, or the like, sender profile creation unit 4704 may employ various Boolean, statistical, and/or semi-boolean searching techniques to associate appropriate network-participation identifier data about the sender with the email communication 4702. Similarly, for example, where device-identifier data is organized, keyed to, and/or otherwise accessible using device-identifier module 4706, various Boolean, statistical, and/or semi-boolean searching techniques may be performed by device-identifier module 4706 to associate appropriate device information with a sender profile and an email communication 4702.

Many examples of databases and database structures may be used in connection with the sender profile creation unit 4704. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for finding information relevant to an email communication and/or for gathering and/or compiling data from the relational database(s).

For example, SQL or SQL-like operations over one or more device-identifier data and/or network-participation identifier data may be performed, or Boolean operations using device-identifier data and/or network-participation identifier data may be performed. For example, weighted Boolean operations may be performed in which different weights or priorities are assigned to one or more of the device-identifier data and/or network-participation identifier data, including various network participation characteristics associated with a particular sender 4701, perhaps relative to one another. For example, a number-weighted, exclusive-OR operation may be performed to request specific weightings of network participation identifiers.

In FIG. 47, sender profile creation unit 4704 may associate an email communication 4702 with information about the device that the sender 4701 is using to send the email communication, such as device brand or model, telecommunications carrier name, and/or device-identifier data such as IP address, SIM data or other data that may identify a specific device or sender, as discussed herein. Optionally, sender profile creation unit 4704 may include a device locator module 4712 that may associate geodata with email communication 4804.

In FIG. 47, sender profile creation unit 4704 is illustrated as possibly being included within a system 4700. Of course, virtually any kind of computing device may be used to implement the special purpose sender profile creation unit 4704, such as, for example, a smart phone, a mobile computer such as a tablet or a laptop, a workstation, a desktop computer, a networked computer, a server, a collection of servers and/or databases, or a virtual machine running inside a computing device.

Additionally, not all of the sender profile creation unit 4704 need be implemented on a single computing device. For example, the sender profile creation unit 4704 may be implemented and/or operable on a remote computer, while a user interface and/or local instance of the sender profile creation unit 4704 are implemented and/or occur on a local computer. Further, aspects of the sender profile creation unit 4704 may be implemented in different combinations and implementations than that shown in FIG. 47. For example, functionality of a user interface may be incorporated into the sender profile creation unit 4704. In one embodiment, sender profile information may be presented via a personal software assistant 4716 such as SIRI 4718. The sender profile creation unit 4704 may perform simple data relay functions and/or complex data analysis, including, for example, fuzzy logic and/or traditional logic steps. Further, many methods of associating data with an email communication described herein or known in the art may be used, including, for example, algorithms used in emailer identification, email header analysis, or email address decoding. In some embodiments, the sender profile creation unit 4704 may create a sender profile based on device-identifier data and/or network-participation identifier data available as updates through a network.

Sender profile creation unit 4704 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

FIG. 48 illustrates certain alternative embodiments of the system 4700 of FIG. 47. In FIG. 48, the sender profile creation unit 4704 may interface over a network, such as the internet. Sender profile creation unit 4704 may communicate over a network or directly with recipient 4806 to associate a profile with email communication 4702. In this way, the sender profile creation unit 4704 may generate a sender profile that contains a rich set of information about the sender for the benefit of recipient 4806. Many of the functions of sender profile creation unit 4704 may be performed in the cloud 4808, for example on remote servers with high computing power and capacity relative to, for example, a given mobile device receiving an email communication as recipient 4806. In this example, a mobile device receiving an email communication may send data regarding the email communication for processing and sender profile creation. A profile associated with the email communication by a sender profile creation unit 4704 located in the cloud may then be sent to be presented on a local device to recipient 4806.

In some embodiments, sender profile creation unit 4704 may access telecommunications carrier database 4736 in creating a sender profile, for example. Sender profile creation unit 4704 can be operated by a telecom company or by a social or other network owner, or by both in cooperation with each other. In one embodiment, the compiled list of unique identifiers discussed above provides an easy resource for organizing profiles containing both device identifier data and network-participation identifier data, including phone number data, social network data, and email data.

A directory of uniquely-identified devices can serve as the foundation for enhanced emailer identification functions, whereby a recipient of an email communication can quickly and easily access information about the emailer beyond just name and email address. Additional axes of information about a sender 4701 may include, for example, social network participation/aciivity, phone number(s), twitter handle, and/or blog activity.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 49 illustrates an operational flow 4900 representing example operations related to identifying a communications partner. In FIG. 49 and in following figures that include various examples of operational flows, discussion and explanation may be provided with respect to the above-described system environments of FIGS. 47-48, and/or with respect to other examples and contexts. However, it should be understood that the operational flows may be executed in a number of other environments and contexts, and/or in modified versions of FIGS. 47-48. Also, although the various operational flows are presented in the sequence(s) illustrated, it should be understood that the various operations may be performed in other orders than those which are illustrated, or may be performed concurrently.

After a start operation, operation 4910 depicts accepting at least one email communication from at least one member of a network. For example, sender profile creation unit 4704 and/or device-identifier module 4706 can accept at least one email communication from at least one member of a network. In one embodiment, a user or recipient with a mobile phone may receive an email from a Facebook friend. That email may be accompanied by information about the sender such as IP address in the header of the email giving information about the device that the email was sent from and a name associated with the email address. In some instances a location for the IP address of the device sending the email may also be available. In another embodiment, mobile device users may opt-in to a system in which their device ID information, e.g., IP address, SIM data or IMEI data, is transmitted with their email, so that a recipient can identify additional information about the caller. Further, it is envisioned herein that for those sharing some aspect of their social graph, e.g., co-membership in a social network, additional information may be transmitted to an email recipient from a sender including, e.g., social network identifiers such as usernames, twitter handles, or other elements of social network activity as described below.

Operation 4920 depicts associating the at least one email communication with a sender profile at least partly based on the sender's device-identifier data and the sender's network-participation identifier data. For example, sender profile creation unit 4704, device-identifier module 4706 and/or network-participation identifier module 4720 may associate the at least one email communication with a sender profile at least partly based on the sender's device-identifier data and the sender's network-participation identifier data. In one embodiment, device-identifier module 4706 may identify an email as one that originated from an iPhone and handled by Verizon as the wireless carrier of the data, perhaps by analysis of the email header, which may include IP address information about the email sender as discussed below. Further, network-participation identifier module 3220 may associate a name connected to the email address of the sender with a Facebook friend of the recipient of the email. Sender profile creation unit 4704 may then associate a profile of the sender with the email, wherein the profile consists of the name associated with the email address of the sender, a Facebook user name, a Facebook profile picture, a twitter handle, a phone number, and a location of the sending device.

In some embodiments, sender profile creation unit 4704 may include an identity prediction algorithm such as a de-anonymization algorithm, a real-name profiling algorithm, a web history tracking algorithm, media content tracking algorithm, and/or an app list tracking algorithm. These algorithms may aid in the association of network-participation identifier data with an email communication, for example by searching public or private databases for the email address and/or name associated with the email address to find relevant network-participation identifier data.

In some embodiments, sender profile creation unit 4704 may associate an email address with a person including network-participation information about the person by accessing a unique identifier corresponding to the person and their device as described above. For example, Facebook may provide real names, usernames, images, birthdates, email addresses, telephone numbers, or other data that it has about the users of its social network to a consortium of telecommunications carriers 220 (this may optionally involve an opting-in step whereby users of Facebook affirmatively approve this action), who may provide device-identifier data 108. Assigning a unique identifier (discussed above) for each network-user-associated device across each of the carriers in the consortium may result in a directory that is particularly valuable for telecommunications carriers, who can then provide directory searching, support, and disambiguation for a potentially large fraction of the Facebook social network. Such a directory will likely be of equal interest and value to networks including Facebook in this example, for the same reasons. For example, a cross-carrier directory of Facebook members with associated phone numbers and email addresses would be an added feature for Facebook that could significantly enhance the social information provided by the network. An enhanced emailer ID that provides social network information about the sender of an email, for example as contact information, would be useful for recipients of emails. Particularly for a trusted sender, automatic acquisition and/or synchronization of contact information, device information, and/or social network information would be very useful for a recipient, for example, an email recipient within the social network of the sender of the email.

Operation 4930 depicts presenting the sender profile in association with the at least one email communication. For example, sender profile creation unit 4704 sender profile creation unit 4704 and/or personal software assistant 4716 may present the sender profile in association with the at least one email communication, optionally via display module 4740. In one embodiment, personal software assistant 4716 may present a profile of a sender as a set of attributes of the sender including name, phone number, wireless carrier network, blog address, and email address to a recipient 4806 of an email.

In another embodiment, the profile or set of attributes of the sender may be integrated into a contact file about the sender in an application on the recipient's communication device. For example, SIRI 4718 may store each element of a profile associated with an email communication on a personalized gmail contact page for the sender, perhaps updating outdated items in an existing entry, filling in missing items in an existing entry, or creating a new entry.

FIG. 50 illustrates alternative embodiments of the example operational flow 4900 of FIG. 49. FIG. 50 illustrates example embodiments where the accepting operation 4910 may include at least one additional operation. Additional operations may include operation 5000, 5002, and/or operation 5004.

Operation 5000 depicts receiving at least one email communication on a mobile telecommunications device. For example, sender profile creation unit 4704 and/or recipient 4806 may receive at least one email communication on a mobile telecommunications device. In one embodiment, a person may receive an email on a smart phone running a sender profile creation unit 4704 program that can identify device-identifier data sent with the email by a sender 4701, associate device-identifier data such as IP address with a name, and use that name to search for and find additional information about the sender. Sender profile creation unit 4704 may then associate the additional information about the sender with the email communication and present the additional information in a profile to the recipient 4806 of the email communication.

Operation 5002 depicts receiving at least one email communication on at least one of a mobile telephone, a tablet computer, a notebook computer, or a laptop computer. For example, sender profile creation unit 4704 and/or recipient 4806 may receive at least one email communication on at least one of a mobile telephone, a tablet computer, a notebook computer, or a laptop computer. Many mobile computing devices are equipped with email capability, whether implemented by a dedicated mail program such as Microsoft Outlook, internet email such as Hotmail, or a Blackberry email client. In one embodiment, a person may receive an email on a tablet computer via the gmail internet email service, wherein the tablet includes a sender profile creation unit 4704 program that can identify device-identifier data such as IP address sent with the email communication by a sender 4701, associate device-identifier data with a name, and use that name to search for and find additional information such as network-participation data about the sender. Sender profile creation unit 4704 may then associate the additional information about the sender with the email communication and present the additional information in a profile to the recipient 4806 of the email communication.

Operation 5004 depicts receiving at least one email communication on at least one of a desktop computer or a networked television. For example, sender profile creation unit 4704 and/or recipient 4806 may receive at least one email communication on at least one of a desktop computer or a networked television. As with mobile computing devices discussed above, many home computing devices are also equipped with email capability, including computers used primarily in the home and even internet-ready televisions. In one embodiment, a person may receive an email on a networked television such as a Sony Internet TV powered by Google TV, an internet ready device that can be used to send and receive internet email. In this example, the television may include a sender profile creation unit 4704 that can identify device-identifier data sent with an email communication by a sender 4701, associate email address and/or email device-identifier data with a name, and use that name to search for and find additional information such as network-participation data about the sender. As above, sender profile creation unit 4704 may then associate the additional information about the sender with the email communication and present the additional information in a profile to the recipient 4806 of the email communication, perhaps directly on the television screen.

FIG. 51 illustrates alternative embodiments of the example operational flow 4900 of FIG. 49. FIG. 51 illustrates example embodiments where the accepting operation 4910 may include at least one additional operation. Additional operations may include operation 5104 and/or operation 5106.

Operation 5104 depicts accepting at least one email communication from at least one member of a social network. For example, sender profile creation unit 4704 and/or recipient 4806 may accept at least one email communication from at least one member of a social network. In one embodiment, a person may receive an email from a sender who is a member of the Facebook social network. Sender profile creation unit 4704 may search social network databases by email address or name associated with the email address to find social networks that include members with the same name or email address. Moreover, intersections between sender and recipient social network data may be identified by network participation identifier module 4720, e.g., overlap of the social graph including direct connections or mutual friends on Facebook. Such connections may provide a tool for disambiguation as discussed above, and may also provide content for a sender profile to be presented to, e.g., recipient 4806.

Operation 5106 depicts receiving at least one email communication from a member of a mobile phone telecommunications network. For example, sender profile creation unit 4704 and/or recipient 4806 may receive at least one email communication from a member of a mobile phone telecommunications network. In one embodiment, a person may receive an mail from a sender 4701 who is a member of the AT&T mobile phone telecommunications network. In some embodiments, information about the sender's telecommunications network may be found in the body of the email, e.g., "sent from my Blackberry," or in the header of the email, which typically contains information about the IP address of the sender, when the email was sent, when the email was received, and the route traveled, among other things. For example, typical email header information may provide an ISP domain of the sender based on the listed IP address, SMTP information about the sending mail server, the real IP address of the sender, and the email client that was used to send the email. Sender profile creation unit 4704 may search the AT&T mobile phone telecommunications network by telephone number to find a name associated with the email address and/or other information found in the email's body or header.

FIG. 52 illustrates alternative embodiments of the example operational flow 4900 of FIG. 49. FIG. 52 illustrates example embodiments where the associating operation 4920 may include at least one additional operation. Additional operations may include operation 5200, 5202, 5204, 5206, and/or operation 5208.

Operation 5200 depicts associating the at least one email communication with a set of sender attributes at least partly based on the sender's device-identifier data and the sender's network-participation identifier data. For example, sender profile creation unit 4704, device-identifier module 4706, and/or network-participation identifier module 4720 may associate the at least one email communication with a set of sender attributes at least partly based on the sender's device-identifier data and the sender's network-participation identifier data. In one embodiment, device-identifier module 4706 may accept an email address associated with an email communication, and then search a telecommunications carrier database to find a name associated with the email address. Network-participation identifier module 4720 may then search one or more social networks to find network participation data for the name associated with the email address. In this example, network-participation identifier module 4720 may employ real-name profiling or de-anonymization to find sender attributes that are in some way connected to the recipient for disambiguation purposes and to provide as much network participation data as possible for the recipient to keep as a resource in future communications with the sender. Together, the device identifier data such as the IP address and the network participation data such as social network participation data may be compiled in a sender profile to be presented as a reference for recipient 4806, for use at any time after receipt of the email communication.

Operation 5202 depicts associating the at least one email communication with a set of sender attributes at least partly based on the sender's device-identifier data and the sender's network-participation identifier data, wherein the sender attributes include at least one of a social network membership list, one or more social network usernames, one or more social network profile pictures, one or more mutual friend lists, or one or more social networking website-posted items. For example, sender profile creation unit 4704, device-identifier module 4706, and/or network-participation identifier module 4720 may associate the at least one email communication with a set of sender attributes at least partly based on the sender's device-identifier data and the sender's network-participation identifier data, wherein the sender attributes include at least one of a social network membership list, one or more social network usernames, one or more social network profile pictures, one or more mutual friend lists, or one or more social networking website-posted items. In one embodiment, device-identifier module 4706 may accept an email address associated with an email, and then search a telecommunications carrier database to find a name associated with the email address. Network-participation identifier module 4720 may then search one or more social networks to find network participation data for the name associated with the email address. In this example, network-participation identifier module 4720 may employ real-name profiling or de-anonymization to find sender attributes that are in some way connected to the recipient for disambiguation purposes and to provide as much network participation data as possible for the recipient to keep as a resource in future communications with the sender. In some embodiments, network-participation identifier module 4720 may identify connections between the sender and the recipient in a social network, such as direct communication in a social network such as posting to a Facebook wall or photograph posted on Facebook with each of the sender and the recipient tagged in the same photograph. Together, the device identifier data such as the IP address or telephone number, and the network participation data such as a list of shared friends on a social network (i.e., mutual friend list) may be compiled in a sender profile to be presented as a reference for recipient 4806, for use at any time after receipt of the email communication.

Operation 5204 depicts associating the at least one email communication with a set of sender attributes at least partly based on the sender's device-identifier data and the sender's network-participation identifier data, wherein the sender attributes include a list of shared contacts. For example, sender profile creation unit 4704, device-identifier module 4706, and/or network-participation identifier module 4720 may associate the at least one email communication with a set of sender attributes at least partly based on the sender's device-identifier data and the sender's network-participation identifier data, wherein the sender attributes include a list of shared contacts. In one embodiment, device-identifier module 4706 may accept a name, email address, and IP address associated with an email communication. Network-participation identifier module 4720 may then search one or more social networks to find network participation data for the name and/or device identifier associated with the email address. In this example, network-participation identifier module 4720 may search the internet to find a list of contacts that are also contacts of the recipient of the email communication. Such information is useful to provide enhanced contact information about those in email contact with recipients; it is particularly useful for a recipient to be presented with a phone number for an emailer automatically when an email arrives. In this application emailer and sender are synonymous.

Operation 5206 depicts associating the at least one email communication with a set of sender attributes at least partly based on the sender's device-identifier data and the sender's network-participation identifier data, wherein the sender attributes include at least one of a list of usernames, a list of online personas, or a list of aliases. For example, sender profile creation unit 4704, device-identifier module 4706, and/or network-participation identifier module 4720 may associate the at least one email communication with a set of sender attributes at least partly based on the sender's device-identifier data and the sender's network-participation identifier data, wherein the sender attributes include at least one of a list of usernames, a list of online personas, or a list of aliases. In one embodiment, device-identifier module 4706 may accept an email address, name, and device identifier (e.g., IP address) associated with an email communication. Network-participation identifier module 4720 may then search one or more networks including the internet to find network participation data for the name and/or device identifier associated with the email address. In this example, network-participation identifier module 4720 may search the internet to find usernames associated with the email address or name, usernames that signify membership in a social network such as LinkedIn or Facebook. Results indicating online personas linked to the sender can then be used to search for additional specific information about the sender, such as things in common with the recipient. In one embodiment, a sender profile indicating membership in Facebook may include a Facebook username that is different from the name associated with the sender's email address, but which provides desired information for future social networking activity/communication between the sender and the recipient. For example, automatically getting the Facebook username shortly after receiving the email allows the recipient to more easily initiate a Facebook friendship with the sender.

Operation 5208 depicts associating the at least one email communication with a set of sender attributes at least partly based on the sender's device-identifier data and the sender's network-participation identifier data, wherein the sender attributes include at least one of a twitter handle, a Facebook page, or a web address for a blog. For example, sender profile creation unit 4704, device-identifier module 4706, and/or network-participation identifier module 4720 may associate the at least one email communication with a set of sender attributes at least partly based on the sender's device-identifier data and the sender's network-participation identifier data, wherein the sender attributes include at least one of a twitter handle, a Facebook page, or a web address for a blog. In one embodiment, device-identifier module 4706 may accept an email address, name, and device identifier (e.g., IP address) associated with an email communication. Network-participation identifier module 4720 may then search one or more networks including the internet to find network participation data for the name and/or device identifier associated with the email address. In this example, network-participation identifier module 4720 may search the internet to find twitter feeds or web pages associated with the email address or associated name. Sender profiles including such twitter feeds or webpages, including social network webpages, may be of interest to a recipient/friend of the sender who would like to know more about the online activities of the sender. In this example, sender profile creation unit 4704 may automatically present to the recipient URL's associated with the sender for storage in, for example, the device on which the email communication was received. This allows for information such as URL's to be recorded for the recipient without the need for memorization, writing them down, or typing them or speaking them into a device for storage.

FIG. 53 illustrates alternative embodiments of the example operational flow 4900 of FIG. 49. FIG. 53 illustrates example embodiments where the associating operation 4920 may include at least one additional operation. Additional operations may include operation 5300 and/or operation 5302.

Operation 5300 depicts associating the at least one email communication with a set of sender attributes at least partly based on the sender's device-identifier data and the sender's network-participation identifier data, wherein the sender attributes include a history of interactions with a recipient of the at least one email communication. For example, sender profile creation unit 4704, device-identifier module 4706, and/or network-participation identifier module 4720 may associate the at least one email communication with a set of sender attributes at least partly based on the sender's device-identifier data and the sender's network-participation identifier data, wherein the sender attributes include a history of interactions with a recipient of the at least one email communication. In one embodiment, sender 4701, a friend of recipient 4806, may have opted in to transmitting with an email to recipient 4806 device-identifier data including telephone number, name, and device identifier data associated with the email communication. In one embodiment, the opt in includes sending to recipient 4806 and/or sender profile creation unit 4704 basic network-participation identifier data such as Facebook username. Network-participation identifier module 4720 may then search one or more networks including the internet and/or social networks to find information about past interactions between the sender and recipient. Network-participation identifier module 4720 may then associate those past interactions with the email communication and present them as part of a sender profile. A sender's device-identifier data in the email context may include IP address, type of device such as smartphone, brand of device such as Blackberry, or other device identifier data as discussed above. An email address, particularly internet-based (i.e., cloud-based) email addresses, may not be strictly tied to one device, however a consistent pattern of usage may establish a connection or association between an internet email address and a given IP address or other device identifier. For example, a smartphone user may use that phone most of the time to send and receive emails. Alternatively, a set of devices associated with an internet email address may be identified based on, e.g., IP addresses for devices used in connection with the internet email address.

Internet emails are designed to carry the IP address of the computer from which the email was sent. This IP address is stored in an email header delivered to the recipient along with the message. Email headers contain the electronic equivalent of addressing and postmarks that reflect the routing of mail from source to destination. Internet email headers contain several lines of text. Some lines start with the words "Received: from . . . ." Following these words is an IP address. In some situations, multiple "Received: from . . . " lines appear in an email header. This happens when the message passes through multiple email servers. Alternatively, some email spammers will insert additional fake "Received: from" lines into the headers themselves in an attempt to confuse recipients. To identify the correct IP address when multiple "Received: from . . . " lines are involved requires analysis. If no fake information was inserted, the correct IP address is contained in the last "Received: from . . . " line of the header. This is a good simple rule to follow when looking at mail from friends or family.

If fake header information was inserted by a spammer, different rules must be applied to identify a sender's IP address. The correct IP address will be normally not be contained in the last "Received: from . . . " line, because information faked by a sender always appears at the bottom of an email header. To find the correct address in this case, one starts from the last "Received: from . . . " line and traces the path taken by the message by traveling up through the header. The "by" (sending) location listed in each "Received" header should match with the "from" (receiving) location listed in the next "Received" header below. One may disregard any entries that contain domain names or IP addresses not matching with the rest of the header chain. The last "Received: from . . . " line containing valid information is the one that contains the sender's true IP address. Many spammers send their emails directly rather than through internet email servers. In these cases, all "Received: from . . . " header lines except the first one will be faked. The first "Received: from . . . " header line contains the sender's true IP address in this scenario.

Operation 5302 depicts associating the at least one email communication with a set of sender attributes at least partly based on the sender's device-identifier data and the sender's network-participation identifier data, wherein the sender attributes include a history of interactions with a recipient of the at least one email communication including at least one of an excerpted history of interactions with a recipient of the at least one email communication, a recent history of interactions with a recipient of the at least one email communication, or a history of interactions with a recipient of the at least one email communication that is keyed to a specific topic. For example, sender profile creation unit 4704, device-identifier module 4706, and/or network-participation identifier module 4720 may associate the at least one email communication with a set of sender attributes at least partly based on the sender's device-identifier data and the sender's network-participation identifier data, wherein the sender attributes include a history of interactions with a recipient of the at least one email communication including at least one of an excerpted history of interactions with a recipient of the at least one email communication, a recent history of interactions with a recipient of the at least one email communication, or a history of interactions with a recipient of the at least one email communication that is keyed to a specific topic. In one embodiment, network-participation identifier module 4720 may associate the at least one email communication (e.g., by using the name associated with the email address as a search term) with a Facebook message thread between the sender and recipient. That message thread may be placed by network-participation identifier module 4720 into the sender profile. The record of the message thread in the sender profile may be useful to recipient 4806 for reference purposes. In another embodiment, recipient 4806 may input by voice, keyboard or other input device a topic key word or phrase by which network-participation identifier module 4720 may narrow the results of a social network history of interactions, for example. In one embodiment, recipient 4806, upon being presented with a profile containing a name and Facebook username, may type into her phone "christmas 2010 photos" as a direction for network-participation identifier module 4720 to copy Christmas 2010 photos from the sender's Facebook page to the sender profile on the recipient's phone.

FIG. 54 illustrates alternative embodiments of the example operational flow 4900 of FIG. 49. FIG. 54 illustrates example embodiments where the associating operation 4920 may include at least one additional operation. Additional operations may include operation 5400 and/or operation 5402.

Operation 5400 depicts associating the at least one email communication with a sender profile at least partly based on the sender's internet protocol address and the sender's network-participation identifier data. For example, sender profile creation unit 4704 and/or device-identifier module 4706 may associate the at least one email communication with a sender profile at least partly based on the sender's internet protocol address and the sender's network-participation identifier data. For example, device-identifier module 4706 may accept a sender's IP address coincident with an email message. The information made available to the recipient may be displayed on a smart phone's display or stored in a file associated with the sender.

In this example, device-identifier module 4706 may use the IP address to search for additional device identification information such as specific device data, telecommunications network data, or the like. Any device identifier data, including the IP address may in turn be used by network-participation identifier module 4720 as a search term with which to find additional information about, for example, the online activities of the sender 4701. Sender profile creation unit 4704 may then present the information in a profile to the recipient's phone.

Operation 5402 depicts associating the at least one email communication with a sender profile at least partly based on the sender's device-identifier data and the sender's network-participation identifier data, wherein the sender's device identifier data includes at least one of subscriber identity module data, integrated circuit card identifier data, mobile equipment identifier data, international mobile subscriber identity data, or electronic serial number data. For example, sender profile creation unit 4704 and/or device-identifier module 4706 may associate the at least one email communication with a sender profile at least partly based on the sender's device-identifier data and the sender's network-participation identifier data, wherein the sender's device identifier data includes at least one of subscriber identity module data, integrated circuit card identifier data, mobile equipment identifier data, international mobile subscriber identity data, or electronic serial number data. In one embodiment, device-identifier module 4706 may accept a short message service text message (SMS text message) as an email, which includes SIM data about the sender's device, where the SIM data includes, e.g., contact information from the sender's phone. In one embodiment, contacts from the sender's device that overlap with those of the recipient's contacts may be placed in the sender's profile, or used to sync or update the contact list in the recipient's device.

In another embodiment, device-identifier module 4706 may accept mobile equipment identifier data specific to the sender's phone with an email, and use that MEI data to search a unique identifier database, either for a single carrier or one that includes multiple carriers as discussed above, to access information about the sender to associate with the email communication and place in a sender profile. This system may operate within a trusted network to maintain privacy of user and device identifier data that is not public.

FIG. 55 illustrates alternative embodiments of the example operational flow 4900 of FIG. 49. FIG. 55 illustrates example embodiments where the associating operation 4920 may include at least one additional operation. Additional operations may include operation 5500, 5502, 5504, 5506, 5508, and/or operation 5510.

Operation 5500 depicts associating the at least one email communication with a sender profile at least partly based on the sender's device-identifier data and the sender's network-participation identifier data, wherein the sender's device identifier data includes at least one device descriptor. For example, sender profile creation unit 4704, device-identifier module 4706, mobile network identifier module 4708, and/or brand identifier module 4710 may associate the at least one email communication with a sender profile at least partly based on the sender's device-identifier data and the sender's network-participation identifier data, wherein the sender's device identifier data includes at least one device descriptor. In one embodiment, mobile network identifier module 4708 may accept an email communication from a sender over a wireless network together with an indication of the wireless carrier's name, such as Blackberry/RIM, AT&T, Verizon, Sprint, or the like. The name of the wireless carrier may be placed in the sender profile for association with the email communication for use by the recipient of the call.

Operation 5502 depicts associating the at least one email communication with a sender profile at least partly based on the sender's device-identifier data and the sender's network-participation identifier data, wherein the sender's device identifier data includes at least one device descriptor, and wherein the device descriptor includes at least one of a device name, a device brand, a device model, or a device location. For example, sender profile creation unit 4704, device-identifier module 4706, mobile network identifier module 4708, and/or brand identifier module 4710 may associate the at least one email communication with a sender profile at least partly based on the sender's device-identifier data and the sender's network-participation identifier data, wherein the sender's device identifier data includes at least one device descriptor, and wherein the device descriptor includes at least one of a device name, a device brand, a device model, or a device location. In one embodiment, brand identifier module 4710 may accept an email communication from a sender over a wireless network together with an indication of the brand of the sender's calling device, such as "sent from my Blackberry." The brand of the sender's calling device may be placed in the sender profile for association with the email communication for use by the recipient of the email, for example to determine whether the sender's device is able to use certain operating system-specific apps, such as FaceTime. In this example, sender profile creation unit 4704 may associate a sender profile showing the sender's device as an iPhone, which may indicate to the recipient that the sender is capable of communicating using the FaceTime video calling app operable only on iOS and macOS devices.

Operation 5504 depicts associating the at least one email communication with a sender profile at least partly based on the sender's device-identifier data and the sender's network-participation identifier data, wherein the sender's device identifier data includes at least one device descriptor, and wherein the device descriptor includes at least one of mobile phone, computer, or television. For example, sender profile creation unit 4704, device-identifier module 4706, mobile network identifier module 4708, and/or brand identifier module 4710 may associate the at least one email communication with a sender profile at least partly based on the sender's device-identifier data and the sender's network-participation identifier data, wherein the sender's device descriptor includes at least one of mobile phone, computer, or television. In one embodiment, device-identifier module 4706 may accept an email communication from a sender with an indication that the sender's emailing device is a networked television. The sender's device-type information may be placed in the sender profile for association with the email communication for use by the recipient of the email, for example to help the recipient decide whether to switch devices or modes of communication for subsequent communication with the sender of the email, e.g., switch to video calling. In this example, sender profile creation unit 4704 may associate a sender profile showing the sender's device as a networked television, which may tell the recipient that she can switch from email to video calling because the sender is online and available in that mode.

Operation 5506 depicts associating the at least one email communication with a sender profile at least partly based on the sender's device-identifier data and the sender's network-participation identifier data, wherein the sender's device identifier data includes at least one device descriptor, and wherein the device descriptor includes at least one of Apple, Motorola, HTC, LG, Samsung, Blackberry, or Nokia. For example, sender profile creation unit 4704, device-identifier module 4706, mobile network identifier module 4708, and/or brand identifier module 4710 may associate the at least one email communication with a sender profile at least partly based on the sender's device-identifier data and the sender's network-participation identifier data, wherein the sender's device descriptor includes at least one of Apple, Motorola, HTC, LG, Samsung, Blackberry, or Nokia. In one embodiment, brand identifier module 4710 may accept an email communication from a sender together with an indication that the sender's emailing device is an HTC phone running the Android mobile operating system. The sender's device brand and operating system information may be placed in the sender profile for association with the email communication for use by the recipient of the email, for example to help the recipient decide whether to switch devices for subsequent communication with the sender of the email. In this example, sender profile creation unit 4704 may associate a sender profile showing the sender's device as an HTC Android phone, which may tell the recipient that she may want to switch devices to one running an Android OS if the recipient's phone (e.g., an iPhone) is not compatible with an Android OS app that the recipient wants to use with the sender. In one embodiment, an indication that an email is sent from a mobile phone, together with the phone number of that mobile phone, allows the recipient to switch communication modes and easily call the sender on their mobile phone if desired subsequent to receiving the email.

Operation 5507 depicts associating the at least one email communication with a sender profile at least partly based on the sender's device-identifier data and the sender's network-participation identifier data, wherein the sender's device identifier data includes at least one device descriptor, and wherein the device descriptor includes a description of the network that the device is using. For example, sender profile creation unit 4704, device-identifier module 4706, mobile network identifier module 4708, and/or brand identifier module 4710 may associate the at least one email communication with a sender profile at least partly based on the sender's device-identifier data and the sender's network-participation identifier data, wherein the sender's device descriptor includes a description of the network that the device is using. In one embodiment, mobile network identifier module 4708 may accept an email communication from a sender over a wireless network together with an indication that the sender's calling device is sending the signal from a specific telecommunication carrier's wireless network, such as the Verizon network. This indication may be a function of the IP address of the sender's device. In one embodiment it is a function of the mobile IP address of the sending device, which may include a permanent home address and a care-of address, which is associated with the network the mobile node is visiting. A home agent may store information about mobile nodes whose permanent home address is in the home agent's network. A foreign agent may store information about mobile nodes visiting its network. Foreign agents may also advertise care-of addresses. If there is no foreign agent in the host network, the mobile device may get an address and advertise that address by its own means.

A node wanting to communicate with the mobile node uses the permanent home address of the mobile node as the destination address to send packets to. Because the home address logically belongs to the network associated with the home agent, normal IP routing mechanisms forward these packets to the home agent. Instead of forwarding these packets to a destination that is physically in the same network as the home agent, the home agent redirects these packets towards the remote address through an IP tunnel by encapsulating the datagram with a new IP header using the care of address of the mobile node.

When acting as transmitter, a mobile node sends packets directly to the other communicating node, without sending the packets through the home agent, using its permanent home address as the source address for the IP packets. This is known as triangular routing. If needed, the foreign agent could employ reverse tunneling by tunneling the mobile node's packets to the home agent, which in turn may forward them to the communicating node. This may be necessary in networks whose gateway routers check that the source IP address of the mobile host belongs to their subnet, discarding the packet otherwise.

The sender's network carrier may serve as an identifying feature of the sender's profile, and in one embodiment, that feature may be used to detect hacking of the sender's device. For example, if a friend with an iPhone known to be using the AT&T wireless network emails, but mobile network identifier module 4708 detects that the email is associated with a different carrier, then sender profile creation unit 4704 may record a security alert in the sender profile associated with the email communication.

Operation 5508 depicts associating the at least one email communication with a sender profile at least partly based on the sender's device-identifier data and the sender's network-participation identifier data, wherein the sender's device identifier data includes at least one device descriptor, and wherein the device descriptor includes geographical information about the device. For example, sender profile creation unit 4704, device-identifier module 4706, mobile network identifier module 4708, device locator module 4712, and/or brand identifier module 4710 may associate the at least one email communication with a sender profile at least partly based on the sender's device-identifier data and the sender's network-participation identifier data, wherein the sender's device identifier data includes at least one device descriptor, and wherein the device descriptor includes geographical information about the device. In one embodiment device-identifier module 4706 or device locator module 4712 may accept an email address and IP address coincident with an email from a sender and associate a geographical location with the email communication using the IP address of the sending device, which typically corresponds to a limited geographical region. In one embodiment, IP address lookup services like those available from an online service provider such as geobytes.com may be performed by device-identifier module 4706.

Operation 5510 depicts associating the at least one email communication with a sender profile at least partly based on the sender's device-identifier data and the sender's network-participation identifier data, wherein the sender's device identifier data includes at least one device descriptor, and wherein the device descriptor includes geographical information about the device, and wherein the geographical information about the device is derived from at least one of internet protocol address, global positioning satellite data, cellular phone tower proximity, Wi-Fi use, user-entered location data, or proximity to at least one other device. For example, sender profile creation unit 4704, device-identifier module 4706, mobile network identifier module 4708, device locator module 4712, and/or brand identifier module 4710 may associate the at least one email communication with a sender profile at least partly based on the sender's device-identifier data and the sender's network-participation identifier data, wherein the sender's device identifier data includes at least one device descriptor, and wherein the device descriptor includes geographical information about the device, and wherein the geographical information about the device is derived from at least one of interne protocol address, global positioning satellite data, cellular phone tower proximity, Wi-Fi use, user-entered location data, or proximity to at least one other device. In one embodiment device-identifier module 4706 or device locator module 4712 may accept Wi-Fi use data coincident with an email (e.g., in the routing information in the header of the email) from a sender and associate a geographical location as part of the sender profile with the email communication using a database of Wi-Fi hotspot locations to identify where the Wi-Fi hotspot that the sender is using is located. In another embodiment, network-participation identifier module 4720 or device locator module 4712 may accept geodata coincident with, or proximate in time to, an email from a sender in the form of a Foursquare checkin by the sender at a specific business or map location, for example in Facebook. Network-participation identifier module 4720 may then associate the geographical location as part of the sender profile with the email communication for presentation to recipient 4806.

FIG. 56 illustrates alternative embodiments of the example operational flow 4900 of FIG. 49. FIG. 56 illustrates example embodiments where the associating operation 4920 may include at least one additional operation. Additional operations may include operation 5600, 5602, and/or operation 5604.

Operation 5600 depicts associating the at least one email communication with a sender profile at least partly based on the sender's device-identifier data and the sender's network-participation identifier data, wherein the sender's network-participation identifier data includes a name in a telecommunications carrier database. For example, sender profile creation unit 4704 and/or network-participation identifier module 4720 may associate the at least one email communication with a sender profile at least partly based on the sender's device-identifier data and the sender's network-participation identifier data, wherein the sender's network-participation identifier data includes a name in a telecommunications carrier database. In one embodiment network-participation identifier module 4720 may accept a name and/or telephone number coincident with an email (e.g., in a signature block in the body of the email) from a sender. Where only a telephone number is associated, network-participation identifier module 4720 may associate the telephone number with a person's identity information on file with the telecommunications carrier used by the sender. In this embodiment, a sender may opt-in to allowing a telecommunications carrier to transmit certain information about the identity linked to the email address/sender. Such information may include publicly available information such as name and address, or in some cases more private information may be shared among designated/trusted calling circles, for example within a designated private network. In this example, friends who want to automatically keep other friends' contact information up-to-date may provide in an email contact information including updates to, e.g., phone number, twitter account, Facebook profile picture, or the like.

Operation 5602 depicts associating the at least one email communication with a real-world person at least partly based on the real-world person's device-identifier data and the real-world person's network-participation identifier data. For example, sender profile creation unit 4704, network-participation identifier module 4720, and/or identity prediction module 4724 may associate the at least one email communication with a real-world person at least partly based on the real-world person's device-identifier data and the real-world person's network-participation identifier data. In one embodiment network-participation identifier module 4720 may accept an email address and name associated with that email address coincident with an email from a sender and employ identity prediction module 4724 to associate the name and email address (including IP address, which may provide geographical information as discussed above to associate with the name for disambiguation purposes) with a real-world person's identity information, for example available publicly on the internet. In this embodiment, identity prediction module 4724 may associate a name associated with a sender's email address with information publicly available on the world wide web, such as phone number, home address, website URL, Facebook page, twitter handle, or the like, and place that information in a sender profile for association with the email and for presentation to a recipient 4806.

Operation 5604 depicts associating the at least one email communication with a sender profile at least partly based on the sender's device-identifier data and the sender's network-participation identifier data, including at least one of associating the at least one email communication with a sender profile using identity prediction, associating the at least one email communication with a sender profile using de-anonymization, or associating the at least one email communication with a sender profile using real-name profiling. For example, sender profile creation unit 4704, network-participation identifier module 4720, identity prediction module 4724, de-anonymization module 4726, and/or real-name profiling module 4728 may associate the at least one email communication with a sender profile at least partly based on the sender's device-identifier data and the sender's network-participation identifier data, including at least one of associating the at least one email communication with a sender profile using identity prediction, associating the at least one email communication with a sender profile using de-anonymization, or associating the at least one email communication with a sender profile using real-name profiling. In one embodiment, de-anonymization module 4726 may accept device identifier data from an otherwise anonymous sender's device with an email and associate it with a name and network participation information. Any device-identifier information may provide a starting point for a de-anonymization algorithm. For example, wireless network information, IP address, or other device ID information may be used in a de-anonymization attempt whereby de-anonymization module 4726 identifies a small number of seed nodes which are present both in the anonymous target graph and an auxiliary graph, and maps them to each other. A propagation stage may then be carried out in which the seed mapping is extended to new nodes using only the topology of the network, and the new mapping is fed back to the algorithm. The eventual result is a large mapping between subgraphs of the auxiliary and target networks which re-identifies all mapped nodes in the latter. In one embodiment, de-anonymization module 4726 may partially de-anonymize an otherwise anonymous email address, correlating its specific email address, email domain, IP address, routing information, or other device or network identifier with a catalog merchants' email address database or other database. De-anonymization module 4726 may then place the de-anonymized information about the call in a sender profile for presentation, for example, to recipient 4806.

FIG. 57 illustrates alternative embodiments of the example operational flow 4900 of FIG. 49. FIG. 57 illustrates example embodiments where the associating operation 4920 may include at least one additional operation. Additional operations may include operation 5700.

Operation 5700 depicts associating the at least one email communication with a real-world person at least partly based on the real-world person's device-identifier data and the real-world person's network-participation identifier data, including at least one of associating the at least one email communication with a real-world person using web history tracking, associating the at least one email communication with a real-world person using media content tracking, or associating the at least one email communication with a real-world person using app data tracking. For example, sender profile creation unit 4704, network-participation identifier module 4720, identity prediction module 4724, web history tracking module 4730, media content tracking module 4732, and/or app data tracking module 4734 may associate the at least one email communication with a real-world person at least partly based on the real-world person's device-identifier data and the real-world person's network-participation identifier data, including at least one of associating the at least one email communication with a real-world person using web history tracking, associating the at least one email communication with a real-world person using media content tracking, or associating the at least one email communication with a real-world person using app data tracking. In one embodiment, app data tracking module 4734 may associate a sender's IP address with a user account, a UDID, a Facebook page, or to GPS coordinates. Such associations have been reported, for example, based on data transmitted to OpenFeint, a mobile social gaming company (see the blog post at http://corte.si/posts/security/openfeint-udid-deanonymization/index.html). Research shows that 68% of iOS apps silently send UDIDs to servers on the Internet. This is often accompanied by information on how, when, and where the device is used. The most common destination for traffic containing a user's UDID is Apple itself, followed by the Flurry mobile analytics network and OpenFeint. These companies are aggregators of UDID-linked user information, because so many apps use their APIs. After the big three are thousands of individual developer sites, ad servers, and smaller analytics firms.

It is possible to use OpenFeint to de-anonymize a large proportion of UDIDs. Further, when an OpenFeint-enabled app is started, it submits the device's UDID to OpenFeint's servers, which then return a list of associated accounts: https://api.openfeint.com/users/for device.xml?udid=XXX. This is an unauthenticated data call. Included is the user's latitude and longitude, the last game played (i.e., app used), chosen account name, and Facebook profile picture URL. Some portions of the OpenFeint API return a user location as well.

If the user registered a Facebook account with OpenFeint, a profile picture URL hosted by the Facebook CDN was returned in the user's profile data. Facebook profile picture URLs include the user's Facebook ID, directly linking it to their Facebook account. This represents a complete de-anonymization of the UDID, directly linking the supposedly anonymous identifier with a user's real-world identity. Also, it has been reported that Scoreloop, a cross platform mobile gaming SDK for virtual currency, partially discloses users' friends lists, even if they are private. One test of seven networks revealed that all seven networks allowed UDIDs to be linked to potentially identifying user information, ranging from usernames to friends lists and private messages (See http://corte.si/posts/security/udid-must-die/index.html). Such connections may be used by, for example media content tracking module 4732, to assemble a sender profile, associate it with an email communication and present it to a recipient 4806.

FIG. 58 illustrates alternative embodiments of the example operational flow 4900 of FIG. 34. FIG. 58 illustrates example embodiments where the presenting operation 4930 may include at least one additional operation. Additional operations may include operations 5800, 5802, and/or operation 5804.

Operation 5800 depicts displaying on a mobile device the sender profile in association with the at least one email communication. For example, sender profile creation unit 4704 and/or display module 4740 may display on a mobile device the sender profile in association with the at least one email communication. In one embodiment, an email sender's profile may be displayed on a mobile device capable of online interaction at the same time that a telephone call is occurring on the mobile device. In this embodiment, additional information based on an email may be added to the sender profile in a dynamic fashion as the telephone call progresses. For example, additional data may be sent by the sender's device as the call progresses, and that data such as photos, location data, or voice data, may be used to update the sender profile as new data comes in to the sender profile creation unit 4704. Similarly, information may be deleted from the sender profile as appropriate based on new data, or sender profile data may be altered as necessary to reflect, for example, changes in state of the sender's device such as location changes. Display of the sender profile may thus occur during a telephone call around the time that an email was received, and change dynamically during the call to provide a real-time profile of the email sender.

Operation 5802 depicts presenting the sender profile in association with the at least one email communication via a personal software assistant. For example, sender profile creation unit 4704, personal software assistant 4716, SIRI 4718, and/or display module 4740 may present the sender profile in association with the at least one email communication via a personal software assistant. In one embodiment, a sender profile may be described to a recipient via voice from a mobile device running a personal software assistant capable of translating information about the sender into voice. In this embodiment, information about the sender profile may be accessible to a recipient for whom visual review of a sender profile is inconvenient or unlawful (e.g., while driving) or impossible (e.g., for the blind).

Operation 5804 depicts presenting the sender profile in association with the at least one email communication via a personal software assistant, wherein the personal software assistant is SIRI. For example, sender profile creation unit 4704, personal software assistant 4716, SIRI 4718, and/or display module 4740 may present the sender profile in association with the at least one email communication via a personal software assistant, wherein the personal software assistant is SIRI. In one embodiment, a sender profile may be described to a recipient via voice from an iPhone4S mobile device running SIRI, a popular personal software assistant. SIRI is capable of accessing a sender profile and performing state changes, for example, to a recipient's contact list based on information from a sender profile.

FIG. 59 illustrates a partial view of an example article of manufacture 5900 that includes a computer program 5904 for executing a computer process on a computing device. An embodiment of the example article of manufacture 5900 is provided including a signal bearing medium 5902, and may include one or more instructions for accepting at least one email communication from at least one member of a network; one or more instructions for associating the at least one email communication with a sender profile at least partly based on the sender's device-identifier data and the sender's network-participation identifier data; and one or more instructions for presenting the sender profile in association with the at least one email communication. The one or more instructions may be, for example, computer executable and/or logic-implemented instructions. In one implementation, the signal-bearing medium 5902 may include a computer-readable medium 5906. In one implementation, the signal bearing medium 5902 may include a recordable medium 5908. In one implementation, the signal bearing medium 5902 may include a communications medium 5910.

FIG. 60 illustrates an example system 6000 in which embodiments may be implemented. The system 6000 includes a computing system environment. The system 6000 also illustrates a user 6012 using a device 6004, which is optionally shown as being in communication with a computing device 6002 by way of an optional coupling 6006. The optional coupling 6006 may represent a local, wide-area, or peer-to-peer network, or may represent a bus that is internal to a computing device (e.g., in example embodiments in which the computing device 6002 is contained in whole or in part within the device 6004). A storage medium 6008 may be any computer storage media. In one embodiment, the computing device 6002 may include a virtual machine operating within another computing device. In an alternative embodiment, the computing device 6002 may include a virtual machine operating within a program running on a remote server.

The computing device 6002 includes computer-executable instructions 6010 that when executed on the computing device 6002 cause the computing device 6002 to (a) accept at least one email communication from at least one member of a network; (b) associate the at least one email communication with a sender profile at least partly based on the sender's device-identifier data and the sender's network-participation identifier data; and (c) present the sender profile in association with the at least one email communication. As referenced above and as shown in FIG. 60, in some examples, the computing device 6002 may optionally be contained in whole or in part within the device 6004.

In FIG. 60, then, the system 6000 includes at least one computing device (e.g., 6002 and/or 6004). The computer-executable instructions 6010 may be executed on one or more of the at least one computing device. For example, the computing device 6002 may implement the computer-executable instructions 6010 and output a result to (and/or receive data from) the computing device 6004. Since the computing device 6002 may be wholly or partially contained within the computing device 6004, the device 6004 also may be said to execute some or all of the computer-executable instructions 6010, in order to be caused to perform or implement, for example, various ones of the techniques described herein, or other techniques.

The device 6004 may include, for example, a portable computing device, workstation, or desktop computing device. In another example embodiment, the computing device 6002 is operable to communicate with the device 6004 associated with the user 6012 to receive information about the input from the user 6012 for performing data access and data processing, and present a sender profile in association with the at least one email communication.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit).

Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Century Link, Southwestern Bell, etc.), or (g) a wired/wireless services entity (e.g., Sprint, Verizon, AT&T, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have, been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
   circuitry configured for accepting at least one search term, the at least one search term received from at least one user via an electronic network, the at least one search term including primary query data corresponding to at least one member of the electronic network;
   circuitry configured for obtaining at least one location at least partly based on the circuitry configured for accepting the at least one search term, the least one location obtained via the electronic network;
   circuitry configured for disambiguating the at least one search term, including at least associating the at least one search term with one or more member profiles relating to one or more members of the electronic network;
   circuitry configured for ranking one or more search results in association with the at least one location and at least partly based on at least one of network-participation identifier data or device-identifier data corresponding to the one or more member profiles indicated by the circuitry configured for disambiguating the at least one search term and corresponding to the primary query data, including at least:
    circuitry configured for elevating at least one search result of at least one member profile at least partly based on the at least one location, the at least one location derived from at least some international mobile subscriber identity ("IMSI") data of at least one device transmitting the at least one search term accepted as the primary query data and indicating that the at least one user is present at the at least one location; and
circuitry configured for presenting, for display to the at least one user, one or more attributes of the one or more members of the electronic network at least partly based on the circuitry configured for ranking the one or more search results in association with the at least one location and at least partly based on the at least one of the network-participation identifier data or the device-identifier data corresponding to the one or more member profiles indicated by the circuitry configured for disambiguating the at least one search term.

2. The system of claim 1, wherein circuitry configured for obtaining at least one location at least partly based on the circuitry configured for accepting the at least one search term, the at least one location obtained via the electronic network comprises:
    circuitry configured for obtaining at least one location of at least one device transmitting the at least one search term, the at least one location of the at least one device transmitting the at least one search term derived from at least one hardware-based position sensor of the at least one device.

3. The system of claim 1, wherein circuitry configured for ranking one or more search results in association with the at least one location and at least partly based on at least one of network-participation identifier data or device-identifier data corresponding to the one or more member profiles indicated by the circuitry configured for disambiguating the at least one search term and corresponding to the primary query data comprises:
    circuitry configured for ranking the one or more search results in association with at least some geo-locator data indicative of at least one location of at least one device transmitting the at least one search term as the at least one location obtained via the electronic network.

4. The system of claim 1, wherein circuitry configured for accepting at least one search term, the at least one search term received from at least one user via an electronic network, the at least one search term including primary query data corresponding to at least one member of the electronic network comprises:
    circuitry configured for accepting at least one search term, the at least one search term received from at least one user via an electronic network, including at least accepting at least one device-identifier corresponding to at least one device transmitting the at least one search term via the electronic network, the device-identifier usable to obtain at least one location related to the device transmitting the at least one search term via the electronic network.

5. The system of claim 1, wherein circuitry configured for ranking one or more search results in association with the at least one location and at least partly based on at least one of network-participation identifier data or device-identifier data corresponding to the one or more member profiles indicated by the circuitry configured for disambiguating the at least one search term and corresponding to the primary query data comprises:
    circuitry configured for ranking the one or more search results in association with the at least one location and at least partly based on at least one telephone number as the device-identifier data or at least one email address as the network-participation identifier data.

6. The system of claim 1, wherein circuitry configured for obtaining at least one location at least partly based on the circuitry configured for accepting the at least one search term, the at least one location obtained via the electronic network comprises:
    circuitry configured for obtaining one or more geographic coordinates indicative of at least one location of at least one device transmitting the at least one search term via the electronic network, the one or more geographic coordinates derived from at least one triangulation of one or more signal strengths associated with one or more transmissions from the at least one device to one or more cellular towers operated by a telecommunications carrier.

7. The system of claim 1, wherein circuitry configured for presenting, for display to the at least one user, one or more attributes of the one or more members of the electronic network at least partly based on the circuitry configured for ranking the one or more search results in association with the at least one location and at least partly based on the at least one of the network-participation identifier data or the device-identifier data corresponding to the one or more member profiles indicated by the circuitry configured for disambiguating the at least one search term comprises:
    circuitry configured for transmitting at least one indication of the one or more attributes of the one or more members of the electronic network, the at least one indication usable to display to the at least one user one or more search results responsive to the at least one search term.

8. The system of claim 1, wherein circuitry configured for obtaining at least one location at least partly based on the circuitry configured for accepting the at least one search term, the least one location obtained via the electronic network comprises:
    circuitry configured for determining whether the at least one user has granted access to location data associated with the at least one user; and
    circuitry configured for obtaining, at least partly based on one or more of the at least one telephone number or at least one email address associated with the at least one user, the at least one location at least partly based on the circuitry configured for determining whether the at least one user has granted the access to the location data associated with the at least one user.

9. The system of claim 8, wherein circuitry configured for determining whether the at least one user has granted access to location data associated with the at least one user comprises:
    circuitry configured for determining that the at least one user has affirmatively opted-in to sharing the location data associated with the at least one user for use in providing one or more search results ranked at least partly based on the location data associated with the at least one user.

10. The system of claim 8, wherein circuitry configured for determining whether the at least one user has granted access to location data associated with the at least one user comprises:
 circuitry configured for determining that the at least one user has not opted-out of sharing the location data associated with the at least one user for use in providing one or more search results ranked at least partly based on the location data associated with the at least one user.

11. The system of claim 1, wherein circuitry configured for ranking one or more search results in association with the at least one location and at least partly based on at least one of network-participation identifier data or device-identifier data corresponding to the one or more member profiles indicated by the circuitry configured for disambiguating the at least one search term and corresponding to the primary query data comprises:
 circuitry configured for ranking one or more search results by degree of direct connection to the at least one user, in association with the at least one location, and at least partly based on at least one of network-participation identifier data or device-identifier data corresponding to the one or more member profiles indicated by the circuitry configured for disambiguating the at least one search term.

12. The system of claim 1, wherein circuitry configured for elevating at least one search result of at least one member profile at least partly based on the at least one location, the at least one location derived from at least some international mobile subscriber identity ("IMSI") data of at least one device transmitting the at least one search term accepted as the primary query data and indicating that the at least one user is present at the at least one location comprises:
 circuitry configured for elevating at least one search result of at least one member profile associated with at least one member associated with at least one particular country at least partly based on the at least one location, the at least one location at least partly based on at least one mobile country code ("MCC") portion of at least some IMSI data unique to and stored by one or more of at least one subscriber identity module or subscriber identification module of at least one device transmitting the at least one search term accepted as the primary query data, the at least one MCC portion indicating that the at least one user also is associated with the at least one particular country.

13. The system of claim 1, wherein circuitry configured for accepting at least one search term, the at least one search term received from at least one user via an electronic network, the at least one search term including primary query data corresponding to at least one member of the electronic network comprises:
 circuitry configured for accepting at least one search term, the at least one search term received from at least one user via an electronic network, the at least one search term including at least one IMSI of at least one mobile device having transmitted the at least one search term as the primary query data corresponding to at least one member of the electronic network.

14. The system of claim 1, wherein circuitry configured for obtaining at least one location at least partly based on the circuitry configured for accepting the at least one search term, the least one location obtained via the electronic network comprises:
 circuitry configured for identifying at least one geographic region at least partly based on at least one IMSI of at least one mobile device having transmitted the at least one search term accepted as the primary query data, the at least one geographic region operable to elevate one or more search results in the ranking at least partly based on the elevated one or more search results having the same at least one geographic region as the at least one mobile device having transmitted the at least one search term.

15. The system of claim 1, wherein circuitry configured for obtaining at least one location at least partly based on the circuitry configured for accepting the at least one search term, the least one location obtained via the electronic network comprises:
 circuitry configured for accessing, using at least one identifier of at least one mobile device having transmitted the at least one search term, at least one billing database of at least one telecommunications carrier providing wireless service to the at least one mobile device having transmitted the at least one search term, including at least obtaining, via the accessing, at least one billing address associated with the at least one mobile device to set the at least one location at least partly based on the at least one billing address.

16. The system of claim 1, wherein circuitry configured for obtaining at least one location at least partly based on the circuitry configured for accepting the at least one search term, the least one location obtained via the electronic network comprises:
 circuitry configured for identifying at least one geographic region at least partly based on at least one telephone number area code of at least one mobile device having transmitted the at least one search term accepted as the primary query data, the at least one geographic region operable to elevate one or more search results in the ranking at least partly based on the elevated one or more search results having the same at least one geographic region as the at least one mobile device having transmitted the at least one search term.

17. The system of claim 1, wherein circuitry configured for accepting at least one search term, the at least one search term received from at least one user via an electronic network, the at least one search term including primary query data corresponding to at least one member of the electronic network comprises:
 circuitry configured for accepting at least one search term, the at least one search term received from at least one user via an electronic network, the at least one search term including at least one internet protocol address of at least one device having transmitted the at least one search term as the primary query data corresponding to at least one member of the electronic network.

18. The system of claim 1, wherein circuitry configured for obtaining at least one location at least partly based on the circuitry configured for accepting the at least one search term, the least one location obtained via the electronic network comprises:
 circuitry configured for identifying at least one geographic region at least partly based on at least one internet protocol address of at least one device having transmitted the at least one search term accepted as the primary query data, the at least one geographic region operable to elevate one or more search results in the ranking at least partly based on the elevated one or more search results having the same at least one geographic region as the at least one device having transmitted the at least one search term.

19. A system, comprising:
a computing device; and
one or more instructions which, when executed on the computing device, configure the computing device to perform one or more operations including at least:
accepting at least one search term, the at least one search term received from at least one user via an electronic network, the at least one search term including primary query data corresponding to at least one member of the electronic network;
obtaining least one location at least partly based on the accepting the at least one search term, the least one location obtained via the electronic network;
disambiguating the at least one search term, including at least associating the at least one search term with one or more member profiles relating to one or more members of the electronic network;
ranking one or more search results in association with the at least one location and at least partly based on at least one of network-participation identifier data or device-identifier data corresponding to the one or more member profiles indicated by the disambiguating the at least one search term and corresponding to the primary query data, including at least:
elevating at least one search result of at least one member profile at least partly based on the at least one location, the at least one location derived from at least some international mobile subscriber identity ("IMSI") data of at least one device transmitting the at least one search term accepted as the primary query data and indicating that the at least one user is present at the at least one location; and
presenting, for display to the at least one user, one or more attributes of the one or more members of the electronic network at least partly based on the ranking the one or more search results in association with the at least one location and at least partly based on the at least one of the network-participation identifier data or the device-identifier data corresponding to the one or more member profiles indicated by the disambiguating the at least one search term.

20. A method, comprising:
accepting at least one search term, the at least one search term received from at least one user via an electronic network, the at least one search term including primary query data corresponding to at least one member of the electronic network;
obtaining at least one location at least partly based on the accepting the at least one search term, the at least one location obtained via the electronic network;
disambiguating the at least one search term, including at least associating the at least one search term with one or more member profiles relating to one or more members of the electronic network;
ranking one or more search results in association with the at least one location and at least partly based on at least one of network-participation identifier data or device-identifier data corresponding to the one or more member profiles indicated by the disambiguating the at least one search term and corresponding to the primary query data, including at least:
elevating at least one search result of at least one member profile at least partly based on the at least one location, the at least one location derived from at least some international mobile subscriber identity ("IMSI") data of at least one device transmitting the at least one search term accepted as the primary query data and indicating that the at least one user is present at the at least one location; and
presenting, for display to the at least one user, one or more attributes of the one or more members of the electronic network at least partly based on the ranking the one or more search results in association with the at least one location and at least partly based on the at least one of the network-participation identifier data or the device-identifier data corresponding to the one or more member profiles indicated by the disambiguating the at least one search term,
wherein at least one of the accepting, obtaining, disambiguating, ranking, or presenting is at least partly implemented using at least one processing device.

* * * * *

UNITED STATES PATENT AND TRADEMARK OFFICE
CERTIFICATE OF CORRECTION

PATENT NO. : 10,523,618 B2
APPLICATION NO. : 13/374246
DATED : December 31, 2019
INVENTOR(S) : Marc E. Davis et al.

Page 1 of 1

It is certified that error appears in the above-identified patent and that said Letters Patent is hereby corrected as shown below:

In the Claims

Column 90, Line 46, Claim 8:
REPLACE "the least one location obtained"
WITH --the at least one location obtained--

Column 91, Line 64, Claim 14:
REPLACE "the least one location obtained"
WITH --the at least one location obtained--

Column 92, Line 12, Claim 15:
REPLACE "the least one location obtained"
WITH --the at least one location obtained--

Column 92, Line 28, Claim 16:
REPLACE "the least one location obtained"
WITH --the at least one location obtained--

Column 92, Line 56, Claim 18:
REPLACE "the least one location obtained"
WITH --the at least one location obtained--

Column 93, Line 11, Claim 19:
REPLACE "obtaining least one location"
WITH --obtaining at least one location--

Column 93, Lines 12-13, Claim 19:
REPLACE "the least one location obtained"
WITH --the at least one location obtained--

Signed and Sealed this
Thirty-first Day of March, 2020

Andrei Iancu
*Director of the United States Patent and Trademark Office*